United States Patent
Enomoto et al.

(10) Patent No.: US 8,250,643 B2
(45) Date of Patent: Aug. 21, 2012

(54) COMMUNICATION DEVICE, COMMUNICATION SYSTEM, COMMUNICATION METHOD, AND PROGRAM

(75) Inventors: Nobuyuki Enomoto, Tokyo (JP); Hideo Yoshimi, Tokyo (JP); Youichi Hidaka, Tokyo (JP)

(73) Assignee: NEC Corporation, Tokyo (JP)

( * ) Notice: Subject to any disclaimer, the term of this patent is extended or adjusted under 35 U.S.C. 154(b) by 1197 days.

(21) Appl. No.: 11/885,249

(22) PCT Filed: Feb. 23, 2006

(86) PCT No.: PCT/JP2006/303294
§ 371 (c)(1),
(2), (4) Date: Aug. 28, 2007

(87) PCT Pub. No.: WO2006/093021
PCT Pub. Date: Sep. 8, 2006

(65) Prior Publication Data
US 2008/0137855 A1 Jun. 12, 2008

(30) Foreign Application Priority Data
Feb. 28, 2005 (JP) ................................ 2005-054953

(51) Int. Cl.
*G06F 9/00* (2006.01)
(52) U.S. Cl. .......................................... 726/12; 726/15
(58) Field of Classification Search .................... 726/12, 726/15
See application file for complete search history.

(56) References Cited

U.S. PATENT DOCUMENTS

| 5,519,699 A | 5/1996 | Ohsawa |
|---|---|---|
| 6,829,238 B2 | 12/2004 | Tokuyo et al. |
| 2002/0035681 A1* | 3/2002 | Maturana et al. ............. 713/151 |
| 2003/0235206 A1 | 12/2003 | Heller |
| 2006/0005240 A1* | 1/2006 | Sundarrajan et al. .......... 726/15 |

FOREIGN PATENT DOCUMENTS

| CA | 2 368 513 A1 | 9/2001 |
|---|---|---|
| JP | 07-177177 | 7/1995 |
| JP | 07-250100 | 9/1995 |
| JP | 2001-244957 | 9/2001 |
| JP | 2003-069615 | 3/2003 |
| JP | 2003-526266 A | 9/2003 |

(Continued)

OTHER PUBLICATIONS

SoftEther.com, SoftEther VPN System, http://www.softether.com/jp/overview/virtual, pp. 1-4 (2004).

(Continued)

*Primary Examiner* — Christopher Brown
(74) *Attorney, Agent, or Firm* — Young & Thompson

(57) ABSTRACT

A TCP 2003 is terminated in an intermediate driver 2006 within a gateway device 20, a TCP 3003 is terminated in an intermediate driver 3006 within a gateway device 30, and a frame is transferred between the intermediate drivers with a method not causing a congestion control such as a UDP. Besides, an SSL session is constructed between an SSL 2002 and an SSL 3002, and upon completing construction of the session, a public key and a secret key are sent by means of an Ethernet frame from a processing speed acceleration engine control to a processing speed acceleration engine. Thus, the gateway device transfers the frame not through a CPU but by employing the processing speed acceleration engine within an NIC in later communication between a terminal 21 and a server 31.

16 Claims, 27 Drawing Sheets

FOREIGN PATENT DOCUMENTS

| | | |
|---|---|---|
| JP | 2004-304696 A | 10/2004 |
| JP | 2004-533138 A | 10/2004 |
| JP | 2004-328066 | 11/2004 |

OTHER PUBLICATIONS

MPC885 PowerQUICC Processor Family, Overview, pp. 1-2, Freescale Semiconductor, Rev 4.

Yamanegi et al., "TCP Proxy Kiko no Jitsu-network-jo deno Jisso Hyoka," IEICE Tech Rep, vol. 104, No. 658, pp. 7-12 (Feb. 10, 2005).

"Why TCP Over TCP is a Bad Idea," http://sites.inka.de/sites/bigred/devel/tcp-tcp.html (Apr. 23, 2001).

JP Office Action dated Apr. 6, 2011.

* cited by examiner

COMMUNICATION DEVICE, COMMUNICATION SYSTEM, COMMUNICATION METHOD, AND PROGRAM

APPLICABLE FIELD IN THE INDUSTRY

The present invention relates to a communication technology, and more particularly to a or enhancing a transfer speed of data, and accommodating data at a large scale in Ether-over-SSL communication.

BACKGROUND ART

At first, a prior art 1 will be explained. Conventionally, the technology has been proposed for mutually connecting a plurality of intranets mutually connected via Internet etc. by the Ether-over-SSL communication so that they can be utilized as an identical LAN segment (Non-patent document 1).

FIG. 1 is a block diagram illustrating a configuration of a network in such a prior art.

An Internet 1, which is configured of a session relay device 10, a Firewall 23, and a Firewall 33, or other appliances, is a wide area network (WAN) for making communication between each of these apparatuses and the other. In FIG. 1, each of the apparatuses within the Internet 1 is mutually connected to the other via a HUB 11, and is also connected to an intranet 2 or an intranet 3 via the Firewall 23 or the Firewall 33.

The session relay device 10 is a computer having SoftEther virtual-HUB software installed. The session relay device 10 is connected to each apparatus within the Internet 1 via the HUB 11. The session relay device 10 performs a session relay operation of transferring an Ethernet frame flowing into an SSL session that is established between a gateway device 20 and the session relay device 10 to an SSL session that is established between a gateway device 30 and the session relay device 10, or contrarily, of transferring the Ethernet frame flowing into the SSL session that is established between the gateway device 30 and the session relay device 10 to the SSL session that is established between the gateway device 20 and the session relay device 10.

The HUB 11 performs a bridging operation of making a reference to an MAC DA header of the Ethernet frame input from each device of the session relay device 10, the Firewall 23, and the Firewall 33, and transfer it to an appropriate destination port (appropriate device).

The intranet 2, which is configured of the gateway device 20, a terminal 21, a HUB 22, and the Firewall 23, is a local area network (LAN) for making communication between each of these apparatuses and the other. The intranet 2 is mutually connected to the Internet 1 via the Firewall 23, and an operation of the Firewall 23 allows communication between the Internet 1 and the intranet 2 to be restricted according to a predetermined setting.

Each of the devices within the intranet 2, which is mutually connected to the other via the HUB 22, can make communication freely without restriction by the foregoing Firewall 23 etc. Further, in the figure, the intranet 2 and an intranet 3 are mutually connected with each other by the gateway device 20, the gateway device 30, and the session relay device 10 so that they operate as an identical LAN, whereby communication between each device within the intranet 2 and each device within the intranet 3 as well can be made freely without restriction by the foregoing Firewall 23 etc.

The gateway device 20 is a computer having a SoftEther client installed. The gateway device 20 is connected to each apparatus within the intranet 2 via the HUB 22. The gateway device 20 performs a gateway operation of transferring the Ethernet frame flowing in the intranet 2 into the SSL session that is established between the gateway device 20 and the session relay device 10, or contrarily, of transferring the Ethernet frame flowing in the SSL session that is established between the gateway device 20 and the session relay device 10 into the intranet 2.

The terminal 21 is a computer that a user of the intranet uses usually, in which software (for example, an Internet browser, a mailer, etc.) for making communication with each apparatus (for example, a server 31) within the intranet operates. The terminal 21 is connected to each apparatus over the intranet 2 via the HUB 22.

The HUB 22, similarly to the HUB 11, performs a bridging operation of making a reference to the MAC DA header of the Ethernet frame input from each device of the gateway device 20, the terminal 21, and the Firewall 23, and transferring it to an appropriate destination port (appropriate device).

The Firewall 23, which is an apparatus for mutually connecting the intranet 2 and the Internet 1, is connected to each apparatus over the intranet 2 via the HUB 22, and is connected to each apparatus over the Internet 1 via the HUB 11. The Firewall 23 performs an operation of restricting communication between the Internet 1 and the intranet 2 according a predetermined setting. For example, in a case where the apparatus inside the intranet 2 employs a TCP to request a communication start of each apparatus of the Internet 1, the communication after it is freely made in a bi-direction; however, contrarily, in a case where each apparatus of the Internet 1 employs a TCP to request a communication start of each apparatus of the intranet 2, this request is interrupted, and the communication after it is also interrupted in a bi-direction.

The intranet 3, which is configured of the gateway 30, the server 31, a HUB 32, and the Firewall 33, is a local area network (LAN) for making communication between each of these apparatuses and the other. The intranet 3 is mutually connected to the Internet 1 via the Firewall 33, and an operation of the Firewall 33 allows communication between the Internet 1 and the intranet 3 to be restricted according to a predetermined setting.

Each of the devices within the intranet 3, which is mutually connected to the other via the HUB 32, can make communication freely without restriction by the foregoing Firewall 33 etc. Further, in FIG. 1, the intranet 2 and the intranet 3 are mutually connected with each other by the gateway device 20, the gateway device 30, and the session relay device 10 so that they operate as an identical LAN, whereby communication between each device within the intranet 3 and each device within the intranet 2 as well can be made freely without restriction by the foregoing Firewall 33 etc.

The gateway device 30, which has a configuration similar to that of the gateway device 20, and performs an operation similar, is a computer. With figure numerals, each apparatus having the number of 3000th level in the gateway device 30 corresponds to each apparatus having the number of 2000th level in the gateway device 20 as it stands. For example, a configuration and an operation of an intermediate driver 3006 are identical to that of an intermediate driver 2006. The gateway device 30, which has the SoftEther client installed, is connected to each apparatus within the intranet 3 via the HUB 32. The gateway device 30 performs a gateway operation of transferring the Ethernet frame flowing in the intranet 3 into the SSL session that is established between the gateway device 30 and the session relay device 10, or contrarily, of transferring the Ethernet frame flowing in the SSL session that is established between the gateway device 30 and the session relay device 10 into the intranet 3.

The server 31, which is accessed by the terminal within the intranet, is a computer, in which software (for example, a WWW server, a POP server, etc.) for receiving communication from each terminal (for example, the terminal 21) within the intranet operates. The server 31 is connected to each apparatus over the intranet 3 via the HUB 32.

The HUB 32, similarly to the HUB 11 and the HUB 22, performs a bridging operation of making a reference to the MAC DA header of the Ethernet frame input from each device of the gateway device 30, the server 31, and the Firewall 33, and transferring it to an appropriate destination port (appropriate device).

The Firewall 33, which is an apparatus for mutually connecting the intranet 3 and the Internet 1, is connected to each apparatus over the intranet 3 via the HUB 32, and is connected to each apparatus over the Internet 1 via the HUB 11. The Firewall 33 performs an operation of restricting communication between the Internet 1 and the intranet 3 according a predetermined setting. For example, in a case where the apparatus inside the intranet 3 has employed the TCP to request a communication start of each apparatus of the Internet 1, the communication after it is feely made in a bi-direction; however, contrarily, in a case where each apparatus of the Internet 1 has employed the TCP to request a communication start of each apparatus of the intranet 3, this request is interrupted, and the communication after it is also interrupted in a bi-direction.

FIG. 2 is a block diagram illustrating a frame format of an Ethernet frame F20 that is transmitted/received within the intranet 2 (for example, between the terminal 21 and the gateway device 20) and within the intranet 3 (for example, between the server 31 and the gateway device 30) in the network shown in FIG. 1.

LAN MAC F21 indicates a header (a header specified by IEEE802 in addition to MAC DA, MAC SA, and Ethernet TYPE) necessary for making communication by means of a layer 2 (Ethernet: Registered Trademark) over the intranet 2 or the intranet 3.

LAN IP F22 indicates a header (a header specified by IETF in addition to IP DA, IP SA, and IP TYPE) necessary for making communication by means of a layer 3 (IP) over the intranet 2 or the intranet 3.

LAN TCP F23 indicates a header (a TCP header such as a port number and a sequence number) necessary for making communication by the TCP between each of the apparatuses existing within the intranet 2 or the intranet 3 and the other.

LAN DATA F24 is data that is exchanged between items of software that operate in each apparatus existing within the intranet 2 or the intranet 3.

FIG. 3 is a block diagram illustrating a frame format of an Ethernet-over-SSL frame F10 that is transmitted/received between the gateway device 20 and the session relay device 10, and between the gateway device 30 and the session relay device 10 in the network shown in FIG. 1.

INET MAC F11 indicates a header (a header specified by IEEE802 in addition to MAC DA, MAC SA, and Ethernet TYPE) necessary for making communication by means of the layer 2 (Ethernet), being communication (for example, communication between the gateway device 20 and the session relay device 10) that is made between the intranet 2 or the intranet 3, and the Internet 1.

INET IP F12 indicates a header (a header specified by IETF in addition to IP DA, IP SA, and IP TYPE) necessary for making communication by means of the layer 3 (IP), being communication (for example, communication between the gateway device 20 and the session relay device 10) that is made between the intranet 2 or the intranet 3, and the Internet 1.

INET TCP F13 indicates a header (a TCP header such as a port number and a sequence number) necessary for making communication by the TCP, being communication (for example, communication between the gateway device 20 and the session relay device 10) that is made between the intranet 2 or the intranet 3, and the Internet 1.

INET SSL Encrypted DATA F14 is data that is exchanged between items of software that operate in each apparatus (for example, the gateway device 20 or the session relay device 10) in communication (for example, communication between the gateway device 20 and the session relay device 10) that is made between the intranet 2 or the intranet 3, and the Internet 1. This data has been encrypted, so the apparatus that exists in a half way of the path cannot decode the encrypted data to decrypt its content with a method that is employed usually.

In the configuration shown in FIG. 1, the Ethernet frame F20 flowing over the intranet 2 or the intranet 3 is filed into the INET SSL Encrypted DATA F14.

AN OPERATIONAL EXAMPLE OF THE PRIOR ART 1

The case of making communication (frame transfer) from the terminal 21 to the server 31 will exemplified to explain an operation of the prior art 1 by employing FIG. 1.

Herein, it is assumed that communication has been already made between the server 31 and the terminal 21 several times, and that the HUB 22 and the HUB 32 have already learned the MAC addresses of the terminal 21, the server 31, the LAN side of the Firewall 23, the LAN side of the Firewall 33, the gateway device 20, and the gateway device 30. Further, it is assumed that the HUB 11 has already learned the MAC addresses of the WAN side of the Firewall 23, the WAN side of the Firewall 33, and each device of the session relay device 10. In addition hereto, it is assumed that an SSL session (secure TCP session) from the gateway device 20 to the session relay device 10 has been already established, and likewise, it is assumed that an SSL session (secure TCP session) as well from the gateway device 30 to the session relay device 10 has been already established. Further, it is assumed that, in a case where the device (LAN side) inside the intranet has employed the TCP to request a communication start of each device (WAN side) of the Internet, the Firewall 23 and the Firewall 33 allow the TCP communication after it to be freely made in a bi-direction; however, contrarily, in a case where each device (WAN side) of the Internet has employed the TCP to request a communication start of each device (LAN side) of the intranet, the Firewall 23 and the Firewall 33 interrupt this request, and also interrupt the communication after it in a bi-direction.

At first, the terminal 21 transmits a frame addressed to the server 31. This frame has a format of the Ethernet frame F20, in which the MAC address of the server 31 is set to the MAC DA within the LAN MAC F21, and the MAC address of the terminal 21 to the MAC SA within the LAN MAC F21. Further, the IP address of the server 31 is set to the IP DA within the LAN IP F22, and the IP address of the terminal 21 to the IP SA within the LAN IP F22.

Upon receipt of the frame transmitted from the terminal 21, the HUB 22 makes a reference to the MAC DA within F21, and outputs this frame to a port of the gateway device 20 side as it stands based upon a result of learning the past routing because the MAC DA is an MAC address of the server 31.

Upon receipt of the frame from the HUB 22, the gateway device 20 allows this frame to flow to the SSL session pre-established with the session relay device 10. That is, the frame input into the gateway device 20 in a format of F20 is encrypted, then filed into a region of F14, and transferred from the gateway device 20 to the HUB 22 in a format of the Ether-over-SSL frame F10.

At this time, the MAC address of the LAN side of the Firewall 23 is set to the MAC DA within the INET MAC F11, and the MAC address of the gateway device 20 to the MAC SA within F11. Further, the IP address of the session relay device 10 is set to the IP DA within the INET IP F12, and the IP address of the gateway device 20 to the IP SA within F12. There is no alteration to the content of F21 to F24.

Upon receipt of the frame transmitted from the gateway device 22, the HUB 22 makes a reference to the MAC DA within F11, and outputs this frame to a port of the Firewall 23 side as it stands based upon a result of learning the past routing because the MAC DA is an MAC address of the LAN side of the Firewall 23.

Upon receipt of the frame transmitted from the HUB 22, the Firewall 23 makes a reference to the IP DA within F12, rewrites the MAC DA within F11 into the MAC address of the session relay device 10 because the IP DA is an address that exists in the Internet 1 side, further rewrites the MAC SA within F11 into the MAC address of the WAN side of the Firewall 23, and transfers it to the HUB 11 with the frame format of F10 unchanged. There is no alteration to the content of F21 to F24.

Upon receipt of the frame transmitted from the Firewall 23, the HUB 11 makes a reference to the MAC DA within F11, and outputs this frame to a port of the session relay device 10 side as it stands based upon a result of learning the past routing because the MAC DA is an MAC address the session relay device 10.

Upon receipt of the frame from the HUB 11, the session relay device 10 undoes the encryption of F14 for the time being, makes a reference to the MAC DA within F21, and allows this frame to flow to the SSL session pre-established with the gateway device 30 based upon a result of learning the past routing because the MAC DA is an MAC address of the server 31. That is, the frame input into the session relay device 10 in a format of F10, of which the encryption is undone, is converted into a formatted frame having F20, encrypted again, filed into a region of F14 in a format of F10, and transferred in a format of F10 from the session relay device 10 to the HUB 11.

At this time, the MAC address of the WAN side of the Firewall 33 is set to the MAC DA within the INET MAC F11, and the MAC address of the session relay device 10 to the MAC SA within F11. Further, the IP address of the gateway device 30 is set to the IP DA within the INET IP F12, and the IP address of the session relay device 10 to the IP SA within F12. There id no alteration to the content of F21 to F24.

Upon receipt of the frame transmitted from the session relay device 10, the HUB 11 makes a reference to the MAC DA within F11, and outputs this frame to a port of the Firewall 33 side as it stands based upon a result of learning the past routing because the MAC DA is an MAC address of the WAN side of the Firewall 33.

Upon receipt of the frame transmitted from the HUB 11, the Firewall 33 makes a reference to the IP DA within F12, rewrites the MAC DA within F11 into the MAC address of the gateway device 30 because the IP DA is an address that exists in the intranet 3 side, and further rewrites the MAC SA within F11 into the MAC address of the LAN side of the Firewall 33, and transfers it to the HUB 32 with a frame format of F10 unchanged. There is no alteration to the content of F21 to F24.

Upon receipt of the frame transmitted from the Firewall 33, the HUB 32 makes a reference to the MAC DA within F11, and outputs this frame to a port of the gateway device 30 side as it stands based upon a result of learning the past routing because the MAC DA is an MAC address of the gateway device 30.

Upon receipt of the frame in a format of F10 from the HUB 32, the gateway device 30 undoes the encryption of F14, takes out an Ethernet frame F20 filed into F14, and transfers this frame to the HUB 32 in a format of F20.

This frame keeps the state at the time of having been transmitted from the terminal 21 as it stands, in which the MAC address of the server 31 has been set to the MAC DA within the LAN MAC F21, and the MAC address of the terminal 21 to the MAC SA within the LAN MAC F21. Further, the IP address of the server 31 has been set to the IP DA within the LAN IP F22, and the IP address of the terminal 21 to the IP SA within the LAN IP F22.

Upon receipt of the frame from the gateway device 30, the HUB 32 makes a reference to the MAC DA within F21, and outputs this frame to a port of the server 31 side as it stands based upon a result of learning the past routing because the MAC DA is an MAC address of the server 31.

The server 31 receives the frame transmitted from the HUB 32, and a series of the frame transfer from the terminal 21 to the server 31 is completed.

The frame transfer as well from the server 31 to the terminal 21 is realized similarly by tracing the path that is opposite to the above-mentioned path.

By employing the prior art 1 as mentioned above, the terminal 21 and the server 31 can make communication with each other without restriction by the Firewall etc. as if they had existed over an identical LAN.

Continuously, a prior art 2 will be explained. Conventionally, out of the CPUs (Central Processing Unit) that are installed inside a computer, the CPU to which an encryption/decoding function has been added, which is called a security engine, is known (Non-patent document 2).

FIG. 4 is a block diagram illustrating an example of applying the prior art 2 to the computer.

The prior art 2 is applicable to the gateway device 20, the gateway device 30, or the session relay device 10 in the prior art 1 shown in FIG. 1.

In FIG. 4, hardware for executing encryption/decoding, which is referred to as a security engine, is connected to the CPU via a high-speed interface such as a PCI bus. By hardware-process the operation of encryption/decoding in the prior art 1 with this security engine, the higher-speed encryption and decoding can be realized as compared with the conventional software processing.

[Non-patent document 1] SoftEther.com-SoftEther virtual-Ethernet system-SoftEther VPN System, retrieved on Dec. 6, 2004], Internet <URL:http://www.softether.com/jp/>

[Non-patent document 2] "MPC875 Product Summary Page", retrieved on Dec. 6, 2004], Internet URL:http://www.freescale.com/webapps/sps/site/prod_summary.jsp?code=MPC875

DISCLOSURE OF THE INVENTION

The process, which is referred to as encapsulation, of allowing the Ethernet frame to flow into the SSL session, thereby to prepare an Ether-over-SSL frame F10 from the Ethernet frame F20, which is to be performed in the gateway device, is software-executed in the CPU in the prior art 1 shown in FIG. 1 to FIG. 3, whereby there exists the problem that the frame cannot be transferred at a high speed. And, hardware-executing the above-mentioned process as it stands in a simplified way necessitates a large-scale scheme such as a TCP Offload Engine (TOE), which gives rise to the problem as well with an increase in both of a circuit scale and a cost.

In addition hereto, in the prior art 1, not only the encapsulation but also the encryption/decoding process in the SSL are software-executed in the CPU, and this point also gives rise to the problem that the frame cannot be transferred at a high speed.

Further, in the prior art 1, allowing the frame within the intranet to flow to the SSL session necessitates the frame format shown in F10. This format gives rise to the state of [TCP over TCP] in which the TCP process is duplicated in transferring one frame, as apparent from the fact that the TCP header exists in both of F13 and F23. And, it is known that the problem that the transfer performance deteriorates and the frame cannot be transferred at a high speed occurs because a congestion control of the TCP result being duplicated in the TCP over TCP (non-patent document 3).

[Non-patent document 3] "Why TCP Over TCP Is A Bad Idea", retrieved on Dec. 6, 2004], Internet <URL:http://sites.inka.de/sites/bigred/devel/tcp-tcp.html>

In the prior art 2 shown in FIG. 4, the encryption process of the SSL in the prior art 1 can be performed at a high speed by means of the hardware; however the encapsulation process, which cannot be hardware-executed, is still software-executed in the CPU, whereby there still exists the problem that the frame cannot be transferred at a high speed.

Further, the TCP-over-TCP problem as well that occurs in the prior art 1 remains unsolved in the prior art 2.

Adding the hardware for executing the encapsulation besides the security engine necessitates preparing the hardware for the encapsulation besides the security engine, which gives rises to the problem that the cost necessary for the processing speed acceleration augments all the more as compared with the case of executing the encryption/decoding and the encapsulation over identical hardware.

In addition hereto, the hardware for executing such encryption/decoding demands a connection to the CPU via the high-speed bus, and mounting the interface for the high-speed bus gives rise to the problem that the development cost and the member cost of the hardware augment as compared with the case of the low-speed bus.

Thus, the present invention has been accomplished in consideration of the problems, and an object thereof is provide a tunneling communication device, a tunneling communication system, a tunneling communication method, and a tunneling communication program that enable a high-speed transfer of the frame while suppressing the cost.

The first invention for solving the above-mentioned problems, which is a communication system, is characterized in:
mounting a terminating means for terminating a session of a TCP between communication devices for establishing a TCP session to make communication; and
that the terminating means is configured to receive a TCP packet (SYN) that is transmitted from a transmission side of the communication device, to transmit a response packet (SYN+ACK) of this TCP packet to the transmission side, and to transmit a peculiar connection request to a reception side of the communication device.

The second invention for solving the above-mentioned problems is characterized in that, in the above-mentioned first invention, the terminating means is configured to receive the peculiar connection request that is transmitted from the transmission side of the communication device, and to transmit the TCP packet (SYN) to the reception side of the communication device.

The third invention for solving the above-mentioned problems is characterized in that, in one of the above-mentioned first and second inventions, the terminating means is configured to receive the response packet (SYN+ACK) of the TCP packet that is transmitted from the reception side of the communication device, and to transmit a reception confirmation packet of this response packet to the reception side, and to transmit a peculiar connection completion notification to the transmission side of the communication device.

The fourth invention for solving the above-mentioned problems is characterized in that, in one of the above-mentioned first to third inventions, the terminating means is configured to communicate one of the connection request and the connection completion notification by employing a communication method not causing a congestion control.

The fifth invention for solving the above-mentioned problems is characterized in, in one of the above-mentioned first to fourth inventions, between the communication devices, including:
an encryption key acquiring means for acquiring an encryption key that is used in making encrypted communication between the communication devices; and
an encrypting means for preserving the acquired encryption key, and upon receipt of a processing speed acceleration process start command, employing this preserved encryption key to encrypt or decode data that is transmitted/received between the communication devices.

The sixth invention for solving the above-mentioned problems is characterized in that, in one of the above-mentioned first to fifth inventions, each of the transmission side and the reception side of the communication device is configured over a different network, and with a configuration for making communication via a firewall, the terminating means is configured for each network.

The seventh invention for solving the above-mentioned problems, which is a communication system, is characterized in, between communication devices for making encrypted communication, including:
an encryption key acquiring means for acquiring an encryption key that is used in making encrypted communication between the communication devices; and
an encrypting means for preserving the acquired encryption key, and upon receipt of a processing speed acceleration process start command, employing this preserved encryption key to encrypt or decode data that is transmitted/received between the communication devices.

The eighth invention for solving the above-mentioned problems is characterized in that, in one of the above-mentioned fifth to seventh inventions, the encrypting means is configured to encrypt fragmented data, and to decode data that has not been de-fragmented.

The ninth invention for solving the above-mentioned problems, which is a communication device, is characterized in including:
a TCP means for transmitting a TCP packet in establishing a TCP session; and
a terminating means for receiving the TCP packet (SYN), transmitting a response packet (SYN+ACK) of this TCP packet to the TCP means, and transmitting a peculiar connection request to a connectee.

The tenth invention for solving the above-mentioned problems is characterized in that, in the above-mentioned ninth invention, the terminating means is configured to transmit the TCP packet (SYN) to the TCP means in a case of having received the peculiar connection request.

The eleventh invention for solving the above-mentioned problems is characterized in that, in one of the above-mentioned ninth and tenth inventions, in a case of having received the response packet (SYN+ACK) of the TCP packet from the TCP means, the terminating means is configured to transmit a reception confirmation packet of this response packet to the TCP means, and to transmit a peculiar connection completion notification to the connectee.

The twelfth invention for solving the above-mentioned problems is characterized in that, in one of the above-mentioned ninth to eleventh inventions, the terminating means is configured to transmit/receive one of the connection request and the connection completion notification by employing a communication method not causing a congestion control.

The thirteenth invention for solving the above-mentioned problems is characterized in, in one of the above-mentioned ninth to twelfth inventions, including:
an encryption key acquiring means for acquiring an encryption key that is used in making encrypted communication; and
an encrypting means for preserving the acquired encryption key, and after receiving of a processing speed acceleration process start command, employing this preserved encryption key to encrypt or decode data that is transmitted/received between the communication devices.

The fourteenth invention for solving the above-mentioned problems, which is a communication device for making encrypted communication, is characterized in including:
an encryption key acquiring means for acquiring an encryption key; and
an encrypting means for preserving the acquired encryption key, and upon receipt of a processing speed acceleration process start command, employing this preserved encryption key to encrypt or decode the data.

The fifteen invention for solving the above-mentioned problems is characterized in that, in one of the above-mentioned thirteenth and fourteenth inventions, the encrypting means is configured to encrypt fragmented data, and to decode data that has not been de-fragmented.

The sixteenth invention for solving the above-mentioned problems, which is a communication method, is characterized in including:
a TCP reception step of receiving a TCP packet (SYN);
a response packet transmission step of transmitting a response packet (SYN+ACK) of the received TCP packet; and
a connection request transmission step of transmitting a peculiar connection request.

The seventeen invention for solving the above-mentioned problems is characterized in, in the above-mentioned sixteenth invention, including:
a connection request reception step of receiving the transmitted connection request; and
a step of transmitting the TCP packet (SYN) after receiving the connection request.

The eighteenth invention for solving the above-mentioned problems is characterized in, in one of the above-mentioned sixteenth and seventeenth inventions, including:
a response packet reception step of receiving the response packet (SYN+ACK) of the transmitted TCP packet;
a reception confirmation transmission step of transmitting a reception confirmation packet of the response packet; and a connection completion notification transmission step of transmitting a peculiar connection completion notification after transmitting the reception confirmation packet.

The nineteenth invention for solving the above-mentioned problems is characterized in that, in one of the above-mentioned sixteenth to eighteenth inventions, each of the connection request transmission step and the connection completion notification transmission step is a step of transmitting one of the connection request and the connection completion notification by employing a communication method not causing a congestion control.

The twentieth invention for solving the above-mentioned problems is characterized in, in one of the above-mentioned sixteenth to nineteenth inventions, including:
an encryption key acquisition step of acquiring an encryption key that is used in making encrypted communication;
a step of receiving a processing speed acceleration process start command; and
an encryption step of preserving the acquired encryption key, and employing this preserved encryption key to encrypt or decode data that is transmitted/received between the communication devices.

The twenty-first invention for solving the above-mentioned problems, which is a method of employing encrypted communication to make communication, is characterized in including:
an encryption key acquisition step of acquiring an encryption key that is used in making encrypted communication;
a step of receiving a processing speed acceleration process start command; and
an encryption step of preserving the acquired encryption key, and employing this preserved encryption key to encrypt or decode data that is transmitted/received between the communication devices.

The twenty-second invention for solving the above-mentioned problems is characterized in that, in the above-mentioned twenty-first invention, the encryption step includes the steps of:
encrypting fragmented data; and
decoding data that has not been de-fragmented.

The twenty-third invention for solving the above-mentioned problems, which is a program of an information processing device, is characterized in causing the information processing device to function as:
a TCP means for transmitting a TCP packet in establishing a TCP session; and
a terminating means for receiving the TCP packet (SYN), transmitting a response packet (SYN+ACK) of this TCP packet to the TCP means, and transmitting a peculiar connection request to a connectee.

The twenty-fourth invention for solving the above-mentioned problems is characterized in that, in the above-mentioned twenty-third invention, in a case of having received the peculiar connection request, the terminating means is caused to function as means for transmitting the TCP packet (SYN) to the TCP means.

The twenty-fifth invention for solving the above-mentioned problems is characterized in that, in one of the above-mentioned twenty-third and twenty-fourth inventions, in a case of having received the response packet (SYN+ACK) of the TCP packet from the TCP means, the terminating means is caused to function as means for transmitting a reception confirmation packet of this response packet to the TCP means, and to transmit a peculiar connection completion notification to the connectee.

The twenty-sixth invention for solving the above-mentioned problems is characterized in that, in one of the above-mentioned twenty-third to twenty-fifth inventions, the terminating means is caused to function as means for transmitting/receiving one of the connection request and the connection completion notification by employing a communication method not causing a congestion control.

Each of the gateway device and the session relay device of the present invention, which includes a processing speed acceleration engine control for establishing an SSL session, and distributing a public key, a secret key, and a common key to a processing speed acceleration engine, an intermediate driver for generating a control frame for terminating a process of the TCP, or taking a control of the processing speed acceleration engine, and the processing speed acceleration engine for performing an encryption process, a decoding process and an encapsulation process by means of the hardware, operates so as to hardware-process the frame transfer after establishing the SSL session. By employing such a configuration to realize the encapsulation process and encryption/decoding process, which are originally to be performed by means of the CPU (software process), by means of the processing speed acceleration engine (hardware) for the processing speed acceleration, the above-mentioned problems are solved.

The gateway device of the present invention, which includes a gateway application for establishing the SSL session and notifying session information to the intermediate driver, and an intermediate driver for terminating the TCP and preparing a frame not causing the congestion control, operates so as to prevent the congestion control and the retransmission control due to the TCP at a position of the header F13 from occurring. By employing such a configuration to avoid occurrence of the TCP-over-TCP problem for the processing speed acceleration, the above-mentioned problems are solved.

Each of the terminal and server of the present invention, which includes an intermediate driver for terminating the TCP and preparing a frame not causing the congestion control, operates so to prevent the congestion control and the retransmission control due to the TCP at a position of the header F23 from occurring. By employing such a configuration to avoid occurrence of the TCP-over-TCP problem for the processing speed acceleration, the above-mentioned problems are solved.

Each of the gateway device of the present invention, which includes a capsulation process for establishing the TCP session based upon a request by the intermediate driver, and the terminal of the present invention, which includes an intermediate driver for terminating the TCP, and further requesting the encapsulation process to construct the TCP session, operates so as to terminate the TCP by the intermediate driver and to re-establish the TCP session with the encapsulation process so that the congestion control and the retransmission control due to the TCP at a position of the header F23 are prevented from occurring. By employing such a configuration to avoid occurrence of the TCP-over-TCP problem for the processing speed acceleration, the above-mentioned problems are solved.

Each of the gateway device of the present invention, which includes a capsulation process for establishing the TCP session based upon a request by the intermediate driver, and an IP stack for rewriting the IP address and the MAC address based upon a request by the intermediate driver, and the terminal of the present invention, which includes an intermediate driver for terminating the TCP, and further requesting the encapsulation process to construct the TCP session, operates so as to terminate the TCP by the intermediate driver and to re-establish the TCP session with the encapsulation process so that the congestion control and the retransmission control due to the TCP at a position of the header F23 are prevented from occurring. By employing such a configuration to avoid occurrence of the TCP-over-TCP problem for the processing speed acceleration, the above-mentioned problems are solved.

Each of the gateway device and the session relay device of the present invention, which includes a gateway application for establishing the SSL session, and distributing a public key, a secret key, and a common key to the processing speed acceleration engine, and a processing speed acceleration engine for performing an encryption process, a decoding process and an encapsulation process by means of the hardware, operates so as to hardware-process the encryption and the decoding after establishing the SSL session. By employing such a configuration to realize the encryption/decoding process, which is originally to be performed by means of the CPU (software process), by means of the processing speed acceleration engine (hardware) for the processing speed acceleration, the above-mentioned problems are solved.

The gateway device of the present invention, which includes a gateway application for establishing the SSL session, and distributing a public key, a secret key, and a common key to the processing speed acceleration engine or the intermediate driver, and an intermediate driver for terminating the TCP, and a processing speed acceleration engine for performing the encryption/decoding process by means of the hardware, operates so as to hardware-process the encryption/decoding after establishing the SSL session. By employing such a configuration to realize the encryption/decoding process, which is originally to be performed by means of the CPU (software process), by means of the processing speed acceleration engine (hardware) for the processing speed acceleration, the above-mentioned problems are solved.

BEST MODE FOR CARRYING OUT THE INVENTION

[First Embodiment]

Figure 33:
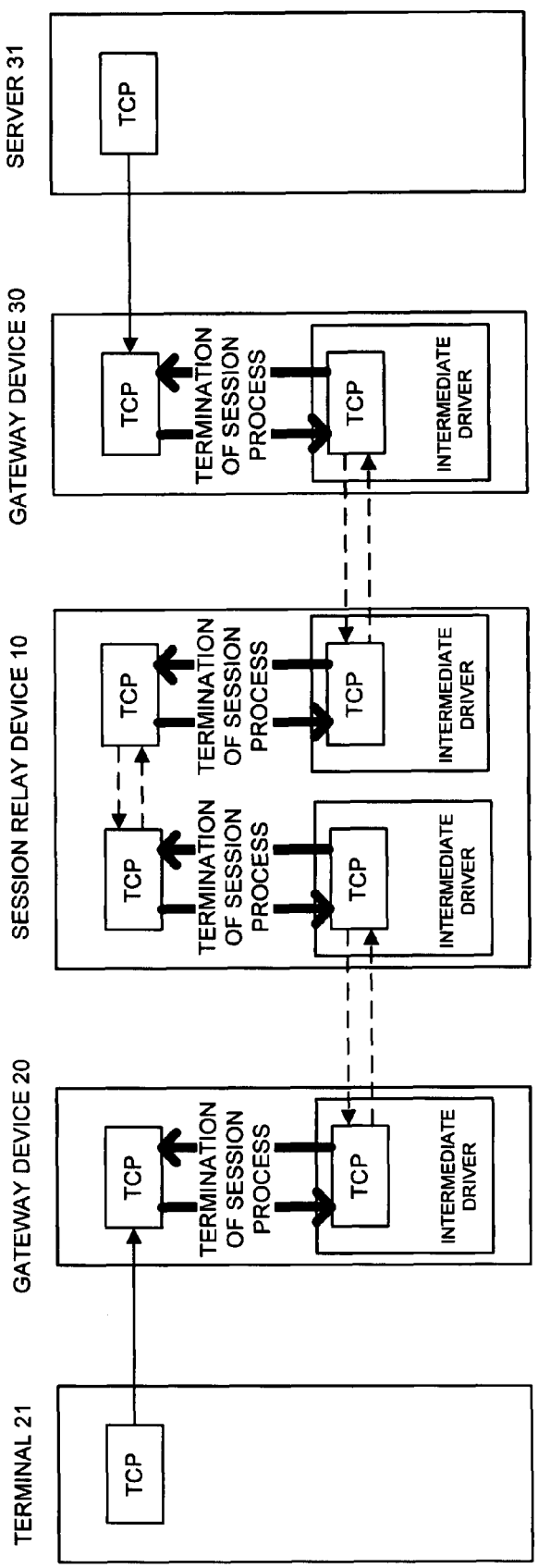
FIG. 33 is a view for explaining characteristics of the present invention.

In the first embodiment of the present invention, as shown in FIG. 33, in establishing the SSL session, a TCP session is established between a TCP of a CPU 100 within a session relay device 10 and a TCP of the intermediate driver, and a TCP session is further established between a TCP of the gateway device 20 and a TCP of the intermediate driver so as to prevent the congestion control in the TCP from being taken between the session relay device 10 and the gateway device 20. Likewise, a TCP session is established between a TCP of the CPU 100 within the session relay device 10 and a TCP of the intermediate driver, and a TCP session is further established between a TCP of a CPU 200 within the gateway device 30 and a TCP of the intermediate driver so as to prevent the congestion control in the TCP from being taken between the session relay device 10 and the gateway device 20. Further, likewise, a TCP session is established between a TCP of a CPU within the gateway device 10 and a TCP of the intermediate driver so as to prevent the congestion control in the TCP from being taken between the session relay device 10 and the gateway device 10. Additionally, in the present invention, establishment of the TCP session between the TCP within the CPU and the TCP of the intermediate driver is referred to as termination of the session of the TCP.

Besides, an NIC (Network Interface Card) 201 within the gateway device 20 includes the processing speed acceleration engine. With these, the encapsulation process and the encryption/decoding process in the gateway device 20 is performed at a high speed, the TCP-over-TCP problem is avoided in addition hereto, the encryption/decoding process and the encapsulation process are realized in an identical location, and further, the devices for these processes are packaged onto a relatively inexpensive interface within the NIC, thereby realizing a price reduction.

Figure 1:
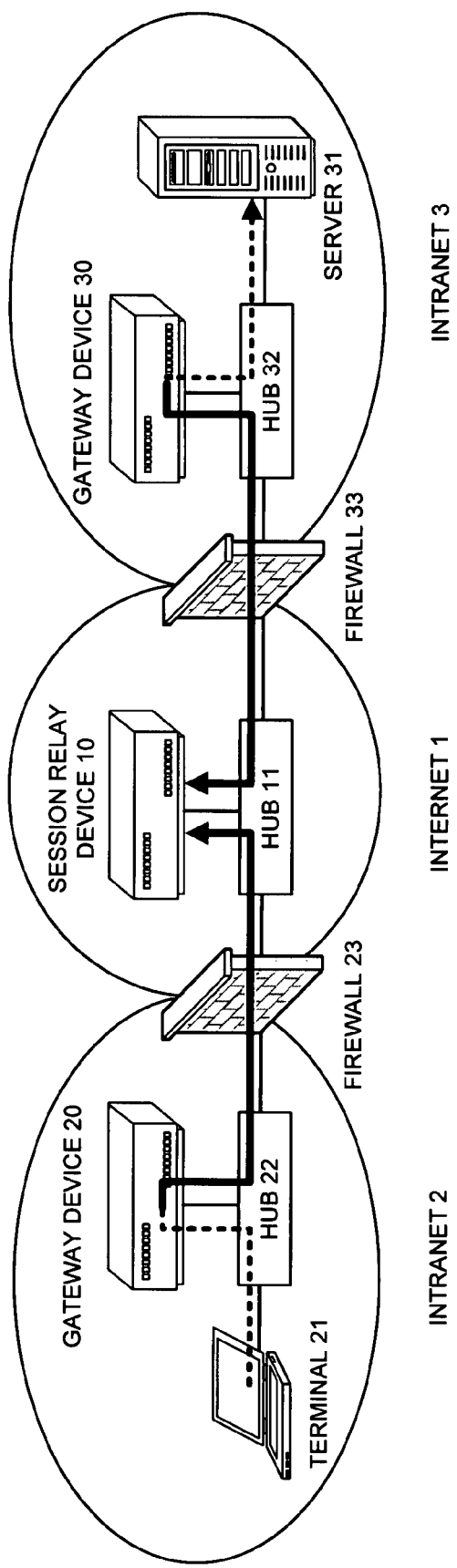
FIG. 1 is a block diagram illustrating a network configuration example of the prior art 1.

A network configuration of the first embodiment is similar to that of the prior art 1 shown in FIG. 1.

An internal configuration of the gateway device 20 and the session relay device 10, however, differs from that of the prior art.

[Explanation of a Configuration]

Figure 5:
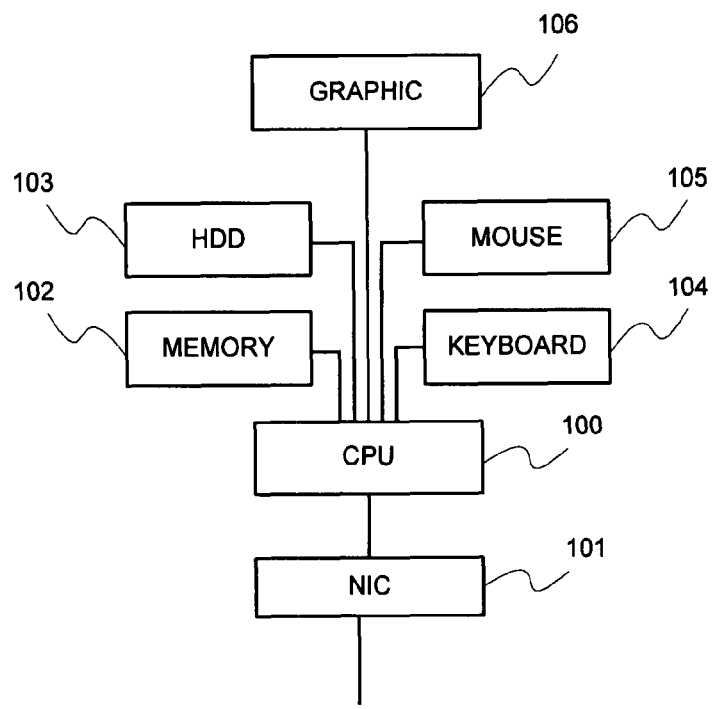
FIG. 5 is a block diagram illustrating a configuration of the session relay device 10 that is a first embodiment of the present invention.

FIG. 5 is a block diagram illustrating a configuration of the session relay device 10 in details in the first embodiment.

The session relay device 10 is configured of a CPU 100, an NIC 101, a memory 102, an HDD 103, a keyboard 104, a mouse 105, and a graphic 106.

The CPU 100, which is referred to as a central processing device, is hardware for loading software (program) recorded into the HDD 103, and executing the process described in the program by employing the memory 102. In this process, the CPU 100 receives a command by a user from the keyboard 104 and the mouse 105, and in addition hereto, outputs a result to the graphic 106 in some cases. Further, it receives data from the NIC 101, or outputs data to the NIC 101 in some cases.

The NIC 101, which is referred to as a Network Interface Card, is hardware that is inserted into a computer for a purpose of connecting a cable for the network such as Ethernet. It receives a frame (data) from the network (the cable such as an Ethernet cable) and transmits it the CPU 100 via the interface such as a bus, and in addition hereto, contrarily, receives the frame (data) via the interface such as a bus from the CPU 100, converts it into a frame suitable for the network, and sends out it to the network (the cable such as an Ethernet cable).

The memory 102 is a volatile memory device that is utilized at the moment that the CPU 100 executes the software process. Further, it preserves data sent together with a write command from the CPU 100 in a designated address. And, upon receipt of a read command from the CPU 100, the memory 102 reads out the data from a designated address, and sends out it to the CPU. Usually, the memory 102 has volatility that the storage content is lost when a power is switched off.

The HDD 103, which is referred to as a hard disc drive, is a non-volatile memory device for storing the software (program). It preserves data sent together with a write command from the CPU 100 in a designated address. And, upon receipt of a read command from the CPU 100, the HDD 103 reads out data from a designated address, and forwards it to the CPU. The non-volatile storage device is a storage device of which the storage content is not lost even though the power is switched off, and in this embodiment, the HDD is employed as a representative of non-volatile storage device for explanation. Additionally, the similar operation can be realized even though non-volatile storage devices (a flash memory, a floppy disc: Registered Trademark, a magnetic tape, etc.) other than the HDD are employed.

The keyboard 104 is an input device for converting a command input by pressing a key by a user into an electric signal, and conveying it to the CPU 100.

The mouse 105 is an input device for converting a command input by moving the mouse 105 by a user into an electric signal, and conveying it to the CPU 100.

The graphic 106 is hardware that is inserted into a computer, or is packaged onto a main substrate for a purpose of receiving a depict command from the CPU 100 to convert it into a signal suitable for display devices such as a Braun tube and a liquid crystal screen.

Figure 6:
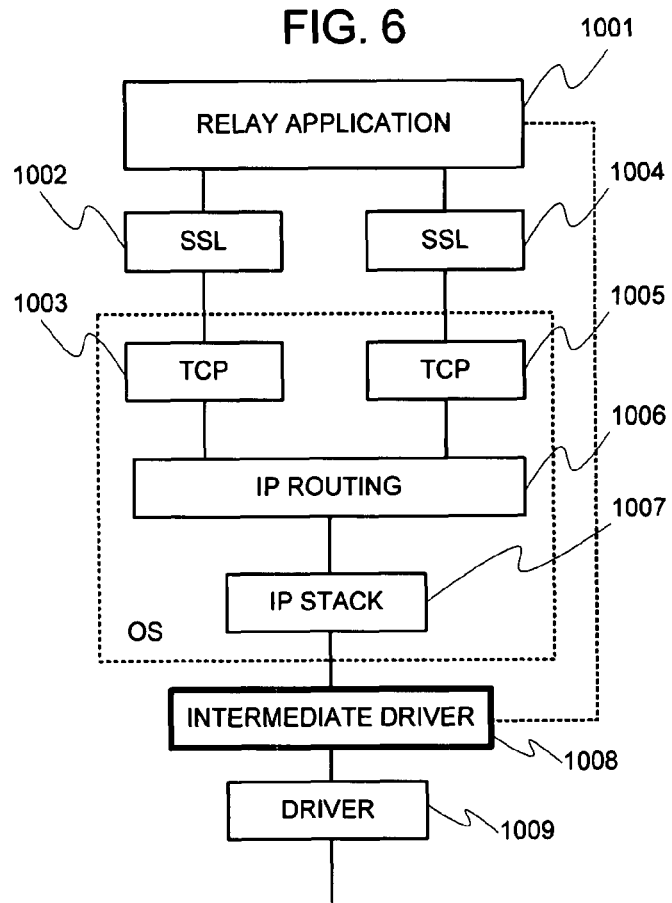
FIG. 6 is a block diagram illustrating a software configuration within a CPU 100 in the first embodiment of the present invention.

FIG. 6 is a block diagram illustrating a configuration of the software that operates within the CPU 100 in FIG. 5.

The software that operates within the CPU 100 is configured of a relay application 1001, an SSL 1002, a TCP 1003, an SSL 1004, a TCP 1005, an IP routing 1006, an IP stack 1007, an intermediate driver 1008, and a driver 1009.

Out of the software listed in FIG. 6, each of the TCP 1003, the TCP 1005, an IP routing 1006, and the IP stack 1007 is software that is usually included in OS (Operating System) such as Windows®, Linux, and BSD. In particular, with the Windows, as a rule, the user cannot rewrite a program of this software.

As a matter of fact, many items of software other than the software shown in FIG. 6 operate within the CPU 100; however software having no relation with the present invention is omitted in FIG. 6.

Figure 9:
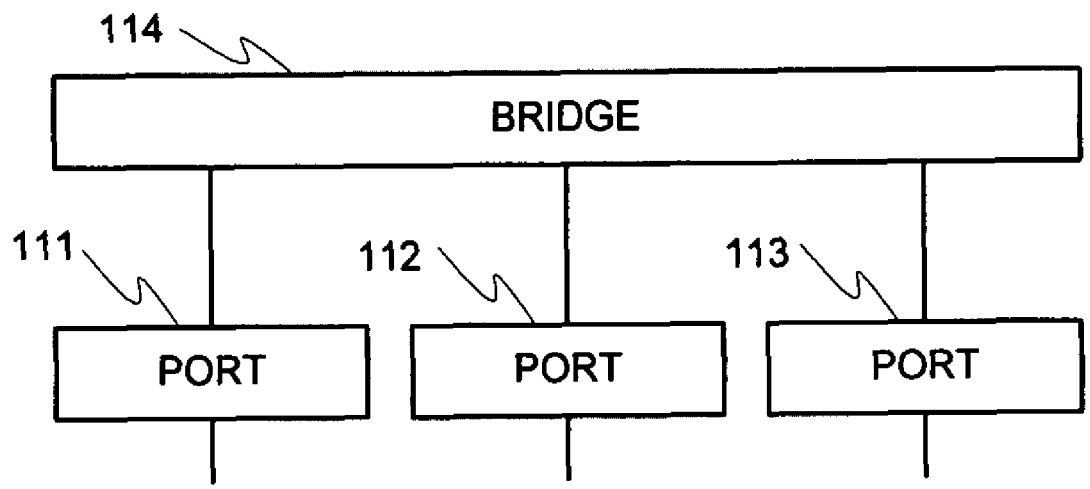
FIG. 9 is a block diagram illustrating a configuration of the HUB 11 in the first embodiment of the present invention.

The relay application 1001 is frame transfer software for realizing an operation similar to that of a bridge 114 within the HUB 11 in FIG. 9 by means of the software. It is referred to as a virtual HUB in the prior art 1.

The relay application 1001 receives data (frame) from the SSL 1002 or the SSL 1004, makes a reference to a destination MAC address (MAC DA), thereby to select an SSL, being a transferee, and transfers the received frame to an appropriate SSL (the SSL 1002 or the SSL 1004) as it stands. In addition hereto, it has a function of making a reference to a transmission source MAC address (MAC SA) at the time of receiving the frame, learning the MAC address, and recording which MAC address a terminal has and which SSL side the above terminal is connected to. Supposing that the relay application 1001 has not learned the MAC address even though it has made a reference to the destination MAC address at the time of receiving the frame, it has a function of broadcasting the frame to all SSLs other than the SSL into which the frame has been input.

Further, the relay application 1001 notifies an IP address of the apparatus (the gateway device 20 and the gateway device 30 in FIG. 1) that becomes a partner of the SSL session, or a transmission source port number and a destination port number of the SSL session to a setting manager 1008L within the intermediate driver 1008. This notification is made not only at the time of establishing and disconnecting the session but also periodically.

The SSL 1002 has a function of receiving data (frame) from the relay application 1001, encrypting it, and sending it to the TCP 1003, or receiving the data from the TCP 1003, decoding it, and sending it to the relay application 1001, and a function of exchanging information of the certificate, the public key, the secret key, the common key, or the like that is employed for encryption. Whether to use the SSL or not is decided according to the setting from the relay application 1001, and the SSL 1002 has a function of, in a case where the SSL is not used, sending the data transmitted by the relay application 1001 to the TCP 1003 as it stands without encrypting it, and further sending the data transmitted by the TCP 1003 to the relay application 1001 as it stands without decoding it.

In this embodiment, usually, the setting is made so that the data is encrypted.

The TCP 1003 has a function of arranging data into formatted data having a constant format, thereby to packetize it with the normal TCP processes as shown in the following (1) to (4), or recovering the data from the packet.

(1) It receives the data from the SSL 1002, or the relay application 1001 in the case that the SSL 1002 is not used, adds the TCP header for detecting a missing of the packet and a reversal of the sequence to this data, and sends it to the IP routing 1006. Herein, the data, of which size is large, is division-processed (also referred to as "is fragmented").

(2) It receives the packet from the IP routing 1006, and makes a reference to the TCP header, thereby to detect a reversal of the sequence and a missing of the packet. And, in a case where not only a reversal of the sequence but also a missing has not occurred, it removes the TCP header from the packet, and sends the packet to the SSL 1002, or to the relay application 1001 in a case where the SSL 1002 is not used. At this moment, it gives a reception confirmation packet (ACK packet) for notifying arrival of the packet as a reply with the transmission source of the packet set to a destination.

(3) In (2), supposing that a missing of the packet has occurred, it transmits a re-sending request packet. Further, in a case where a reversal of the sequence or a fragment has occurred, it waits for the packet that is to arrive later, and recovers the data.

(4) It transmits a TCP session establishment request (SYN packet) in establishing the TCP session, receives an ACK packet transmitted responding hereto, and regulates a transmission speed of the packet in (1), thereby to take the congestion control.

The SSL 1004 performs an operation similar to that of the SSL 1002.

The TCP 1005 performs an operation similar to that of the TCP 1003.

The IP routing 1006 has a function of receiving the packet from the TCP 1003, the TCP 1005, or the IP stack 1007, makes a reference to the destination IP address and the destination port number, and transfer the packet to the IP stack 1007, the TCP 1003, or the TCP 1005.

The IP stack 1007 has functions shown below.

(1) It receives the packet from the IP routing 1006, adds the Ethernet header such as the MAC address hereto, thereby to generates a frame, and delivers it to the intermediate driver 1008.

(2) It removes the MAC header from the frame received from the intermediate driver 1008, and delivers the frame to the IP routing 1006.

(3) It transmits/receives an ARP protocol for a purpose of deciding the MAC address etc. that is added in (1).

(4) It receives the settings necessary for IP communication, for example, the IP address, a default route, and a net mask by a DHCP protocol or a manual setting, and manages them.

The intermediate driver 1008 has four functions listed below. Additionally, the details of a configuration will be described later.

(1) It has a TCP processing function and terminates the TCP process with the TCP 1003 or the TCP 1005. Additionally, the so-called termination of the TCP process signifies performing a series of the processes for establishing the TCP session between the TCP 1003 or the TCP 1005 and the TCP within the intermediate driver 1008.

(2) It has a fragmentation processing function (a fragmentation process and a fragment assembly process), divides the frame in a case where size of the frame flowing to the driver 1009 side is large, or performs a assembly process in a case where the frame that arrives from the driver 1009 side has been pre-divided.

(3) It has an encapsulation function and a de-encapsulation function, adds an appropriate header to the packet that is sent from the IP stack 1007 side, or modifies the header into a header having an appropriate value, and transfers it to the driver 1009 side. Further, it deletes the header from the frame that is sent from the driver 1009 side, or modifies the header into a header having an appropriate value, and transfers it to the IP stack 1007 side.

(4) It receives information necessary for identifying the frame that becomes an object of the processes of the above-mentioned (1) to (3) from the relay application 1001.

(5) It prepares a control frame based upon a request by the application, and transmits it to the driver 1009. Further, it receives the control frame that has arrived from the driver 1009, and notifies its effect to the application.

The driver 1009, which is software for mediating between the NIC 101 and each of various items of software that operate within the CPU 100, has a function of receiving the frame from the NIC 101 and sending it to the intermediate driver 1008 or the IP stack 1007, and further has a function of receiving the frame from the intermediate driver 1008 or the IP stack 1007 and sending it to the NIC 101.

Figure 7:
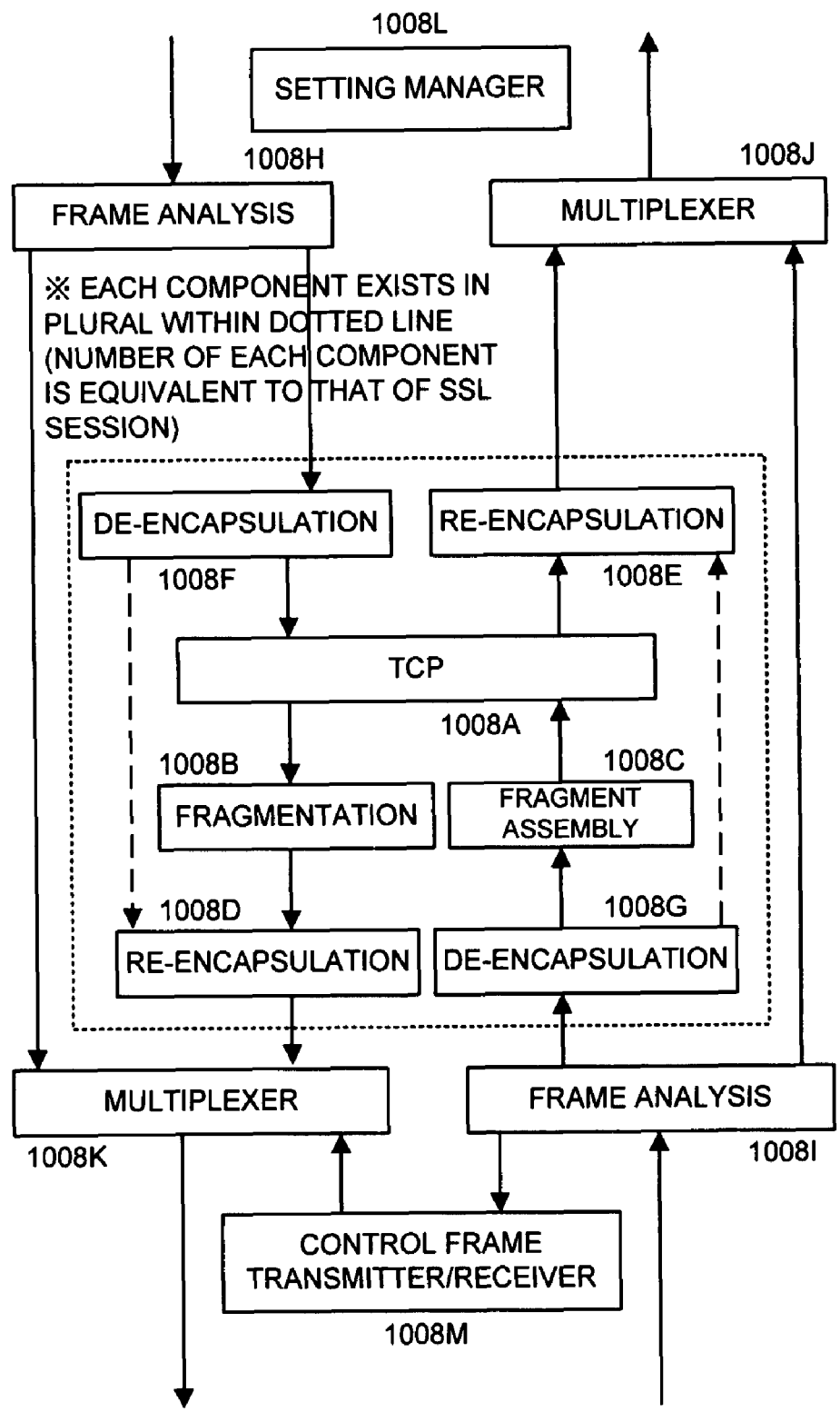
FIG. 7 is a block diagram illustrating a configuration of an intermediate driver 1008 in the first embodiment of the present invention.

FIG. 7 is a block diagram having an internal configuration of the intermediate driver 1008 in FIG. 6 described in details.

The intermediate driver 1008 is configured of a TCP 1008A, a fragmentation 1008B, a fragment assembly 1008C, a re-encapsulation 1008D, a re-encapsulation 1008E, a de-encapsulation 1008F, a de-encapsulation 1008G, a frame analysis 1008H, a frame analysis 1008I, a multiplexer 1008J, and a multiplexer 1008K.

There is the case that, out of the components of the intermediate driver 1008, each component of the TCP 1008A, the fragmentation 1008B, the fragment assembly 1008C, the re-encapsulation 1008D, the re-encapsulation 1008E, the de-encapsulation 1008F, and the de-encapsulation 1008G, of which the number is equal to that of the TCP session for performing the process of establishing the TCP session at a high speed, is mounted in plural. For example, accelerating a processing speed of both of the TCP 1003 and the TCP 1005 in the session relay device 10 necessitates preparing two sets of each component of the intermediate driver 1008. For example, in a case where only the processing speed of the TCP 1003 is accelerated and a conventional transfer speed is employed in the TCP 1005, only one set of each component of the intermediate driver 1008 is enough.

The TCP 1008A performs an operation similar to that of the TCP 1003, and that is, has four functions listed below.

(1) It receives the data from the fragment assembly 1008C, adds the TCP header for detecting a missing of the packet and a reversal of the sequence to this data, and sends it to the re-encapsulation 1008E. Herein, the data, of which size is large, is division-processed (also referred to as "is fragmented").

(2) It receives the packet from the de-encapsulation 1008F, and makes a reference to the TCP header, thereby to detect a reversal of the sequence and a missing of the packet, and in a case where not only a reversal of the sequence but also a missing has not occurred, removes the TCP header from the packet, sends the packet to the fragmentation 1008B. At this moment, it gives an ACK packet for notifying arrival of the packet as a reply to the transmission source of the packet, i.e. the TCP 1003 or the TCP 1005 via the re-encapsulation 1008E.

(3) In (2), supposing that a missing of the packet has occurred, it transmits a re-sending request packet to the TCP 1003 or the TCP 1005 via the re-encapsulation 1008E. Further, in a case where a reversal of the sequence or a fragmentation has occurred, it waits for the packet that is to arrive later, recovers the data (a re-sending wait process and a fragment union process), and transfers it to the fragmentation 1008B.

(4) It receives the packet in line with the TCP specification that is transmitted by the TCP 1003 or the TCP 1005, and regulates a transmission speed of the packet in (1). Upon receipt of the TCP session establishment request (SYN packet), the TCP 1008A generates a connection request packet. Further, upon receipt of the response packet (SYN+ACK packet) to the TCP session establishment request, it gives an ACK packet for this as a reply, and generates a connection completion notification packet. Additionally, each of these connection request packet and connection completion notification packet is not a packet in line with the TCP specification, but a peculiar packet in the communication system of the present invention.

The fragmentation 1008B receives the packet from the TCP 1008A, and transfers it to the re-encapsulation 1008D. At this time, supposing that size of the packet is larger than a pre-set size, it divides (fragments) the packet, and then transfers it the re-encapsulation 1008D.

The fragment assembly 1008C receives the packet from the de-encapsulation 1008G, and transfers it to the TCP 1008A. At this time, supposing that a flag indicating a division has been added to the packet, it preserves the packet for the time being, waits for the packet that is to arrive later, unions the packets, and transfers it to the TCP 1008A. This process is called a fragment assembly process.

The re-encapsulation 1008D adds each header of the INET MAC F11, the INET MAC F12, and the INET MAC F13 to the data (F14 in FIG. 3) that is sent from the fragmentation 1008B, and transfers it to the multiplexer 1008K. The re-encapsulation 1008D is notified of the value of each header of F11 to F13 that is added from the de-encapsulation 1008F. Additionally, it is also possible to set not the TCP header but the UDP header to a position of the INET TCP F13 according to the setting.

The reason why the TCP header F13 is added in the re-encapsulation 1008D is that the packet is prevented from being interrupted due to the Firewall, an NAT router, etc. (the Firewall 23 in a case of an example of FIG. 1) that exists on the communication path. In a case of having set the UDP header to F13, there is a possibility that communication is interrupted if the Firewall, the NAT router, etc. exist on the communication path. The TCP header added in the re-encapsulation 1008D, of which the frame format has a form of the TCP, is not employed for the congestion control and the re-sending control as a matter of fact because the TCP is not an added header. The header F13 that is added herein is, totally, a header for allowing the packet to pass through the Firewall and the NAT, and the actual congestion control and the re-sending control are taken by the TCP (a TCP header portion of F23 in the frame format F10 of FIG. 3) that exists within the terminal 21 or the server 31.

The re-encapsulation 1008E adds the INET MAC header F11 to the data (F12, F13, and F14) that is sent from the TCP 1008A, and delivers it to the multiplexer 1008J. The re-encapsulation 1008E is notified of the value of the headers (F11) that is added from the de-encapsulation 1008G.

The de-encapsulation 1008F deletes the INET MAC F11 header from the formatted packet (having the Ether-over-SSL frame format F10) that is sent from the frame analysis 1008H, and transfers the packet to the TCP 1008A. At this time, it notifies the content of the removed header F11, and the content of each of the header F12 and the header F13 to re-encapsulation 1008D.

The de-encapsulation 1008G deletes each header of the INET MAC F11, the INET IP F12, and the INET TCP F13 from the formatted packet (having the Ether-over-SSL frame format F10) that is sent from the frame analysis 1008I, and transfers the packet to the fragment assembly 1008C. At this time, it notifies the content of each header of the removed F1 to F13 to the re-encapsulation 1008E. Additionally, in a case where not the TCP header but the UDP header has been set to a position of the INET TCP F13 according to the setting, it notifies the content of this UDP header to the re-encapsulation 1008E The frame analysis 1008H receives the frame from the IP stack 1007, determines whether or not the frame is a frame relating to the processing speed acceleration process based upon the MAC address, the IP address, the TCP header, the UDP header, etc., if the frame is a frame relating to the processing speed acceleration of the process of establishing the TCP session, transfers the frame to the de-encapsulation 1008F, and if the frame is another frame, transfers the frame to the multiplexer 1008K. The frame analysis 1008H is notified of information necessary for determining the frame from the relay application 1001 via the setting manager 1008L.

The frame analysis 1008I receives the frame from the driver 1009, determines whether or not the frame is a frame relating to the processing speed acceleration process of the TCP session based upon the MAC address, the IP address, the TCP header, the UDP header, etc., if the frame is a frame relating to the processing speed acceleration process, transfers the frame to the de-encapsulation 1008G, and if the frame is another frame, transfers the frame to the multiplexer 1008J. The frame analysis 1008I is notified of information necessary for determining the frame from the relay application 1001 via the setting manager 1008L.

Further, the frame analysis 1008I receives the frame from the driver 1009, and in a case where the frame is a special frame (hereinafter, referred to as a control frame) relating to a control of the apparatus or the processing speed acceleration engine, transfers this control frame to the control frame transmitter/receiver 1008M. Usually, whether or not the frame is a special frame is determined from the MAC DA and the MAC SA. In a case where the MAC address (called an MAC address for a control. For example, 00004C0000xx) within a pre-specified address range has been described in any of the MAC DA and the MAC SA, it determines that this frame is a control frame.

The multiplexer 1008J receives the frame from the frame analysis 1008I and the re-encapsulation 1008E, and transfers it to the IP stack 1007. At this moment, it performs a buffer operation so as to prevent a missing of the frame due to simultaneous arrival from occurring.

The multiplexer 1008K receives the frame from the frame analysis 1008H and the re-encapsulation 1008D, and transfers it to the driver 1009. At this moment, it performs a buffer operation so as to prevent a missing of the frame due to simultaneous arrival from occurring.

The setting manager 1008M is notified of information (the IP address, the port number, etc.) of the session relating to the processing speed acceleration process from the relay application 1001, and makes the setting to the frame analysis 1008H and the frame analysis 1008I.

The control frame transmitter/receiver 1008L sends a special frame (hereinafter, referred to as a control frame) relating to a control of the apparatus and the processing speed acceleration engine to the multiplexer 1008K, and further receives the control frame from the frame analysis 1008I. The control frame is transmitted by a request by the application such as the processing speed acceleration engine control 2001. Further, the received control frame is transferred to an appropriate application.

Upon summarizing the foregoing, the intermediate driver 1008 performs the process relating to the fragmentation in two locations. The first one is the TCP 1008A, in which the intermediate driver 1008 performs the fragmentation process with the TCP 1003 or the TCP 1005. The second one is the fragmentation 1008B and the fragment assembly 1008C, in which the intermediate driver 1008 performs the fragmentation process with the processing speed acceleration engine 2014.

Herein, it is desirable to prevent the fragmentation process by the intermediate driver 1008, the processing speed acceleration engine 2014, the TCP 1003, and further the TCP 1004 from occurring if circumstances permit. By setting a maximum frame length at a small size level in the TCP 2102 within the terminal 21 if possible, the fragmentation process at the location is prevented from occurring. In particular, the fragment assembly process in the processing speed acceleration engine 2014 requires a complicated hardware configuration, whereby the TCP maximum-frame length within the terminal 21 or the server 31 is set so as to prevent this process from being performed if possible.

Figure 8:
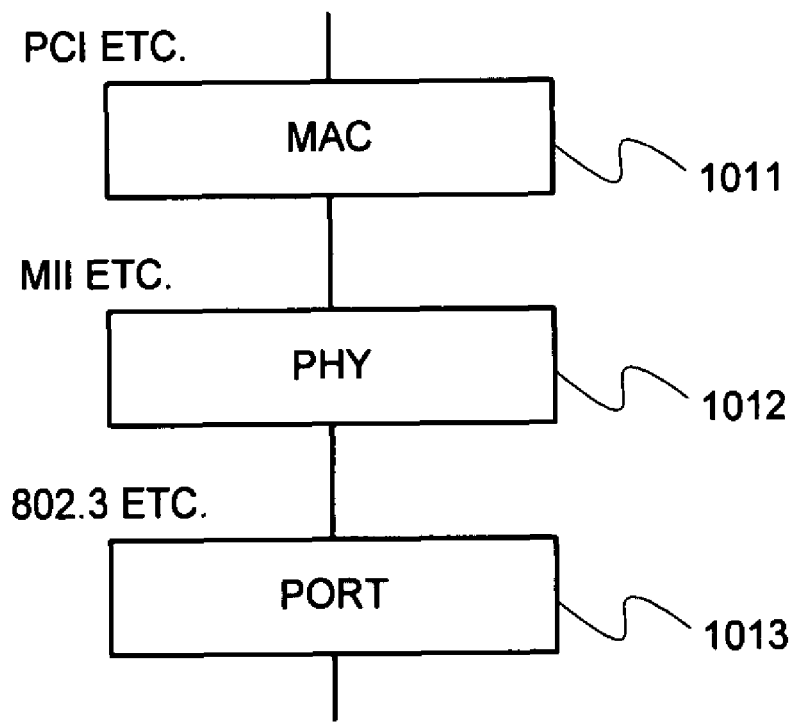
FIG. 8 is a block diagram illustrating a configuration of an NIC 101 in the first embodiment of the present invention.

FIG. 8 is a block diagram having a configuration of the NIC 101 in FIG. 5 shown in details.

The NIC 101 is configured of an MAC 1011, a PHY 1012 and a port 1013.

The MAC 1011, which is connected to the CPU 100 via the high-speed interface such as a PCI bus, and connected to the PHY 1012 via the interface such as an MII, is hardware for mediating between both of these interfaces. Upon receipt of data (frame) from the CPU 100 side, the MAC 1011 takes the control such as addition of the transmission source MAC address (MAC SA), and transfers the received frame to the PHY 1012 side. Contrarily, it receives the frame from the PHY 1012 side, determines whether or not the frame is a frame addressed to its own node from the destination MAC address (MAC DA), and if the frame is a frame addressed to its own node or a frame for a broadcast/multicast, transfers the frame to the CPU 100 side.

The PHY 1012, which is connected to the MAC 1011 via the interface such as the MII, and connected to the port 1013 via the interface of the IEEE 802.3 specification (10BASE-T, 100BASE-TX, 1000BASE-T, 1000BASE-SX, etc.), is hardware for mediating between both of these interfaces. Upon receipt of data (frame) from the MAC 1011 side, the PHY 1012 converts it into a signal (an electric signal or an optical signal) suitable for the port 1013 side, and transmits it to a cable through the port 1013. Further, it receives a signal (an electric signal or an optical signal) from the port 1013 side, converts it into a signal suitable for the interface (MII etc.) of the MAC 1011 side, and transmits the data (frame) to the MAC 1011 side.

The port 1013 is a connection mouth to which an Ethernet cable (a UTP, an optical fiber, etc.) is connected.

FIG. 9 is a block diagram having a configuration of the HUB 11 in the first embodiment shown in details.

The HUB 11 is configured of a port 111, a port 112, a port 113, and a bridge 114.

The port 111, similarly to the port 1013 in the NIC 101 of FIG. 8, is a connection mouth to which an Ethernet cable (a UTP, an optical fiber, etc.) is connected.

The port 112 is similar to the port 111.

The port 113 is similar to the port 111.

The bridge 114 has a function of receiving the frame from the ports 111 to 113, making a reference to the destination MAC address, and transferring the frame to any of the port 111 to the port 113. In addition hereto, it has a function of making a reference to the transmission source MAC address at the time of receiving the frame, learning the MAC address, and recording which MAC address a terminal has, and which port the above terminal is connected to. Supposing that the bridge 114 has not learned the MAC address even though it has made a reference to the destination MAC address at the time of receiving the frame, it has a function of broadcasting the frame to the port other than the port into which the frame has been input.

With the bridge 114, there exist both of the case that it is configured of the hardware, and the case that it is configured of the software that operates over the CPU. Supposing that it is configured of the software, the relating software such as the driver also operates within the CPU in addition to the bridge software.

In FIG. 9, the portion equivalent to the NIC described in FIG. 8 is omitted. That is, the MAC in FIG. 8 is integrally built into the bridge 114 as a partial function of the bridge 114, or is integrally built into the ports 111 to 113 as a partial function of the ports 111 to 113. Likewise, the PHY as well is integrally built into the bridge 114 as a partial function of the bridge 114, or is integrally built into the ports 111 to 113 as a partial function of the ports 111 to 113.

Figure 10:
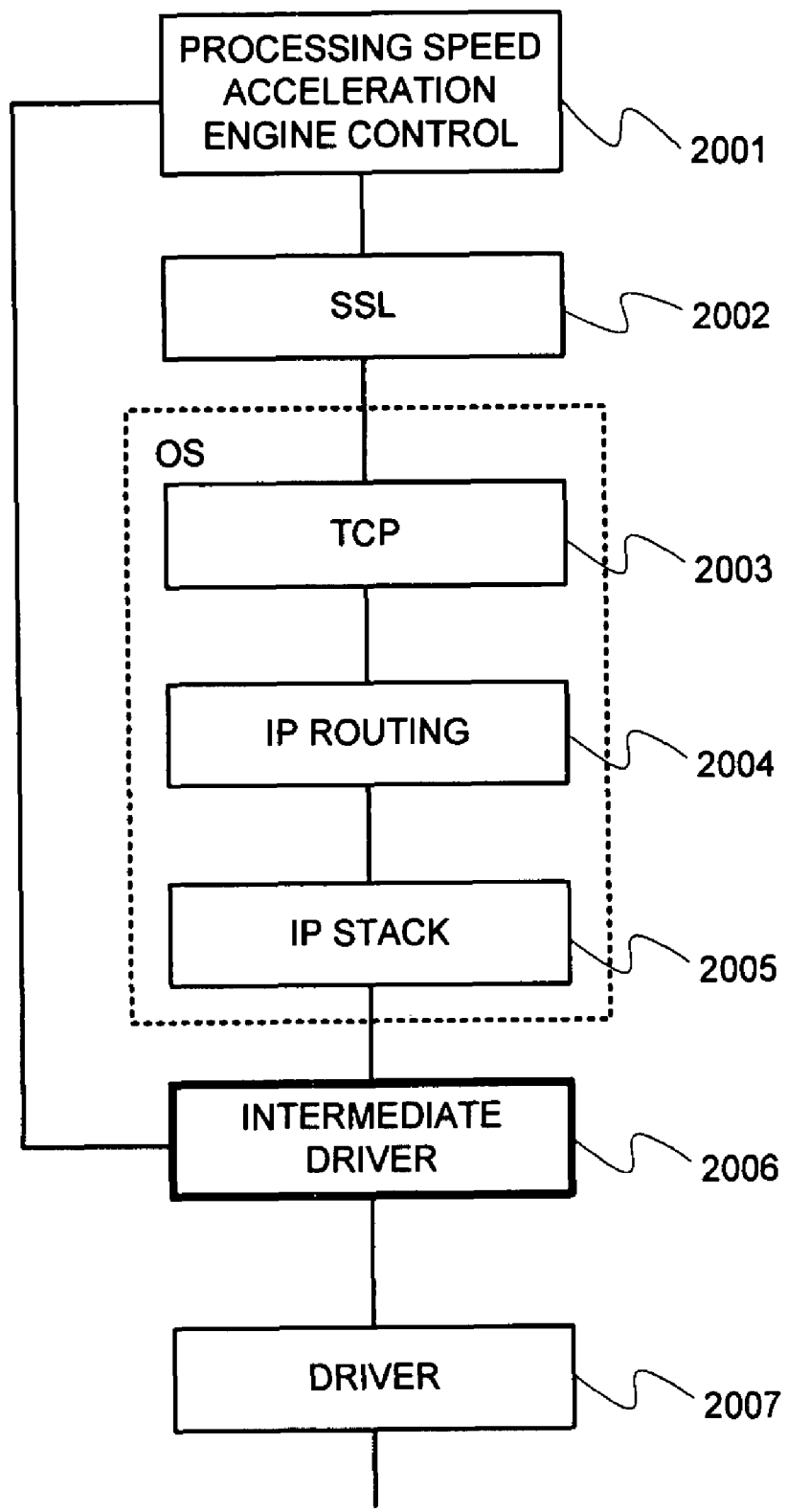
FIG. 10 is a block diagram illustrating a software configuration within a CPU 200 in the first embodiment of the present invention.

FIG. 10 is a block diagram having a configuration of the software operating within the CPU 200 shown in details that exists within the gateway device 20 in the first embodiment.

The software operating within the CPU 200 is configured of a processing speed acceleration engine control 2001, an SSL 2002, a TCP 2003, an IP routing 2004, an IP stack 2005, an intermediate driver 2006, and a driver 2007.

Additionally, the gateway device 20, which has a hardware configuration similar to that of the session relay device 10 shown in FIG. 5, differs from the latter in a point etc. that the CPU 100 and the NIC 101 in FIG. 5 become a CPU 200 and an NIC 201, respectively, that is, in numerals.

Out of the software listed in FIG. 10, each of the TCP 2003, the IP routing 2004, and the IP stack 2005 is software that is usually included in the OS (Operating System) such as Windows, Linux, and BSD. In particular, with the Windows, as a rule, the user cannot rewrite a program of this software.

As a matter of fact, many items of software other than the software shown in FIG. 10 operate within the CPU 200; however software having no relation with the present invention is omitted in FIG. 10.

The processing speed acceleration engine control 2001 performs operations listed below.

(1) It makes the setting necessary for connecting and disconnecting the SSL session with the relay application 1001 within the session relay device 10 for the SSL 2002.

(2) It notifies the destination MAC address and the transmission source MAC address of its own node, which are obtained from a result of having made an ARP enquiry about the IP address and the destination port of a partner apparatus (the session relay device 10) of the SSL session, the transmission source port number and the transmission source IP address of the SSL session of its own node (gateway device 20) side, and further, the IP address of a partner apparatus (the session relay device 10) of the SSL session, to the processing speed acceleration engine 2014 via the internet driver 2006. It employs the control frame, thereby to transfer the address etc. from the intermediate driver 2006 to the processing speed acceleration engine 2014.

(3) Upon receipt of an authentication completion notification of a partner (the SSL 1002 within the session 1001) of the SSL session from the SSL 2002, it transfers the processing speed acceleration process start command, the public key of a partner, its own secret key, and further the common key to the processing speed acceleration engine 2014 through the intermediate driver 2006. It employs the control frame, thereby to transfer the public key, the secret key and the common key from the intermediate driver 2006 to the processing speed acceleration engine 2014. Additionally, the processing speed acceleration process start command in this embodiment is explained by employing a configuration in which the public key of a partner, its own secret key, and the common key are transferred to the processing speed acceleration engine 2014 through the intermediate driver 2006; however what is obtained by synthesizing the public key of a partner, its own secret key, and the common key may be assumed to be a processing speed acceleration process start command.

(4) It commands the processing speed acceleration engine 2014 to start and end the encryption process through the intermediate driver 2006 at the time of completing the setting of the SSL session and at the time of disconnecting it. At this time, it employs the control frame, thereby to transfer a command for starting and ending the encryption process from the intermediate driver 2006 to the processing speed acceleration engine 2014.

(5) It receives a request for disconnecting the SSL session that is notified through the intermediate driver 2006 from the processing speed acceleration engine 2014, and requests a disconnection of the SSL 2002.

The SSL 2002 has a function of exchanging information of the certificate, the public key, the secret key, the common key, etc. that are employed for the encryption. In this embodiment, the SSL 2002 exchanges the certificate (public key) with the SSL 1002. And, it makes a signature confirmation of the certificate according to the technique of PKI etc., and notifies completion of a confirmation to the processing speed acceleration engine control 2001 in a case where it is authenticated.

Usually, the SSL performs the encryption process and the decoding process as well in addition to the foregoing; however, in this embodiment, the processes of the encryption and the decoding are performed not in the gateway device 20 but in the processing speed acceleration engine 2014. In this embodiment, with the session relay device 10, the encryption and the decoding are executed in the SSL 1002 and the SSL 1004.

The TCP 2003 has a function of arranging the data into formatted data having a constant format with the normal TCP processes as shown in the following (1) to (4), or recovering data from the packet.

(1) It receives the data from the SSL 2002, or the processing speed acceleration engine control 2001 in the case that the SSL 2002 is not used, adds the TCP header for detecting a missing of the packet and a reversal of the sequence to the received data, and sends it to the IP routing 2004. Herein, the data, of which size is large, is division-processed (also referred to as "is fragmented").

(2) It receives the packet from the IP routing 2004, makes a reference to the TCP header, thereby to detect a reversal of the sequence and a missing of the packet, and in a case where not only a reversal of the sequence but also a missing has not occurred, removes the TCP header from the packet to send the packet to the SSL 2002, or to the encapsulation application 2001 if the SSL 2002 is not used. At this moment, it gives an ACK packet for notifying arrival of the packet as a reply to the transmission source of the packet.

(3) In (2), supposing that a missing of the packet has occurred, it transmits a re-sending request packet. Further, in a case where a reversal of the sequence or a fragmentation has occurred, it waits for the packet that is to arrive later, and recovers the data.

(4) It transmits a TCP session establishment request packet (SYN packet) in establishing the TCP session. It receives an ACK packet, and regulates a transmission speed of the packet in (1), thereby to take the congestion control.

The IP routing 2004 has a function of receiving the packet from the TCP 2003 or the IP stack 2005, making a reference to the destination IP address and the destination port number, and transferring the packet to the IP stack 2005 or the TCP 2003.

The IP stack 2005 has functions shown below.

(1) It receives the packet from the IP routing 2004, adds the Ethernet header such as the MAC address, and delivers it to the bridge 2006.

(2) It deletes the MAC header from the packet received from the bridge 2006, and delivers the packet to the IP routing 2004.

(3) It transmits/receives the ARP protocol for a purpose of deciding the MAC address etc. that is added in (1).

(4) It receives the settings necessary for IP communication, for example, the IP address, the default route, and the net mask by the DHCP protocol or the manual setting, and manages them.

The intermediate driver 2006 is an intermediate driver similar to the intermediate driver 1008 shown in FIG. 7. The intermediate driver 2006 has five functions listed below. Additionally, the details of the intermediate driver 2006 are omitted because it is similar to the intermediate driver 1008.

(1) It has a TCP process function, and terminates the TCP 1003.

(2) It has fragmentation process functions (a fragmentation process and a fragment assembly function), divides the frame in a case where size of the frame flowing to the driver 2007 side is large, and further, performs a assembly process in a case where the frame that arrives from the driver 2007 side has been pre-divided.

(3) It has an encapsulation function and a de-encapsulation function, adds an appropriate header to the packet that is sent from the IP stack 2005 side, deletes the header, or modifies the header, and transfers the packet to the driver 2007 side. Further, it deletes the header of the packet that is sent from the driver 2007 side, adds the header, or modifies the header, and transfers the packet to the IP stack 2005 side.

(4) It receives information necessary for identifying the frame that becomes an object of the processes of the above-mentioned (1) to (3) from the processing speed acceleration engine control 2001.

(5) It prepares a control frame based upon a request by the processing speed acceleration engine control 2001, and transmits it to the driver 2007. Further, it receives the control frame that has arrived from the driver 2007, and notifies its effect to the processing speed acceleration engine control 2001.

The driver 2007, which is software for mediating between the NIC 201 and software that operates within the CPU 200, has a function of receiving the packet from the NIC 201 and sending it to the intermediate driver 2006, and further has a function of receiving the frame from the intermediate driver 2006 and sending it to the NIC 201.

Figure 11:
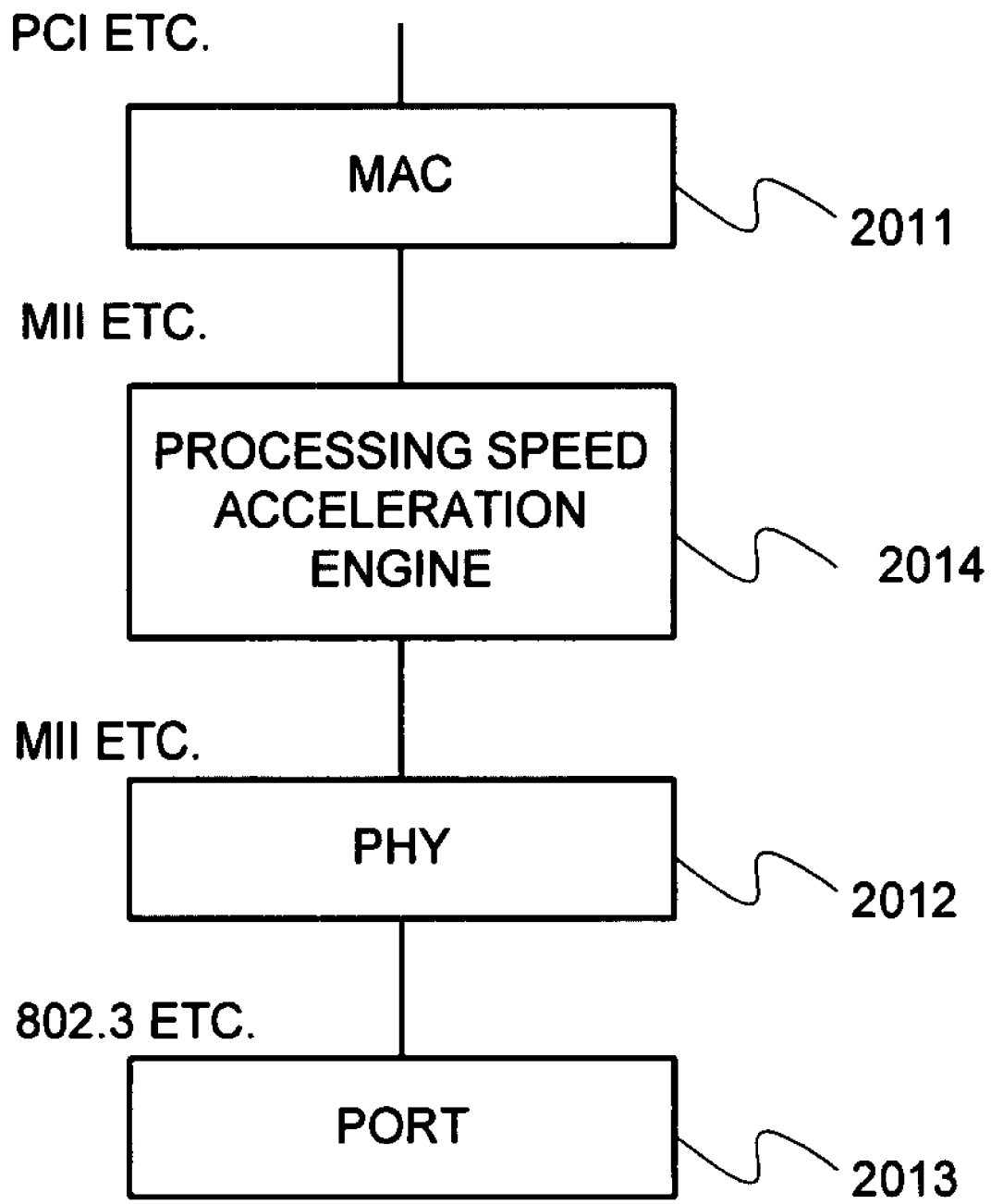
FIG. 11 is a block diagram illustrating a configuration of an NIC 201 in the first embodiment of the present invention.

FIG. 11 is a block diagram having a configuration of the NIC 201 shown in details that exists within the gateway device 20 in the first embodiment.

The NIC 201 is configured of an MAC 2011, a PHY 2012, a port 2013, and a processing speed acceleration engine 2014.

The MAC 2011 performs an operation similar to that of the MAC 1011 in FIG. 8.

The PHY 2012 performs an operation similar to that of the PHY 1012 in FIG. 8.

The port 2013 is a connection mouth to which an Ethernet cable (a UTP, an optical fiber, etc.) is connected.

The processing speed acceleration engine 2014, which is packaged in such a manner that it wedges into the interface (MII etc.) between the MAC 2011 and the PHY 2012, is hardware for performing each process of the encryption, the decoding, the encapsulation, the de-encapsulation, the fragmentation, the fragment assembly in employing the SSL session to make communication. Further, it transmits/receives the control frame for a purpose of transmitting/receiving setting information necessary for the operation of the processing speed acceleration engine 2014. Usually, the processing speed acceleration engine 2014 is realized with the integrated circuits such as a FPGA and an ASIC.

The details of the processing speed acceleration engine 2014 will be explained.

Figure 12:
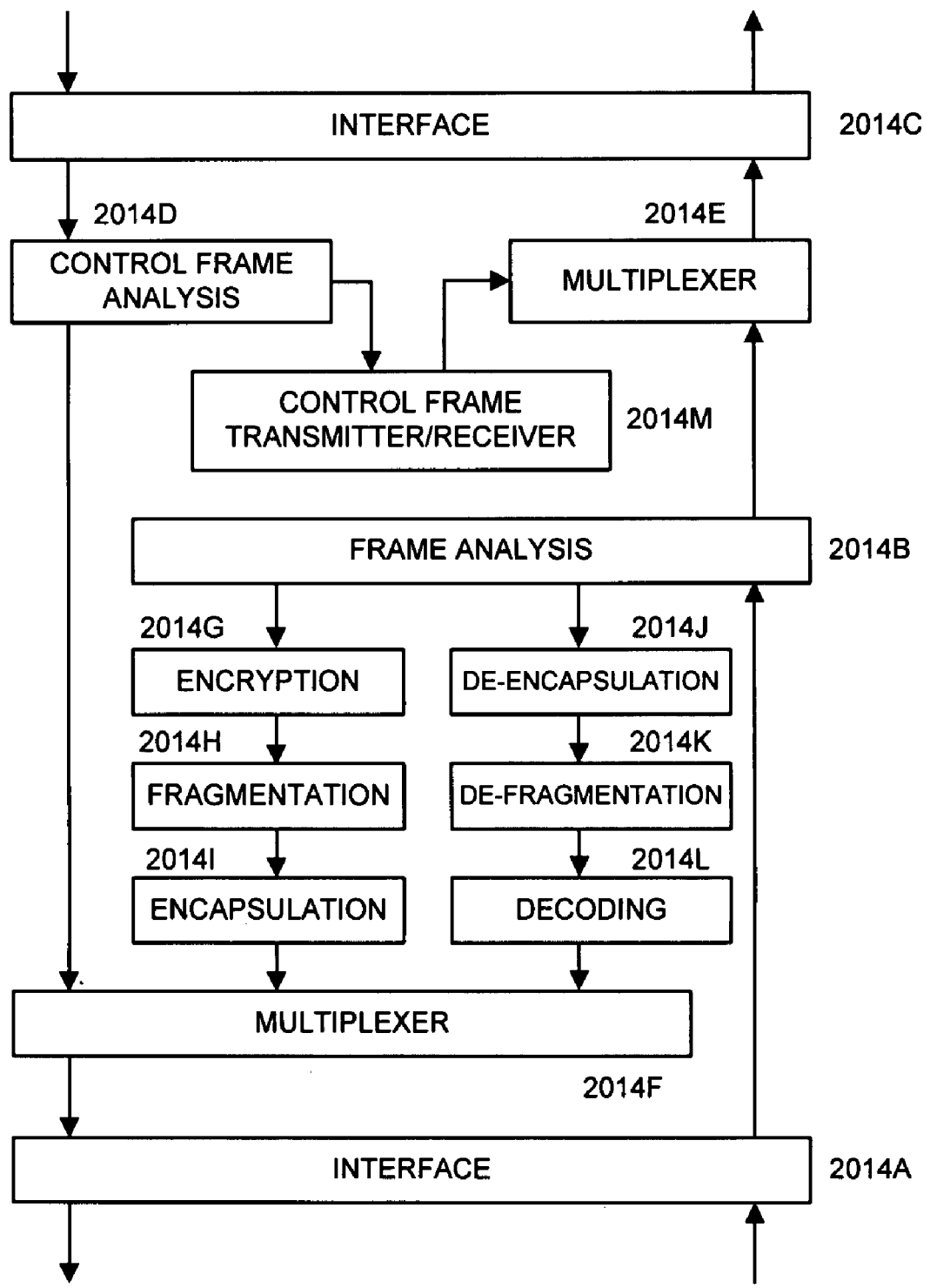
FIG. 12 is a block diagram illustrating a configuration of a processing speed acceleration engine 2014 in the first embodiment of the present invention.

FIG. 12 is a block diagram having a configuration of the processing speed acceleration engine 2014 in FIG. 11 shown in details.

The processing speed acceleration engine 2014 is configured of an interface 2014A, a frame analysis 2014B, an interface 2014C, a control frame analysis 2014D, a multiplexer 2014E, a multiplexer 2014F, an encryption 2014G, a fragmentation 2014H, an encapsulation 2041I, a de-encapsulation 2014J, a de-fragmentation 2014K, a decoding 2014L, and a control frame transmitter/receiver 2014M.

The interface 2014A is a portion for mediating between the bus (MII) etc. connected to the PHY 2012 and the processing speed acceleration engine. The interface 2014A converts the frame that has arrived from the PHY 2012 side into a signal suitable for the operation of the processing speed acceleration engine, and transfers it to the frame analysis 2014B. Further, it converts the frame that is transmitted to the PHY 2012 side from the processing speed acceleration engine side, i.e. the multiplexer 2014F into a signal suitable for the bus (MII) etc. connected to the PHY 2012.

The frame analysis 2014B receives the frame from the interface 2014A, decides the destination in the order of (1) to (4) shown below, and transfers the frame.

(1) If the frame is a frame addressed to its own node, and yet a frame of the pre-set SSL session (a frame encrypted by the session relay device 10), it transfers this frame to the de-encapsulation 2014J.

(2) If the frame is a frame addressed to its own node other than (1), it transfers the received frame to the multiplexer 2014E.

(3) If the frame is a broadcast frame in which a broadcast MAC has been added to the MAC DA, or a multicast frame in which a multicast MAC has been added to the MAC DA, it copies this frame, and transfers a copy to the multiplexer 2014E and the encryption 2014G, respectively.

(4) If the frame is a frame other than (1) to (3), it transfers the frame to the encryption 2014G.

The interface 2014C is a portion for mediating between the bus (MII) etc. connected to the MAC 2011 and the processing speed acceleration engine. The interface 2014C converts the frame that has arrived from the MAC 2011 side into a signal suitable for the operation of the processing speed acceleration engine, and transfers it to the control frame analysis 2014D. Further, it converts the frame that is transmitted to the MAC 2011 side from the processing speed acceleration engine side, i.e. the multiplexer 2014E into a signal suitable for the bus (MII) etc. connected to the MAC 2011.

The control frame analysis 2014D receives the frame from the interface 2014C, and in a case where this frame is a special frame (hereinafter, referred to as a control frame) relating to a control of the processing speed acceleration engine, transfers the frame to the control frame transmitter/receiver 2014M. In a case where the frame is not a special frame, it transfers the frame to the multiplexer 2014F. Whether or not the frame is a special frame is usually determined from the MAC DA and the MAC SA. In a case where the MAC address (called a MAC address for a control. For example, 00004C000000 to FF) within a pre-specified address range has been described in any of the MAC DA and the MAC SA, it determines that this frame is a control frame.

The multiplexer 2014E receives the frame from the frame analysis 2014B and the control frame transmitter/receiver 2014M, preserves it in a queue to regulate the transmission timing if necessary, and transmits it to the interface 2014C. The reason why the frame is preserved in the queue is that the frame that arrives from the frame analysis 2014B side and the frame that arrives from the control frame transmitter/receiver 2014M side are prevent from colliding with each other.

The multiplexer 2014F receives the frame from the control frame analysis 2014D, the encapsulation 2014I, and further the decoding 2014L, preserves it in the queue to regulate the transmission timing if necessary, and transmits it to the interface 2014A. The reason why the frame is preserved in the queue is that the frames that arrive from each of the control frame analysis 2014D, the encapsulation 2014I, and further the decoding 2014L are prevent from colliding with each other.

The encryption 2014G receives the frame from the frame analysis 2014B, encrypts it with the method such as 3-DES, and transfers it to the fragmentation 2014H. The public key and the common key notified by the control frame transmitter/receiver 2014M are utilized as a public key and a common key that are employed for the encryption.

The fragmentation 2014H performs an operation similar to that of the fragmentation 1008B within the intermediate driver 1008 shown in FIG. 7. That is, it receives the packet from the encryption 2014G, and transfers it to the encapsulation 2014I. At this time, supposing that size of the packet is larger than a pre-set size, it divides (fragments) the packet, and then transfers it the encapsulation 2014I.

The encapsulation 2014I performs an operation similar to that of the re-encapsulation 1008D within the intermediate driver 1008 shown in FIG. 7. That is, it adds each header of the INET MAC F11, the INET IP F12, and the INET TCP F13 to the data (F14 in FIG. 3) that is sent from the fragmentation 2014H, and transfers the data to the multiplexer 2014F. The encapsulation 2014I is notified of the value of each header of F11 to F13 that is added from the control frame transmitter/receiver 2014M. Additionally, it is also possible to set not the TCP header but the UDP header to a position of the INET TCP F13 according to the setting.

The reason why the TCP header F13 is added in the encapsulation 2014I is that the packet is prevented from being interrupted due to the Firewall, the NAT router, etc. (the Firewall 23 in a case of an example of FIG. 1) that exist on the communication path. In a case of having set the UPD header to F13, there is a possibility that communication is interrupted if the Firewall, the NAT router, etc. exist on the communication path. The TCP header added in the encapsulation 2014I, of which the frame format has a form of the TCP, is not employed for the congestion control and the re-sending control as a matter of fact because the TCP is not an added header. The header F13 that is added herein is, totally, a header for allowing the packet to pass through the Firewall and the NAT, and the actual congestion control and the re-sending control are taken by the TCP (a TCP header portion of F23 in the frame format F10 of FIG. 3) that exists within the terminal 21 or the server 31.

The de-encapsulation 2014J performs an operation similar to that of the de-encapsulation 1008G within the intermediate driver 1008 shown in FIG. 7. The de-encapsulation 2014J removes each header of the INET MAC F11, the INET IP F12, and the INET TCP F13 from the formatted packet (having the Ether-over-SSL frame format F10) that is sent from the frame analysis 2014B, and transfers the packet to the de-fragmentation 2014K. Additionally, also in the case where not the TCP header but the UDP header has been set to a position of the INET TCP F13 according to the setting, it performs the process similar to that of the case of the TCP header.

The de-fragmentation 2014K performs an operation similar to that of the fragment assembly 1008C within the intermediate driver 1008 shown in FIG. 7. The de-fragmentation 2014K receives the packet from the de-encapsulation 2014J, and transfers it to the decoding 2014L. At this time, supposing that a flag indicating a division has been added to the packet, it preserves the packet for the time being, waits for the packet that is to arrive later, then unions the packets, and transfers it to the decoding 2014L. This process is called a fragment assembly process.

The decoding 2014L receives the frame from the de-fragmentation 2014K, decodes it with the method such as the 3-DES, and transfers it to the multiplexer 2014F. The secret key and the common key notified by the control frame transmitter/receiver 2014M are utilized as a secret key and a common key that are employed for the decoding.

The control frame transmitter/receiver 2014M transmits/receives the control frame to/from the control frame transmitter/receiver 1008M within the intermediate driver 1008 shown in FIG. 7. The control frame transmitter/receiver 2014M sends a special frame (hereinafter referred to as a control frame) relating to a control of the processing speed acceleration engine to the multiplexer 2014E, and further receives the control frame from the control frame analysis 2014D. In a case of having received the public key by the control frame, it notifies its effect to the encryption 2014G. In a case of having received the secret key by the control frame, it notifies its effect to the decoding 2014L. In a case of having received the common key by the control frame, it notifies its effect to the encryption 2014G and the decoding 2014L. In a case of having received the IP address or the destination port of a partner apparatus (session relay device 10) of the SSL session, the transmission source port number or the transmission source IP address of the SSL session of its own node (gateway device 20) side, and further the destination MAC address and the transmission source MAC address of its own node by the control frame, it notifies its effect to the frame analysis 2014B. In addition hereto, in a case of having received a command of starting and ending the encryption process by the control frame, it notifies its effect to the frame analysis 2014B.

As mentioned above, the processing speed acceleration engine 2014 performs the process in a pair with the intermediate driver 2006, or the intermediate driver 1008.

Figure 13:
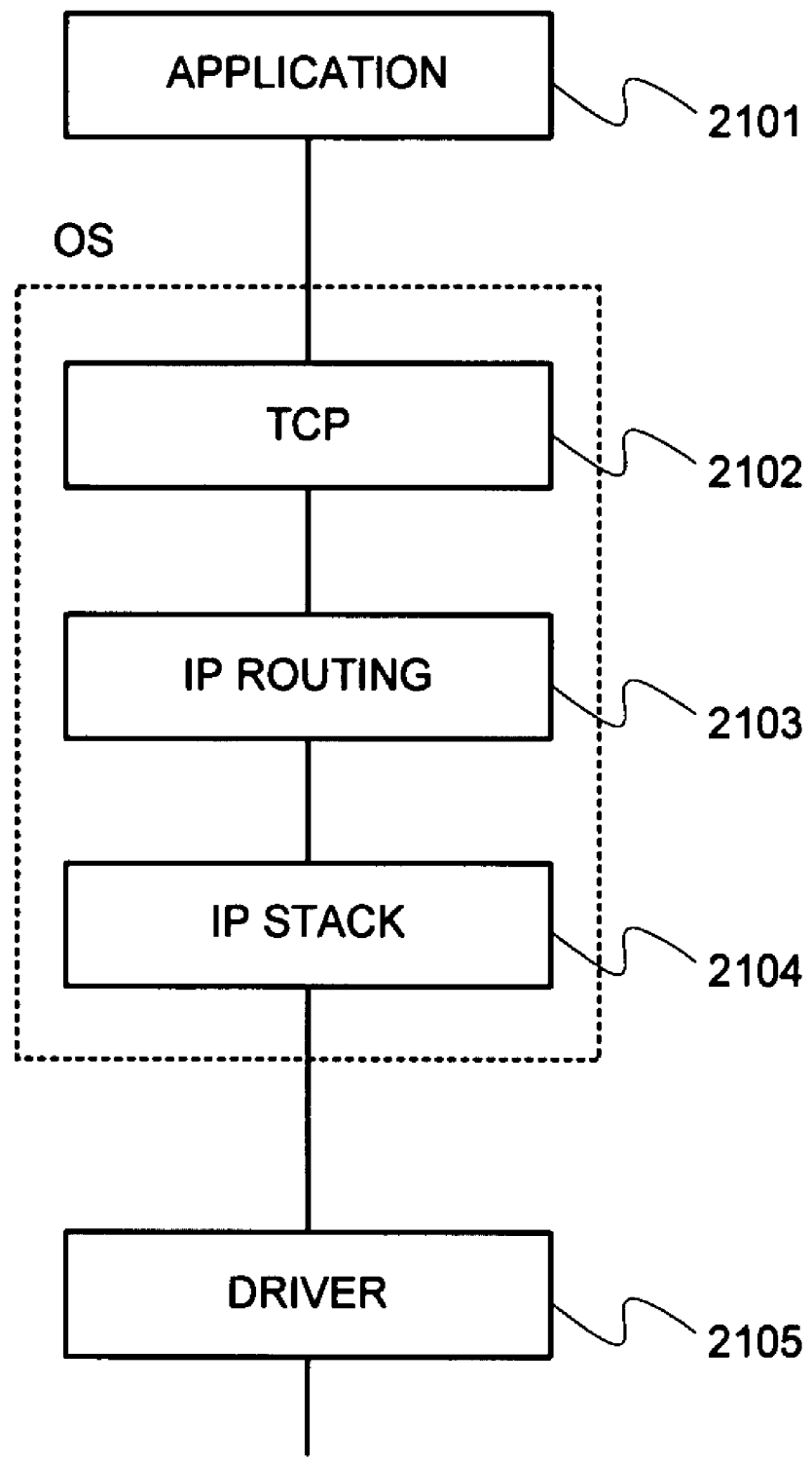
FIG. 13 is a block diagram illustrating a software configuration within a CPU 210 in the first embodiment of the present invention.

FIG. 13 is a block diagram having a configuration of the software operating within the CPU 210 shown in details that exists within the terminal 21 in the first embodiment.

The software operating within the CPU 210 is configured of an application 2101, a TCP 2102, an IP routing 2103, an IP stack 2104, and a driver 2105.

Additionally, the terminal 21, which has a hardware configuration similar to that of the session relay device 10 shown in FIG. 5, differs from the latter in a point that the CPU 100 and the NIC 101 in FIG. 5 become a CPU 210 and an NIC 211, respectively.

Out of the software listed in FIG. 13, each of the TCP 2102, the IP routing 2103, and the IP stack 2104 is software that is usually included in the OS (Operating System) such as Windows, Linux, and BSD. In particular, with the Windows, as a rule, the user cannot rewrite a program of this software.

As a matter of fact, many items of software other than the software shown in FIG. 13 operate within the CPU 210; however software having no relation with the present invention is omitted in FIG. 13.

The application 2101 is an application for making bi-directional communication with an application 3101 within the server 31. WEB browser software is typically applied to the application 2101, and in this case, a WEB server application is applied to the application 3101 within the server 31. Various applications such as TELNET client software, FTP client software, accounting client software, file sharing client software, and database client software in addition to the WEB browser software are applicable to the application 2101.

In this case, TELNET server software, FTP server software, accounting server software, file sharing server software, database server software, etc. are applied to the application 3101 as well within the server 31 corresponding to the application 2101.

The TCP 2102 performs an operation similar to that of the TCP 2003 shown in FIG. 10, or the TCP 1003 and the TCP 1005 shown in FIG. 6. That is, the TCP 2102 has a function of arranging the data into formatted data having a constant format with the processes of the following (1) to (4), thereby to packetize it, or recovering data from the packet.

(1) It receives the data from the application 2101, adds the TCP header for detecting a missing of the packet or a reversal of the sequence to this data, and sends it to the IP routing 2103. Herein, the data, of which size is large, is division-processed (also referred to as "is fragmented").

(2) It receives the packet from the IP routing 2103, makes a reference to the TCP header, thereby to detect a reversal of the sequence and a missing of the packet, and in a case where not only a reversal of the sequence but also a missing has not occurred, removes the TCP header from the packet to send the packet to the application 2101. At this moment, it gives an ACK packet for notifying arrival of the packet as a reply to the transmission source of the packet.

(3) In (2), supposing that a missing of the packet has occurred, it transmits a re-sending request packet. Further, in a case where a reversal of the sequence or a fragmentation has occurred, it waits for the packet that is to arrive later, and recovers the data.

(4) It receives an ACK packet, and regulates a transmission speed of the packet in (1).

Herein, the maximum frame length is set at a small size level in the TCP 2102. The reason is that the fragmentation process by the intermediate driver 1008, the processing speed acceleration engine 2014, the TCP 1003, and further the TCP 1004 is prevented.

The IP routing 2103 performs an operation similar to that of the IP routing 2004 shown in FIG. 10, or the IP routing 1006 shown in FIG. 6. That is, the IP routing 2103 has a function of receiving the packet from the TCP 2102 or the IP stack 2104, making a reference to the destination IP address and the destination port number, and transferring the packet to the IP stack 2104 or the TCP 2102.

The IP stack 2104 performs an operation similar to that of the IP stack 2005 shown in FIG. 10, or the IP stack 1007 shown in FIG. 6. That is, the IP stack 2104 has functions shown below.

(1) It receives the packet from the IP routing 2103, adds the Ethernet header such as the MAC address, and delivers it to the driver 2105.

(2) It deletes the MAC header from the packet received from the driver 2105, and delivers the packet to the IP routing 2103.

(3) It transmits/receives the ARP protocol for a purpose of deciding the MAC address etc. that is added in (1).

(4) It receives the settings necessary for IP communication, for example, the IP address, the default route, and the net mask by the DHCP protocol or the manual setting, and manages them.

The driver 2105 performs an operation similar to that of the driver 2007 shown in FIG. 10, or the IP stack 1007 shown in FIG. 6. That is, the driver 2105, which is software for mediating between the NIC 211 and software that operates within the CPU 210, has a function of receiving the packet from the NIC 211 and sending it to the IP stack 2104, and further has a function of receiving the packet from the IP stack 2104 and sending it to the NIC 211.

Figure 14:
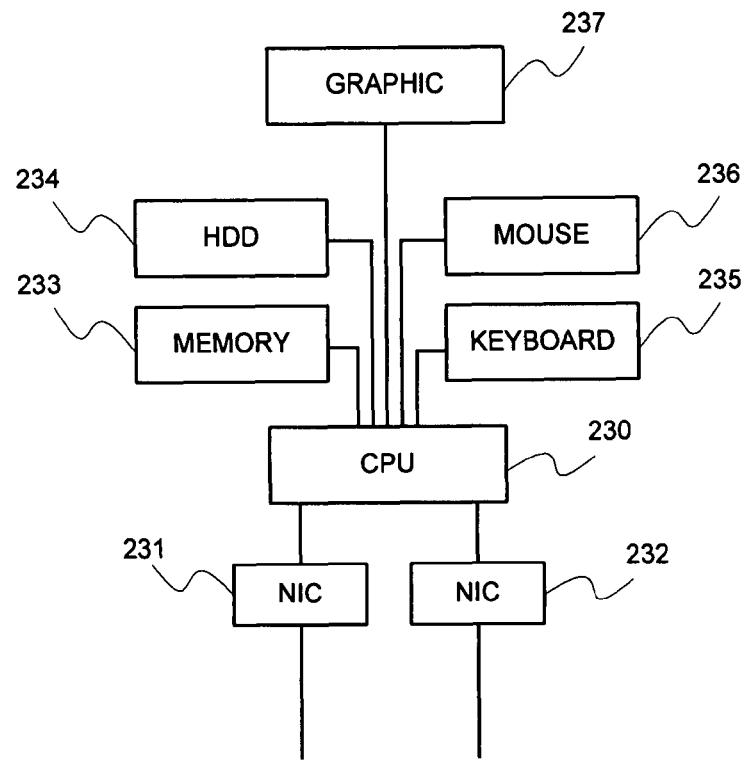
FIG. 14 is a block diagram illustrating a configuration of the Firewall 23 in the first embodiment of the present invention.

FIG. 14 is a block diagram having a configuration of the Firewall 23 in the first embodiment shown in details.

The Firewall 23 is a computer having a configuration in which an NIC 232 has been added to the session relay device 10 shown in FIG. 5. The Firewall 23 is configured of a CPU 230, an NIC 231, an NIC 232, a memory 233, an HDD 234, a keyboard 235, a mouse 236, and a graphic 237, and in some case, the keyboard, the mouse, and the graphic are not connected.

The CPU 230 is similar to the CPU 100 in FIG. 5.
The NIC 231 is similar to the NIC 101 in FIG. 5.
The NIC 232 is similar to the NIC 101 in FIG. 5.
The memory 233, the HDD 234, the keyboard 235, the mouse 236, and the graphic 237 are also similar to the memory 102, the HDD 103, the keyboard 104, the mouse 105, and the graphic 106 in FIG. 5, respectively.

Figure 15:
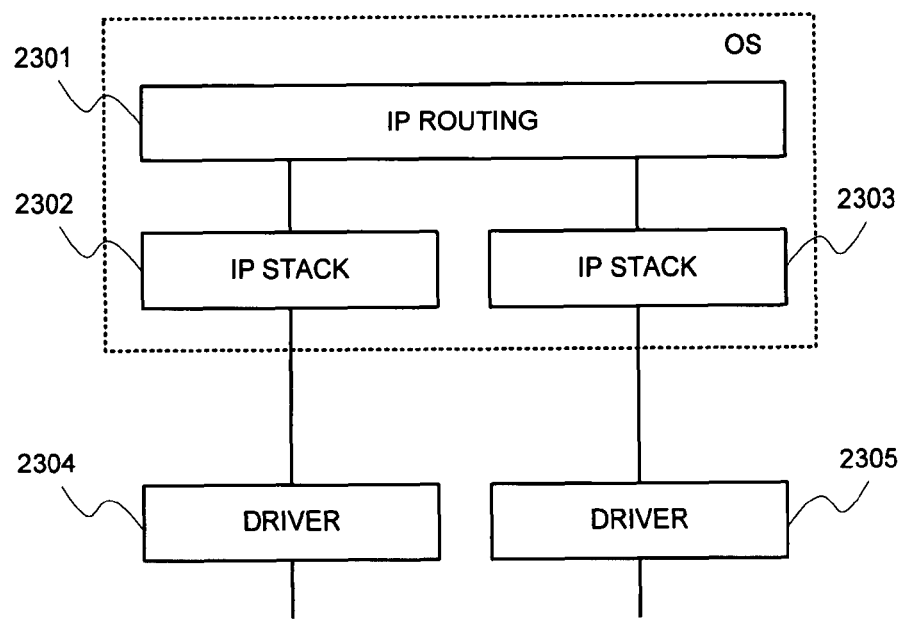
FIG. 15 is a block diagram illustrating a software configuration within a CPU 230 in the first embodiment of the present invention.

FIG. 15 is a block diagram having a configuration of the software operating within the CPU 230 shown in details that exists within the Firewall 23 in the first embodiment.

The software operating within the CPU 230 is configured of an IP routing 2301, an IP stack 2302, an IP stack 2303, a driver 2304, and a driver 2305.

Out of the software listed in FIG. 15, each of the IP routing 2301, the IP stack 2302, and the IP stack 2303 is software that is usually included in the OS (Operating System) such as Windows, Linux, and BSD. In particular, with the Windows, as a rule, the user cannot rewrite a program of this software.

As a matter of fact, many items of software other than the software shown in FIG. 15 operate within the CPU 230; however software having no relation with the present invention is omitted in FIG. 15.

The IP routing 2301 has a function of receiving the packet from the IP stack 2302 or the IP stack 2303, making a reference to the destination IP address and the destination port number, and transferring the packet to the IP stack 2303 or the IP stack 2302. At this moment, the IP routing 2301 performs an operation of restricting communication between the Internet 1 (IP stack 2303 side) and the intranet 2 (IP stack 2302 side) according to a predetermined setting. For example, in a case of where the device inside the intranet 2 has employed the TCP to request a communication start of each device of the Internet 1, the communication after it is freely made in a bi-direction; however, contrarily, in a case of where the each device of the Internet 1 has employed the TCP to request a communication start of each device of the intranet 2, the IP routing 2301 interrupts this request and interrupts communication as well after it in a bi-direction. It performs the process of canceling the packet in making an interruption.

The IP stack 2302 performs an operation similar to that of the IP stack 2104 shown in FIG. 13, the IP stack 2005 shown in FIG. 10, or the IP stack 1007 shown in FIG. 6. That is, the IP stack 2302 has functions shown below.

(1) It receives the packet from the IP routing 2301, adds the Ethernet header such as the MAC address, and delivers it to the driver 2304.

(2) It deletes the MAC header from the packet received from the driver 2304, and delivers the packet to the IP routing 2301.

(3) It transmits/receives the ARP protocol for a purpose of deciding the MAC address etc. that is added in (1).

(4) It receives the settings necessary for IP communication, for example, the IP address, the default route, and the net mask by the DHCP protocol or the manual setting, and manages them.

The IP stack 2303 performs an operation similar to that of the IP stack 2302.

The driver 2302 performs an operation similar to that of the driver 2007 shown in FIG. 10, or the IP attack 1007 shown in FIG. 6. That is, the driver 2302, which is software for mediating between the NIC 231 and software that operate within the CPU 230, has a function of receiving the packet from the NIC 231 and sending it to the IP stack 2302, and further has a function of receiving the packet from the IP stack 2302 and sending it to the NIC 231.

The driver 2305 performs an operation similar to that of the driver 2302.

[Explanation of an Operation]
[An Operation of Establishing the SSL Session]

Figure 16:
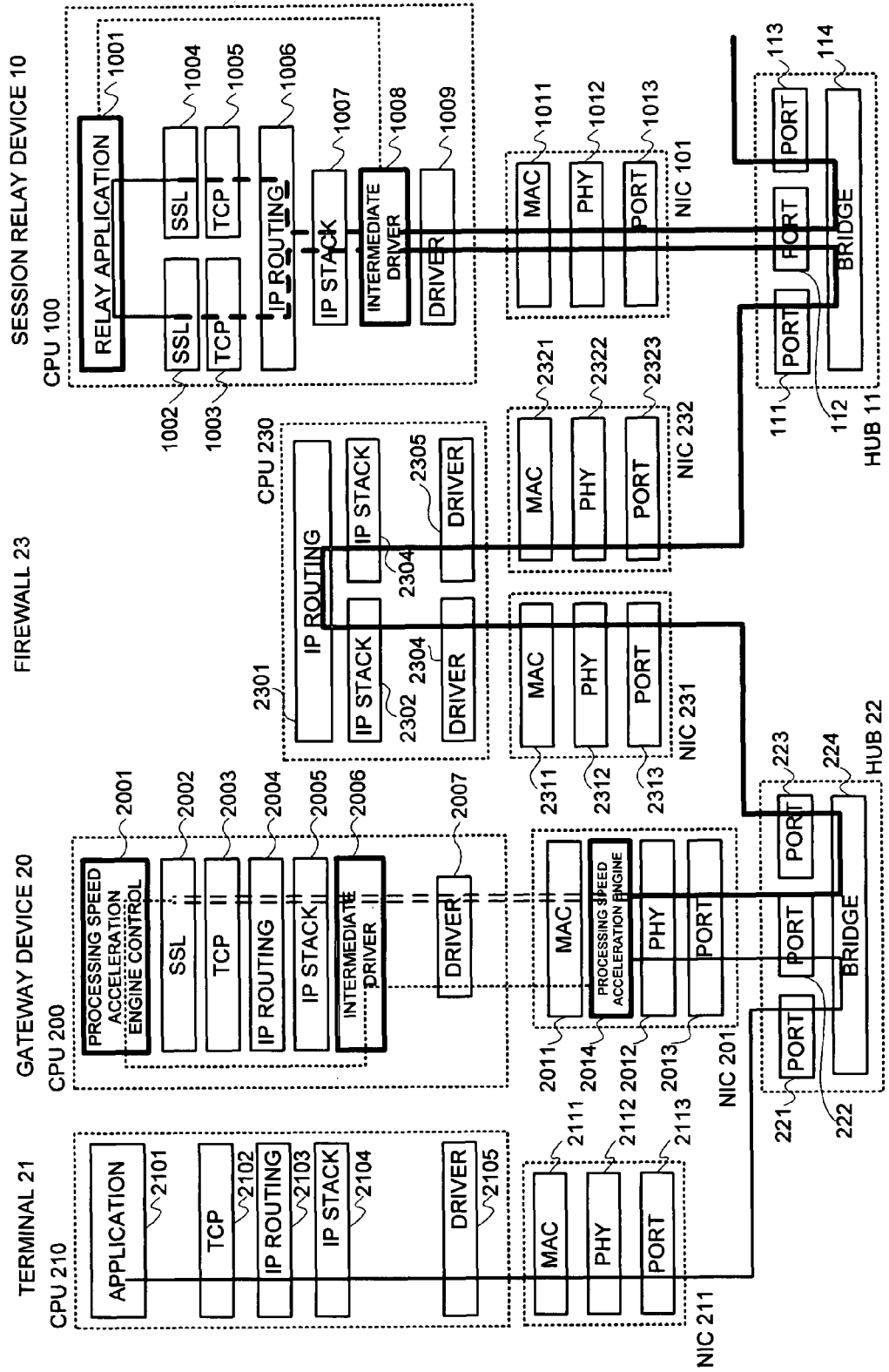
FIG. 16 is a block diagram illustrating a network configuration and a communication path in the first embodiment of the present invention.

The case of establishing the SSL session (secure TCP session) from the gateway device 20 to the session relay device 10 in the first embodiment will be exemplified to explain the operation by employing FIG. 16.

At this moment, it is assumed that the HUB 22 and the HUB 32 have already learned the MAC addresses of the terminal 21, the server 31, the LAN side of the Firewall 23, the LAN side of the Firewall 33, the gateway device 20, and the gateway device 30. Further, it is assumed that the HUB 11 has already learned the MAC addresses of the WAN side of the Firewall 23, the WAN side of the Firewall 33, and each device of the session relay device 10. Further, it is assumed that in a case where the device (LAN side) inside the intranet has employed the TCP to request a communication start of each device (WAN side) of the Internet, the Firewall 23 and the Firewall 33 allows the communication after requesting a communication start to be freely made in a bi-direction; however, contrarily, in a case where each device (WAN side) of the Internet has employed the TCP to request a communication start of each device (LAN side) of the intranet, they interrupt this request and interrupt the communication as well after it in a bi-direction.

When the relay application 1001 within the session relay device 10 comes into a wait state of a connection from the gateway device 20 after starting, it notifies a start of the wait state to the intermediate driver 1008. This notification includes the IP address of the session relay device 10, and a wait port number of the relay application 1001.

Upon receipt of a notification from the relay application 1001, the intermediate driver 1008 makes the setting in the frame analysis process so that the process such as the TCP connection/termination can be performed at the moment that the packet addressed to the relay application 1001 has arrived.

The processing speed acceleration engine control 2001 within the gateway device 20 receives a request for making a connection to the relay application 1001 within the session relay device 10 from a user, and instructs the SSL 2002 to start communication with the relay application 1001 within the session relay device 10. Simultaneously, it notifies a start of communication with the relay application 1001 within the session relay device 10 to the intermediate driver 2006. This notification includes the IP address of the session relay device 10, the port number of the relay application 1001, the transmission source port number of the processing speed acceleration engine control 2001, and further the IP address of the gateway device 20.

The SSL 2002 receives an instruction for starting communication from the processing speed acceleration engine control 2001, and instructs the TCP 2003 to start communication with the relay application 1001 within the session relay device 10 for a purpose of establishing the SSL session with the SSL 1002.

The TCP 2003 receives an instruction for starting communication from the SSL 2002, and transmits a packet (SYN) for requesting establishment of the TCP session with the TCP 1003 to the IP routing 2004 for a purpose of establishing the TCP session with the TCP 1003. This packet is a packet in line with the TCP specification, in which the session relay device 10 has been set to the destination IP address, and the TCP 1003 to the destination port number. This so-called TCP session establishment request packet is an SYN packet that is transmitted for a three-way handshake in establishing the TCP session. In this specification, for simplifying explanation of the TCP session establishment operation, out of the packets that are transmitted/received with the three-way handshake, the SYN packet is called a TCP session establishment request packet, and the SYN+ACK packet is called a response packet. Further, as a matter of fact, the ACK packet is also transmitted; however explanation thereof is omitted in the explanation of this operation because it is transferred similarly to the SYN packet.

The IP routing 2004 makes a reference to the destination IP address and the destination port number of the packet received from the TCP 2003, and transfers the packet to the IP stack 2005.

The IP stack 2005 adds the MAC address of the intranet 2 side within the Firewall 23 to the packet received from the IP routing 2004 as a destination MAC address, further sets the MAC address of its own node to the transmission source MAC address, thereby to prepare a frame, and transfers it to the intermediate driver 2006.

The intermediate driver 2006 receives the frame from the IP stack 2005, and makes a frame analysis. A result of the analysis, the frame is a frame to which the destination IP, the destination port, the transmission source IP, and the transmission source port pre-notified from the processing speed acceleration engine control 2001 have been added, whereby it removes the MAC header in the de-encapsulation, and converts the frame into a packet. And, it terminates the TCP process from the TCP 2003 to the TCP 1003 in the TCP of the intermediate driver 2006. That is, originally, the TCP 2003 transmitted the TCP session establishment request to the TCP 1003; however as a matter of fact, the TCP within the intermediate driver 2006 receives and reserves this request, thereby allowing an establishment of the TCP session to be terminated between the TCP 2003 and the TCP within the intermediate driver 2006.

The intermediate driver 2006 sends a packet for a connection request to the driver 2007 in terminating process of requesting the above-mentioned establishment for a purpose of requesting the intermediate driver 1008 to connect the session (session not causing the congestion control such as the UDP) with the TCP 1003. Additionally, this connection request packet is not a packet in line with the TCP specification, but is a peculiar packet in the communication system of the present invention. It sets the session relay device 10 and the TCP 1003 to this connection request packet as a destination IP address and a destination port number, respectively. And, it adds the MAC address of the intranet 2 side within the Firewall 23 to this packet as a destination MAC address, further sets the MAC address of its own node to the transmission source MAC address, and prepares a connection request frame.

The driver 2007 receives the connection request frame from the intermediate driver 2006, and transfers it to the MAC 2011.

The MAC 2011 receives the connection request frame from the driver 2007, and transfers it to the processing speed acceleration engine 2014.

The processing speed acceleration engine 2014 receives the connection request frame from the MAC 2011, and transfers it to the PHY 2012 as it stands.

The PHY 2012 receives the connection request frame from the processing speed acceleration engine 2014, and transfers it to the port 2013.

The port 2013 receives the connection request frame from the PHY 2012, and transfers it to the port 222 via the Ethernet cable.

The port 222 receives the connection request frame from the port 2013, and transfers it to the bridge 224.

Upon receipt of the connection request frame from the port 222, the bridge 224 makes a reference to the MAC DA, and outputs this frame to the port (port 223) of the Firewall 23 side as it stands based upon a result of learning the past routing because the MAC DA is an MAC address of the LAN side of the Firewall 23.

The port 223 receives the connection request frame from the bridge 224, and transfers it to the port 2313 within the Firewall 23 via the Ethernet cable.

The Firewall 23 receives the connection request frame from the port 223 within the HUB 22, transfers the frame through the path of the port 2313, the PHY 2312, the MAC 2311, the driver 2304, the IP stack 2302, the IP routing 2301, the IP stack 2304, the driver 2305, the MAC 2321, the PHY 2322, and the port 2323, and transfers it to the port 111 within the HUB 11.

The port 111 within the HUB 11 receives the connection request frame from the port 2323, and transfers it to the bridge 114.

Upon receipt of the connection request frame from the port 111, the bridge 114 makes a reference to the MAC DA, and outputs this frame to the port (port 112) of the session relay device 10 side as it stands based upon a result of learning the past routing because the MAC DA is an MAC address of the session relay device 10 side.

The port 112 receives the connection request frame from the bridge 114, and transfers it to the port 1013 within the session relay device 10 via the Ethernet cable.

The session relay device 10 receives the connection request frame from the port 112 within the HUB 22, and transfers the frame through the path of the port 1013, the PHY 1012, the MAC 1011, and the driver 1009, and transfers it to the intermediate driver 1008.

The intermediate driver 1008 receives the connection request frame from the driver 1009, and makes a frame analysis. As a result of the analysis, this frame is a frame to which the destination IP and the destination port to the relay application 1001 pre-notified from the relay application 1001 have been added, whereby it receives this frame, removes the MAC header in the de-encapsulation, and converts the frame into a packet. The TCP of the intermediate driver 1008 transmits the packet necessary for establishing the session with the TCP 1003 for a purpose of establishing the TCP session with the TCP 1003 because this packet is a packet for requesting a connection to the TCP 1003 transmitted to the intermediate driver 1008 from the intermediate driver 2006. This packet is a packet in line with the TCP specification, in which the session relay device 10 is set to the destination IP address, the TCP 1003 to the destination port number, further the IP address of the gateway device 20 to the transmission source IP address, and the port number of the TCP 2003 to the transmission source port number. And, this packet, to which the MAC address is added by the re-encapsulation 1008E within the intermediate driver 1008, is converted into a framed packet, and transferred to the IP stack 1007. The so-called packet necessary for establishing the session is an SYN packet that is transmitted for the three-way handshake in establishing the TCP session. In this specification, for simplifying explanation of the TCP session establishment operation, out of the packets that are transmitted/received with the three-way handshake, the SYN packet is called a TCP session establishment request packet, and the SYN+ACK packet is called a response packet. Further, as a matter of fact, the ACK packet is also transmitted; however its explanation is omitted because it is transferred similarly to the SYN packet.

The TCP within the intermediate driver 1008 transmits a connection request to the TCP 1003 under a false name of the TCP 2003. Thus, the TCP 1003 recognizes as if it had made communication with the TCP 2003, and further the TCP 2003 recognizes as if it had made communication with the TCP 1003. However, the actual process of establishing the TCP is performed between the TCP 2003 and the TCP within the intermediate driver 2006, and between the intermediate driver 1008 and the TCP 1003, respectively, and in addition hereto, communication is made between the intermediate driver 2006 and the intermediate driver 1008 separately with the method (peculiar packet in the communication system of the present invention) not causing the congestion control such as the UDP. And, the TCP session between the TCP 2003 and the intermediate driver 2006, some communication session such as the UDP between the intermediate driver 2006 and the intermediate driver 1008, and further the TCP session between the intermediate driver 1008 and the TCP 1003 are mutually connected/relayed by the intermediate driver 2006 and the intermediate driver 1008, thereby allowing the communication to be made as if the TCP session had been established between the TCP 2003 and the TCP 1003.

The IP stack 1007 receives the frame from the intermediate driver, removes the MAC header, thereby to convert it into a packet, and transfers it to the IP routing 1006.

The IP routing 1006 makes a reference to the destination port number of the packet received from the IP stack 1007, and transfers this packet to the TCP 1003 because the port number of the TCP 1003 side has been added.

The TCP 1003 receives the packet from the IP routing 1006. It gives a response packet (SYN+ACK) to a request for establishing the session as a reply according to the TCP protocol because this packet is a TCP session establishment request packet (SYN). At this moment, the TCP 1003 recognizes that the TCP session establishment request is one that has arrived from the TCP 2003. The reason is that the actual establishment request was transmitted from the TCP within the intermediate driver 1008; however the TCP 1003 recognizes as if it had established the session with the TCP 2003 because the TCP within the intermediate driver 1008 requested the TCP 1003 to establish the TCP session under a false name of the TCP 2003.

Thus, the TCP 1003 transmits the response packet (SYN+ACK) addressed to the TCP 2003. That is, the IP address of the gateway device 20 is set to the destination IP of the response packet, and the port number of the TCP 2003 to the destination port thereof.

The response packet is sent to the IP stack 1007 through the IP routing 1006, is converted into a response frame by adding the MAC header herein, and arrives at the intermediate driver 1008.

Upon receiving the response frame, the intermediate driver 1008 removes the MAC header of the response frame in the de-encapsulation within the intermediate driver 1008, thereby takes out a response packet, receives this response packet (SYN+ACK) in the TCP, gives an ACK packet as a reply, and terminates the TCP process. And, it transmits a connection completion notification packet for notifying completion of a connection of the session (session not causing the congestion control such as the UDP) to the intermediate driver 2006. This connection completion notification packet is not a packet in line with the TCP specification, but a peculiar packet in the communication system of the present invention, in which the gateway device 20 is set as the destination IP address, the TCP 2003 as the destination port number, the session relay device 10 as the transmission source IP address, and the TCP 1003 as the transmission source port number. And, the intermediate driver 1008 adds the MAC header to the connection completion notification packet in the re-encapsulation 1008D within the intermediate driver 1008, and prepares a connection completion notification frame.

The connection completion notification frame arrives at the intermediate driver 2006 within the CPU 200 through the path opposite to that of the connection request, i.e. the driver 1009, the NIC 101, the HUB 11, the NIC 232, the CPU 230, the NIC 231, the HUB 22, and the NIC 201.

The intermediate driver 2006 receives the connection completion notification frame, and makes a frame analysis thereof. As a result of the analysis, the received frame is a frame to which the destination IP and the destination port to the processing speed acceleration engine control 2001 pre-notified from the processing speed acceleration engine control 2001 have been added, whereby it receives this packet, removes the MAC header in the de-encapsulation, and converts it into a packet. The TCP within the intermediate driver 2006 transmits a response packet to the IP stack 2005 according to the TCP protocol for a purpose of sending the response packet (SYN+ACK) necessary for establishing the session to the TCP 2003 because the packet is a packet for notifying completion of connection between the TCP 1003 and the intermediate driver 1008 transmitted to the intermediate driver 2006 from the intermediate driver 1008.

The response packet arrives at the TCP 2003 through the IP stack 2005 and the IP routing 2004.

The TCP 2003 receives the response packet (SYN+ACK) from the IP routing 2004. It notifies completion of a connection of the TCP session with the TCP 1003 to the SSL 2002 because this packet is a response packet to a request for establishing the TCP session. At this moment, the TCP 2003 recognizes that the received response packet (SYN+ACK) is one that has arrived from the TCP 1003. The reason is that the actual response packet is one transmitted from the TCP within the intermediate driver 2006; however the TCP 2003 recognizes as if the response had been given from the TCP 1003 because the TCP within the intermediate driver 2006 gave a response for establishing the session to the TCP 2003 under a false name of the TCP 1003.

Upon receipt of the response packet (SYN+ACK), the TCP 2003 generates an ACK packet to this response packet addressed to the TCP 2003, and transmits it. This ACK packet, which is received by the TCP of the intermediate driver 2006 via the IP routing 2004 and the IP stack 2005, allows the TCP process to be terminated.

The SSL 2002 receives the connection completion notification from the TCP 2003, and transmits a packet (SSL session establishment request packet) for requesting establishment of the SSL session according to the SSL protocol for a purpose of establishing the SSL session with the SSL 1002.

The SSL session establishment request packet, which is received in the TCP 2003, goes through the TCP session established between the TCP 2003 and the TCP within the intermediate driver 2006, and arrives at the intermediate driver 2006.

The intermediate driver 2006 terminates the TCP of the SSL session establishment request packet, adds the header not causing the congestion control such as the UDP, and transmits the packet to the intermediate driver 1008. The packet arrives at the intermediate driver 1008 through the NIC 201, the HUB 22, the NIC 231, the CPU 230, the NIC 232, the HUB 11, and the NIC 101. At this moment, the processing speed acceleration engine 2014 within the NIC 201 transfers the packet received from the MAC 1011 to the PHY 2012 as it stands.

The SSL session establishment request packet, which is received by the intermediate driver 1008, goes through the TCP session established between the TCP within the intermediate driver 1008 and the TCP 1003, and arrives at the TCP 1003.

The TCP 1003 transfers the packet to the SSL 1002.

The SSL 1002 verifies the content of the SSL session establishment request, notifies establishment of the session with the SSL 2002 to the relay application 1001 if it were not for a problem, and simultaneously therewith, transmits a SSL session establishment response packet to the SSL 2002 according to the SSL protocol.

The SSL session establishment response packet arrives at the intermediate driver 1008 through the path opposite to that of the SSL session establishment request packet, i.e. the TCP session between the TCP 1003 and the intermediate driver 1008, and arrives at the intermediate driver 2006 through the session not causing the congestion control such as the UDP between the intermediate driver 1008 and the intermediate driver 2006. Further it arrives at the SSL 2002 through the TCP session between the intermediate driver 2006 and the TCP 2003.

The SSL 2002 verifies the content of the SSL session establishment request according to the SSL protocol, notifies establishment of the SSL session between the SSL 2002 and the SSL 1002 to the processing speed acceleration engine control 2001 if it were not for a problem.

Upon receipt of the SSL session establishment notification, the processing speed acceleration engine control 2001 notifies the public key of the SSL 1002, the secret key of the SSL 2002, and further the common key to the SSL 1002 and the SSL 2002 received by the SSL session establishment notification to the intermediate driver 2006.

Upon receipt of a notification of the public key, the secret key, and the common key, the intermediate driver 2006 loads the public key, the secret key and the common key, the IP address of a partner apparatus of the SSL session (IP address of the session relay device 10), the destination port of a partner apparatus of the SSL session (port of the TCP 1003), the transmission source port number of the SSL session of its own node side (port number of the TCP 2003), the transmission source IP address (IP address of the gateway device 20), and the start command into the control frame, and notifies it to the processing speed acceleration engine 2014.

The control frame arrives at the processing speed acceleration engine 2014 through the driver 2007 and the MAC 2011.

The processing speed acceleration engine 2014 identifies the control frame by means of the MAC address etc., and receives it in the control frame transmitter/receiver. And, it preserves the public key, the secret key, and the common key, respectively, for a purpose of using them in the decoding and the encryption, and preserves the IP address or the port number for a purpose of analyzing the frame. And it receives the processing speed acceleration process start command, and starts the processes of the frame analysis, the encryption, and the decoding.

Prior to the processing speed acceleration process start command, the processing speed acceleration engine 2014 transmitted all frames received from the MAC 2011 other than the control frame to the PHY 2012 as they stood, and transmitted all frames received from the PHY 2012 other than the control frame to the MAC 2011 as they stood. However, after the processing speed acceleration process start command, the processing speed acceleration engine 2014 performs the following processes for the frame received from the PHY 2012 even though the operation of transmitting all frames received from the MAC 2011 other than the control frame to the PHY 2012 as they stands remains unchanged.

(1) If the frame is a frame addressed to the gateway device 20, and yet a frame encrypted in the SSL 1002, it undoes the encapsulation such as the UDP, undoes the fragmentation if necessary, decodes the frame, and transmits the frame to the PHY 2012 side.

(2) If the frame is a frame addressed to its own node except (1), it transfers the frame to the MAC 2011.

(3) If the frame is a broadcast frame, or a multicast frame, it copies the frame, transfers one copy to the MAC 2011 as it stands, and encrypts and encapsulates the other, which is transmitted to the SSL 1002 (PHY 2012 side). The frame is also fragmented if necessary.

(4) If the frame is a frame other than (1) to (3), it encrypts and encapsulates the frame, and transmits the frame to the SSL 1002 (PHY 2012 side). The frame is also fragmented if necessary.

As mentioned above, the session for transferring the frame not causing the congestion control such as the UDP is established between the processing speed acceleration engine 2014 and the intermediate driver 1008. Further, the SSL session is established between the processing speed acceleration engine 2014 and the SSL 1002.

That is, the SSL 1002 of the session relay device 10 exchanges the frame with the SSL 2002 of the gateway device only at the time of requesting establishment of the SSL session, and when establishment of the SSL session is finished, it exchanges information of the encryption and the decoding of the SSL with the processing speed acceleration engine 2014 after establishment of the SSL session.

Further, the intermediate driver 1008 of the session relay device 10 exchanges the frame with the intermediate driver 2006 of the gateway device 20 only at the time of requesting establishment of the SSL session, and exchanges the frame with the processing speed acceleration engine 2014 after establishing the SSL session.

Above, in the first embodiment, the operation in the case of establishing the SSL session (secure TCP session) from the gateway device 20 to the session relay device 10 is completed.

Additionally, in the foregoing example, the case of establishing the SSL session (secure TCP session) from the gateway device 20 to the session relay device 10 was exemplified to explain the operation, and an operation of establishing the SSL session (secure TCP session) from the gateway device 30 to the session relay device 10 is performed similarly.

Further, in the foregoing example, the configuration was employed for explanation in which the TCP within the intermediate driver 2006 received and reserved a request for establishing the TCP session for the TCP 1003, and transmitted the response packet (SYN+ACK) to the TCP 2003 after receiving the connection completion notification; however it is not limited hereto. That is, it is also acceptable to assume a configuration in which upon receipt of a request for establishing the TCP session, the TCP within the intermediate driver 2006 transmits the response packet (SYN+ACK) to the TCP 2003.

[An Operation of Transferring the Frame from the Terminal 21 to the Server 31]

The case of transferring the frame from the terminal 21 to the server 31 in the first embodiment will be exemplified to explain an operation by employing FIG. 16.

At this moment, it is assumed that the HUB 22 and the HUB 32 have already learned the MAC addresses of the terminal 21, the server 31, the LAN side of the Firewall 23, the LAN side of the Firewall 33, the gateway device 20, and the gateway device 30. Further, it is assumed that the HUB 11 has already learned the MAC addresses of the WAN side of the Firewall 23, the WAN side of the Firewall 33, and each device of the session relay device 10. Further, it is assumed that in a case where the device (LAN side) inside the intranet has employed the TCP to request a communication start of each device (WAN side) of the Internet, the Firewall 23 and the Firewall 33 allows the communication after it to be freely made in a bi-direction; however, contrarily, in a case where each device (WAN side) of the Internet has employed the TCP to request a communication start of each device (LAN side) of the intranet, they interrupt this request and communication as well after it in a bi-direction.

Further, it is assumed that the SSL session (secure TCP session) from the gateway device 20 to the session relay device 10 has been already established according to the foregoing operational example, and likewise, the SSL session (secure TCP session) as well from the gateway device 30 to the session relay device 10 has been already established according to the method similar to that of the SSL session from the gateway device 20 to the session relay device 10.

Further, it is assumed that the TCP session has been already constructed between the application 2101 within the terminal 21 and the application (application 3101) within the server 31.

Figure 2:
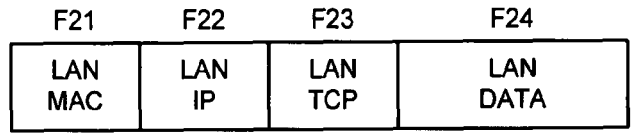
FIG. 2 is a block diagram illustrating a configuration of the Ethernet frame format F20 of the prior art 1.

The application 2101 within the terminal 21 delivers data (equivalent to F24 in FIG. 2) addressed to the application within the server 31 to the TCP 2102.

The TCP 2102 receives the data from the application 2101, adds the TCP header (F23 in FIG. 2) or the IP header (F22 in FIG. 2) according to the TCP protocol, thereby to converts it into an IP packet, and delivers it to the IP routing 2103. At this moment, the IP address of the server 31 is set to the IP DA within the LAN IP F22, and the IP address of the terminal 21 to the IP SA within the LAN IP F22.

The IP routing 2103 makes a reference to the destination IP address (addressed to the server 31) and the destination port (addressed to the TCP 3003) of the packet received from the TCP 2102, and transfers the data to the IP stack 2104 as it stands.

The IP stack 2104 receives the packet from the IP routing 2103, adds the MAC header (F21 in FIG. 2) to prepare an Ethernet frame, and delivers it to the driver 2105. This frame has a format of the Ethernet frame F20. At this time, the IP stack 2104 makes a reference to a result of the ARP, and sets the MAC address of the server 31 to the MAC DA within the LAN MAC F21 of the frame, and the MAC address of the terminal 21 to the MAC SA within the LAN MAC F21.

The driver 2105 receives the above-mentioned frame from the IP stack 2105, and transfers it to the NIC 211.

The NIC 211 receives the frame from the driver 2105, and transfers it to the HUB 22 through the MAC 2111, the PHY 2112, and the port 2113.

Upon receipt of the frame from the port 221 of the NIC 211 side of the terminal 21, the HUB 22 makes a reference to the MAC DA within F21 in the bridge 224, and outputs this frame to the port 222 of the gateway device 20 side as it stands based upon a result of learning the past routing because the MAC DA is an MAC address of the server 31.

The NIC 201 within the gateway device 20 receives the frame transmitted by the HUB 22 in the port 2013, and delivers it to the processing speed acceleration engine 2014 through the PHY 2012.

Figure 3:
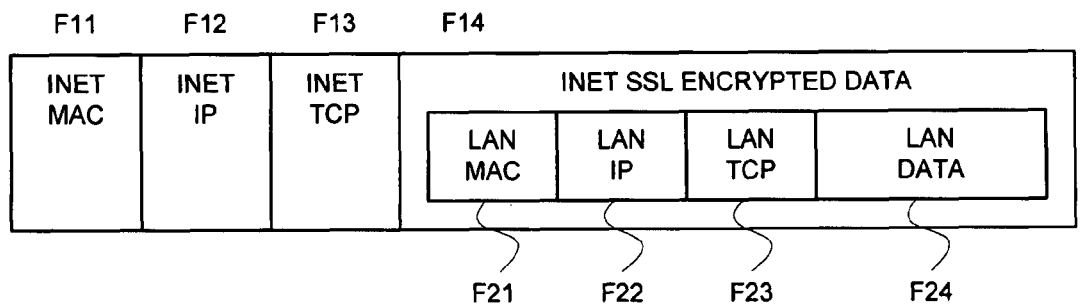
FIG. 3 is a block diagram illustrating a configuration of the Ether-over-SSL frame format F10 of the prior art 1.
Figure 4:
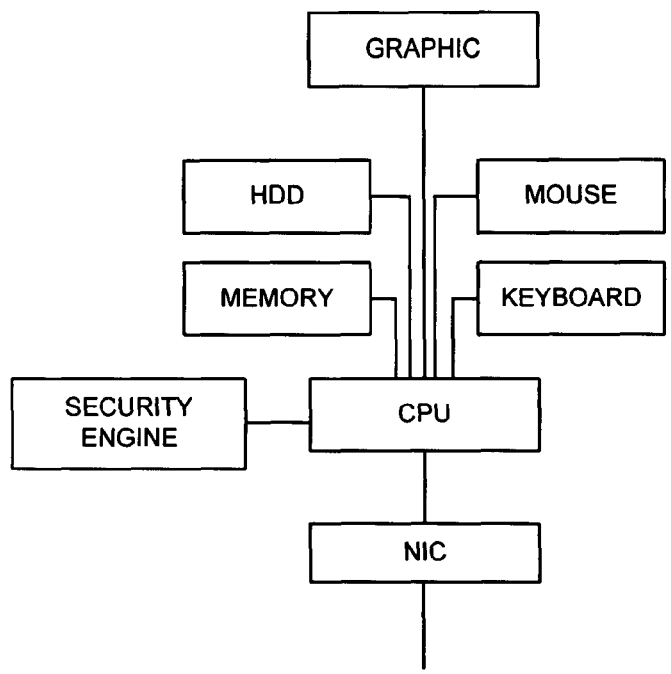
FIG. 4 is a block diagram illustrating an example of an application of the prior art 2 to a computer.

The processing speed acceleration engine 2014 encrypts the frame in the encryption 2014G within the processing speed acceleration engine 2014 to prepare data F14 in FIG. 3, and further adds each header of F11 to F13 in FIG. 3 in the encapsulation 2014I, thereby to convert it into a formatted frame having the Ether-over-SSL frame F10, and transfers it to the PHY 2012 side again because the destination MAC of the frame that has arrived is addressed to the server 31.

At this time, the MAC address of the LAN side of the Firewall 23 is set to the MAC DA within the INET MAC F11, and the MAC address of the gateway device 20 to the MAC SA within F11. Further, the IP address of the session relay device 10 is set to the IP DA within the INET IP F12, and the IP address of the gateway device 20 to the IP SA within F12. The processing speed acceleration engine 2014 adds the TCP header for feigning as if communication with the TCP 1003 within the session relay device 10 had been made to the INET TCP F13 for a purpose of allowing the frame to go through the Firewall 23. However, as a matter of fact, this TCP header does not affect the congestion control of the TCP 1003 because it is removed in the intermediate driver 1008 for the time being. Thus, F13 to be added here, which has a format of the TCP header, actually works only as the UDP. Supposing that the Firewall 23 does not exist, the UDP header may be added to F13.

Upon receipt of the frame from the processing speed acceleration engine 2014, the PHY 2012 transfers the frame to the HUB 22 through the port 2013.

Upon receipt of the frame from the port 222 of the gateway device 22 side, the HUB 22 makes a reference to the MAC DA within F11 in the bridge 224, and outputs this frame from the port 223 to the Firewall 23 as it stands based upon a result of learning the past routing because the MAC DA is an MAC address of the LAN side of the Firewall 23.

The Firewall 23 receives the frame transmitted by the HUB 22 in the NIC 231, transfers it in the order of the port 2313, the PHY 2312, the MAC 2311, and the driver 2304, and delivers it to the IP stack 2302.

The IP stack 2302 removes the MAC header F11, and sends the frame to the IP routing 2301.

The IP routing 2301 makes a reference to the IP DA within the header F12 of the received frame, and transfers the frame to the IP stack 2304 because the IP DA is an address that exists in the Internet 1 side.

The IP stack 2304 receives the frame from the IP routing 2301, and adds the header F11. Herein, it sets the MAC address of the session relay device 10 to the MAC DA within F11, and the MAC address of the WAN side of the Firewall 23 to the MAC SA within F11. In such a manner, it converts the received frame into a formatted frame having a form of the frame format F10, and transfers it to the HUB 11 through the driver 2305, the MAC 2321, the PHY 2322, and the port 2323.

Upon receipt of the frame transmitted by the Firewall 23 from the port 111, the HUB 11 makes a reference to the MAC DA within F11 in the bridge 114, and outputs this frame to the port 112 of the session relay device 10 side as it stands based upon a result of learning the past routing because the MAC DA is an MAC address of the session relay device 10.

Upon receipt of the frame transmitted by the HUB 11 from the port 1013, the session relay device 10 transfers it to the intermediate driver 1008 through the PHY 1012, the MAC 1011, and the driver 1009.

The intermediate driver 1008 receives the frame from the driver 1009. This frame has a form of the frame format F10 at the time of receiving; however the header F11, the header F12, and the header F13 thereof are deleted in the de-encapsulation 1008G, and only the encrypted data F14 is left. And, it delivers the data F14 to the TCP 1008A, and allows the data to flow to the TCP session pre-established between the TCP 1003 and the TCP 1008A within the intermediate driver.

The TCP 1008A within the intermediate driver 1008 adds the TCP header F13 and the IP header F12 necessary for the TCP communication with the TCP 1003 to the received data F14, and sends it to re-encapsulation 1008E. The IP address of the session relay device 10 is set to the IP DA within F12, and the IP address of the gateway device 20 to the IP SA within F12.

Upon receipt of the data from the TCP 1008A, the re-encapsulation 1008E within the intermediate driver 1008 adds the header F11 hereto, and sends it to the IP stack 1007. Herein, it sets the MAC address of the session relay device 10 to the MAC DA within F11, and the MAC address of the WAN side of the Firewall 23 to the MAC SA within F11. In such a manner, it converts the frame received from the TCP 1008A into a formatted frame having a form of the frame format F10, and transfers it to the IP stack 1007.

The IP stack 1007 removes the MAC header F11 of the frame received from the intermediate driver 1008, and sends the frame to the IP routing 1006.

The IP routing 1006 makes a reference to the IP DA within the header F12 and the destination port number within F13 of the received frame, and transfers the frame to the TCP 1003.

Upon receipt of the frame from the IP routing 1006, the TCP 1003 performs the process of sending back an ACK packet or the like according to the TCP protocol. And, it removes the TCP header F13 and the IP header F12 from the received frame, and transfers the data F14 to the SSL 1002.

Upon receipt of the data F14 from the TCP 1003, the SSL 1002 undoes the encryption with the decoding process, takes out an Ethernet frame F20, i.e. F21 to F24 from the data F14, and transfer it to the relay application 1001.

Upon receipt of the frame F20 from the SSL 1002, the relay application 1001 makes a reference to the MAC DA within F21, and allows this frame to flow to the SSL session pre-established with gateway device 30 based upon a result of learning the past routing because the MAC DA is an MAC address of the server 31. Thus, it transfers the frame to the SSL 1004 side as it stands.

Thereafter, the frame having the F20 format is again encrypted within the session relay device 10, further filed into a region of F14 in the format of F10, and transferred in a format of F10 to the gateway device 30 through a path from the session relay device 10 to the HUB 11, the Firewall 33, the HUB 32, and the gateway device 30.

And, upon receipt of the frame from the HUB 32 in a format of F10, the gateway device 30 undoes the encryption of F14, takes out an Ethernet frame F20 filed in F14, and transfers this frame in a format of F20 to the server 31 through the HUB 32.

This frame keeps the state of having been transmitted from the terminal 21 to the HUB 32 as it stands, in which the MAC address of the server 31 has been set to the MAC DA within the LAN MAC F21, and the MAC address of the terminal 21 to the MAC SA within the LAN MAC F21. Further, the IP address of the server 31 has been set to the IP DA within the LAN IP F22, and the IP address of the terminal 21 to the IP SA within the LAN IP F22.

The server 31 receives the frame transmitted from the HUB 32, and a series of the frame transfer from the application 2101 within the terminal 21 to the application 3101 within the server 31 is completed.

A series of the frame transfer from the application 3101 within the server 31 to the application 2101 within the terminal 21 also can be realized similarly by tracing the path opposite to that of the above-mentioned example.

Additionally, in this embodiment, the process between the intermediate driver and the TCP (for example, between the intermediate driver 1008 and the TCP 1003) becomes a process of a TCP-over-TCP format temporally in the software within the session relay device. However, a possibility that a decline in a speed due to the TCP over TCP occurs is extremely low because there exist almost no possibility that the packet is missing between the intermediate driver and the TCP. The reason is that the so-called TCP-over-TCP problem is the problem that a remarkable decline in a speed occurs when a packet loss occurs, and supposing that no packet loss occurs, even though the process of the TCP-over-TCP format is performed, window size of the TCP of the header F13 side becomes large at any time, and the problem such as a decline in a speed does not occur.

Even though the congestion control and the re-sending control of the TCP of the header F13 side are stopped substantially with the above-mentioned method, the congestion control and the re-sending control of the TCP of the header F23 side work as usual, whereby the congestion control as well as the re-sending control are taken without a problem owing to the working of the TCP within the terminal 21 and the TCP within the server 31 from a viewpoint of each application of the terminal 21 and the server 31.

[Effects of the Invention]

Next, effects of this embodiment will be explained.

Utilizing the invention listed in this embodiment enables a high-speed transfer of the frame between the terminal 21 and the server 31.

The reason is that utilizing the processing speed acceleration engine 2014 after establishing the SSL session makes it possible to exclude the encapsulation process and the encryption/decoding process by the CPU (software) in the gateway device 20 or the gateway device 30, and to realize all these processes by means of the processing speed acceleration engine (hardware).

In addition hereto, the reason is that a request for establishing the TCP session is terminated in the intermediate driver 1008 within the session relay device 10, or in the intermediate driver 2006 within the gateway device 20 and occurrence of the TCP-over-TCP problem is avoided so as to prevent the congestion control and the re-sending control due to the TCP at a position of the header F13 from occurring in communication between the gateway device 20 and the session relay device 10.

Further, utilizing the invention listed in this embodiment enables the cost for developing the hardware (processing speed acceleration engine) for the processing speed acceleration process and the cost for members to be suppressed at a relatively low level.

The reason is that the encryption and decoding as well as the encapsulation of the SSL can be executed on identical hardware (FPGA/ASIC).

Further, the reason is that the above-mentioned hardware can be packaged into the relatively inexpensive interface between the MAC and the PHY.

Further, the reason is that it is possible to leave the TCP process, which is difficult to package into the hardware, to the software, and to hardware-process only the encryption/decoding and encapsulation of the SSL, which are relatively easy to package into the hardware and yet have a large effect upon the processing speed acceleration process.

[Second Embodiment]

The second embodiment of the present invention differs from the first embodiment in a point of connecting the intranet 2 and the intranet 3 not through the Internet 1 but directly, and further, establishing the SSL session (secure TCP session) between the gateway device 20 and the gateway device 30 not through the session relay device 10 but directly.

A configuration and an operation of the terminal 21, the server 31, the HUB 22, the HUB 32, the gateway device 20, the gateway device 30, the intranet 2, and the intranet 3 in the second embodiment are identical that of the first embodiment except for an operation of setting up the session from the gateway device 30 toward the gateway device 20, or the session from the gateway device 30 toward the gateway device 20.

In the second embodiment, not only a closed LAN but also an open WAN such as Internet may be employed for the intranet 2.

[Explanation of a Configuration]

Figure 17:
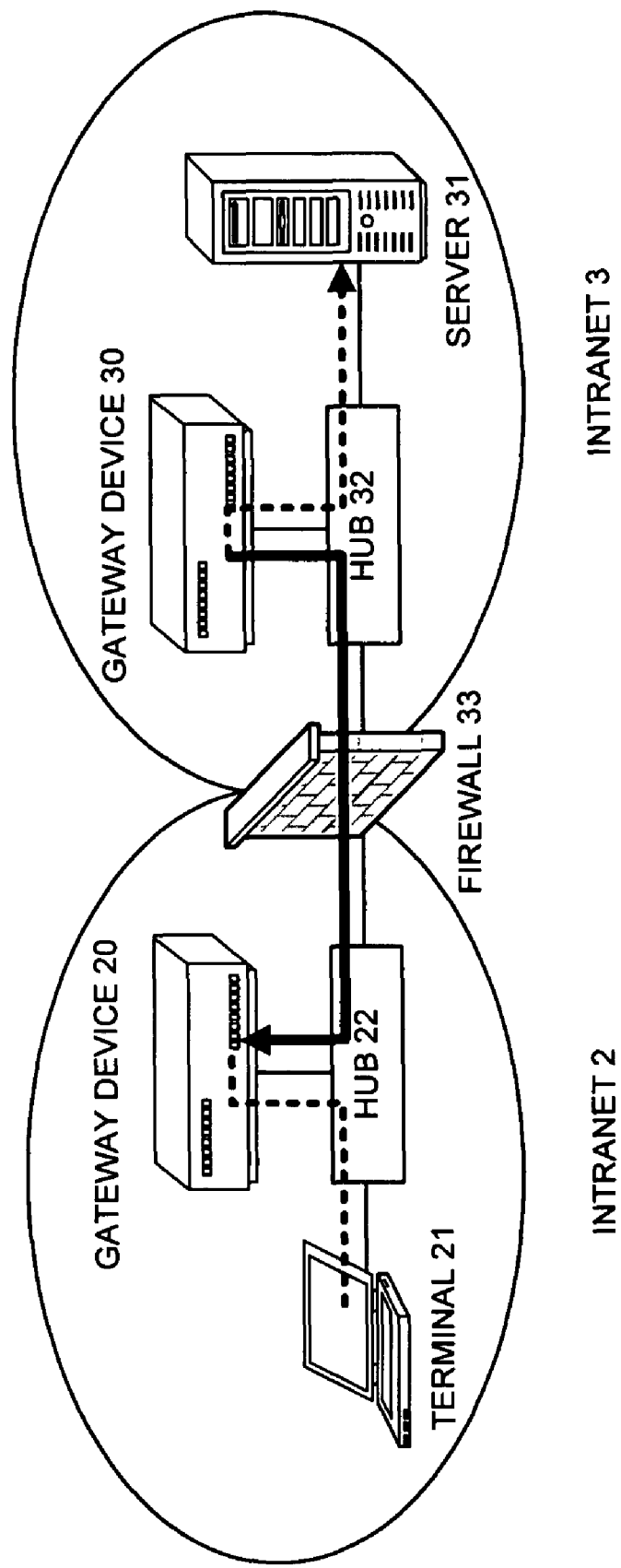
FIG. 17 is a block diagram illustrating a network configuration example in a second embodiment of the present invention.

FIG. 17 is a block diagram illustrating a network configuration in the second embodiment.

The intranet 2, which is configured of the gateway device 20, the terminal 21, the HUB 22, and the Firewall 33, is a local area network (LAN) for making communication between each of these appliances and the other. The intranet 2 is mutually connected to the intranet 3 via the WAN side of the Firewall 33, and the operation of the Firewall 33 allows communication between the intranet 2 and the intranet 3 to be restricted according to a pre-decided setting.

Each of the devices within intranet 2, which is mutually connected via the HUB 22, can make communication freely with the other without restriction by the foregoing Firewall 33 etc. Further, in FIG. 17, the intranet 2 and the intranet 3 are mutually connected by the gateway device 20 and the gateway device 30 so that they operate as an identical LAN, whereby communication can be made freely between each device within the intranet 2 and each device within the intranet 3 as well without restriction by the foregoing Firewall 33 etc.

The intranet 3, which is configured of the gateway device 30, the server 31, the HUB 32, and the Firewall 33, is a local area network (LAN) for making communication between each of theses appliances and the other. The intranet 3 is mutually connected to the intranet 2 via the Firewall 33, and an operation of the Firewall 33 allows communication between the intranet 2 and the intranet 3 to be restricted according to a pre-decided setting.

Each of the devices within intranet 3, which is mutually connected via the HUB 32, can make communication freely with the other without restriction by the foregoing Firewall 33 etc. Further, in FIG. 17, the intranet 2 and the intranet 3 are mutually connected by the gateway device 20 and the gateway device 30 so that they operate as an identical LAN, whereby communication can be made between each device within the intranet 2 and each device within the intranet 3 as well without restriction by the foregoing Firewall 33 etc.

Figure 18:
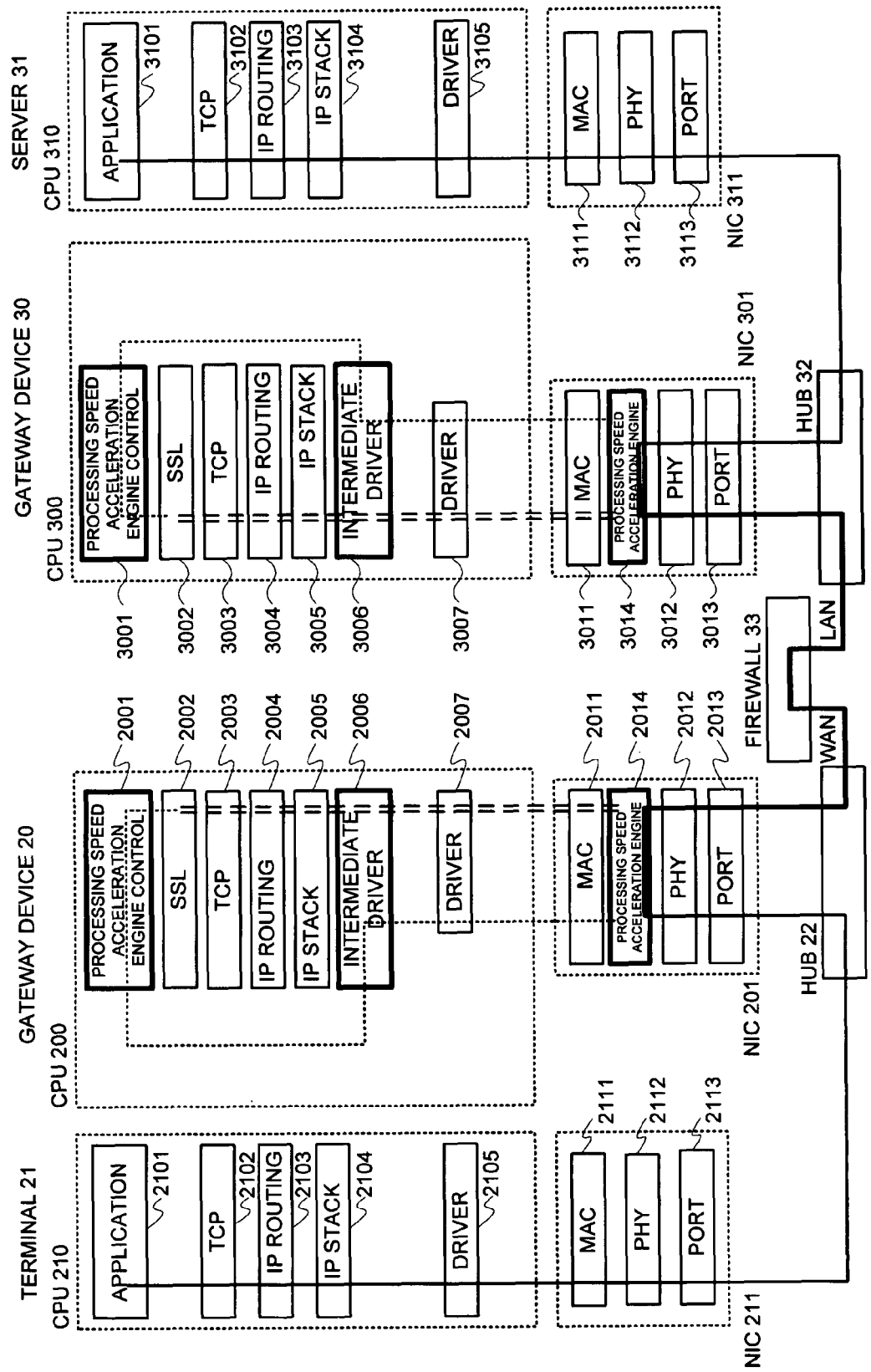
FIG. 18 is a block diagram illustrating a network configuration and a communication path in the second embodiment of the present invention.

FIG. 18 is a block diagram having a configuration of each apparatus and a transfer path of the frame in the second embodiment shown in details.

The gateway device 20 has a configuration similar to that of the gateway device 20 in the first embodiment. However, an operation of a processing speed acceleration engine control 2001 within the gateway device 20 includes not only the operation in the first embodiment but also an operation of receiving a session connection request from the other gateway device (gateway device 30 etc.).

The gateway device 30 has a configuration similar to that of the gateway device 30 in the first embodiment. That is, it has a configuration similar to that of the gateway device 20, and operates a similar operation. However, an operation of a processing speed acceleration engine control 3001 within the gateway device 30 includes not only the operation in the first embodiment but also an operation of receiving a session connection request from the other gateway device (gateway device 20 etc.).

Each of the terminal 21, the server 31, the HUB 22, and the HUB 32 has a configuration similar to that of the first embodiment, and performs a similar operation.

The Firewall 33 is an apparatus for mutually connecting the intranet 3 and the intranet 2, the LAN side port thereof is connected to each apparatus over the intranet 3 via the HUB 32, and the WAN side port thereof is connected to each apparatus over the intranet 2 via the HUB 22.

The Firewall 33 performs an operation of restricting communication between the intranet 2 and the intranet 3 according to a pre-decided setting. For example, it permits communication between the gateway device 20 and the gateway device 30 in a bi-direction, and interrupts direct communication between the terminal 21 and the server 31, which does not go through the gateway device 20 or the gateway device 30, in a bi-direction.

Thus, in the second embodiment, an access to the apparatus within the intranet 3 from the apparatus within the intranet 2 is enabled only in the case that the SSL session has been pre-established between the gateway device 20 and the gateway device 30.

[Explanation of an Operation]
[An Operation of Establishing the SSL Session]

The case of establishing the SSL session (secure TCP session) from the gateway device 30 to the gateway 20 in the second embodiment will be exemplified to explain the operation by employing FIG. 18.

At this moment, it is assumed that the HUB 22 and the HUB 32 have already learned the MAC addresses of the terminal 21, the server 31, the WAN side of the Firewall 33, the LAN side of the Firewall 33, the gateway device 20, and the gateway device 30.

Further, it is assumed that the Firewall 33 permits communication between the gateway device 20 and the gateway device 30 in a bi-direction, and interrupts direct communication between the terminal 21 and the server 31, which does not go through the gateway device 20 or the gateway device 30, in a bi-direction.

When the processing speed acceleration engine control 2001 within the gateway device 20 comes into a wait state of a connection from the gateway device 30 after starting, it notifies a start of the wait state to the intermediate driver 2006. This notification includes the IP address of the gateway device 20, and the wait port number of the processing speed acceleration engine control 2001.

Upon receipt of a notification from the processing speed acceleration engine control 2001, the intermediate driver 2006 makes the setting in the frame analysis process so that the process such as the connection/termination of the TCP session can be performed at the moment that the packet addressed to the processing speed acceleration engine control 2001 has arrived.

A processing speed acceleration engine control 3001 within the gateway device 30 receives a request for connecting to the processing speed acceleration engine control 2001 within the gateway device 20 from a user, and instructs an SSL 3002 to start communication with the processing speed acceleration engine control 2001 within the gateway device 20. Simultaneously, it notifies a start of communication with the processing speed acceleration engine control 2001 within the gateway device 20 to an intermediate driver 3006. The IP address of the gateway device 20, the port number of the processing speed acceleration engine control 2001, the transmission source port number of the processing speed acceleration engine control 3001, and further the IP address of the gateway device 30 are included in this notification.

The SSL 3002 receives an instruction for starting communication from the processing speed acceleration engine control 3001, and instructs a TCP 3003 to start communication with the processing speed acceleration engine control 2001 within the gateway device 20 for a purpose of establishing the SSL session with the SSL 2002.

The TCP 3003 receives an instruction for starting communication from the SSL 3002, and transmits a packet (SYN) for requesting establishment of the TCP session with the TCP 2003 to an IP routing 3004 for a purpose of establishing the TCP session with the TCP 2003. This packet is a packet in line with the TCP specification, in which the gateway device 20 has been set to the destination IP address, and the TCP 2003 to the destination port number. This so-called TCP session establishment request packet is an SYN packet that is transmitted for a three-way handshake in establishing the TCP session. In this specification, for simplifying explanation of the TCP session establishment operation, out of the packets that are transmitted/received with the three-way handshake, the SYN packet is called a TCP session establishment request packet, and the SYN+ACK packet is called a response packet. Further, as a matter of fact, the ACK packet is also transmitted; however its explanation is omitted in the explanation of this operation because it is transferred similarly to the SYN packet.

The IP routing 3004 makes a reference to the destination IP address and the destination port number of the packet received from the TCP 3003, and transfers the packet to an IP stack 3005.

The IP stack 3005 adds the MAC address of the intranet 3 side within the Firewall 33 to the packet received from the IP routing 3004 as a destination MAC address, further sets the MAC address of its own node to the transmission source MAC address, thereby to prepares a frame, and transfers it to the intermediate driver 3006.

The intermediate driver 3006 receives the frame from the IP stack 3005, and makes a frame analysis. As a result of the analysis, the frame is a frame to which the destination IP, the destination port, the transmission source IP, and the transmission source port pre-notified from the processing speed acceleration engine control 3001 have been added, whereby it removes the MAC header in the de-encapsulation, thereby to convert it into a packet. And, the intermediate driver 3006 terminates the process of requesting establishment of the TCP session from the TCP 3003 to the TCP 2003 in the TCP section of the intermediate driver 3006. That is, originally, the TCP 3003 requested the TCP 2003 to establish the TCP session; however as a matter of fact, the TCP within the intermediate driver 3006 receives and reserves this request, thereby to terminate the process of requesting establishment of the TCP session between the TCP 3003 and the TCP within the intermediate driver 3006.

The intermediate driver 3006 sends a driver 3007 a connection request packet for requesting a connection to the TCP 2003 in terminating the above-mentioned process of requesting establishment for a purpose of requesting the intermediate driver 2006 to establish the TCP session with the TCP 2003. In this connection request packet, the gateway device 20 is set to the destination IP address, and the TCP 2003 to the destination port number. And, this packet, to which the destination MAC address and the transmission source MAC address are set, becomes a connection request frame. Additionally, the above-mentioned connection request packet is not a packet in line with the TCP specification, but a peculiar packet.

The driver 3007 receives the connection request frame from the intermediate driver 3006, and transfers it to an MAC 3011.

The MAC 3011 receives the frame from the driver 3007, and transfers it to a processing speed acceleration engine 3014.

The processing speed acceleration engine 3014 receives the frame from the MAC 3011, and transfers it to a PHY 3012 as it stands.

The PHY 3012 receives the frame from the processing speed acceleration engine 3014, and transfers it to a port 3013.

The port 3013 receives the frame from the PHY 3012, and transfers it to the HUB 32 via the Ethernet cable.

Upon receipt of the frame, the HUB 32 makes a reference to the MAC DA, and outputs this frame to the port of the Firewall 33 side as it stands based upon a result of learning the past routing because the MAC DA is an MAC address of the LAN side of the Firewall 33.

The Firewall 33 receives the packet from the HUB 22, permits this for a purpose of communication from the gateway device 30 to the gateway device 20 and transfers it to the HUB 22.

The HUB 22 receives the frame from the Firewall 33, and transfers this frame to the gateway device 20 as it stands based upon a result of learning the past routing.

The gateway device 20 receives the frame from the HUB 22, and transfers the frame to the intermediate driver 2006 through the path of the port 2013, the PHY 2012, the processing speed acceleration engine 2014, the MAC 2011, and the driver 2007. At this time, the processing speed acceleration engine 2014 transfers the frame received from the PHY to the MAC 2011 as it stands.

The intermediate driver 2006 receives the connection request frame from the driver 2007, and makes a frame analysis. As a result of the analysis, this frame is a frame to which the destination IP and the destination port to the processing speed acceleration engine control 2001 pre-notified from the processing speed acceleration engine control 2001 have been added, whereby it receives this frame, and removes the MAC header in the de-encapsulation, thereby to convert it into a packet. The packet is a packet of requesting a connection to the TCP 2003 transmitted to the intermediate driver 2006 from the intermediate driver 3006, whereby the TCP within the intermediate driver 2006 transmits a TCP session establishment request packet necessary for establishing the session with the TCP 2003 to the IP stack 2005 for a purpose of establishing the TCP session with the TCP 2003. This packet is a packet in line with the TCP specification, in which the gateway device 20 is set to the destination IP address, the TCP 2003 to the destination port number, further the IP address of the gateway device 30 to the transmission source IP address, and the port number of the TCP 3003 to the transmission source port number. And, this packet, to which the MAC address is added by the re-encapsulation within the intermediate driver 2006, is converted into a framed packet, and transferred to the IP stack 2005.

That is, the TCP within the intermediate driver 2006 requests the TCP 2003 to establish the TCP session under a false name of the TCP 3003. Thus, the TCP 2003 recognizes as if it had made communication with the TCP 3003, and further the TCP 3003 recognizes as if it had made communication with the TCP 2003. However, it follows that the actual process of establishing the TCP session is performed between the TCP 3003 and the TCP within the intermediate driver 3006, and between the intermediate driver 2006 and the TCP 2003, and further, communication is separately made between the intermediate driver 3006 and the intermediate driver 2006 with the method (peculiar packet in the communication system of the present invention) not causing the congestion control such as the UDP. And, the TCP session between the TCP 3003 and the intermediate driver 3006, the communication session such as the UDP between the intermediate driver 3006 and the intermediate driver 2006, and further the TCP session between the intermediate driver 2006 and the TCP 2003 are mutually connected/relayed by the intermediate driver 3006 and the intermediate driver 2006, thereby allowing the communication to be made as if the TCP session had been established between the TCP 3003 and the TCP 2003.

The IP stack 2005 receives the frame from the intermediate driver 2006, removes the MAC header, thereby to convert it into a packet, and transfers it to the IP routing 2004.

The IP routing 2004 makes a reference to the destination port number of the packet received from the IP stack 2005, and transfers this packet to the TCP 2003 because the port number of the TCP 2003 side has been added.

The TCP 2003 receives the packet from the IP routing 2004. It gives a response packet (SYN+ACK) necessary for establishing the TCP session as a reply according to the TCP protocol because this packet is a TCP session establishment request packet (SYN). At this moment, the TCP 2003 recognizes that the TCP session establishment request is one that has arrived from the TCP 3003. The reason is that the actual establishment request was transmitted from the TCP within the intermediate driver 2006; however the TCP 1003 recognizes as if it had established the session with the TCP 3003 because the TCP within the intermediate driver 2006 requested the TCP 2003 to establish the TCP session under a false name of the TCP 3003.

Thus, the TCP 2003 transmits the response packet (SYN+ACK) addressed to the TCP 3003. That is, the IP address of the gateway device 30 is set to the destination IP of the response packet, and the port number of the TCP 3003 to the destination port thereof.

The response packet from the TCP 2003 is sent to the IP routing 2004 and the IP stack 2005, and is converted into a response frame by adding the MAC header herein, which arrives at the intermediate driver 2006.

Upon receipt of the response frame, the intermediate driver 2006 removes the MAC header of the response frame, thereby takes out a response packet in the de-encapsulation within the intermediate driver 2006, receives this response packet (SYN+ACK) in the TCP, and transmits an ACK packet of this response packet to the TCP 2003, thereby to terminate the process of the TCP. And, it transmits to the intermediate driver 3006 a connection completion notification packet for notifying completion of a connection. This connection completion notification packet is not a packet in line with the TCP specification, but is a peculiar packet in the communication system of the present invention. The gateway device 30 is set to the destination IP address of this packet, the TCP 3003 to the destination port number, the gateway device 20 to the transmission source IP address, and the TCP 2003 to the transmission source port number. And, the intermediate driver 2006 adds the MAC header to the connection completion notification packet in the re-encapsulation within the intermediate driver, thereby to prepare a connection completion notification frame.

The connection completion notification frame arrives at the intermediate driver 3006 within the CPU 300 through the path opposite to that of the connection request, i.e. the driver 2007, the NIC 201, the HUB 22, the Firewall 33, the HUB 32, and the NIC 301.

The intermediate driver 3006 receives the connection completion notification frame, and makes a frame analysis. As a result of the analysis, the frame is a frame to which the destination IP and the destination port to the processing speed acceleration engine control 3001 pre-notified from the processing speed acceleration engine control 3001 have been added, whereby it receives this frame, removes the MAC header in the de-encapsulation, thereby to convert it into a packet. The packet is a packet of notifying completion of a connection between the TCP 2003 and the intermediate driver 2006 transmitted to the intermediate driver 3006 from the intermediate driver 2006, whereby the TCP within the intermediate driver 3006 transmits a response packet to the IP stack 3005 according to the TCP protocol for a purpose of sending the response packet (SYN+ACK) necessary for establishing the session to the TCP 3003.

The response packet (SYN+ACK) arrives at the TCP 3003 through the IP stack 3005 and the IP routing 3004.

The TCP 3003 receives the response packet (SYN+ACK) from the IP routing 3004. It notifies completion of a connection of the TCP session with the TCP 2003 to the SSL 3002 because this packet is a response packet to a request for establishing the TCP session. At this moment, the TCP 3003 recognizes that the received response packet (SYN+ACK) is one that has arrived from the TCP 2003. The reason is that as a matter of fact, this response packet is one transmitted from the TCP within the intermediate driver 3006; however the TCP 3003 recognizes as if the response packet had been given by the TCP 2003 because the TCP within the intermediate driver 3006 transmitted a response packet to a request for establishing the session to the TCP 3003 under a false name of the TCP 2003.

Upon receipt of the response packet (SYN+ACK), the TCP 3003 generates an ACK packet to this response packet addressed to the TCP 2003, and transmits it. This ACK packet, which is received by the TCP of the intermediate driver 3006 via the IP routing 2004 and the IP stack 2005, allows the TCP process to be terminated.

The SSL 3002 receives the connection completion notification from the TCP 3003, and transmits a packet (SSL session establishment request packet) for requesting establishment of the session according to the SSL protocol for a purpose of establishing the SSL session with the SSL 2002.

The SSL session establishment request packet, which is received in the TCP 3003, goes through the TCP session established between the TCP 3003 and the TCP within the intermediate driver 3006, and arrives at the intermediate driver 3006.

The intermediate driver 3006 terminates the TCP process of the SSL session establishment request packet, adds the header not causing the congestion control such as the UDP, and transmits the packet to the intermediate driver 2006. The packet arrives at the intermediate driver 2006 through the NIC 301, the HUB 32, the Firewall 33, the HUB 22, and the NIC 201. At this moment, the processing speed acceleration engine 3014 within the NIC 301 transfers the packet received from the MAC 3011 to the PHY 3012 as it stands, and the processing speed acceleration engine 2014 within the NIC 201 transfers the packet received from the PHY 2012 to the MAC 2011 as it stands.

The SSL session establishment request packet, which is received by the intermediate driver 2006, goes through the TCP session established between the TCP within the intermediate driver 2006 and the TCP 2003, and arrives at the TCP 2003.

The TCP 2003 transfers the packet to the SSL 2002.

The SSL 2002 verifies the content of the SSL session establishment request, notifies establishment of the session with the SSL 3002 to the processing speed acceleration engine control 2001 if it were not for a problem, and simultaneously therewith, transmits a SSL session establishment response packet to the SSL 3002 according to the SSL protocol.

Upon receipt of the SSL session establishment notification from the SSL 2002, the processing speed acceleration engine control 2001 notifies the public key of the SSL 3002, the secret key of the SSL 2002, and further, the common key to the SSL 2002 and the SSL 3002 received by the SSL session establishment notification to the intermediate driver 2006.

Upon receipt of a notification about the public key, the secret key, and the common key, the intermediate driver 2006 loads the public key, the secret key and the common key, the IP address (IP address of the gateway device 30) of a partner apparatus of the SSL session, the destination port (port of the TCP 3003) of a partner apparatus of the SSL session, the transmission source port number (port number of the TCP 2003) of the SSL session of its own node side, the transmission source IP address (IP address of the gateway device 20), and the start command into the control frame, and notifies it to the processing speed acceleration engine 2014.

The control frame arrives at the processing speed acceleration engine 2014 through the driver 2007 and the MAC 2011.

The processing speed acceleration engine 2014 identifies the control frame by use of the MAC address etc., and receives it in the control frame transmitter/receiver. And, it preserves the public key, the secret key, and the common key, respectively, for a purpose of using them in the decoding and the encryption, and preserves the IP address or the port number for a purpose of analyzing the frame. And it receives the processing speed acceleration process start command, and starts the processes of the frame analysis, the encryption, and the decoding.

Prior to the processing speed acceleration process start command, the processing speed acceleration engine 2014 transmitted all frames received from the MAC 2011 other than the control frame to the PHY 2012 as they stood, and transmitted all frames received from the PHY 2012 to the MAC 2011 as they stood. However, after the processing speed acceleration process start command, the processing speed acceleration engine 2014 performs the processes described below for the frame received from the PHY 2012 even though the operation of transmitting all frames received from the MAC 2011 other than the control frame to the PHY 2012 as they stand remains unchanged.

(1) If the frame is a frame addressed to the gateway device 20, and yet a frame encrypted in the SSL 3002, it undoes the encapsulation such as the UDP, undoes the fragmentation if necessary, decodes the frame, and transmits it to the PHY 2012.

(2) If the frame is a frame addressed to its own node except for (1), it transfers the frame to the MAC 2011.

(3) If the frame is a broadcast frame, or a multicast frame, it copies the frame and transfers one copy to the MAC 2011 as it stands, and encrypts and encapsulates the other, which is transmitted to the SSL 3002 (PHY 2012 side). The frame is also fragmented if necessary.

(4) If the received frame is a frame other than (1) to (3), it encrypts and encapsulates the frame, which is transmitted the SSL 3002 (PHY 2012 side). The frame is also fragmented if necessary.

The SSL session establishment response packet transmitted from the SSL 2002 arrives at the intermediate driver 2006 through the path opposite to that of the SSL session establishment request packet, i.e. the TCP session between the TCP 2003 and the intermediate driver 2006, and arrives at the intermediate driver 3006 through the session no causing the congestion control such as the UDP between the intermediate driver 2006 and the intermediate driver 3006. Further, it arrives at the SSL 3002 through the TCP session between the intermediate driver 3006 and the TCP 3003.

The SSL 3002 verifies the content of the SSL session establishment request according to the SSL protocol, and notifies establishment of the SSL session between the SSL 3002 and the SSL 2002 to the processing speed acceleration engine control 3001 if it were not for a problem.

The processing speed acceleration engine control 3001 sends the public key of the gateway device 20, the secret key of the gateway device 30, the common key to the gateway device 20 and the gateway device 30, the processing speed acceleration process start command, etc. to the processing speed acceleration engine 3014 in a method similar to that of the processing speed acceleration engine control 2001, i.e. through the intermediate driver 3006.

The processing speed acceleration engine 3014 receives a notification about the public key etc. from the processing speed acceleration engine control 3001, and operates similarly to the processing speed acceleration engine 2014.

As mentioned above, when the SSL session is established between the SSL 2002 and the SSL 3002, thereafter, communication by the SSL is made between the processing speed acceleration engine 2014 and the processing speed acceleration engine 3014 without going through the SSL 2002 or the SSL 3002.

Above, in the second embodiment, the operation in the case of establishing the SSL session (secure TCP session) from the gateway device 30 to the gateway device 20 is completed.

[An Operation of Transferring the Frame from the Terminal 21 to the Server 31]

The case of transferring the frame from the terminal 21 to the server 31 in the second embodiment will be exemplified to explain the operation by employing FIG. 18.

At this moment, it is assumed that the HUB 22 and the HUB 32 have already learned the MAC addresses of the terminal 21, the server 31, the Firewall 33, the gateway device 20, and the gateway device 30.

Further, it is assumed that the Firewall 33 permits communication between the gateway device 20 and the gateway device 30 in a bi-direction, and interrupts direct communication between the terminal 21 and the server 31, which does not go through the gateway device 20 or the gateway device 30, in a bi-direction.

Further, it is assumed that the SSL session (secure TCP session) from the gateway device 30 to the gateway device 20 has already established according to the foregoing operational example.

Further, it is assumed that the TCP session has been already constructed between the application 2101 within the terminal 21 and the application (application 3101) within the server 31.

The application 2101 within the terminal 21 delivers the data addressed to the application 3101 within the server 31 to the TCP 2102.

The TCP 2102 receives the data from the application 2101, adds the TCP header (F23 in FIG. 2) and the IP header (F22 in FIG. 2) according to the TCP protocol, thereby to convert it into an IP packet, and delivers it to the IP routing 2103. At this time, the IP address of the server 31 is set to the IP DA within the LAN IP F22, and the IP address of the terminal 21 to the IP SA within the LAN IP F22.

The IP routing 2103 makes a reference to the destination IP address (addressed to the server 31) and the destination port (addressed to the TCP 3102) of the packet received from the TCP 2102, and transfers the data to the IP stack 2104 as it stands.

The IP stack 2104 receives the packet from the IP routing 2103, adds the MAC header (F21 in FIG. 2), thereby to prepare an Ethernet frame, and delivers it to the driver 2105. This frame has a format of the Ethernet frame F20. At this time, the IP stack 2104 makes a reference to a result of the ARP, and sets the MAC address of the server 31 to the MAC DA within the LAN MAC F21 of the frame, and the MAC address of the terminal 21 to the MAC SA within the LAN MAC F21.

The driver 2105 receives the above-mentioned frame from the IP stack 2105, and transfers it to the NIC 211.

The NIC 211 receives the frame from the driver 2105, and transfers it to the HUB 22 through the MAC 2111, the PHY 2112, and the port 2113.

Upon receipt of the frame from the port of the NIC 211 side of the terminal 21, the HUB 22 makes a reference to the MAC DA within F21, and outputs this frame to the port of the gateway device 20 side as it stands based upon a result of learning the past routing because the MAC DA is an MAC address of the server 31.

The NIC 201 within the gateway device 20 receives the frame transmitted by the HUB 22 in the port 2013, and delivers it to the processing speed acceleration engine 2014 through the PHY 2012.

The destination MAC of the frame that arrived is addressed to the server 31, whereby the processing speed acceleration engine 2014 encrypts the frame in the encryption 2014G within the processing speed acceleration engine 2014, thereby to prepare data F14 in FIG. 3 and further adds each header of F11 to F13 in FIG. 3 in the encapsulation 2014I, thereby to convert it into a formatted frame having the Ether-over-SSL frame F10, and transfers it to the PHY 2012 again.

At this time, the MAC address of the WAN side of the Firewall 33 is set to the MAC DA within the INET MAC F11, and the MAC address of the gateway device 20 to the MAC SA within F11. Further, the IP address of the gateway device 30 is set to the IP DA within the INET IP F12, and the IP address of the gateway device 20 to the IP SA within F12. With the INET TCP F13, the processing speed acceleration engine 2014 adds the TCP header for feigning as if communication with the TCP 3003 within the gateway device 30 had been made for a purpose of allowing the frame to go through the Firewall 33. However, as a matter of fact, this TCP header does not affect the congestion control of the TCP 3003 because it is removed in the intermediate driver 3006 for the time being. Thus, F13 to be added here, which has a format of the TCP header, actually works only as the UDP. Supposing that the router has been mounted instead of the Firewall 33, the UDP header may be added to F13.

Upon receipt of the frame from the processing speed acceleration engine 2014, the PHY 2012 transfers the frame to the HUB 22 through the port 2013.

Upon receipt of the frame from the port of the gateway device 22 side, the HUB 22 makes a reference to the MAC DA within F11, and outputs this frame to the Firewall 33 as it stands based upon a result of learning the past routing because the MAC DA is an MAC address of the WAN side of the Firewall 33.

The Firewall 33 receives the frame transmitted by the HUB 22, makes a reference to the IP DA, thereby to change the MAC header F14, and transfers the received frame with a form of the frame format F10 unchanged to the HUB 32.

Herein, the MAC address of the gateway device 30 is set to the MAC DA within F11, and the MAC address of the LAN side of the Firewall 33 to the MAC SA within F11.

Upon receipt of the frame transmitted by the Firewall 33, the HUB 32 makes a reference to the MAC DA within F11, and outputs this frame to the port of the gateway device 30 side as it stands based upon a result of learning the past routing because the MAC DA is an MAC address of the gateway device 30.

The NIC 301 within the gateway device 30 receives the frame transmitted by the HUB 32 in the port 3013, and transfers it to the processing speed acceleration engine 3014 through the PHY 3012.

The destination MAC of the frame that has arrived is addressed to the gateway device 30, and the frame has already been encrypted in the gateway device 20, whereby the processing speed acceleration engine 3014 deletes each header of F11 to F13 in the encapsulation 3014J within the processing speed acceleration engine 3014 to take out only data F14 in FIG. 3, decodes the data F14 in decoding 3014L, takes out data (Ethernet frame F20) of F21 to F24 filed into the data F14, and transfers it to the PHY 3012 side again.

This frame keeps the state of having been transmitted from the terminal 21 to the HUB 22 as it stands, in which the MAC address of the server 31 has been set to the MAC DA within the LAN MAC F21, and the MAC address of the terminal 21 to the MAC SA within the LAN MAC F21. Further, the IP address of the server 31 has been set to the IP DA within the LAN IP F22, and the IP address of the terminal 21 to the IP SA within the LAN IP F22.

Upon receipt of the frame from the processing speed acceleration engine 3014, the PHY 3012 transfers the frame to the HUB 32 through the port 3013.

Upon receipt of the frame from the port of the gateway device 30 side, the HUB 32 makes a reference to the MAC DA within F21, and outputs this frame to the port of the server 31 side as it stands based upon a result of learning the past routing because the MAC DA is an MAC address of the server 31.

The server 31 receives the frame transmitted from the HUB 32, and delivers the data F24 within the frame to the application 3101 through the driver 3105, the IP stack 3104, the IP routing 3103, and the TCP 3102.

As mentioned above, a series of the frame transfer from the application 2101 within the terminal 21 to the application 3101 within the server 31 is completed.

A series of the frame transfer from the application 3101 within the server 31 to the application 2101 within the terminal 21 also can be realized similarly by tracing the path opposite to that of the above-mentioned example.

Even though the congestion control and the re-sending control of the TCP of the header F13 side are stopped substantially with the above-mentioned method, the congestion control and the re-sending control of the TCP of the header F23 side work as usual, whereby the congestion control as well as the re-sending control are taken without a problem owing to the working of the TCP within the terminal 21 and the TCP within the server 31 from a viewpoint of each application of the terminal 21 and the server 31.

Additionally, in this embodiment, it is also possible to exchange the installation location of the server 31 for that of the terminal 21.

[Effects of the Invention]

Next, effects of this embodiment will be explained.

Utilizing the invention listed in this embodiment enables a high-speed transfer of the frame between the terminal 21 and the server 31.

The reason is that utilizing the processing speed acceleration engines 2014 and 3014 makes it possible to exclude the encapsulation process and the encryption/decoding process by the CPU (software) in the gateway device 20 and the gateway device 30, and to realize all these processes by means of the processing speed acceleration engine (hardware).

In addition hereto, the reason is that the TCP within the gateway device 20 and the TCP within the gateway device 30 are terminated in the intermediate driver within the gateway device 30 and the intermediate driver within the gateway device 20, respectively, and occurrence of the TCP-over-TCP problem is avoided so as to prevent the congestion control and the re-sending control due to the TCP at a position of the header F13 from occurring in communication between the gateway device 20 and the gateway device 30.

Further, utilizing the invention listed in this embodiment enables the cost for developing the hardware (processing speed acceleration engine) for the processing speed acceleration process and the cost for members to be suppressed at a relatively low level.

The reason is that the encryption/decoding and the encapsulation can be executed on identical hardware (FPGA/ASIC).

Further, the reason is that the hardware can be packaged into the relatively inexpensive interface between the MAC and the PHY.

Further, the reason is that it is possible to leave the TCP process, which is difficult to package into the hardware, to the software, and to hardware-process only the encryption/decoding and encapsulation, which are relatively easy to package into the hardware and yet have a large effect upon the processing speed acceleration process.

[Third Embodiment]

The third embodiment of the present invention differs from the second embodiment in a point that the processing speed acceleration engine 3014 does not exist within the gateway device 30, and a gateway application 3001A exists instead of the processing speed acceleration engine control 3001.

A configuration and an operation of the terminal 21, the server 31, the HUB 22, the HUB 32, the gateway device 20, the intranet 2, and the intranet 3 in the third embodiment are identical to that of the second embodiment.

In the third embodiment, not only a closed LAN but also an open WAN such as Internet may be employed for the intranet 2.

[Explanation of a Configuration]

Figure 19:
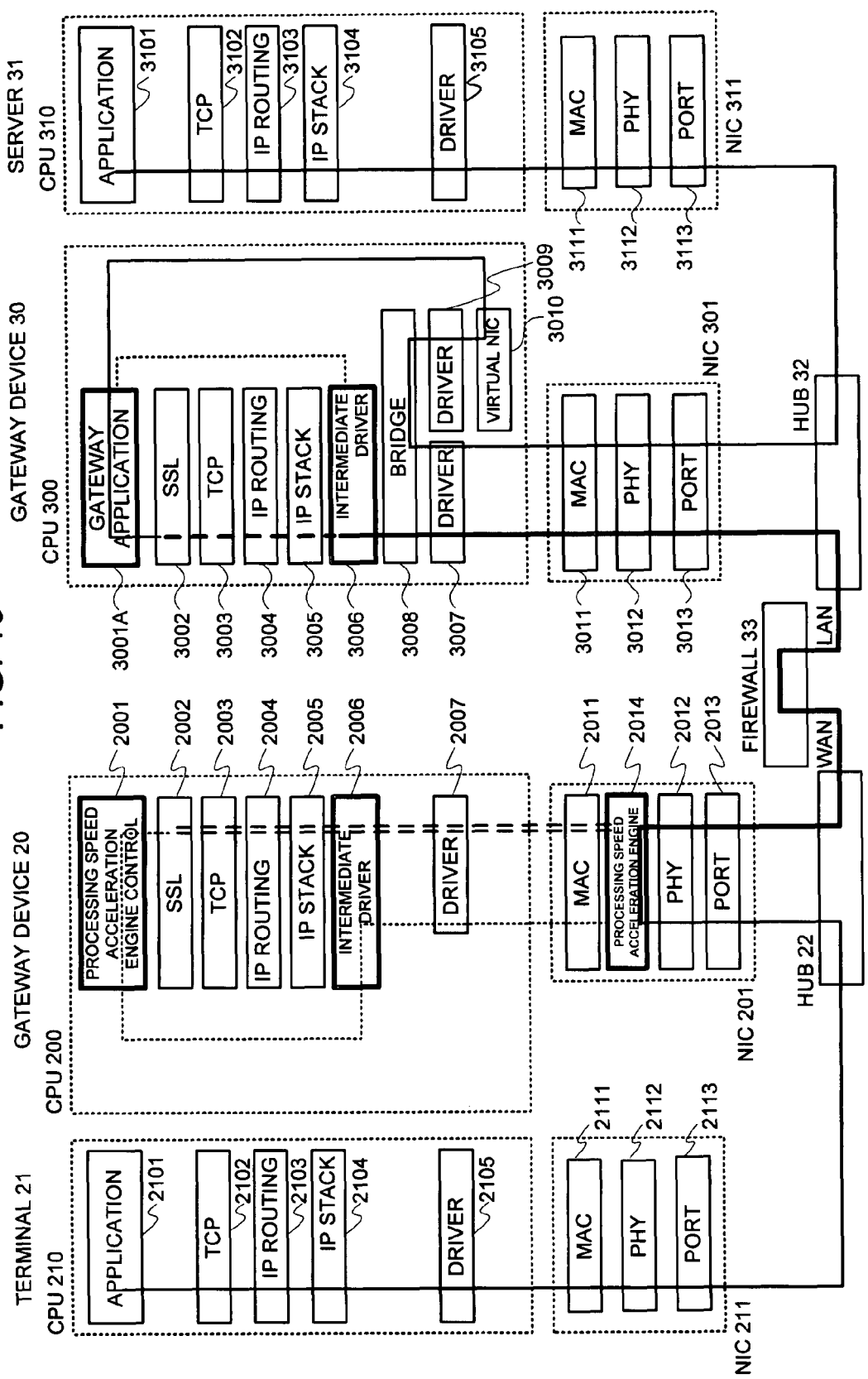
FIG. 19 is a block diagram illustrating a network configuration and a communication path in a third embodiment of the present invention.

FIG. 19 is a block diagram having a configuration of each apparatus and a transfer path of the frame in the third embodiment shown in details.

The gateway device 30 differs from the gateway device 30 in the second embodiment in a point that the processing speed acceleration engine 3014 does not exist, and the gateway application 3001A exists instead of the processing speed acceleration engine control 3001, and further a point that a bridge 3008, a driver 3009, and a virtual NIC 3010 are added.

The gateway application 3001A performs operations listed below.

(1) It transfers the frame arriving from the virtual NIC 3010 to the SSL 3002. That is, it loads the frame arriving from the virtual NIC 3010 as data into the SSL session that is established between the gateway application 3001A and the processing speed acceleration engine control 2001, and transmits the frame addressed to the processing speed acceleration engine control 2001. Additionally, herein, the partner of communication looks like the processing speed acceleration engine control 2001 from a view of the gateway application 3001A; however the actual partner is the processing speed acceleration engine 2014.

(2) It transfers the data, which arrives from the SSL 3002 through the SSL session that is established between the gateway application 3001A and the processing speed acceleration engine control 2001, to the virtual NIC 3010 as a frame.

(3) It performs an operation necessary for connecting and disconnecting the SSL session with the processing speed acceleration engine control 2001. Requesting a connection to the processing speed acceleration engine control 2001 side by the gateway application 3001A side, needless to say, signifies that the gateway application 3001A can receives a request for connecting to the gateway application 3001A side by the processing speed acceleration engine control 2001.

The bridge 3008 has a function of receiving the frame from the intermediate driver 3006, making a reference to the destination MAC address, and transferring the frame to the driver 3009 or the driver 3007. Usually, this function is packaged as a function of the OS. Further, it has a function of receiving the frame from the driver 3009, making a reference to the destination MAC address, and transferring the frame to the driver 3007 or the intermediate driver 3006. Further, it has a function of receiving the frame from the driver 3007, making a reference to the destination MAC address, and transferring the frame to the driver 3009 or the intermediate driver 3006.

Further, The bridge 3008 has a function of making a reference to the transmission source MAC address at the time of receiving the frame, learning the MAC address, and recording which MAC address a terminal has, and which interface (i.e. the intermediate driver 3006, the driver 3009, and the driver 3007) side the above terminal is connected to. Supposing that it has not learned the MAC address even though it has made a reference to the destination MAC address at the time of receiving the frame, it has a function of broadcasting the frame to the intermediate driver or the driver other than the intermediate driver or the driver into which the frame has been input.

The driver 3009, which is software for mediating between the virtual NIC 3010 and the OS, has a function of receiving the frame from the virtual NIC to send it to the OS, and further receiving the frame from the OS to send it to the virtual NIC.

The virtual NIC 3010 is software for mediating between the driver 3009 and the gateway application 3001A. The virtual NIC 3010 has a function of receiving the frame from the driver 3009, and delivering it to the gateway application 3001A. Further, it has a function of receiving the frame from the gateway application 3001A, and delivering it to the driver 3010. Originally, the NIC is configured with hardware; however the virtual NIC 3010 is configured with the software. The virtual NIC 3010 is recognized as if it were hardware from a viewpoint of the OS.

The virtual NIC 3010, the driver 3009, and the bridge 3008 can be integrated by collecting each function into the intermediate driver 3006. In this case, the frame output from the gateway application 3001A is delivered to the driver 3007 through the intermediate driver 3006, and further the unicast frame or the broadcast frame other than one addressed to its own node that has been input from the driver 3007 is sent to the gateway application 3001A from the intermediate driver 3006.

In the third embodiment, the SSL 3002, the TCP 3003, the IP routing 3004, the IP stack 3005, the intermediate driver 3006, and the driver 3007, which exist within the gateway device 30, have a configuration to a similar to that of the SSL 3002, the TCP 3003, the IP routing 3004, the IP stack 3005, the intermediate driver 3006, and the driver 3007 in the second embodiment, respectively, and perform a similar operation.

Each of the terminal 21, the server 31, the gateway device 20, the Firewall 33, the HUB 22, and the HUB 32 has a configuration similar to that of the second embodiment, and perform a similar operation.

Thus, in the third embodiment, only in the case that the SSL session has been pre-established between the gateway device 20 and the gateway device 30, an access to the apparatus within the intranet 3 from the apparatus in the intranet 2 is enabled.

[Explanation of an Operation]

[An Operation of Establishing the SSL Session]

The case of establishing the SSL session (secure TCP session) from the gateway device 30 to the gateway device 20 in the third embodiment will be exemplified to explain the operation by employing FIG. 19.

At this moment, it is assumed that the bridge 3008, the HUB 22, and the HUB 32 have already learned the MAC addresses of the terminal 21, the server 31, the WAN side of the Firewall 33, the LAN side of the Firewall 33, the gateway device 20, and the gateway device 30.

Further, it is assumed that the Firewall 33 permits communication between the gateway device 20 and the gateway device 30 in a bi-direction, and interrupts direct communication between the terminal 21 and the server 31, which does not go through the gateway device 20 or the gateway device 30, in a bi-direction.

When the processing speed acceleration engine control 2001 within the gateway device 20 comes into a wait state of a connection from the gateway device 30 after starting, it notifies a wait start to the intermediate driver 2006. This notification includes the IP address of the gateway device 20, and the wait port number of the processing speed acceleration engine control 2001.

Upon receipt of a notification from the processing speed acceleration engine control 2001, the intermediate driver 2006 makes the setting in the frame analysis process so that the process such as the connection/termination of the TCP session can be performed at the moment that the packet addressed to the processing speed acceleration engine control 2001 has arrived.

The gateway application 3001A within the gateway device 30 receives a request for making a connection to the processing speed acceleration engine control 2001 within the gateway device 20 from a user, and instructs the SSL 3002 to start communication with the processing speed acceleration engine control 2001 within the gateway device 20. Simultaneously, it notifies a start of communication with the processing speed acceleration engine control 2001 within the gateway device 20 to the intermediate driver 3006. This notification includes the IP address of the gateway device 20, the port number of the processing speed acceleration engine control 2001, the transmission source port number of the gateway application 3001A, and further, the IP address of the gateway device 30.

The SSL 3002 receives an instruction for starting communication from the gateway application 3001A, and instructs the TCP 3003 to start communication with the processing speed acceleration engine control 2001 within the gateway device 20 for a purpose of establishing the SSL session with the SSL 2002.

The TCP 3003 receives an instruction for starting communication from the SSL 3002, and transmits a packet (SYN) for requesting establishment of the TCP session with the TCP 2003 to the IP routing 3004 for a purpose of establishing the TCP session with the TCP 2003. This packet is a packet in line with the TCP specification, in which the gateway device 20 has been set to the destination IP address, and the TCP 2003 to the destination port number. This so-called TCP session establishment request packet is an SYN packet that is transmitted for a three-way handshake in establishing the TCP session. In this specification, for simplifying explanation of the TCP session establishment operation, out of the packets that are transmitted/received with the three-way handshake, the SYN packet is called a TCP session establishment request packet, and the SYN+ACK packet is called a response packet. Further, as a matter of fact, the ACK packet is also transmitted; however its explanation is omitted in the explanation of this operation because it is transferred similarly to the SYN packet.

The IP routing 3004 makes a reference to the destination IP address and the destination port number of the packet received from the TCP 3003, and transfers the packet to the IP stack 3005.

The IP stack 3005 adds the MAC address of the intranet 3 side within the Firewall 33 to the packet received from the IP routing 3004 as a destination MAC address, further sets the MAC address of its own node to the transmission source MAC address, thereby to prepare a frame, and transfers it to the intermediate driver 3006.

The intermediate driver 3006 receives the frame of the TCP session establishment request from the IP stack 3005, and makes a frame analysis. As a result of the analysis, this frame is a frame to which the destination IP, the destination port, the transmission source IP, and the transmission source port pre-notified from the gateway application 3001 have been added, whereby it removes the MAC header in the de-encapsulation, and converts it into a packet. And, the intermediate driver 3006 terminates the TCP process from the TCP 3003 to the TCP 2003 in the TCP section of the intermediate driver 3006. That is, originally, the TCP 3003 requested the TCP 2003 to establish the TCP session; however as a matter of fact, this request is reserved in the TCP of the intermediate driver, thereby to allow establishment of the TCP session to be terminated, and the process of establishing the TCP session is performed between the TCP 3003 and the TCP within the intermediate driver 3006.

The intermediate driver 3006 generates a connection request packet for requesting a connection for the driver 3007 in performing the termination process for a purpose of requesting the intermediate driver 2006 to establish the TCP session with the TCP 2003. The gateway device 20 is set to the destination IP address of this connection request packet, and the TCP 2003 to the destination port number. And, it adds the destination MAC address to this packet, and further sets the MAC address of its own node to the transmission source MAC address, thereby to convert it into a connection request frame. This connection request frame is not a packet in line with the TCP specification, but a peculiar packet in the communication system of the present invention.

The driver 3007 receives the connection request frame from the intermediate driver 3006, and transfers it to the MAC 3011.

The MAC 3011 receives the frame from the driver 3007, and transfers it to the PHY 3012.

The PHY 3012 receives the frame from the MAC 3011, and transfers it to the port 3013.

The port 3013 receives the frame from the PHY 3012, and transfers it to the HUB 32 via the Ethernet cable.

Upon receipt of the frame, the HUB 32 makes a reference to the MAC DA, and outputs this frame to the port of the Firewall 33 side as it stands based upon a result of learning the past routing because the MAC DA is an MAC address of the LAN side of the Firewall 33.

The Firewall 33 receives the packet from the HUB 22, permits this for a purpose of communication from the gateway device 30 to the gateway device 20 and transfers it to the HUB 22.

The HUB 22 receives the frame from the Firewall 33, and transfers this frame to the gateway device 20 as it stands based upon a result of learning the past routing.

The gateway device 20 receives the connection request frame from the HUB 22, transfers the frame through the path of the port 2013, the PHY 2012, the processing speed acceleration engine 2014, the MAC 2011, and the driver 2007, and transfers it to the intermediate driver 2006. At this time, the processing speed acceleration engine 2014 transfers the frame received from the PHY to the MAC 2011 as it stands.

The intermediate driver 2006 receives the connection request frame from the driver 2007, and makes a frame analysis. As a result of the analysis, this frame is a connection request frame to which the destination IP and destination port to the processing speed acceleration engine control 2001 pre-notified from the processing speed acceleration engine control 2001 have been added, whereby the intermediate driver 2006 receives this frame, and removes the MAC header in the de-encapsulation, thereby to convert it into a packet. This packet is a packet of requesting a connection to the TCP 2003 transmitted to the intermediate driver 2006 from the intermediate driver 3006, whereby the TCP within the intermediate driver 2006 transmits a packet necessary for establishing the session with the TCP 2003 to the IP stack 2005 for a purpose of establishing the TCP session with the TCP 2003. This packet is a packet in line with the TCP specification, in which the gateway device 20 is set to the destination IP address, the TCP 2003 to the destination port number, further the IP address of the gateway device 30 to the transmission source IP address, and the port number of the TCP 3003 to the transmission source port number. And, this packet, to which the MAC address is added by the re-encapsulation within the intermediate driver 2006, is converted into a frame, which is transferred to the IP stack 2005.

That is, the TCP within the intermediate driver 2006 requests the TCP 2003 to establish the TCP session under a false name of the TCP 3003. Thus, the TCP 2003 recognizes as if it had made communication with the TCP 3003, and further the TCP 3003 recognizes as if it had made communication with the TCP 2003. However, the actual TCP process is performed between the TCP 3003 and the TCP within the intermediate driver 3006, and between the intermediate driver 2006 and the TCP 2003, and further, communication is separately made between the intermediate driver 3006 and the intermediate driver 2006 with the method (peculiar packet in the communication system of the present invention) not causing the congestion control such as the UDP. And, the TCP session between the TCP 3003 and the intermediate driver 3006, some communication session such as the UDP between the intermediate driver 3006 and the intermediate driver 2006, and further the TCP session between the intermediate driver 2006 and the TCP 2003 are mutually connected/relayed by the intermediate driver 3006 and the intermediate driver 2006, thereby allowing the communication to be made as if the TCP session had been established between the TCP 3003 and the TCP 2003.

The IP stack 2005 receives the frame from the intermediate driver 2006, removes the MAC header, thereby to convert it into a packet, and transfers it to the IP routing 2004.

The IP routing 2004 makes a reference to the destination port number of the packet received from the IP stack 2005, and transfers this packet to the TCP 2003 because the port number of the TCP 2003 side has been added.

The TCP 2003 receives the packet from the IP routing 2004. It gives a response packet (SYN+ACK) to the session establishment request as a reply according to the TCP protocol because this packet is a TCP session establishment request packet (SYN). At this moment, the TCP 2003 recognizes that the TCP session establishment request is one that has arrived from the TCP 3003. The reason is that the actual establishment request is one transmitted from the TCP within the intermediate driver 2006; however the TCP 2003 recognizes as if it had made established the session with the TCP 3003 because the TCP within the intermediate driver 2006 requested the TCP 2003 to establish the session under a false name of the TCP 3003.

Thus, the TCP 2003 transmits a response packet (SYN+ACK) of the TCP session establishment request addressed to the TCP 3003. That is, the IP address of the gateway device 30 is set to the destination IP of the response packet, and the port number of the TCP 3003 to the destination port thereof.

The response packet is sent to the IP stack 2005 through the IP routing 2004, converted into a response frame by adding the MAC header herein, and arrives at the intermediate driver 2006.

Upon receipt of the response frame, the intermediate driver 2006 removes the MAC header of the response frame, thereby to take out a response packet in the de-encapsulation within the intermediate driver 2006, receives this response packet (SYN+ACK) in the TCP, and transmits an ACK packet of this response packet to the TCP 2003, thereby to allow the process of the TCP to be terminated. And, it generates a connection completion notification packet for the intermediate driver 3006. The above-mentioned connection completion notification packet is not a packet in line with the TCP specification, but a peculiar packet. In this connection completion notification packet, the gateway device 30 is set to the destination IP address, the TCP 3003 to the destination port number, the gateway device 20 to the transmission source IP address, and the TCP 2003 to the transmission source port number. And, the connection completion notification packet, to which the MAC header is added in the re-encapsulation within the intermediate driver 2006, is converted into a connection completion notification frame.

The connection completion notification frame arrives to the intermediate driver 3006 within the CPU 300 through the path opposite to that of the connection request frame, i.e. the driver 2007, the NIC 201, the HUB 22, the Firewall 33, the HUB 32, and the NIC 301.

The intermediate driver 3006 receives the connection completion notification frame, and makes a frame analysis. As a result of the analysis, the packet is a connection completion notification frame to which the destination IP and the destination port to the gateway application 3001A pre-notified from the gateway application 3001A have been added, whereby it receives this frame. The received frame, from which the MAC header is removed in the de-encapsulation, is converted into a packet. The TCP within the intermediate driver 3006 transmits a response packet prepared according to the TCP protocol to the IP stack 3005 for a purpose of sending the response packet (SYN+ACK) necessary for establishing the TCP session to the TCP 3003 because the packet is a packet of notifying completion of a connection between the TCP 2003 and the intermediate driver 2006 transmitted to the intermediate driver 3006 from the intermediate driver 2006.

The response packet arrives at the TCP 3003 through the IP stack 3005 and the IP routing 3004.

The TCP 3003 receives the response packet (SYN+ACK) from the IP routing 3004. It notifies completion of a connection of the TCP session with the TCP 2003 to the SSL 3002 because this packet is a response packet of a request for establishing the TCP session. At this moment, the TCP 3003 recognizes that the response packet (SYN+ACK) is one that has arrived from the TCP 2003. The reason is that the actual response is one transmitted from the TCP within the intermediate driver 3006; however the TCP 3003 recognizes as if the response had been given by the TCP 2003 because the TCP within the intermediate driver 3006 gave a session establishment response to the TCP 3003 under a false name of the TCP 2003.

Upon receipt of the response packet (SYN+ACK), the TCP 3003 generates an ACK packet of this response packet addressed to the TCP 3003, and transmits it. This ACK packet, which is received by the TCP of the intermediate driver 3006 via the IP routing 2004 and the IP stack 2005, allows the TCP process to be terminated.

Upon receipt of the connection completion notification from the TCP 3003, the SSL 3002 transmits a packet (SSL session establishment request packet) for requesting establishment of the session according to the SSL protocol for a purpose of establishing the SSL session with the SSL 2002.

The SSL session establishment request packet, which is received by the TCP 3003, goes through the TCP session established between the TCP 3003 and the TCP within the intermediate driver 3006, and arrives at the intermediate driver 3006.

The intermediate driver 3006 receives the SSL session establishment request packet to terminate the TCP, adds the header not causing the congestion control such as the UDP, and transmits the SSL session establishment request packet to the intermediate driver 2006. The SSL session establishment request packet arrives at the intermediate driver 2006 through the NIC 301, the HUB 32, the Firewall 33, the HUB 22, and the NIC 201. At this moment, the processing speed acceleration engine 2014 within the NIC 201 transfers the packet received from the PHY 2012 to the MAC 2011 as it stands.

The SSL session establishment request packet, which is received by the intermediate driver 2006, goes through the TCP session established between the TCP within the intermediate driver 2006 and the TCP 2003, and arrives at the TCP 2003.

The TCP 2003 transfers the packet to the SSL 2002.

The SSL 2002 verifies the content of the SSL session establishment request, notifies establishment of the session with the SSL 3002 to the processing speed acceleration engine control 2001 if it were not for a problem, and simultaneously therewith, transmits a SSL session establishment response packet to the SSL 3002 according to the SSL protocol.

The SSL session establishment response packet arrives at the intermediate driver 2006 through the path opposite to that of the SSL session establishment request packet, i.e. the TCP session between the TCP 2003 and the intermediate driver 2006, and arrives at the intermediate driver 3006 through the session not causing the congestion control such as the UDP between the intermediate driver 2006 and the intermediate driver 3006. Further, it arrives at the SSL 3002 through the TCP session between the intermediate driver 3006 and the TCP 3003.

The SSL 3002 verifies the content of the SSL session establishment response according to the SSL protocol, and notifies establishment of the SSL session between the SSL 3002 and the SSL 2002 to the gateway application 3001A if it were not for a problem.

Upon receipt of the SSL session establishment notification from the SSL 2002, the processing speed acceleration engine control 2001 notifies the public key of the SSL 3002, the secret key of the SSL 2002, and the common key to the SSL 2002 and the SSL 3002 received by the SSL session establishment notification to the intermediate driver 2006.

Upon receipt of a notification about the public key, the secret key, and the common key, the intermediate driver 2006 loads the public key, the secret key and the common key, the IP address of a partner apparatus of the SSL session (IP address of the gateway device 30), the destination port of a partner apparatus of the SSL session (port of the TCP 3003), the transmission source port number of the SSL session of its own node side (port number of the TCP 2003), the transmission source IP address (IP address of the gateway device 20), and the start command into the control frame, and notifies it to the processing speed acceleration engine 2014.

The control frame arrives at the processing speed acceleration engine 2014 through the driver 2007 and the MAC 2011.

The processing speed acceleration engine 2014 identifies the control frame by use of the MAC address etc., and receives it in the control frame transmitter/receiver. And, it preserves the public key, the secret key, and the common key, respectively, for a purpose of using them in the decoding and the encryption, and preserves the IP address or the port number for a purpose of analyzing the frame. And upon receipt of a processing speed acceleration process start command, it starts the processes of the frame analysis, the encryption, and the decoding.

Prior to the processing speed acceleration process start command, the processing speed acceleration engine 2014 transmitted all frames received from the MAC 2011 other than the control frame to the PHY 2012 as they stood, and transmitted all frames received from the PHY 2012 to the MAC 2011 as they stood. However, after the processing speed acceleration process start command, it performs the following processes for the frame received from the PHY 2012 even though the operation of transmitting all frames received from the MAC 2011 other than the control frame to the PHY 2012 as they stands remains unchanged.

(1) If the frame is a frame addressed to the gateway device 20, and yet a frame encrypted in the SSL 3002, it undoes the encapsulation such as the UDP, undoes the fragmentation if necessary, decodes the frame, and transmits it to the PHY 2012 side.

(2) If the frame is a frame addressed to its own node other than (1), it transfers the frame to the MAC 2011.

(3) If the frame is a broadcast frame, or a multicast frame, it copies the frame, transfers one copy to the MAC 2011 as it stands, and encrypts and encapsulates the other, which is transmitted to the SSL 3002 (PHY 2012 side). The frame is also fragmented if necessary.

(4) If the frame is a frame except for (1) to (3), it encrypts and encapsulates the frame, and transmits the frame to the SSL 3002 (PHY 2012 side). The frame is also fragmented if necessary.

As mentioned above, the session for transferring the frame causing not the congestion control such as the UDP is established between the processing speed acceleration engine 2014 and the intermediate driver 3006. Further, the SSL session (SSL tunnel) is established between the processing speed acceleration engine 2014 and the SSL 3002.

That is, the SSL 2002 exchanges the frame with the SSL 3002 only at the time of requesting establishment of the SSL session; however when the establishment of the SSL session is finished, thereafter, information of the encryption and the decoding of the SSL is exchanged between the processing speed acceleration engine 2014 and the SSL 3002.

Further, the intermediate driver 2006 exchanges the frame with the intermediate driver 3006 only at the time of establishing the SSL session; however after the SSL session has been established, the frame is exchanged between the processing speed acceleration engine 2014 and the intermediate driver 3006.

Above, in the third embodiment, the operation in the case of establishing the SSL session (secure TCP session) from the gateway device 30 to the gateway device 20 is completed.

[An Operation of Transferring the Frame from the Terminal 21 to the Server 31]

The case of transferring the frame from the terminal 21 to the server 31 in the third embodiment will be exemplified for explaining the operation by employing FIG. 19.

At this moment, it is assumed that the bridge 3008, the HUB 22 and the HUB 32 have already learned the MAC addresses of the terminal 21, the server 31, the Firewall 33 the gateway device 20, and the gateway device 30.

Further, it is assumed that the Firewall 33 permits communication between the gateway device 20 and the gateway device 30 in a bi-direction, and interrupts direct communication between the terminal 21 and the server 31, which does not go through the gateway device 20 or the gateway device 30, in a bi-direction.

Further, it is assumed that the SSL session (secure TCP session) from the gateway device 30 to the gateway device 20 has already established according to the foregoing operational example.

Further, it is assumed that the TCP session has been already constructed between the application 2101 within the terminal 21 and the application (application 3101) within the server 31.

The application 2101 within the terminal 21 delivers data addressed to the application 3101 within the server 31 to the TCP 2102.

The TCP 2102 receives the data from the application 2101, adds the TCP header (F23 in FIG. 2) and the IP header (F22 in FIG. 2) according to the TCP protocol, thereby to convert it into an IP packet, and delivers it to the IP routing 2103. At this time, the IP address of the server 31 is set to the IP DA within the LAN IP F22, and the IP address of the terminal 21 to the IP SA within the LAN IP F22.

The IP routing 2103 makes a reference to the destination IP address (addressed to the server 31) and the destination port (addressed to the TCP 3102) of the packet received from the TCP 2102, and transfers the data to the IP stack 2104 as it stands.

The IP stack 2104 receives the packet from the IP routing 2103, adds the MAC header (F21 in FIG. 2) to prepare an Ethernet frame, and delivers it to the driver 2105. This frame has a format of the Ethernet frame F20. At this time, the IP stack 2104 makes a reference to a result of the ARP, and sets the MAC address of the server 31 to the MAC DA within the LAN MAC F21 of the frame, and the MAC address of the terminal 21 to the MAC SA within the LAN MAC F21.

The driver 2105 receives the above-mentioned frame from the IP stack 2105, and transfers it to the NIC 211.

The NIC 211 receives the frame from the driver 2105, and transfers it to the HUB 22 through the MAC 2111, the PHY 2112, and the port 2113.

Upon receipt of the frame from the port of the NIC 211 side of the terminal 21, the HUB 22 makes a reference to the MAC DA within F21, and outputs this frame to the port of the gateway device 20 side as it stands based upon a result of learning the past routing because the MAC DA is an MAC address of the server 31.

The NIC 201 within the gateway device 20 receives the frame transmitted by the HUB 22 in the port 2013, and delivers it to the processing speed acceleration engine 2014 through the PHY 2012.

The processing speed acceleration engine 2014 encrypts the frame in the encryption 2014G within the processing speed acceleration engine 2014, thereby to prepare the data F14 in FIG. 3, further adds each header of F11 to F13 in FIG. 3 in the encapsulation 2014I, thereby to convert it into a formatted frame having the Ether-over-SSL frame F10, and transfers it to the PHY 2012 again because the destination MAC of the frame that has arrived is addressed to the server 31.

At this time, the MAC address of the WAN side of the Firewall 33 is set to the MAC DA within the INET MAC F11, and the MAC address of the gateway device 20 to the MAC SA within F11. Further, the IP address of the gateway device 30 is set to the IP DA within the INET IP F12, and the IP address of the gateway device 20 to the IP SA within F12. With the INET TCP F13, the processing speed acceleration engine 2014 adds the TCP header for feigning as if communication with the TCP 3003 within the gateway device 30 had been made for purpose of allowing the frame to go through the Firewall 33. However, as a matter of fact, this TCP header does not affect the congestion control of the TCP 3003 because it is removed for the time being in the intermediate driver 3006. Thus, F13 to be added here, which has a format of the TCP header, actually works only as the UDP. Supposing that a router is mounted instead of the Firewall 33, the UDP header may be added to F13.

Upon receipt of the frame from the processing speed acceleration engine 2014, the PHY 2012 transfers the frame to the HUB 22 through the port 2013.

Upon receipt of the frame from the port of the gateway device 22 side, the HUB 22 makes a reference to the MAC DA within F11, and outputs this frame to the Firewall 33 as it stands based upon a result of learning the past routing because the MAC DA is an MAC address of the WAN side of the Firewall 33.

The Firewall 33 receives the frame transmitted from the HUB 22, makes a reference to the IP DA, thereby to change the MAC header F11, and transfers the received frame with a form of the frame format F10 unchanged to the HUB 32.

Herein, the MAC address of the gateway device 30 is set to the MAC DA within F11, and the MAC address of the LAN side of the Firewall 33 to the MAC SA within F11.

Upon receipt of the frame transmitted from the Firewall 33, the HUB 32 makes a reference to the MAC DA within F11, and outputs this frame to the port of the gateway device 30 side as it stands based upon a result of learning the past routing because the MAC DA is an MAC address of the gateway device 30.

Upon receipt of the frame transmitted by the HUB 32 in the port 3013, the gateway device 30 transfers it to the intermediate driver 3006 through the PHY 3012, the MAC 3011, the driver 3007, and the bridge 3008.

The intermediate driver 3006 receives the frame from the bridge 3008. This frame has a form of the frame format F10 at the time of having been received; however the header F11, the header F12, and the header F13 thereof are deleted in the de-encapsulation 3006G, and only the encrypted data F14 is left. And, it delivers the data F14 to the TCP 3006A, and allows the data to flow to the TCP session pre-established between the TCP 3003 and the TCP 3006A within the intermediate driver.

The TCP 3006A within the intermediate driver 3006 adds the TCP header F13 and the IP header F12 necessary for making TCP communication with the TCP 3003 to the received data F14, and sends it to the re-encapsulation 3006E. The IP address of the gateway device 30 is set to the IP DA within F12, and the IP address of the gateway device 20 to the IP SA within F12.

Upon receipt of data from the TCP 3006A, the re-encapsulation 3006E within the intermediate driver 3006 adds header F11 hereto, and sends it to the IP stack 3005. Herein, it sets the MAC address of the gateway device 30 to the MAC DA within Fli, and sets the MAC address of the WAN side of the Firewall 33 to the MAC SA within F11. In such a manner, it converts the received frame from the TCP 3006A into a formatted frame having a frame format F10, and transfers it to the IP stack 3005.

The IP stack 3005 removes the MAC header F11 of the frame received from the intermediate driver 3006, and sends the frame to the IP routing 3004.

The IP routing 3004 makes a reference to the IP DA within the header F12 and the destination port number within the header F13 of the received frame, and transfers the frame to the TCP 3003.

Upon receipt of the frame from the IP routing 3004, the TCP 3003 performs the process of sending back an ACK packet, or the like according to the TCP protocol. It removes the TCP header F13 and the IP header F12 from the received frame, and transfers the data F14 to the SSL 3002.

Upon receipt of the data F14 from the TCP 3003, the SSL 3002 undoes the encryption with decoding process, takes out an Ethernet frame F20, i.e. F21 to F24, from the data F14, and transfers it to the gateway application 3001A.

Upon receipt of the frame F20 from the SSL 3002, the gateway application 3001A allows this frame to flow to the virtual NIC 3010 as it stands.

This frame keeps the state of having been transmitted from the terminal 21 to the HUB 22 as it stands, in which the MAC address of the server 31 has been set to the MAC DA within the LAN MAC F21, and the MAC address of the terminal 21 to the MAC SA within the LAN MAC F21. Further, the IP address of the server 31 has been set to the IP DA within the LAN IP F22, and the IP address of the terminal 21 to the IP SA within the LAN IP F22.

The frame delivered to the virtual NIC 3010 from the gateway application 3001A is transferred to the HUB 32 through the driver 3009, the bridge 3008, and the NIC 301.

Upon receipt of the frame from the port of the gateway device 30 side, the HUB 32 makes a reference to the MAC DA within F21, and outputs this frame to the port of the server 31 side as it stands based upon a result of learning the past routing because the MAC DA is an MAC address of the server 31.

The server 31 receives the frame transmitted from the HUB 32, and delivers the data F24 within the frame to the application 3101 through the driver 3105, the IP stack 3104, the IP routing 3103, and the TCP 3102.

As mentioned above, a series of the frame transfer from the application 2101 within the terminal 21 to the application 3101 within the server 31 is completed.

A series of the frame transfer from the application 3101 within the server 31 to the application 2101 within the terminal 21 also can be realized similarly by tracing the path opposite to that of the above-mentioned example.

Additionally, also in this embodiment, similarly to the software process within the session relay device 10 in the first embodiment, the process between the intermediate driver 3006 and the TCP 3003 temporally becomes a process of the TCP-over-TCP format in the software within the gateway device 30. However, a possibility that a decline in a speed due to the TCP over TCP occurs is extremely low because there is almost no possibility that the packet is missing between the intermediate driver and the TCP. The reason is that the so-called TCP-over-TCP problem is a problem that a remarkable decline in a speed occurs at the time that a packet loss has occurred, and supposing that no packet loss occurs, window size of the TCP of the header F13 side becomes large at any time, and the problem such as a decline in a speed does not occur even though the process of a TCP-over-TCP format is performed.

Even though the congestion control and the re-sending control of the TCP of the header F13 side are stopped substantially with the above-mentioned method, the congestion control and the re-sending control of the TCP of the header F23 side work as usual, whereby the congestion control as well as the re-sending control are taken without a problem owing to the working of the TCP within the terminal 21 and the TCP within the server 31 from a viewpoint of each application of the terminal 21 and the server 31.

In this embodiment, an example of packaging the intermediate driver etc. in the gateway device 30 side, and packaging the intermediate driver and the processing speed acceleration engine in the gateway device 20 side was shown, and, contrarily hereto, it is also possible to package the intermediate driver etc. in the gateway device 20 side, and to package the intermediate driver and the processing speed acceleration engine in the gateway device 30 side. Additionally, in this embodiment, it is also possible to exchange the installation location of the server 31 for that of the terminal 21.

[Effects of the Invention]

Next, effects of this embodiment will be explained.

Utilizing the invention listed in this embodiment enables a high-speed transfer of the frame between the terminal 21 and the server 31.

The reason is that utilizing the processing speed acceleration engine 2014 makes it possible to exclude the encapsulation process and the encryption/decoding process in the CPU 200 (software) of the gateway device 20, and to realize all these processes by means of the processing speed acceleration engine (hardware).

In addition hereto, the reason is that the process of the TCP within the gateway device 20, or the TCP within the gateway device 30 is terminated in the intermediate driver within the gateway device 30 and in the intermediate driver within the gateway device 20, respectively, and occurrence of the TCP-over-TCP problem is avoided so as to prevent the congestion control and the re-sending control due to the TCP at a position of the header F13 from occurring in communication between the gateway device 20 and the gateway device 30.

Further, utilizing the invention listed in this embodiment enables the cost for developing the hardware (processing speed acceleration engine) for the processing speed acceleration process and the cost for members to be suppressed at a relatively low level.

The reason is that the encryption/decoding and the encapsulation can be executed on identical hardware (FPGA/ASIC).

Further, the reason is that the hardware can be packaged into the relatively inexpensive interface between the MAC and the PHY.

Further, the reason is that it is possible to leave the TCP process, which is difficult to package into the hardware, to the software, and to hardware-process only the encryption/decoding and the encapsulation, which are relatively easy to package into the hardware and yet have a large effect upon the processing speed acceleration process.

[Fourth Embodiment]

The fourth embodiment of the present invention differs from the third embodiment in a point that the processing speed acceleration engine 2014 does not exist within the gateway device 20, and a gateway application 2001A exists instead of the processing speed acceleration engine control 2001. That is, the gateway device 20 has a configuration similar to that of the gateway device 30 in the third embodiment, and performs a similar operation.

A configuration and an operation of each of the terminal 21, the server 31, the HUB 22, the HUB 32, the gateway device 30, the intranet 2, and the intranet 3 in the fourth embodiment are identical to that of the third embodiment, respectively.

In the fourth embodiment, not only a closed LAN but also an open WAN such as Internet may be employed for the intranet 2.

[Explanation of a Configuration]

Figure 20:
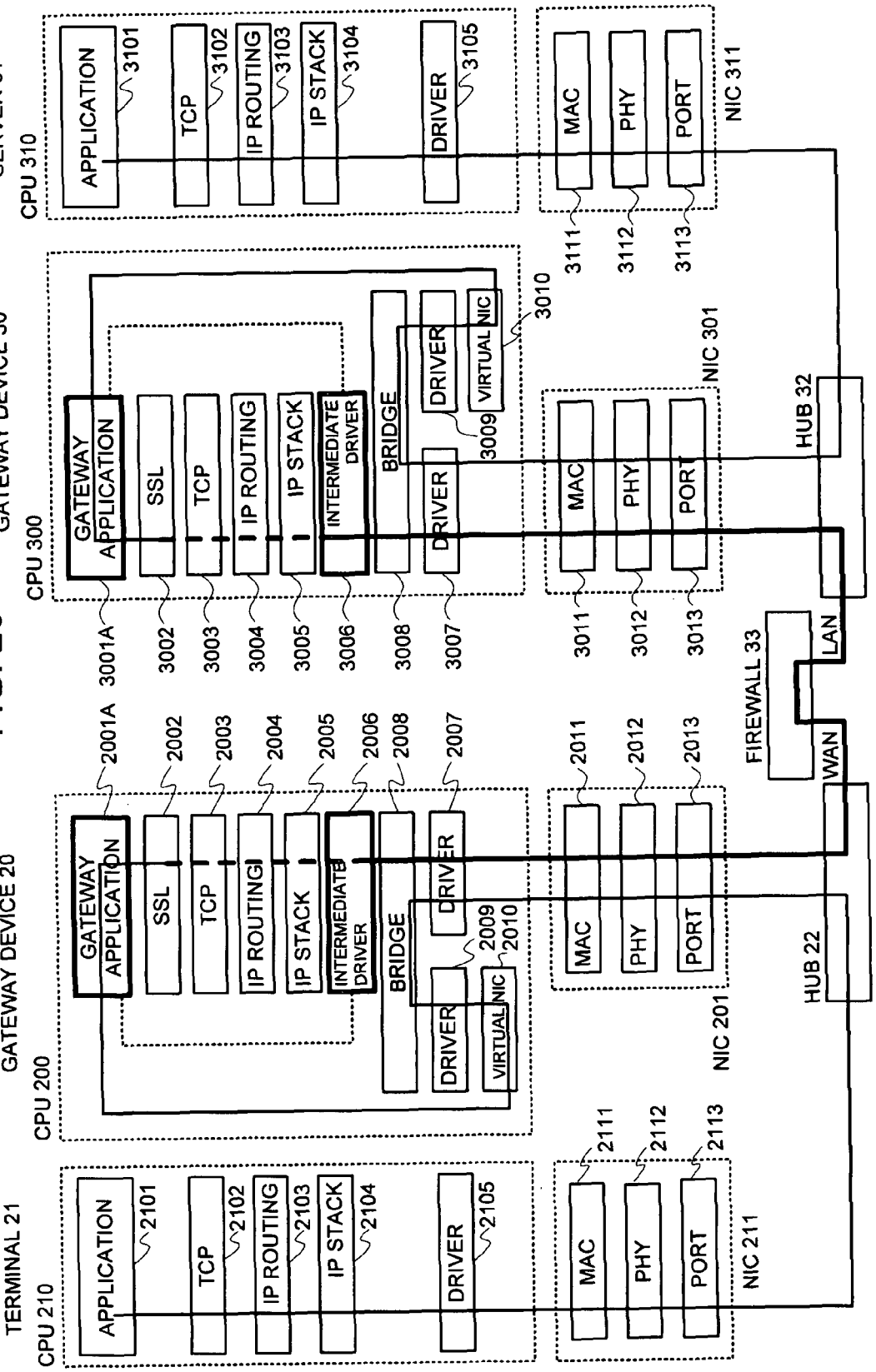
FIG. 20 is a block diagram illustrating a network configuration and a communication path in a fourth embodiment of the present invention.

FIG. 20 is a block diagram having a configuration of each apparatus and a transfer path of the frame in the fourth embodiment shown in details.

The gateway device 20 differs from the gateway device 20 in the third embodiment in a point that the processing speed acceleration engine 2014 does not exist, and the gateway application 2001A exists instead of the processing speed acceleration engine control 2001, and further a point that a bridge 2008, a driver 2009, and a virtual NIC 2010 are added.

Each of the gateway application 2001A, the bridge 2008, the driver 2009, and the virtual NIC 2010 performs an operation similar to that of each of the gateway application 3001A, the bridge 3008, the driver 3009, and the virtual NIC 3010 within gateway device 30.

The virtual NIC 3010, the driver 3009, and the bridge 3008 can be integrated by collecting respective functions into the intermediate driver 3006. In this case, the frame output from the gateway application 3001A is delivered to the driver 3007 through the intermediate driver 3006, and further the unicast frame or the broadcast frame input from the driver 3007 other than one addressed to its own node is sent to the gateway application 3001A from the intermediate driver 3006.

Each of the terminal 21, the server 31, the gateway device 20, the Firewall 33, the HUB 22, and the HUB 32 has a configuration similar to that of the third embodiment, and performs a similar operation.

Thus, in the fourth embodiment, only in the case that the SSL session has been pre-established between the gateway device 20 and the gateway device 30, an access to the apparatus within the intranet 3 from the apparatus in the intranet 2 is enabled.

[Explanation of an Operation]

[An Operation of Establishing the SSL Session]

The case of establishing the SSL session (secure TCP session) from the gateway device 30 to the gateway device 20 in the fourth embodiment will be exemplified to explain the operation by employing FIG. 20.

At this moment, it is assumed that the bridge 2008, the bridge 3008, the HUB 22 and the HUB 32 have already learned the MAC addresses of the terminal 21, the server 31, the WAN side of the Firewall 33, the LAN side of the Firewall 33, the gateway device 20, and the gateway device 30.

Further, it is assumed that the Firewall 33 permits communication between the gateway device 20 and the gateway device 30 in a bi-direction, and interrupts direct communication between the terminal 21 and the server 31, which does not go through the gateway device 20 or the gateway device 30, in a bi-direction.

When the gateway application 2001A within the gateway device 20 comes into a wait state of a connection from the gateway device 30 after starting, it notifies a wait start to the intermediate driver 2006. This notification includes the IP address of the gateway device 20, and the wait port number of the gateway application 2001A.

Upon receipt of a notification from the gateway application 2001A, the intermediate driver 2006 makes the setting in the frame analysis process so that the process such as the TCP connection/termination can be performed at the moment that the packet addressed to the gateway application 2001A has arrived.

The gateway application 3001A within the gateway device 30 receives a request for making a connection to the gateway application 2001A within the gateway device 20 from a user, and instructs the SSL 3002 to start communication with the gateway application 2001A within the gateway device 20. Simultaneously, it notifies a start of communication with the gateway application 2001A within the gateway device 20 to the intermediate driver 3006. This notification includes the IP address of the gateway device 20, the port number of the gateway application 2001A, the transmission source port number of the gateway application 3001A, and further, the IP address of the gateway device 30.

The SSL 3002 receives the communication start instruction from the gateway application 3001A, and instructs the TCP 3003 to start communication with the gateway application 2001A within the gateway device 20 for a purpose of establishing the SSL session with the SSL 2002.

The TCP 3003 receives the communication start instruction from the SSL 3002, and transmits a packet (SYN) for requesting establishment of the TCP session with the TCP 2003 to the IP routing 3004 for a purpose of establishing the TCP session with the TCP 2003. This session establishment request packet is a packet in line with the TCP specification, in which the gateway device 20 has been set to the destination IP address, and the TCP 2003 to the destination port number. The so-called TCP session establishment request packet is an SYN packet that is transmitted for a three-way handshake in establishing the TCP session. In this specification, for simplifying explanation of the SSL session establishment operation, out of the packets that are transmitted/received with the three-way handshake, the SYN packet is called a TCP session establishment request packet, and the SYN+ACK packet is called a response packet. Further, as a matter of fact, the ACK packet is also transmitted; however its explanation is omitted in the explanation of this operation because it is transferred similarly to the SYN packet.

The IP routing 3004 makes a reference to the destination IP address and the destination port number of the packet received from the TCP 3003, and transfers the session establishment request packet to the IP stack 3005.

The IP stack 3005 adds the MAC address of the intranet 3 side within the Firewall 33 to the packet received from the IP routing 3004 as a destination MAC address, further sets the MAC address of its own node to the transmission source MAC address, thereby to prepare a frame of a session establishment request, and transfers it to the intermediate driver 3006.

The intermediate driver 3006 receives the frame from the IP stack 3005, and makes a frame analysis. As a result of the analysis, the frame is a frame to which the destination IP, the destination port, and the transmission source IP, and the transmission source port pre-notified from the gateway application 3001 have been added, whereby it removes the MAC header in the de-encapsulation, and terminates the process of the TCP from the TCP 3003 to the TCP 2003 in the TCP section of the intermediate driver 3006. That is, originally, the TCP 3003 transmitted the session establishment request to the TCP 2003; however as a matter of fact, the TCP within the intermediate driver 3006 receives and reserves this request, and the process of establishing the TCP session is performed between the TCP 3006 and the TCP within the intermediate driver 3006, thereby to allow the process of the TCP to be terminated.

In performing the TCP termination process, the intermediate driver 3006 sends a connection request packet to the driver 3007 through the bridge 3008 for a purpose of requesting the intermediate driver 2006 to establish the TCP session with the TCP 2003. Additionally, this connection request packet is not a packet in line with the TCP specification, but a packet peculiar to the communication system of the present invention. It sets the gateway device 20 to the destination IP address, and the TCP 2003 to the destination port number in this packet. And, it adds the destination MAC address to this packet, further sets its own node to the transmission source MAC address, thereby to generate a connection request frame.

The driver 3007 receives the frame from the intermediate driver 3006, and transfers it to the MAC 3011.

The MAC 3011 receives the frame from the driver 3007, and transfers it to the PHY 3012.

The PHY 3012 receives the frame from the MAC 3011, and transfers it to the port 3013.

The port 3013 receives the frame from the PHY 3012, and transfers it to the HUB 32 via the Ethernet cable.

Upon receipt of the frame, the HUB 32 makes a reference to the MAC DA, and outputs this frame to the port of the Firewall 33 side as it stands based upon a result of learning the past routing because the MAC DA is an MAC address of the LAN side of the Firewall 33.

The Firewall 33 receives the frame from the HUB 22, permits this for a purpose of communication from the gateway device 30 to the gateway device 20, and transfers it to the HUB 22.

The HUB 22 receives the frame from the Firewall 33, and transfers this frame to the gateway device 20 as it stands based upon a result of learning the past routing.

The gateway device 20 receives the frame from the HUB 22, and transfers the frame to the intermediate driver 2006 through a path of the port 2013, the PHY 2012, the MAC 2011, the driver 2007, and the bridge 2008.

The intermediate driver 2006 receives the frame from the driver 2007, and makes a frame analysis. As a result of the analysis, this frame is a connection request frame to which the destination IP and the destination port to the gateway application 2001A pre-notified from the gateway application 2001A have been added, whereby it receives this frame, and removes the MAC header in the de-encapsulation, thereby to convert it into a packet. The TCP within the intermediate driver 2006 transmits a session establishment request packet necessary for establishing the session with the TCP 2003 to the IP stack 2005 for a purpose of establishing the TCP session with the TCP 2003 because this packet is a packet of requesting a connection to the TCP 2003 transmitted to the intermediate driver 2006 from the intermediate driver 3006. This packet is a packet in line with the TCP specification, in which the gateway device 20 is set to the destination IP address, the TCP 2003 to the destination port number, further the IP address of the gateway device 30 to the transmission source IP address, and the port number of the TCP 3003 to the transmission source port number.

That is, the TCP within the intermediate driver 2006 requests the TCP 2003 to establish the TCP session under a false name of the TCP 3003. Thus, the TCP 2003 recognizes as if it had made communication with the TCP 3003, and further the TCP 3003 recognizes as if it had made communication with the TCP 2003. However, the actual TCP process is performed between the TCP 3003 and the TCP within the intermediate driver 3006, and between the intermediate driver 2006 and the TCP 2003, and further, communication is separately made between the intermediate driver 3006 and the intermediate driver 2006 with the method (peculiar packet in the communication system of the present invention) not causing the congestion control such as the UDP. And, the TCP session between the TCP 3003 and the intermediate driver 3006, some communication session such as the UDP between the intermediate driver 3006 and the intermediate driver 2006, and further the TCP session between the intermediate driver 2006 and the TCP 2003 are mutually connected/relayed by the intermediate driver 3006 and the intermediate driver 2006, thereby allowing the communication to be made as if the TCP session had been established between the TCP 3003 and the TCP 2003.

The IP stack 2005 receives the frame from the intermediate driver 2006, removes the MAC header, thereby to convert it into a packet, and transfers it to the IP routing 2004.

The IP routing 2004 makes a reference to the destination port number of the packet received from the IP stack 2005, and transfers this packet to the TCP 2003 because the port number of the TCP 2003 side has been added.

The TCP 2003 receives the packet from the IP routing 2004. It sends back a response packet (SYN+ACK) necessary according to the TCP protocol for a purpose of establishing the TCP session because this packet is a TCP session establishment request packet (SYN). At this moment, the TCP 2003 recognizes that the received TCP session establishment request is one that has arrived from the TCP 3003. The reason is that the actual establishment request is one transmitted from the TCP within the intermediate driver 2006; however the TCP 2003 recognizes as if it had established the session with the TCP 3003 because the TCP within the intermediate driver 2006 requested the TCP 2003 to establish the TCP session under a false name of the TCP 3003.

Thus, the TCP 2003 transmits the response packet (SYN+ACK) generated in line with the TCP specification that is addressed to the TCP 3003. That is, the IP address of the gateway device 30 is set to the destination IP of the response packet, and the port number of the TCP 3003 to the destination port thereof.

The response packet is sent to the IP stack 2005 through the IP routing 2004, and is converted into a response frame by adding the MAC header herein, which arrives at the intermediate driver 2006.

Upon receipt of the response frame, the intermediate driver 2006 removes the MAC header of the response frame in the de-encapsulation within the intermediate driver 2006, thereby to take out a response packet, receives it in the TCP of the intermediate driver 2006, and transmits an ACK packet for the response packet to the TCP 2003, thereby to terminate the TCP process. And, it transmits to the intermediate driver 3006 a connection completion notification packet for notifying completion of a connection. This connection completion notification packet is not a packet in line with the TCP specification, but a peculiar packet. The gateway device 30 is set to the destination IP address of this connection completion notification packet, the TCP 3003 to the destination port number, the gateway device 20 to the transmission source IP address, and the TCP 2003 to the transmission source port number. And, the MAC header is added to the connection completion notification packet in the re-encapsulation within the intermediate driver 2006 to generate a connection completion notification frame.

The connection completion notification frame arrives at the intermediate driver 3006 within the CPU 300 through the path opposite to that of the connection request frame, i.e. the driver 2007, the NIC 201, the HUB 22, the Firewall 33, the HUB 32, and the NIC 301.

The intermediate driver 3006 receives the connection completion notification frame, and makes a frame analysis. As a result of the analysis, the received frame is a frame to which the destination IP and the destination port to the gateway application 3001A pre-notified from the gateway application 3001A has been added, whereby it receives this frame and removes the MAC header in the de-encapsulation, thereby to convert it into a packet. The TCP of the intermediate driver 3006 transmits a response packet to the IP stack 3005 for a purpose of sending the response packet (SYN+ ACK) necessary for establishing the TCP session to the TCP 3003 according to the TCP protocol because this packet is a packet of notifying completion of a connection between the TCP 2003 and the intermediate driver 2006 transmitted to the intermediate driver 3006 from the intermediate driver 2006.

The response packet arrives at the TCP 3003 through the IP stack 3005 and the IP routing 3004.

The TCP 3003 receives the packet from the IP routing 3004. It notifies completion of a connection of the TCP session with the TCP 2003 to the SSL 3002 because this packet is a response packet to a request for establishing the TCP session. At this moment, the TCP 3003 recognizes that the response packet is one that has arrived from the TCP 2003. The reason is that the actual response is one transmitted from the TCP within the intermediate driver 3006; however the TCP 3003 recognizes as if the response had been given by the TCP 2003 because the TCP within the intermediate driver 3006 gave a response of the session establishment to the TCP 3003 under a false name of the TCP 2003.

Upon receipt of the response packet, the TCP 3003 generates an ACK packet to this response packet addressed to the TCP 2003 and transmits it. This ACK packet, which is received by the TCP of the intermediate driver 3006 via the IP routing 2004 and the IP stack 2005, allows the TCP process to be terminated.

The SSL 3002 receives the connection completion notification from the TCP 3003, and transmits a packet (SSL session establishment request packet) for requesting establishment of the session according to the SSL protocol for a purpose of establishing the SSL session with the SSL 2002.

The SSL session establishment request packet, which is received by the TCP 3003, goes through the TCP session established between the TCP 3003 and the TCP within the intermediate driver 3006, and arrives at the intermediate driver 3006.

The intermediate driver 3006 receives the SSL session establishment request packet, thereby to terminate the TCP session, adds the header not causing the congestion control such as the UDP, and transmits the packet to the intermediate driver 2006. The packet arrives at the intermediate driver 2006 through the NIC 301, the HUB 32, the Firewall 33, the HUB 22, and the NIC 201. At this moment, the processing speed acceleration engine 2014 within the NIC 201 transfers the packet received from the PHY 2012 to the MAC 2011 as it stands.

The SSL session establishment request packet, which is received by the intermediate driver 2006, goes through the TCP session established between the TCP within the intermediate driver 2006 and the TCP 2003, and arrives at the TCP 2003.

The TCP 2003 transfers the SSL session establishment request packet to the SSL 2002.

The SSL 2002 verifies the content of the SSL session establishment request, notifies establishment of the session with the SSL 3002 to the gateway application 2001A if it were not for a problem, and simultaneously therewith, transmits an SSL session establishment response packet to the SSL 3002 according to the SSL protocol.

The SSL session establishment response packet arrives at the intermediate driver 2006 through the path opposite to that of the SSL session establishment request packet, i.e. the TCP session between the TCP 2003 and the intermediate driver 2006, and arrives at the intermediate driver 3006 through the session not causing the congestion control such as the UDP between the intermediate driver 2006 and the intermediate driver 3006. Further, it arrives at the SSL 3002 through the TCP session between the intermediate driver 3006 and the TCP 3003.

The SSL 3002 verifies the content of the SSL session establishment response according to the SSL protocol, and notifies establishment of the SSL session between the SSL 3002 and the SSL 2002 to the gateway application 3001A if it were not for a problem.

As mentioned above, the session for transferring the frame not causing the congestion control such as the UDP is established between the intermediate driver 2006 and the intermediate driver 3006. Further, the SSL session is established between the SSL 2002 and the SSL 3002.

Above, in the fourth embodiment, the operation in the case of establishing the SSL session (secure TCP session) from the gateway device 30 to the gateway device 20 is completed.

[An Operation of Transferring the Frame from the Terminal 21 to the Server 31]

The case of transferring the frame from the terminal 21 to the server 31 in the fourth embodiment will be exemplified to explain the operation by employing FIG. 20.

At this moment, it is assumed that the bridge 2008, the bridge 3008, the HUB 22 and the HUB 32 have already learned the MAC addresses of the terminal 21, the server 31, the Firewall 33, the gateway device 20, and the gateway device 30.

Further, it is assumed that the Firewall 33 permits communication between the gateway device 20 and the gateway device 30 in a bi-direction, and interrupts direct communication between the terminal 21 and the server 31, which does not go through the gateway device 20 or the gateway device 30, in a bi-direction.

Further, it is assumed that the SSL session (secure TCP session) from the gateway device 30 to the gateway device 20 has already established according to the foregoing operational example.

Further, it is assumed that the TCP session has been already constructed between the application 2101 within the terminal 21 and the application (application 3101) within the server 31.

The application 2101 within the terminal 21 delivers the data addressed to the application 3101 within the server 31 to the TCP 2102.

The TCP 2102 receives the data from the application 2101, adds the TCP header (F23 in FIG. 2) or the IP header (F22 in FIG. 2) according to TCP protocol, thereby to convert it into an IP packet, and delivers it to the IP routing 2103. At this time, the IP address of the server 31 is set to the IP DA within the LAN IP F22, and the IP address of the terminal 21 to the IP SA within the LAN IP F22.

The IP routing 2103 makes a reference to the destination IP address (addressed to the server 31) and the destination port (addressed to the TCP 3102) of the packet received from the TCP 2102, and transfers the data to the IP stack 2104 as it stands.

The IP stack 2104 receives the packet from the IP routing 2103, adds the MAC header (F21 in FIG. 2), thereby to generate an Ethernet frame, and delivers it to the driver 2105. This frame has a format of the Ethernet frame F20. At this time, the IP stack 2104 makes a reference to a result of the ARP, and sets the MAC address of the server 31 to the MAC DA within the LAN MAC F21 of the frame, and the MAC address of the terminal 21 to the MAC SA within the LAN MAC F21.

The driver 2105 receives the above-mentioned frame from the IP stack 2105, and transfers it to the NIC 211.

The NIC 211 receives the frame from the driver 2105, and transfers it to the HUB 22 through the MAC 2111, the PHY 2112, and the port 2113.

Upon receipt of the frame from the port of the NIC 211 side of the terminal 21, the HUB 22 makes a reference to the MAC DA within F21, and outputs this frame to the port of the gateway device 20 side as it stands based upon a result of learning the past routing because the MAC DA is an MAC address of the server 31.

The gateway device 20 receives the frame transmitted by the HUB 22 in the port 2013, and delivers it to the bridge 2008 through the PHY 2012, the MAC 2011, and the driver 2007.

The bridge 2008 makes a reference to the MAC DA that exists within the header F21 within the frame (having a form of the frame format F20) received from the driver 2007, and transfers the frame to the driver 2009 because the MAC DA is an MAC address of the server 31, and not an MAC address of the gateway device 20.

The frame transmitted from the bridge 2008 is transferred to the gateway application 2001A through the driver 2009 and the virtual NIC 2010.

The gateway application 2001A allows the frame received from the virtual NIC 2010 to flow to the SSL session established between the gateway application 2001A and the gateway application 3001A. That is, the gateway application 2001A delivers the Ethernet frame (having the frame format F20) received from the virtual NIC 2010 as data to the SSL 2002.

Upon receipt of the data (F21 to F24) from the gateway application 2001A, the SSL 2002 encrypts this, thereby to generate data F14, and delivers it the TCP 2003.

The TCP 2003 receives the data F14 from the SSL 2002, adds the TCP header F13 and the IP header F12, and transfers it to the IP routing 2004.

Herein, the IP address of the gateway device 30 is set to the IP DA within F12, and the IP address of the gateway device 20 to the IP SA within F12. Further, the port of the TCP 3003 is set to the destination port, and the port of the TCP 2003 is designated as the transmission source port.

The IP routing 2004 makes a reference to the IP address etc. within the IP header F12 of the data received from the TCP 2003, and transfers the frame to the IP stack 2005.

The IP stack 2005 receives the frame from the IP routing 2004, adds the MAC header F11 to the frame, thereby to convert it into a formatted frame having the Ether-over-SSL frame format F10, and delivers it to the intermediate driver 2006.

Herein, from a result of the ARP, the MAC address of the WAN side of the Firewall 33 is set to the MAC DA within F11, and the MAC address of the gateway device 20 to the MAC SA within F11.

The intermediate driver 2006 receives the frame from the IP stack 2005, and makes a frame analysis thereof in the frame analysis 2006H. Then, as a result of the analysis, the frame is a frame of the SSL session with the gateway device 30 pre-notified by the gateway application 2001A, whereby it deletes and preserves the MAC header F11 of this frame in the de-encapsulation 2006F, and delivers the frame to the TCP 2006A.

The TCP 2006A within intermediate driver 2006 terminates the TCP 2003A. That is, it deletes the IP header F12 and the MAC header F13 of the frame and leaves only F14, and sends the data F14 to the fragmentation 2006B. Further, it sends an ACK frame to the TCP 2003.

The fragmentation 2006B within the intermediate driver 2006 confirms size of the data F14 received from the TCP 2006A, and sends the data to the re-encapsulation 2006D as it stands because it does not need to be fragmented.

The re-encapsulation 2006D within the intermediate driver 2006 adds the MAC header F11, the IP header F12, and the MAC header F13 to the data F14 received from the fragmentation 2006B, thereby to convert it into formatted data having the frame format F10, and transmits it to the bridge 2008. At this moment, the MAC address of the WAN side of the Firewall 33 is set to the MAC DA within F11, and the MAC address of the gateway device 20 to the MAC SA within F11. Further, the IP address of the gateway device 30 is set to the IP DA within F12, and the IP address of the gateway device 20 is set to the IP SA within F12. Further, the port of the TCP 3003 is set to the destination port, and the port of the TCP 2003 is designated as the transmission source port. Theses headers are ones preserved by the de-encapsulation 2006F.

The frame transmitted from the intermediate driver is sent to the HUB 22 through the bridge 2008, the driver 2007, and the NIC 201.

Upon receipt of the frame from the port of the gateway device 22 side, the HUB 22 makes a reference to the MAC DA within F11, and outputs this frame to the Firewall 33 as it stands based upon a result of learning the past routing because the MAC DA is an MAC address of the WAN side of the Firewall 33.

The Firewall 33 receives the frame transmitted from the HUB 22, makes a reference to the IP DA, thereby to change the MAC header F11, and transfers the received frame with a form of the frame format F10 unchanged to the HUB 32.

Herein, the MAC address of the gateway device 30 is set to the MAC DA within F11, and the MAC address of the LAN side of the Firewall 33 to the MAC SA within F11.

Upon receipt of the frame from the Firewall 33, the HUB 32 makes a reference to the MAC DA within F11, and outputs this frame to the port of the gateway device 30 side as it stands based upon a result of learning the past routing because the MAC DA is an MAC address of the gateway device 30.

Upon receipt of the frame transmitted by the HUB 32 from the port 3013, the gateway device 30 transfers it to the intermediate driver 3006 through the PHY 3012, the MAC 3011, the driver 3007, and the bridge 3008.

The intermediate driver 3006 receives the frame from the bridge 3008. This frame has a form of the frame format F10 at the time of having been received; however the header F11, the header F12 and the header F13 thereof are deleted in the de-encapsulation 3006G, and only the encrypted data F14 is left. And, it delivers the data F14 to the TCP 3006A, and allows the data to flow to the TCP session pre-established between the TCP 3003 and the TCP 3006A within the intermediate driver. The TCP 3006A within the intermediate driver 3006 adds the TCP header F13 and the IP header F12 necessary for TCP communication with the TCP 3003 to the received data F14, and sends it to the re-encapsulation 3006E. The IP address of the gateway device 30 is set to the IP DA within F12, and the IP address of the gateway device 20 to the IP SA within F12.

Upon receipt of the data from the TCP 3006A, the re-encapsulation 3006E within the intermediate driver 3006 adds the header F11 hereto, and sends it the IP stack 3005. Herein, it sets the MAC address of the gateway device 30 to the MAC DA within F11, and sets the MAC address of the WAN side of the Firewall 33 to the MAC SA within F11. In such a manner, it converts the frame received from the TCP 3006A into a formatted frame having the frame format F10, and transfers it to the IP stack 3005.

The IP stack 3005 removes the MAC header F11 of the frame received from the intermediate driver 3006, and sends the frame to the IP routing 3004.

The IP routing 3004 makes a reference to the IP DA within the header F12 and the destination port number within F13 of the received frame, and transfers the frame to the TCP 3003.

Upon receipt of the frame from the IP routing 3004, the TCP 3003 performs the process of sending back an ACK packet, or the like according to the TCP protocol. And, it removes the TCP header F13 and the IP header F12 from the received frame, and transfers data F14 to the SSL 3002.

Upon receipt of the data F14 from the TCP 3003, the SSL 3002 undoes the encryption with decoding process, takes out an Ethernet frame F20, i.e. F21 to F24, from the data F14, and transfers it to the gateway application 3001A.

Upon receipt of the frame F20 from the SSL 3002, the gateway application 3001A allows this frame to flow to the virtual NIC 3010 as it stands.

This frame keeps the state at the time of having been transmitted from the terminal 21 to the HUB 22 as it stands, in which the MAC address of the server 31 has been set to the MAC DA within the LAN MAC F21, and the MAC address of the terminal 21 to the MAC SA within the LAN MAC F21. Further, the IP address of the server 31 has been set to the IP DA within the LAN IP F22, and the IP address of the terminal 21 to the IP SA within the LAN IP F22.

The frame delivered to the virtual NIC 3010 from the gateway application 3001A is transferred to the HUB 32 through the driver 3009, the bridge 3008, and the NIC 301.

Upon receipt of the frame transmitted from the port of the gateway device 30 side, the HUB 32 makes a reference to the MAC DA within F21, and outputs this frame to the port of the server 31 side as it stands based upon a result of learning the past routing because the MAC DA is an MAC address of the server 31.

The server 31 receives the frame transmitted from the HUB 32, and delivers the data F24 within the frame to the application 3101 through the driver 3105, the IP stack 3104, the IP routing 3103, and the TCP 3102.

As mentioned above, a series of the frame transfer from the application 2101 within the terminal 21 to the application 3101 within the server 31 is completed.

A series of the frame transfer from the application 3101 within the server 31 to the application 2101 within the terminal 21 also can be realized similarly by tracing the path opposite to that of the above-mentioned example.

Additionally, also in this embodiment, similarly to the software process within the session relay device 10 in the first embodiment, each of the process between the intermediate driver 3006 and the TCP 3003 and the process between the intermediate driver 2006 and the TCP 2003 temporally becomes a process of a TCP-over-TCP format in the software within the gateway device 30 and in the software within the gateway device 20, respectively. However, a possibility that a decline in a speed due to the TCP over TCP occurs is extremely low because there is almost no possibility that the packet is missing between the intermediate driver and the TCP. The reason is that the so-called TCP-over-TCP problem is a problem that a remarkable decline in a speed occurs at the time that a packet loss has occurred, and supposing that no packet loss occurs, even though the process of a TCP-over-TCP format is performed, window size of the TCP of the header F13 side becomes large at any time, and the problem such as a decline in a speed does not occur.

Even though the congestion control and the re-sending control of the TCP of the header F13 side are stopped substantially with the above-mentioned method, the congestion control and the re-sending control of the TCP of the header F23 side work as usual, whereby the congestion control as well as the re-sending control are taken without a problem owing to the working of the TCP within the terminal 21 and the TCP within the server 31 from a viewpoint of each application of the terminal 21 and the server 31.

Additionally, in this embodiment, it is also possible to exchange the installation location of the server 31 for that of the terminal 21.

[Effects of the Invention]

Next, effects of this embodiment will be explained.

Utilizing the invention listed in this embodiment enables a high-speed transfer of the frame between the terminal 21 and the server 31.

The reason is that the TCP within the gateway device 20 and the TCP within the gateway device 30 are terminated in the intermediate driver within the gateway device 30 and in the intermediate driver within the gateway device 20, respectively, and occurrence of the TCP-over-TCP problem is avoided so as to prevent the congestion control and the re-sending control due to the TCP at a position of the header F13 from occurring in communication between the gateway device 20 and the gateway device 30.

[Fifth Embodiment ]

The fifth embodiment of the present invention differs from the fourth embodiment in a point that the intermediate driver 2006 within the gateway device 20 and the intermediate driver 3006 within the gateway device 30 are lost, and an intermediate driver 2105 within the terminal 21 and an intermediate driver 3106 within the server 31 are mounted instead thereof, respectively.

A configuration and an operation of the HUB 22, the HUB 32, the intranet 2, and the intranet 3 in the fifth embodiment are identical to that of the fourth embodiment.

In the fifth embodiment, not only a closed LAN but also an open WAN such as Internet may be employed for the intranet 2.

[Explanation of a Configuration]

Figure 21:
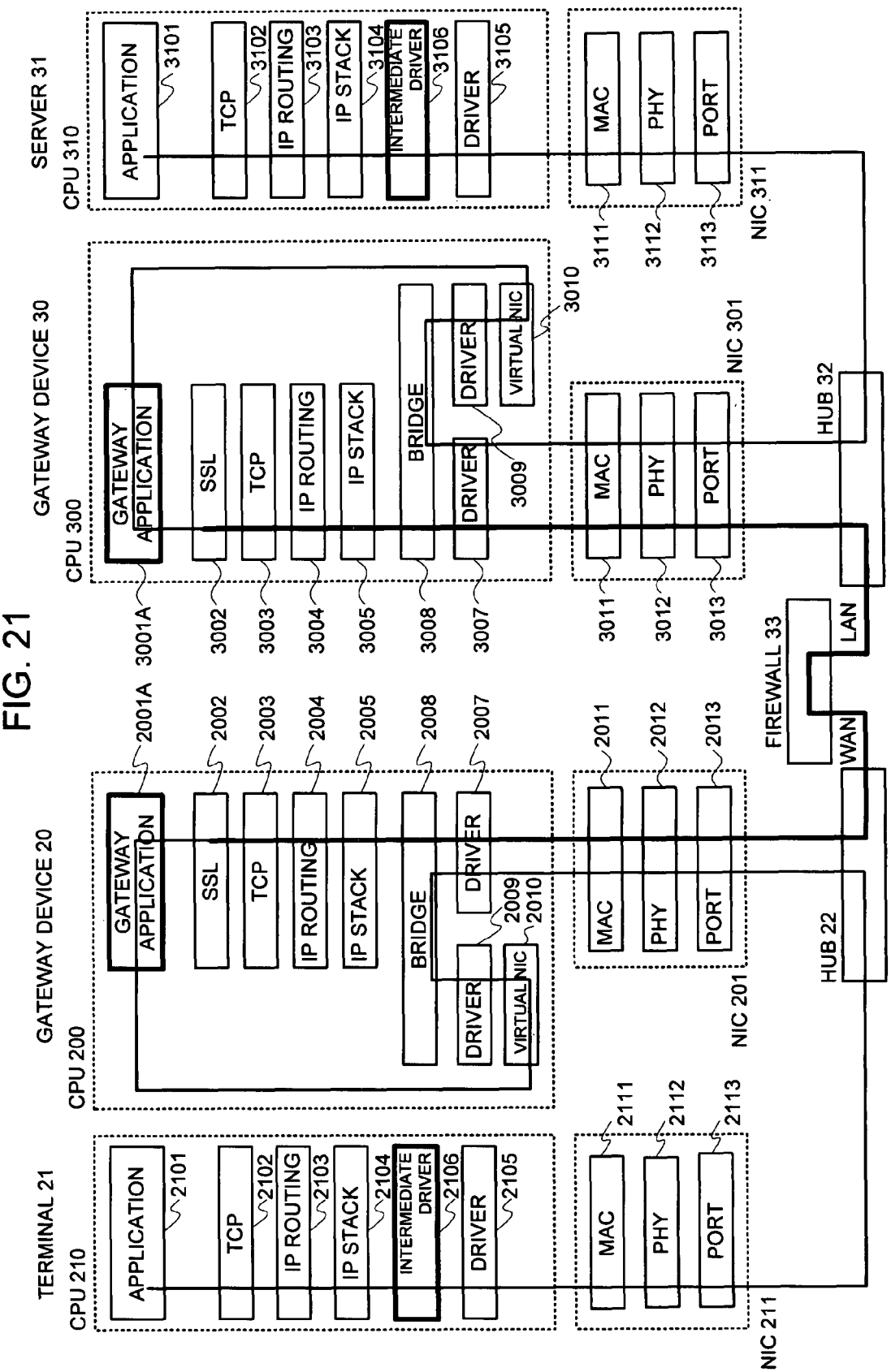
FIG. 21 is a block diagram illustrating a network configuration and a communication path in a fifth embodiment of the present invention.

FIG. 21 is a block diagram having a configuration of each apparatus and a transfer path of the frame in the fifth embodiment shown in details.

The gateway device 20 differs from the gateway device 20 in the fourth embodiment in a point that the intermediate driver 2006 is lost, and in a point that the gateway application 2001A ceases conveying information (port number of the gateway application etc.) associated with the SSL session to the intermediate driver 2006.

The gateway device 30 differs from the gateway device 30 in the fourth embodiment in a point that the intermediate driver 3006 is lost, and in a point that the gateway application 3001A ceases conveying information (port number of the gateway application etc.) associated with the SSL session to the intermediate driver 3006.

The terminal 21 differs from the terminal 21 in the fourth embodiment in a point that the intermediate driver 2006 is mounted.

The intermediate driver 2106 has a configuration similar to that of the intermediate driver 2006 in the fourth embodiment, or to that of the intermediate driver 1008 in the first embodiment shown in FIG. 7, and performs a similar operation. However, the setting is made in advance so that the TCP packets from all applications are terminated for the time being. For this, such an operation of, in the fourth embodiment, conveying the port number of the gateway application 2001A to the intermediate driver 2006 from the gateway application 2001A is unnecessary.

The server 31 differs from the server 31 in the fourth embodiment in a point that an intermediate driver 3106 is mounted.

The intermediate driver 3106 has a configuration similar to that of the intermediate driver 3006 in the fourth embodiment, or to that of the intermediate driver 1008 in the first embodiment shown in FIG. 7, and performs a similar operation. However, the setting is made in advance so that the TCP packets from all applications are terminated for the time being. For this, such an operation of, in the fourth embodiment, conveying the port number of the gateway application 3001A to the intermediate driver 3006 from the gateway application 3001A is unnecessary.

The HUB 22 and the HUB 32 have a configuration similar to that of the HUB 22 and the HUB 32 in the fourth embodiment, and perform a similar operation, respectively.

The Firewall 33 has a configuration similar to that of the Firewall 33 in the fourth embodiment, and performs a similar operation. However, in this embodiment, a NAT router or a Proxy server may be employed instead of the Firewall 33.

Also in the fifth embodiment, similarly to the other embodiments, only in the case that the SSL session has been pre-established between the gateway device 20 and the gateway device 30, an access to the apparatus within the intranet 3 from the apparatus in the intranet 2 is enabled.

[Explanation of an Operation]

[An Operation of Establishing the SSL Session]

The case of establishing the SSL session (secure TCP session) from the gateway device 30 to the gateway device 20 in the fifth embodiment will be exemplified to explain the operation by employing FIG. 21.

At this moment, it is assumed that the bridge 2008, the bridge 3008, the HUB 22 and the HUB 32 have already learned the MAC addresses of the terminal 21, the server 31, the LAN side of the Firewall 33, the WAN side of the Firewall 33, the gateway device 20, and the gateway device 30.

Further, it is assumed that the Firewall 33 permits communication between the gateway device 20 and the gateway device 30 in a bi-direction, and interrupts direct communication between the terminal 21 and the server 31, which does not go through the gateway device 20 or the gateway device 30, in a bi-direction.

The gateway application 3001A within the gateway device 30 receives a request for making a connection to the gateway application 2001A within the gateway device 20 from a user, and instructs the SSL 3002 to start communication with the gateway application 2001A within the gateway device 20.

The SSL 3002 receives the communication start instruction from the gateway application 3001A, and instructs the TCP 3003 to start communication with the gateway application 2001A within the gateway device 20 for a purpose of establishing the SSL session with the SSL 2002.

The TCP 3003 receives the communication start instruction from the SSL 3002, and transmits a packet (SYN) for requesting establishment of the TCP session with the TCP 2003 to the IP routing 3004 for a purpose of establishing the TCP session with the TCP 2003. This packet is a packet in line with the TCP specification, in which the gateway device 20 has been set to the destination IP address, and the TCP 2003 to the destination port number. This packet is a packet in line with the TCP specification, in which the session relay device 10 has been set to the destination IP address, and the TCP 1003 to the destination port number. This so-called TCP session establishment request packet is an SYN packet that is transmitted for a three-way handshake in establishing the TCP session. In this specification, for simplifying explanation of the TCP session establishment operation, out of the packets that are transmitted/received with the three-way handshake, the SYN packet is called a TCP session establishment request packet, and the SYN+ACK packet is called a response packet. Further, as a matter of fact, the ACK packet is also transmitted; however its explanation is omitted in the explanation of this operation because it is transferred similarly to the SYN packet.

The IP routing 3004 makes a reference to the destination IP address and the destination port number of the packet received from the TCP 3003, and transfers the packet to the IP stack 3005.

The IP stack 3005 adds the MAC address of the intranet 3 side within the Firewall 33 to the packet received from the IP routing 3004 as a destination MAC address, further sets the MAC address of its own node to the transmission source MAC address, thereby to generate a frame, and transfers it to the driver 3007 through the bridge 3008.

The driver 3007 receives the frame from the IP stack 3005, and transfers it to the MAC 3011.

The MAC 3011 receives the frame from the driver 3007, and transfers it to the PHY 3012.

The PHY 3012 receives the frame from the MAC 3011, and transfers it to the port 3013.

The port 3013 receives the frame from the PHY 3012, and transfers it to the HUB 32 via the Ethernet cable.

Upon receipt of the frame, the HUB 32 makes a reference to the MAC DA, and outputs this frame to the port of the Firewall 33 side as it stands based upon a result of learning the past routing because the MAC DA is an MAC address of the LAN side of the Firewall 33.

The Firewall 33 receives the frame from the HUB 22, permits this for a purpose of communication from the gateway device 30 to the gateway device 20, and transfers it to the HUB 22.

The HUB 22 receives the frame from the Firewall 33, and transfers this frame to the gateway device 20 as it stands based upon a result of learning the past routing.

The gateway device 20 receives the frame from the HUB 22, and transfers it to the IP stack 2005 through a path of the port 2013, the PHY 2012, the MAC 2011, the driver 2007, and the bridge 2008.

The IP stack 2005 receives the frame from the bridge 2008, removes the MAC header, thereby to convert it into a packet, and transfers it to the IP routing 2004.

The IP routing 2004 makes a reference to the destination port number of the packet received from the IP stack 2005, and transfers it to the TCP 2003 because the port number of the TCP 2003 side has been added.

The TCP 2003 receives the packet from the IP routing 2004. It transmits a response packet (SYN+ACK) to the session establishment request addressed to the TCP 3003 according to the TCP protocol because this packet is a TCP session establishment request packet (SYN+ACK). That is, the IP address of the gateway device 30 is set to the destination IP of the response packet, and the port number of the TCP 3003 to the destination port thereof.

The response packet arrives at the CPU 300 through the IP routing 2004, the IP stack 2005, the bridge 2008, the driver 2007, the NIC 201, the HUB 22, the Firewall 33, the HUB 32, and the NIC 301, and further arrives at the TCP 3003 through the driver 3007, the bridge 3008, the IP stack 3005, and the IP routing 3004.

The TCP 3003 receives the packet from the IP routing 3004. It notifies completion of a connection of the TCP session with the TCP 2003 to the SSL 3002 because this packet is a response packet to a request for establishing the TCP session.

The SSL 3002 receives the connection completion notification from the TCP 3003, and transmits a packet (SSL session establishment request packet) for requesting establishment of the session according to the SSL protocol for a purpose of establishing the SSL session with the SSL 2002.

The SSL session establishment request packet, which is received by the TCP 3003, goes through the TCP session established between the TCP 3003 and the TCP 2003, and arrives at the TCP 2003 through the NIC 301, the HUB 32, the Firewall 33, the HUB 22, and the NIC 201.

The TCP 2003 transfers the packet to the SSL 2002.

The SSL 2002 verifies the content of the SSL session establishment request, notifies establishment of the session with the SSL 3002 to the gateway application 2001A if it were not for a problem, and simultaneously therewith, transmits an SSL session establishment response packet to the SSL 3002 according to the SSL protocol.

The SSL session establishment response packet arrives at the SSL 3002 through the path opposite to that of the SSL session establishment request packet, i.e. the TCP session between the TCP 2003 and the TCP 3003.

The SSL 3002 verifies the content of the SSL session establishment response according to the SSL protocol, and notifies establishment of the SSL session between the SSL 3002 and the SSL 2002 to the gateway application 3001A if it were not for a problem.

As mentioned above, the SSL session is established between the SSL 2002 and the SSL 3002.

Above, in the fourth embodiment, the operation in the case of establishing the SSL session (secure TCP session) from the gateway device 30 to the gateway device 20 is completed.

[An Operation of Constructing the Session from the Application 2101 to the Application 3101]

An operation will be explained of establishing the session between the application 2101 within the terminal 21 and the application 3101 within the server 31 in the fifth embodiment by employing FIG. 21.

At this moment, it is assumed that the bridge 2008, the bridge 3008, the HUB 22 and the HUB 32 have already learned the MAC addresses of the terminal 21, the server 31, the Firewall 33, the gateway device 20, and the gateway device 30.

Further, it is assumed that the Firewall 33 permits communication between the gateway device 20 and the gateway device 30 in a bi-direction, and interrupts direct communication between the terminal 21 and the server 31, which does not go through the gateway device 20 or the gateway device 30, in a bi-direction.

Further, it is assumed that the SSL session (secure TCP session) from the gateway device 30 to the gateway device 20 has already established according to the foregoing operational example.

It is assumed that the setting is made in advance for the intermediate driver 2106 and the intermediate driver 3106 so that the TCPs of all applications within its own node are terminated.

The application 2101 within the terminal 21 receives a request for making a connection to the application 3101 within the server 31 from a user, and instructs the TCP 2102 to start communication with the application 3101 within the server 31.

The TCP 2102 receives the communication start instruction from the application 2101, and transmits a packet necessary for establishing the TCP session with the TCP 3102 to the IP routing 2103 for a purpose of establishing the TCP session with the TCP 3102. This packet is a packet in line with the TCP specification, in which the server 31 has been set to the destination IP address, and the TCP 3102 to the destination port number. This so-called TCP session establishment request packet is an SYN packet that is transmitted for a three-way handshake in establishing the TCP session. In this specification, for simplifying explanation of the SSL session establishment operation, out of the packets that are transmitted/received with the three-way handshake, the SYN packet is called a TCP session establishment request packet, and the SYN+ACK packet is called a response packet. Further, as a matter of fact, the ACK packet is also transmitted; however its explanation is omitted in the explanation of this operation because it is transferred similarly to the SYN packet.

The IP routing 2104 makes a reference to the destination IP address and the destination port number of the packet received from the TCP 2102, and transfers the packet to the IP stack 2104.

The IP stack 2104 adds the MAC address of the server 31 to the packet received from the IP routing 2103 as a destination MAC address, and further sets the MAC address of the terminal 21 to the transmission source MAC address, and transfers it to the intermediate driver 2106.

The intermediate driver 2106 receives the packet from the IP stack 2104, and makes a frame analysis. As a result of the analysis, the packet is a TCP packet, whereby it removes the MAC header, and terminates the request for making a connection to the TCP 3102 in the TCP section of the intermediate driver 2106. That is, originally, the TCP 2102 requested a connection request of the TCP 3102; however as a matter of fact, the TCP within the intermediate driver 2106 receives and reserves this request, and the process of establishing the TCP session is performed between the TCP 2102 and the TCP within the intermediate driver 2106, thereby to allow the connection request to be terminated.

In performing the termination process, the intermediate driver 2106 sends a packet for a connection request to the driver 2105 for a purpose of requesting the intermediate driver 3106 to establish the TCP session with the TCP 3102. This connection request packet is not a packet in line with the TCP specification, but a peculiar packet. The server 31 is set to the destination IP address of this packet and the TCP 3102 is set to the destination port number thereof, thereby to generate a frame.

The driver 2105 receives the connection request frame from the intermediate driver 2106, and transfers it to the MAC 2111.

The MAC 2111 receives the frame from the driver 2105, and transfers it to the PHY 2112.

The PHY 2112 receives the frame from the MAC 2111, and transfers it to the port 2113.

The port 2113 receives the frame from the PHY 2112, and transfers it to the HUB 22 via the Ethernet cable.

Upon receipt of the frame from the port of the NIC 211 side of the terminal 21, the HUB 22 makes a reference to the MAC DA within F21, and outputs this frame to the port of the gateway device 20 side as it stands based upon a result of learning the past routing because the MAC DA is an MAC address of the server 31.

The gateway device 20 receives the frame transmitted by the HUB 22 in the port 2013, and delivers it to the bridge 2008 through the PHY 2012, the MAC 2011, and the driver 2007.

The bridge 2008 makes a reference to the MAC DA that exists within the header F21 within the frame (having a form of the frame format F20) received from the driver 2007, and transfers the frame to the driver 2009 because the MAC DA is an MAC address of the server 31, and is not an MAC address of the gateway device 20.

The frame transmitted from the bridge 2008 is transferred to the gateway application 2001A through the driver 2009 and the virtual NIC 2010.

The gateway application 2001A allows the frame received from the virtual NIC 2010 to flow to the SSL session established between the gateway application 2001A and the gateway application 3001A. That is, the gateway application 2001A delivers the Ethernet frame (frame format F20) received from the virtual NIC 2010 as data to the SSL 2002.

Upon receipt of the data (F21 to F24) from the gateway application 2001A, the SSL 2002 encrypts this, thereby to generate data F14, and delivers it the TCP 2003.

The TCP 2003 receives the data F14 from the SSL 2002, adds the TCP header F13 and the IP header F12, and transfers it to the IP routing 2004.

Herein, the IP address of the gateway device 30 is set to the IP DA within F12, and the IP address of the gateway device 20 to the IP SA within F12. Further, the port of the TCP 3003 is set to the destination port, and the port of the TCP 2003 is designated as the transmission source port.

The IP routing 2004 makes a reference to the IP address etc. within the IP header F12 of the data received from the TCP 2003, and transfers the frame to the IP stack 2005.

The IP stack 2005 receives the frame from the IP routing 2004, adds the MAC header F11 to the frame, thereby to convert it into a formatted frame having the Ether-over-SSL frame format F10, and delivers it to the bridge 2008.

Herein, from a result of the ARP, the MAC address of the WAN side of the Firewall 33 is set to the MAC DA within F11, and the MAC address of the gateway device 20 to the MAC SA within F11.

The frame transmitted by the IP stack 2005 is sent to the HUB 22 through the bridge 2008, the driver 2007, and the NIC 201.

Upon receipt of the frame from the port of the gateway device 22 side, the HUB 22 makes a reference to the MAC DA within F11, outputs this frame to the Firewall 33 as it stands based upon a result of learning the past routing because the MAC DA is an MAC address of the WAN side of the Firewall 33.

The Firewall 33 receives the frame transmitted from the HUB 22, makes a reference to the IP DA, thereby to change the MAC header F11, and transfers the received frame with a form of the frame format F10 unchanged to the HUB 32.

Herein, the MAC address of the gateway device 30 is set to the MAC DA within F11, and the MAC address of the LAN side of the Firewall 33 to the MAC SA within F11.

Upon receipt of the frame from the Firewall 33, the HUB 32 makes a reference to the MAC DA within F11, and outputs this frame to the port of the gateway device 30 side as it stands based upon a result of learning the past routing because the MAC DA is an MAC address of the gateway device 30.

Upon receipt of the frame transmitted by the HUB 32 in the port 3013, the gateway device 30 transfers it to the IP stack 3005 through the PHY 3012, the MAC 3011, the driver 3007, and the bridge 3008.

The IP stack 3005 removes the MAC header F11 of the frame received from the bridge 3008, and transfers the frame to the IP routing 3004.

The IP routing 3004 makes a reference to the IP DA within the header F12 and the destination port number within F13 of the received frame, and transfers the frame to the TCP 3003.

Upon receipt of the frame from the IP routing 3004, the TCP 3003 performs the process of sending back an ACK packet to the TCP 2003, or the like according to the TCP protocol. And, it removes the TCP header F13 and the IP header F12 from the received frame, and transfers the data F14 to the SSL 3002.

Upon receipt of the data F14 from the TCP 3003, the SSL 3002 undoes the encryption with decoding process, takes out an Ethernet frame F20, i.e. F21 to F24, from the data F14, and transfers it to the gateway application 3001A.

Upon receipt of the frame F20 from the SSL 3002, the gateway application 3001A allows this frame to flow to the virtual NIC 3010 as it stands. This frame keeps the state at the time of have been transmitted from the terminal 21 to the HUB 22 as it stands, in which the MAC address of the server 31 has been set to the MAC DA within the LAN MAC F21, and the MAC address of the terminal 21 to the MAC SA within the LAN MAC F21. Further, the IP address of the server 31 has been set to the IP DA within the LAN IP F22, and the IP address of the terminal 21 to the IP SA within the LAN IP F22.

The frame delivered to the virtual NIC 3010 from the gateway application 3001A is transferred to the HUB 32 through the driver 3009, the bridge 3008, and the NIC 301.

Upon receipt of the frame transmitted from the port of the gateway device 30 side, the HUB 32 makes a reference to the MAC DA within F12, and outputs this frame to the port of the server 31 side as it stands based upon a result of learning the past routing because the MAC DA is an MAC address of the server 31.

The server 31 receives the packet from the HUB 32, and transfers the packet to the intermediate driver 3106 through the path of the port 3113, the PHY 3112, the MAC 3111, and the driver 3105.

The intermediate driver 3106 receives the packet from the driver 3105, and makes a frame analysis thereof. As a result of the analysis, the frame is a TCP frame addressed to the application within its own node, whereby it receives this frame and removes the MAC header, thereby to convert it into a packet. The TCP within the intermediate driver 3106 transmits a packet necessary for establishing the session with the TCP 3102 to the IP stack 3104 for a purpose of establishing the TCP session with the TCP 3102 because the packet is a packet of requesting a connection to the TCP 3102 transmitted to the intermediate driver 3106 from the intermediate driver 2106. This packet is a packet in line with the TCP specification, in which the server 31 is set to the destination IP address, the TCP 3102 to the destination port number, further, the IP address of the terminal 21 to the transmission source IP address, and the port number of the TCP 2102 to the transmission source port number.

That is, the TCP within the intermediate driver 3106 requests the TCP 3102 to establish the session under a false name of the TCP 2102. Thus, the TCP 3102 recognizes as if it had made communication with the TCP 2102, and further the TCP 2102 recognizes as if it had made communication with the TCP 3102. However, the actual TCP process is performed between the TCP 2102 and the TCP within the intermediate driver 2106, and between the intermediate driver 3106 and the TCP 3102 and, further, communication is separately made between the intermediate driver 2106 and the intermediate driver 3106 with the method not causing the congestion control such as the UDP. And, the TCP session between the TCP 2102 and the intermediate driver 2106, some communication session such as the UDP between the intermediate driver 2106 and the intermediate driver 3106, and further the TCP session between the intermediate driver 3106 and the TCP 3102 are mutually connected/relayed by the intermediate driver 2106 and the intermediate driver 3106, thereby allowing the communication to be made as if the TCP session had been established between the TCP 3003 and the TCP 2003.

The IP stack 3104 receives the packet from the intermediate driver 3106, removes the MAC header, and transfers it to the IP routing 3103.

The IP routing 3103 makes a reference to the destination port number of the packet received from the IP stack 3104, and transfers this packet to the TCP 3102 because the port number of the TCP 3102 side has been added.

The TCP 3102 receives the packet from the IP routing 3103. It sends back a response packet to the TCP session establishment request according to the TCP protocol because this packet is a TCP session establishment request packet. At this moment, the TCP 3102 recognizes that the TCP session establishment request is one that has arrived from the TCP 2102. The reason is that the actual establishment request is one transmitted from the TCP within the intermediate driver 3106; however the TCP 3102 recognizes as if it had established the session with the TCP 2102 because the TCP within the intermediate driver 3106 requested the TCP 3102 to establish the session under a false name of the TCP 2102.

Thus, the TCP 3102 transmits the response packet addressed to the TCP 2102. That is, the IP address of the terminal 21 is set to the destination IP of the response packet, and the port number of the TCP 2102 to the destination port thereof.

The response packet arrives at the intermediate driver 3106 through the IP routing 3103 and the IP stack 3104.

Upon receipt of the response packet, the intermediate driver 3106 receives it in the TCP within the intermediate driver 3106, and transmits an ACK packet to this response packet, thereby to terminate the TCP process. And, it transmits to the intermediate driver 2106 a packet for notifying completion of a connection. This connection completion notification packet is not a packet in line with the TCP specification, but a peculiar packet. In this packet, The terminal 21 is set to the destination IP address, the TCP 2102 to the destination port number, the server 31 to the transmission source IP address, and the TCP 3102 to the transmission source port number, and a frame is generated.

The connection completion notification frame arrives at the intermediate driver 2106 within the CPU 210 through the path opposite to that of the connection request frame, i.e. through the driver 3105, the NIC 311, the HUB 32, the NIC 301, the CPU 300, the NIC 301, the Firewall 33, the HUB 32, and the NIC 201, the CPU 200, the NIC 201, the HUB 22, and the NIC 211.

The intermediate driver 2106 receives the connection completion notification frame, and makes a frame analysis thereof. As a result of the analysis, the received frame is a packet addressed to the application within its own node, whereby it receives this packet. The received packet is a notification about completion of a connection between the TCP 3102 and the intermediate driver 3106 transmitted to the intermediate driver 2106 from the intermediate driver 3106, whereby the TCP within the intermediate driver 2106 generates a response packet according to the TCP protocol for a purpose of sending a response packet of the session establishment request to the TCP 2103, and transmits it to the IP stack 2104.

The response packet arrives at the TCP 2102 through the IP stack 2104 and the IP routing 2103.

The TCP 2102 receives the packet from the IP routing 2103. It notifies completion of a connection of the TCP session with the TCP 3102 to the application 2101 because this packet is a response packet to the request for establishing the TCP session. At this moment, the TCP 2102 recognizes that the response packet is one that has arrived from the TCP 3102. The reason is that the actual response is one transmitted from the TCP within the intermediate driver 2106; however the TCP 2102 recognizes as if the response had been given by the TCP 3102 because the TCP within the intermediate driver 2006 gave a session establishment response to the TCP 2102 under a false name of the TCP 3102.

Upon receipt of the response packet, the TCP 2102 generates an ACK packet to this response packet addressed to the TCP 3102. This ACK packet, which is received by the TCP of the intermediate driver 2106 via the IP routing 2103 and the IP stack 2104, allows the TCP process to be terminated.

As mentioned above, in the fifth embodiment, the operation is completed of establishing the session between the application 2101 within the terminal 21 and the application 3101 within the server 31.

[An Operation of Transferring the Frame from the Terminal 21 to the Server 31]

The case of transferring the frame from the terminal 21 to the server 31 in the fifth embodiment will be exemplified to explain the operation by employing FIG. 21.

At this moment, it is assumed that the bridge 2008, the bridge 3008, the HUB 22 and the HUB 32 have already learned the MAC addresses of the terminal 21, the server 31, the Firewall 33, the gateway device 20, and the gateway device 30.

Further, it is assumed that the Firewall 33 permits communication between the gateway device 20 and the gateway device 30 in a bi-direction, and interrupts direct communication between the terminal 21 and the server 31, which does not go through the gateway device 20 or the gateway device 30, in a bi-direction.

Further, it is assumed that the SSL session (secure TCP session) from the gateway device 30 to the gateway device 20 has already established according to the foregoing operational example.

Further, it is assumed that the TCP session has been already constructed between the application 2101 within the terminal 21 and the application (application 3101) within the server 31.

The application 2101 within the terminal 21 delivers data addressed to the application 3101 within the server 31 to the TCP 2102.

The TCP 2102 receives the data from the application 2101, adds the TCP header (F23 in FIG. 2) and the IP header (F22 in FIG. 2) according to the TCP protocol, thereby to convert it into an IP packet, and delivers it to the IP routing 2103. At this time, the IP address of the server 31 is set to the IP DA within the LAN IP F22, and the IP address of the terminal 21 to the IP SA within the LAN IP F22.

The IP routing 2103 makes a reference to the destination IP address (addressed to the server 31) and the destination port (addressed to the TCP 3102) of the packet received from the TCP 2102, and transfers the data to the IP stack 2104 as it stands.

The IP stack 2104 receives the packet from the IP routing 2103, adds the MAC header (F21 in FIG. 2), thereby to generate an Ethernet frame, and delivers it to the intermediate driver 2106. This frame has a format of the Ethernet frame F20. At this time, the IP stack 2104 makes a reference to a result of the ARP, and sets the MAC address of the server 31 to the MAC DA within the LAN MAC F21 of the frame, and the MAC address of the terminal 21 to the MAC SA within the LAN MAC F21.

The intermediate driver 2106 receives the frame from the IP stack 2004, and makes a frame analysis thereof in the frame analysis 2006H. As a result of the analysis, the frame is a frame of the session between the TCP 2102 and the TCP 3102 previously session-established, whereby it deletes and preserves the MAC header F12 of this frame in the de-encapsulation 2106F, and delivers the frame to the TCP 2106A.

The TCP 2106A within intermediate driver 2106 terminates the TCP 2103A. That is, it deletes the IP header F22 and the MAC header F23 of the frame, leaves only F24, and sends the data F24 to the fragmentation 2106B. Further, it transmits an ACK frame to the TCP 2102.

The fragmentation 2106B within the intermediate driver 2106 confirms size of the data F24 received from the TCP 2106A, and sends the data to the re-encapsulation 2106D as it stands because it does not need to be fragmented.

The re-encapsulation 2106D within the intermediate driver 2106 adds the MAC header F21, the IP header F22, and the MAC header F23 to the data F24 received from the fragmentation 2106B, thereby to convert it into formatted data having the frame format F20, and transmits it to the driver 2105. At this moment, the MAC address of the server 31 is set to the MAC DA within F21, the MAC address of the terminal 21 to the MAC SA within F21. Further the IP address of the server 31 is set to the IP DA within F22, and the IP address of the terminal 21 to the IP SA within F22. Further, the port of the TCP 3102 is set to the destination port, and the port of the TCP 2102 is designated as the transmission source. Theses headers are ones preserved by the de-encapsulation 2106F.

The driver 2105 receives the above-mentioned frame from the intermediate driver 2106, and transfers it to the NIC 211.

The NIC 211 receives the frame from the driver 2105, and transfers it to the HUB 22 through the MAC 2111, the PHY 2112, and the port 2113.

Upon receipt of the frame from the port of the NIC 211 side of the terminal 21, the HUB 22 makes a reference to the MAC DA within F21, and outputs this frame to the port of the gateway device 20 side as it stands based upon a result of learning the past routing because the MAC DA is an MAC address of the server 31.

The gateway device 20 receives the frame transmitted by the HUB 22 in the port 2013, and delivers it to the bridge 2008 through the PHY 2012, the MAC 2011 and the driver 2007.

The bridge 2008 makes a reference to the MAC DA that exists within the header F21 within the formatted frame (having the frame format F20) received from the driver 2007, and transfers the frame to the driver 2009 because the MAC DA is an MAC address of the server 31, and not an MAC address of the gateway device 20.

The frame transmitted from the bridge 2008 is transferred to the gateway application 2001A through the driver 2009, and the virtual NIC 2010.

The gateway application 2001A allows the frame received from the virtual NIC 2010 to flow to the SSL session established between the gateway application 2001A and the gateway application 3001A. That is, the gateway application 2001A delivers the Ethernet frame (having the frame format F20) received from the virtual NIC 2010 as data to the SSL 2002.

Upon receipt of the data (F21 to F24) from the gateway application 2001A, the SSL 2002 encrypts this, thereby to generate data F14, and delivers it the TCP 2003.

The TCP 2003 receives the data F14 from the SSL 2002, adds the TCP header F13 and the IP header F12, and delivers it to the IP routing 2004. Herein, the IP address of the gateway device 30 is set to the IP DA within F12, and the IP address of the gateway device 20 to the IP SA within F12. Further, the port of the TCP 3003 is set to the destination port, and the port of the TCP 2003 is designated as the transmission source port.

The IP routing 2004 makes a reference to the IP address etc. within the IP header F12 of the data received from the TCP 2003, and transfers the frame to the IP stack 2005.

The IP stack 2005 receives the frame from the IP routing 2004, adds the MAC header F11 to the frame, thereby to convert it into a formatted frame having the Ether-over-SSL frame format F10, and delivers it to the bridge 2008. Herein, from a result of the ARP, the MAC address of the WAN side of the Firewall 33 is set to the MAC DA within F11, and the MAC address of the gateway device 20 to the MAC SA within F11.

The frame transmitted from the IP stack 2005 is sent to the HUB 22 through the bridge 2008, the driver 2007, and the NIC 201.

Upon receipt of the frame from the port of the gateway device 22 side, the HUB 22 makes a reference to the MAC DA within F11, and outputs this frame to the Firewall 33 as it stands based upon a result of learning the past routing because the MAC DA is an MAC address of the WAN side of the Firewall 33.

The Firewall 33 receives the frame transmitted by the HUB 22, makes a reference to the IP DA, thereby to change the MAC header F11, and transfers the received frame with a form of the frame format F10 unchanged to the HUB 32.

Herein, the MAC address of the gateway device 30 is set to the MAC DA within F11, and the MAC address of the LAN side of the Firewall 33 to the MAC SA within F11.

Upon receipt of the frame transmitted from the Firewall 33, the HUB 32 makes a reference to the MAC DA within F11, and outputs this frame to the port of the gateway device 30 side as it stands based upon a result of learning the past routing because the MAC DA is an MAC address of the gateway device 30.

Upon receipt of the frame transmitted by the HUB 32 in the port 3013, the gateway device 30 transfers it to the IP stack 3005 through the PHY 3012, the MAC 3011, the driver 3007, and the bridge 3008.

The IP stack 3005 removes the MAC header F11 of the frame received from the bridge 3008, and transfers the frame to the IP routing 3004.

The IP routing 3004 makes a reference to the IP DA within the header F12 and the destination port number within F13 of the received frame, and transfers the frame to the TCP 3003.

Upon receipt of the frame from the IP routing 3004, the TCP 3003 performs the process of sending back an ACK packet, or the like according to the TCP protocol. And, it removes the TCP header F13 and the IP header F12 from the received frame, and transfers the data F14 to the SSL 3002.

Upon receipt of the data F14 from the TCP 3003, the SSL 3002 undoes the encryption with decoding process, takes out an Ethernet frame F20, i.e. F21 to F24, from the data F14, and transfers it to the gateway application 3001A.

Upon receipt of the frame F20 from the SSL 3002, the gateway application 3001A allows this frame to flow to the virtual NIC 3010 as it stands. This frame keeps the state at the time of having been transmitted from the terminal 21 to the HUB 22 as it stands, in which the MAC address of the server 31 has been set to the MAC DA within the LAN MAC F21, and the MAC address of the terminal 21 to the MAC SA within the LAN MAC F21. Further, the IP address of the server 31 has been set to the IP DA within the LAN IP F22, and the IP address of the terminal 21 to the IP SA within the LAN IP F22.

The frame delivered to the virtual NIC 3010 by the gateway application 3001A is transferred to the HUB 32 through the driver 3009, the bridge 3008, and the NIC 301.

Upon receipt of the frame from the port of the gateway device 30 side, the HUB 32 makes a reference to the MAC DA within F21, and outputs this frame to the port of the server 31 side as it stands based upon a result of learning the past routing because the MAC DA is an MAC address of the server 31.

The frame transmitted from the HUB 32 is transferred to the intermediate driver 3106 through the NIC 311 and the driver 3105 within the server 31.

The intermediate driver 3106 receives the frame from the driver 3105. This frame has a form of the frame format F20 at the time of having been received; however the header F21, the header F22, and the header F23 thereof are deleted in the de-encapsulation 3106G, and only the data F24 is left. And, it delivers the data F24 to the TCP 3106A, and allows the data to flow to the TCP session pre-established between the TCP 3102 and the TCP 3106A within the intermediate driver.

The TCP 3106A within the intermediate driver 3106 adds the TCP header F23 and the IP header F22 necessary for TCP communication with the TCP 3102 to the received data F24, and sends it to the re-encapsulation 3106E. The IP address of the server 31 is set to the IP DA within F22, and the IP address of the terminal 21 is set to the IP SA within F22.

Upon receipt of the data from the TCP 3106A, the re-encapsulation 3106E within the intermediate driver 3106 adds the header F21 hereto, and sends it to the IP stack 3104. Herein, it sets the MAC address of the server 31 to the MAC DA within F21, and sets the MAC address of the terminal 21 to the MAC SA within F21. In such a manner, it converts the framed received from the TCP 3106A into a formatted frame having the frame format F20, and transfers it to the IP stack 3104.

The frame output from the intermediate driver 3106 goes through the IP stack 3104, the IP routing 3103, and the TCP 3102, and the data F24 within the frame is delivered to the application 3101.

As mentioned above, a series of the frame transfer from the application 2101 within the terminal 21 to the application 3101 within the server 31 is completed.

A series of the frame transfer from the application 3101 within the server 31 to the application 2101 within the terminal 21 also can be realized similarly by tracing the path opposite to that of the above-mentioned example.

Additionally, in this embodiment, the TCP session is established between the TCP 2102 and the intermediate driver 2106, between the TCP 2003 and the TCP 3003, and between the intermediate driver 3106 and the TCP 3102, respectively. Thus, it follows that the function of the congestion control and the re-sending control by the TCP does not extend over the transfer from the intermediate driver 2106 to the TCP 2003, and the transfer from the TCP 3003 to the intermediate driver 3106.

However, as a rule, it is rarely that the packet loss occurs and the congestion occurs within the intranet, and the connection for riding the Firewall, i.e. the connection via the WAN necessitates a countermeasure to the loss or the congestion. In this embodiment, the TCP works between the gateway device 20 and the gateway device 30, whereby an influence upon communication between the application 2101 and the application 3101 hardly occurs so long as the re-sending control and the congestion control exist in this section.

Additionally, in this embodiment, it is also possible to exchange the installation location of the server 31 for that of the terminal 21.

[Effects of the Invention]

Next, effects of this embodiment will be explained.

Utilizing the invention listed in this embodiment enables a high-speed transfer of the frame between the terminal 21 and the server 31.

The reason is that the TCP within the terminal 21 and the TCP within the server 31 are terminated in the intermediate driver within the terminal 21 and in the intermediate driver within the server 31, respectively, and occurrence of the TCP-over-TCP problem is avoided so as to prevent the congestion control and the re-sending control due to the TCP at a position of the header F23 from occurring in communication between the terminal 21 and the server 31.

[Sixth Embodiment]

The sixth embodiment of the present invention differs from the fifth embodiment in a point that the bridge 3008, the driver 3009 and the virtual NIC 3010 within the gateway device 30, and the intermediate driver 3106 within the server 31 are lost, and each of an encapsulation process 3001B and a TCP 3003B within the gateway device 30 is mounted instead thereof.

A configuration and an operation of the HUB 22, the HUB 32, the terminal 21, the gateway device 20, the intranet 2, and the intranet 3 in the sixth embodiment are identical to that of the fifth embodiment.

In the sixth embodiment, not only a closed LAN but also an open WAN such as Internet may be employed for the intranet 2.

[Explanation of a Configuration]

Figure 22:
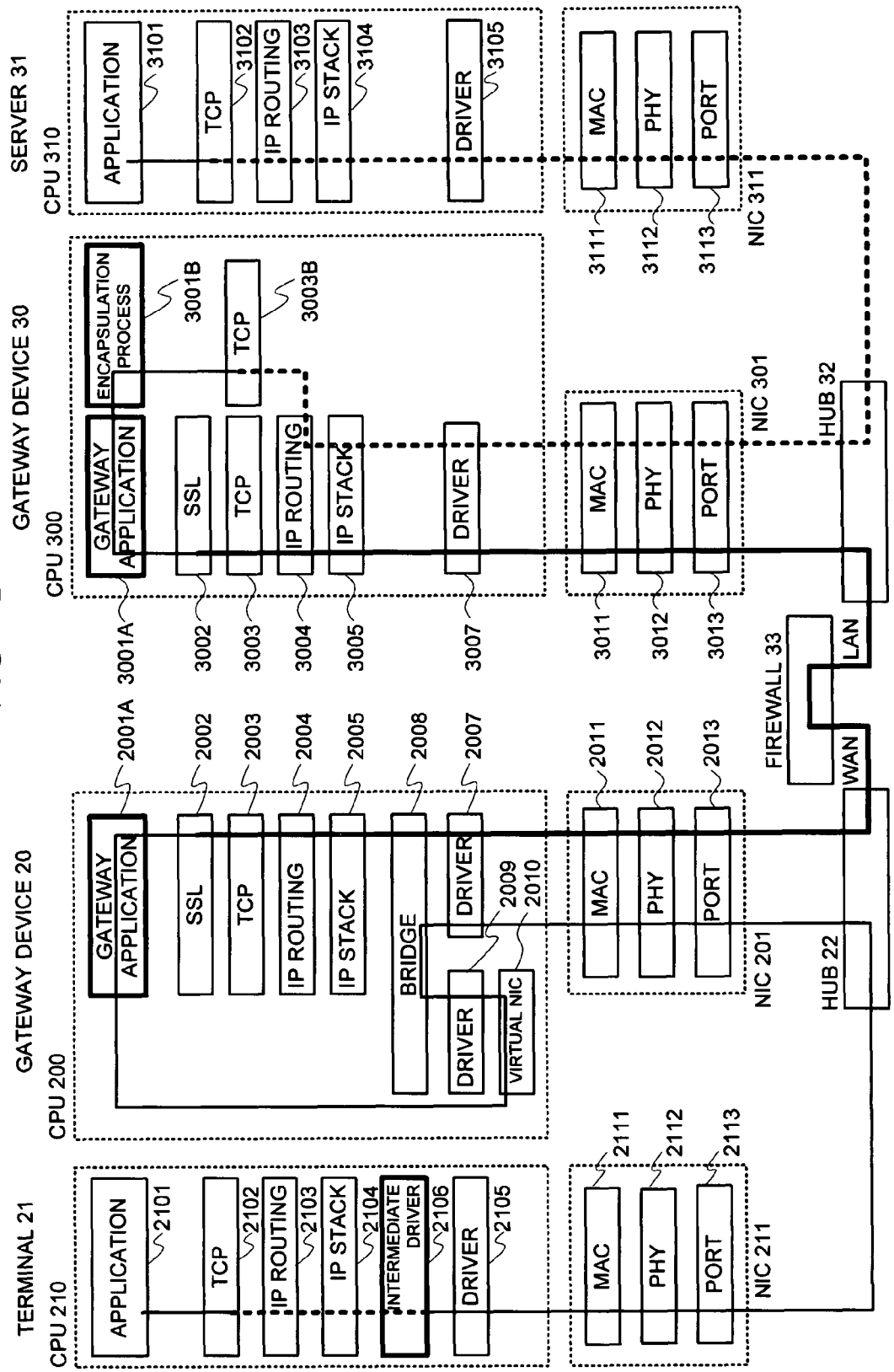
FIG. 22 is a block diagram illustrating a network configuration and a communication path in a sixth embodiment of the present invention.

FIG. 22 is a block diagram having a configuration of each apparatus and a transfer path of the frame in the sixth embodiment shown in details.

The gateway device 30 differs from the gateway device 30 in the fifth embodiment in a point that the bridge 3008, the driver 3009, and the virtual NIC 3010 are lost, and each of the encapsulation process 3001B and the TCP 3003B is mounted instead thereof.

The encapsulation process 3001B receives a formatted frame having the format F20 from the gateway application 3001A, deletes each of the header F21, the header F22, and the header F23, and delivers only the data F24 to the TCP 3003B. Further, it receives the data F24 from the TCP 3003B, adds each of the header F21, the header F22, and the header F23, and delivers it to the gateway application 3001A. Further, upon receipt of a connection request, it requests the TCP 3003B to establish the TCP session. In addition hereto, it receives a TCP session establishment response from TCP 3003B, generates a connection completion notification frame, and delivers it to the gateway application 3001A.

The TCP 3003B has a configuration similar to that of the TCP 2003 or the TCP 3003, and performs a similar operation.

The server 31 differs from the server 31 in the fifth embodiment in a point that an intermediate driver 3106 is mounted. That is, the server 31 has a configuration similar to that of the server 31 in the first to fourth embodiments, and performs a similar operation.

A configuration and an operation of the HUB 22, the HUB 32, the terminal 21, the gateway device 20, the intranet 2, and the intranet 3 are identical to that of the fifth embodiment.

The Firewall 33 has a configuration similar to that of the Firewall 33 of the fifth embodiment, and performs a similar operation. However, in this embodiment, a NAT router or a Proxy server may be employed instead of the Firewall 33.

Also in the sixth embodiment, similarly to the other embodiments, only in the case that the SSL session has been pre-established between the gateway device 20 and the gateway device 30, an access to the apparatus within the intranet 3 from the apparatus in the intranet 2 is enabled.

[Explanation of an Operation]

[An Operation of Establishing the SSL Session]

An operation of establishing the SSL session (secure TCP session) from the gateway device 30 to the gateway device 20 in the sixth embodiment is similar to that of the fifth embodiment, so its explanation is omitted.

[An Operation of Constructing the Session from the Application 2101 to the Application 3101]

An operation will be explained of establishing the session between the application 2101 within the terminal 21 and the application 3101 within the server 31 in the sixth embodiment by employing FIG. 22.

At this moment, it is assumed that the bridge 2008, the HUB 22 and the HUB 32 have already learned the MAC addresses of the terminal 21, the server 31, the Firewall 33, the gateway device 20, and the gateway device 30.

Further, it is assumed that the Firewall 33 permits communication between the gateway device 20 and the gateway device 30 in a bi-direction, and interrupts direct communication between the terminal 21 and the server 31, which does not go through the gateway device 20 or the gateway device 30, in a bi-direction.

Further, it is assumed that the SSL session (secure TCP session) from the gateway device 30 to the gateway device 20 has already established according to the foregoing operational example.

It is assumed that the setting to the intermediate driver 2106 has been made in advance so that the process of the TCP in all applications within its own node is terminated.

The application 2101 within the terminal 21 receives a request for making a connection to the application 3101 within the server 31 from a user, and instructs the TCP 2102 to start communication with the application 3101 within the server 31.

The TCP 2102 receives the communication start instruction from the application 2101, and transmits a packet for requesting establishment of the TCP session with the TCP 3102 to the IP routing 2103 for a purpose of establishing the TCP session with the TCP 3102. This packet is a packet in line with the TCP specification, in which the server 31 has been set to the destination IP address, and the TCP 3102 set to the destination port number. The so-called packet necessary for establishing the session is an SYN packet that is transmitted for a three-way handshake in establishing the TCP session. In this specification, for simplifying explanation of the TCP session establishment operation, out of the packets that are transmitted/received with the three-way handshake, the SYN packet is called a TCP session establishment request packet, and the SYN+ACK packet is called a response packet. Further, as a matter of fact, the ACK packet is also transmitted; however its explanation is omitted in the explanation of this operation because it is transferred similarly to the SYN packet.

The IP routing 2104 makes a reference to the destination IP address and the destination port number of the packet received from the TCP 2102, and transfers the packet to the IP stack 2104.

The IP stack 2104 adds the MAC address of the server 31 to the packet received from the IP routing 2103 as a destination MAC address, further sets the MAC address of the terminal 21 to the transmission source MAC address, thereby to generate a frame, and transfers it to the intermediate driver 2106.

The intermediate driver 2106 receives the TCP session establishment request frame from the IP stack 2104, and makes a frame analysis. As a result of analysis, the received frame is a TCP frame, whereby it removes the MAC header in the de-encapsulation, thereby to convert it into a packet. And, the intermediate drive 2106 terminates the TCP process from the TCP 2102 to the TCP 3102 in the TCP section of the intermediate drive 2106. That is, originally, the TCP 2102 requested the connection request of the TCP 3102; however as a matter of fact, the TCP within the intermediate driver 2106 receives and reserves this request, and the process of establishing the TCP session is performed between the TCP 2102 and the TCP within the intermediate driver 2106, thereby to allowing the process of the TCP to be terminated.

The intermediate driver 2106 sends a packet for a connection request to the driver 2105 in performing the termination process for a purpose of requesting the encapsulation process 3001B to establish the TCP session with the TCP 3102. This connection request packet is not a packet in line with the TCP specification, but a peculiar packet. In this packet, the server 31 is set to the destination IP address and the TCP 3102 to the destination port number. And, it adds the destination MAC address to this packet, further sets the MAC address of its own node to the transmission source MAC address, thereby to generate a connection request frame.

The driver 2105 receives the connection request frame from the intermediate driver 2106, and transfers it to the MAC 2111.

The MAC 2111 receives the frame from the driver 2105, and transfers it to the PHY 2112.

The PHY 2112 receives the frame from the MAC 2111, and transfers it to the port 2113.

The port 2113 receives the frame from the PHY 2112, and transfers it to the HUB 22 via the Ethernet cable.

Upon receipt of the frame from the port of the NIC 211 side of the terminal 21, the HUB 22 makes a reference to the MAC DA within F21, and outputs this frame to the port of the gateway device 20 side as it stands based upon a result of learning the past routing because the MAC DA is an MAC address of the server 31.

The gateway device 20 receives the frame transmitted by the HUB 22 in the port 2013, and delivers it to the bridge 2008 through the PHY 2012, the MAC 2011, and the driver 2007.

The bridge 2008 makes a reference to the MAC DA that exists within the header F21 within the formatted frame (having the frame format F20) received from the driver 2007, and transfers the frame to the driver 2009 because the MAC DA is an MAC address of the server 31, and not an MAC address of the gateway device 20.

The frame transmitted from the bridge 2008 is transferred to the gateway application 2001A through the driver 2009 and the virtual NIC 2010.

The gateway application 2001A allows the frame received from the virtual NIC 2010 to flow to the SSL session established between the gateway application 2001A and the gateway application 3001A. That is, the gateway application 2001A delivers the Ethernet frame (having the frame format F20) received from the virtual NIC 2010 as data to the SSL 2002.

Upon receipt of the data (F21 to F24) from the gateway application 2001A, the SSL 2002 encrypts this, thereby to generate data F14, and delivers it the TCP 2003.

The TCP 2003 receives the data F14 from the SSL 2002, adds the TCP header F13 and the IP header F12, and delivers it to the IP routing 2004. Herein, the IP address of the gateway device 30 is set to the IP DA within F12, and the IP address of the gateway device 20 to the IP SA within F12. Further, the port of the TCP 3003 is set to the destination port, and the port of the TCP 2003 is designated as the transmission source port.

The IP routing 2004 makes a reference to the IP address etc. within the IP header F12 of the data received from the TCP 2003, and transfers the frame to the IP stack 2005.

The IP stack 2005 receives the frame from the IP routing 2004, adds the MAC header F11 to the frame, thereby to convert it into a formed frame having the Ether-over-SSL frame format F10, and delivers it to the bridge 2008.

Herein, from a result of the ARP, the MAC address of the WAN side of the Firewall 33 is set to the MAC DA within F11, and the MAC address of the gateway device 20 to the MAC SA within F11.

The frame transmitted from the IP stack 2005 is sent to the HUB 22 through the bridge 2008, the driver 2007, and the NIC 201.

Upon receipt of the frame from the port of the gateway device 22 side, the HUB 22 makes a reference to the MAC DA within F11, outputs this frame to the Firewall 33 as it stands based upon a result of learning the past routing because the MAC DA is an MAC address of the WAN side of the Firewall 33.

The Firewall 33 receives the frame transmitted by the HUB 22, makes a reference to the IP DA, thereby to change the MAC header F11, and transfers the received frame with a form of the frame format F10 unchanged to the HUB 32.

Herein, the MAC address of the gateway device 30 is set to the MAC DA within F11, and the MAC address of the LAN side of the Firewall 33 to the MAC SA within F11.

Upon receipt of the frame from the Firewall 33, the HUB 32 makes a reference to the MAC DA within F11, and outputs this frame to the port of the gateway device 30 side as it stands based upon a result of learning the past routing because the MAC DA is an MAC address of the gateway device 30.

Upon receipt of the frame transmitted by the HUB 32 in the port 3013, the gateway device 30 transfers it to the IP stack 3005 through the PHY 3012, the MAC 3011, and the driver 3007.

The IP stack 3005 removes the MAC header F11 of the frame received from the driver 3007, thereby to convert it into a packet, and sends it to the IP routing 3004.

The IP routing 3004 makes a reference to the IP DA within the header F12 and the destination port number within F13 of the packet transmitted by the IP stack 3005, and transfers this packet to the TCP 3003.

Upon receipt of the packet from the IP routing 3004, the TCP 3003 performs the process of sending back an ACK packet to the TCP 2003, or the like according to the TCP protocol. And, it removes the TCP header F13 and the IP header F12 from the received packet, and transfers data F14 to the SSL 3002.

Upon receipt of the data F14 from the TCP 3003, the SSL 3002 undoes the encryption with decoding process, takes out an Ethernet frame F20, i.e. F21 to F24, from the data F14, and transfers it to the gateway application 3001A.

Upon receipt of the frame F20 from the SSL 3002, the gateway application 3001A allows this frame to flow to the encapsulation process 3001B as it stands. This frame keeps the state at the time of having been transmitted from the terminal 21 to the HUB 22 as it stands, in which the MAC address of the server 31 has been set to the MAC DA within the LAN MAC F21, and the MAC address of the terminal 21 to the MAC SA within the LAN MAC F21. Further, the IP address of the server 31 has been set to the IP DA within the LAN IP F22, and the IP address of the terminal 21 to the IP SA within the LAN IP F22.

The encapsulation process 3001B receives the frame from the gateway application 3001A, and makes a frame analysis. As a result of the analysis, this frame is a request for making a connection to the TCP 3102 transmitted from the intermediate driver 2106, whereby it commands the TCP 3003B to establish the TCP session with the TCP 3102.

The TCP 3003B transmits a packet of requesting establishment of the TCP session with the TCP 3102 to the IP routing 3004 for a purpose of establishing the TCP session with the TCP 3102. This packet is a packet in line with the TCP specification, in which the server 31 is set to the destination IP address, the TCP 3102 to the destination port number, further, the IP address of the gateway device 30 to the transmission source IP address, and the port number of the TCP 3003B to the transmission source port number. It is possible not only to make a setting so that the port number of the TCP 3003B is made identical to that of the TCP 2102 but also to make a setting that it is made different. Additionally, the so-called TCP session establishment request packet is an SYN packet that is transmitted for a three-way handshake in establishing the TCP session. In this specification, for simplifying explanation of the SSL session establishment operation, out of the packets that are transmitted/received with the three-way handshake, the SYN packet is called a TCP session establishment request packet, and the SYN+ACK packet is called a response packet. Further, as a matter of fact, the ACK packet is also transmitted; however its explanation is omitted in the explanation of this operation because it is transferred similarly to the SYN packet.

The destination MAC address is added to the packet delivered to the IP routing 3004 in the IP stack 3005, and further the MAC address of its own node is set to the transmission source MAC address, thereby to generate a frame, which is transferred to the HUB 32 through the driver 3007 and the NIC 301.

Upon receipt of the frame from the port of the gateway device 30 side, the HUB 32 makes a reference to the MAC DA within F21, and outputs this frame to the port of the server 31 side as it stands based upon a result of learning the past routing because the MAC DA is an MAC address of the server 31.

The server 31 receives the frame from the HUB 32, and transfers the packet to the IP stack 3104 through the path of the port 3113, the PHY 3112, the MAC 3111, and the driver 3105.

The IP stack 3104 receives the frame from the driver 3105, removes the MAC header, thereby to convert the frame into a packet, and transfers it to the IP routing 3103.

The IP routing 3103 makes a reference to the destination port number of the packet received from the IP stack 3104, and transfers this packet to the TCP 3102 because the port number of the TCP 3102 side has been added.

The TCP 3102 receives the packet from the IP routing 3103. It sends back a response packet (SYN+ACK) to this TCP session establishment request packet according to the TCP protocol because this packet is a TCP session establishment request packet (SYN).

The TCP 3102 transmits the response packet addressed to the TCP 3003B. That is, the IP address of the gateway device 30 is set to the destination IP of the response packet, and the port number of the TCP 3003B to the destination port thereof.

The response packet arrives at the TCP 3003B through the path opposite to that of the TCP session establishment request packet, i.e. the IP routing 3103, the IP stack 3104, the driver 3105, the NIC 311, the HUB 32, and the NIC 301.

Upon receipt of the response packet, the TCP 3003B transmits an ACK packet of the response packet to the TCP 3102, and delivers the response packet to the encapsulation process 3001B.

The encapsulation process 3001B transmits to the intermediate driver 2106 within the terminal 21 a packet for notifying completion of a connection. This connection completion notification packet is not a packet in line with the TCP specification, but a peculiar packet. In this packet, the terminal 21 is set to the destination IP address, the TCP 2102 to the destination port number, the server 31 to the transmission source IP address, and the TCP 3102 to the transmission source port number, so a frame is generated.

The connection completion notification frame arrives at the intermediate driver 2106 within the CPU 210 through the path opposite to that of the connection request frame, i.e. the gateway application 3001A, the SSL 3002, the TCP 3003, the IP routing 3004, the IP stack 3005, the driver 3007, the NIC 301, the HUB 33, the Firewall 33, the HUB 32, the NIC 201, the CPU 200, the NIC 201, the HUB 22, and the NIC 211.

The intermediate driver 2106 receives the connection completion notification frame, and makes a frame analysis. As a result of the analysis, the frame is a frame addressed to the application within its own node, whereby it receives this frame, and removes the MAC header in the de-encapsulation, thereby to convert it into a packet. The TCP within the intermediate driver 2106 generates a response packet (SYN+ACK) to the TCP session establishment request according to the TCP protocol for a purpose of sending it to the TCP 2103, and transmits the response packet to the IP stack 2104 because this packet is a packet of notifying completion of a connection between the encapsulation process 3001B and the TCP 3102 transmitted to the intermediate driver 2106 from the encapsulation process 3001B.

The response packet arrives at the TCP 2102 through the IP stack 2104 and the IP routing 2103.

The TCP 2102 receives the packet from the IP routing 2103. It notifies completion of a connection of the TCP session with the TCP 3102 to the application 2101 because this packet is a response packet to the request for establishing the TCP session. At this moment, the TCP 2102 recognizes that the response packet is one that has arrived from the TCP 3102. The reason is that the actual response is one transmitted from the TCP within the intermediate driver 2106; however the TCP 2102 recognizes as if the response had been given by the TCP 3102 because the TCP within the intermediate driver 2006 gave a false session establishment response to the TCP 2102 under a false name of the TCP 3102.

Upon receipt of the response packet, the TCP 2102 generates an ACK packet to this response packet addressed to the TCP 3102, and transmits it. This ACK packet, which is received by the TCP of the intermediate driver 2106 via the IP routing 2103 and the IP stack 2104, allows the TCP process to be terminated.

As mentioned above, in the sixth embodiment, the operation is completed of establishing the session between the application 2101 within the terminal 21 and the application 3101 within the server 31.

[An Operation of Transferring the Frame from the Terminal 21 to the Server 31]

The case of transferring the frame from the terminal 21 to the server 31 in the sixth embodiment will be exemplified to explain the operation by employing FIG. 22.

At this moment, it is assumed that the bridge 2008, the HUB 22 and the HUB 32 have already learned the MAC addresses of the terminal 21, the server 31, the Firewall 33, the gateway device 20, and the gateway device 30.

Further, it is assumed that the Firewall 33 permits communication between the gateway device 20 and the gateway device 30 in a bi-direction, and interrupts direct communication between the terminal 21 and the server 31, which does not go through the gateway device 20 or the gateway device 30, in a bi-direction.

Further, it is assumed that the SSL session (secure TCP session) from the gateway device 30 to the gateway device 20 has already established according to the foregoing operational example.

Further, it is assumed that the TCP session has been already constructed between the application 2101 within the terminal 21 and the application (application 3101) within the server 31.

The application 2101 within the terminal 21 delivers data addressed to the application 3101 within the server 31 to the TCP 2102.

The TCP 2102 receives the data from the application 2101, adds the TCP header (F23 in FIG. 2) or the IP header (F22 in FIG. 2) according to the TCP protocol, thereby to convert it into an IP packet, and delivers it to the IP routing 2103. At this time, the IP address of the server 31 is set to the IP DA within the LAN IP F22, and the IP address of the terminal 21 to the IP SA within the LAN IP F22.

The IP routing 2103 makes a reference to the destination IP address (addressed to the server 31) and the destination port (addressed to the TCP 3102) of the packet received from the TCP 2102, and transfers the data to the IP stack 2104 as it stands.

The IP stack 2104 receives the packet from the IP routing 2103, adds the MAC header (F21 in FIG. 2), thereby to generate an Ethernet frame, and delivers it to the intermediate driver 2106. This frame has a format of the Ethernet frame F20. At this time, the IP stack 2104 makes a reference to a result of the ARP, and sets the MAC address of the server 31 to the MAC DA within the LAN MAC F21 of the frame, and the MAC address of the terminal 21 to the MAC SA within the LAN MAC F21.

The intermediate driver 2106 receives the frame from the IP stack 2004, and makes a frame analysis in the frame analysis 2006H. As a result of the analysis, the frame is a frame of the session between the TCP 2102 and the TCP 3102 previously session-established, whereby it deletes and preserves the MAC header F12 of this frame in the de-encapsulation 2006F, and delivers the frame to the TCP 2106A.

The TCP 2106A within intermediate driver 2106 terminates the TCP 2103A. That is, it deletes the IP header F22 and the MAC header F23 of the frame, leaves only F24, and sends the data F24 to the fragmentation 2106B. Further, it transmits the ACK frame to the TCP 2102.

The fragmentation 2106B within the intermediate driver 2106 confirms size of the data F24 received from the TCP 2106A, and sends the data to the re-encapsulation 2106D as it stands because the data does not need to be fragmented.

The re-encapsulation 2106D within the intermediate driver 2106 adds the MAC header F21, the IP header F22, and the MAC header F23 to the data F24 received from the fragmentation 2106B, thereby to convert it into formed data having the frame format F20, and transmits it to the driver 2105. At this moment, the MAC address of the server 31 is set to the MAC DA within F21, the MAC address of the terminal 21 to the MAC SA within F21. Further, the IP address of the server 31 is set to the IP DA within F22, and the IP address of the terminal 21 to the IP SA within F22. Further, the port of the TCP 3102 is set to the destination port, and the port of the TCP 2102 is designated as the transmission source. Theses headers are ones preserved by the de-encapsulation 2106F.

The driver 2105 receives the above-mentioned frame from the intermediate driver 2106, and transfers it to the NIC 211.

The NIC 211 receives the frame from the driver 2105, and transfers it to the HUB 22 through the MAC 2111, the PHY 2112, and the port 2113.

Upon receipt of the frame from the port of the NIC 211 side of the terminal 21, the HUB 22 makes a reference to the MAC DA within F21, and outputs this frame to the port of the gateway device 20 side as it stands based upon a result of learning the past routing because the MAC DA is an MAC address of the server 31.

The gateway device 20 receives the frame transmitted by the HUB 22 in the port 2013, and delivers it to the bridge 2008 through the PHY 2012, the MAC 2011 and the driver 2007.

The bridge 2008 makes a reference to the MAC DA that exists within the header F21 within the formatted frame (having the frame format F20) received from the driver 2007, and transfers the frame to the driver 2009 because the MAC DA is an MAC address of the server 31, and not an MAC address of the gateway device 20.

The frame transmitted from the bridge 2008 is transferred to the gateway application 2001A through the driver 2009 and the virtual NIC 2010.

The gateway application 2001A allows the frame received from the virtual NIC 2010 to flow to the SSL session established between the gateway application 2001A and the gateway application 3001A.

That is, the gateway application 2001A delivers the Ethernet frame (having the frame format F20) received from the virtual NIC 2010 as data to the SSL 2002.

Upon receipt of the data (F21 to F24) from the gateway application 2001A, the SSL 2002 encrypts this, thereby to generate data F14, and delivers it the TCP 2003.

The TCP 2003 receives the data F14 from the SSL 2002, adds the TCP header F13 and the IP header F12, and delivers it to the IP routing 2004. Herein, the IP address of the gateway device 30 is set to the IP DA within F12, and the IP address of the gateway device 20 to the IP SA within F12. Further, the port of the TCP 3003 is set to the destination port, and the port of the TCP 2003 is designated as the transmission source port.

The IP routing 2004 makes a reference to the IP address etc. within the IP header F12 of the data received from the TCP 2003, and transfers the frame to the IP stack 2005.

The IP stack 2005 receives the frame from the IP routing 2004, adds the MAC header F11 to the frame, thereby to convert it into a formatted frame having the Ether-over-SSL frame format F10, and delivers it to the bridge 2008.

Herein, from a result of the ARP, the MAC address of the WAN side of the Firewall 33 is set to the MAC DA within F11, and the MAC address of the gateway device 20 to the MAC SA within F11.

The frame transmitted from the IP stack 2005 is sent to the HUB 22 through the bridge 2008, the driver 2007, and the NIC 201.

Upon receipt of the frame from the port of the gateway device 22 side, the HUB 22 makes a reference to the MAC DA within F11, and outputs this frame to the Firewall 33 as it stands based upon a result of learning the past routing because the MAC DA is an MAC address of the WAN side of the Firewall 33.

The Firewall 33 receives the frame transmitted by the HUB 22, makes a reference to the IP DA, thereby to change the MAC header F11, and transfers the received frame with a form of the frame format F10 unchanged to the HUB 32.

Herein, the MAC address of the gateway device 30 is set to the MAC DA within F11, and the MAC address of the LAN side of the Firewall 33 to the MAC SA within F11.

Upon receipt of the frame from the Firewall 33, the HUB 32 makes a reference to the MAC DA within F11, and outputs this frame to the port of the gateway device 30 side as it stands based upon a result of learning the past routing because the MAC DA is an MAC address of the gateway device 30.

Upon receipt of the frame transmitted by the HUB 32 in the port 3013, the gateway device 30 transfers it to the IP stack 3005 through the PHY 3012, the MAC 3011, and the driver 3007.

The IP stack 3005 removes the MAC header F11 of the frame received from the driver 3007, and transfers the frame to the IP routing 3004.

The IP routing 3004 makes a reference to the IP DA within the header F12 and the destination port number within F13 of the received frame, and transfers the frame to the TCP 3003.

Upon receipt of the frame from the IP routing 3004, the TCP 3003 performs the process of sending back an ACK packet, or the like according to the TCP protocol. And, it removes the TCP header F13 and the IP header F12 from the received frame, and transfers data F14 to the SSL 3002.

Upon receipt of the data F14 from the TCP 3003, the SSL 3002 undoes the encryption with decoding process, takes out an Ethernet frame F20, i.e. F21 to F24, from the data F14, and transfers it to the gateway application 3001A.

This frame keeps the state at the time of having been transmitted from the terminal 21 to the HUB 22 as it stands, in which the MAC address of the server 31 has been set to the MAC DA within the LAN MAC F21, and the MAC address of the terminal 21 to the MAC SA within the LAN MAC F21. Further, the IP address of the server 31 has been set to the IP DA within the LAN IP F22, and the IP address of the terminal 21 to the IP SA within the LAN IP F22.

Upon receipt of the frame F20 from the SSL 3002, the gateway application 3001A allows this frame to flow to the encapsulation process 3001B as it stands.

Upon receipt of the frame from the gateway application 3001A, the encapsulation process 3001B removes the header F21, the header F22, and the header F23, revises the IP address and the port into ones described in these headers, and transmits the frame to the TCP 3003B. That is, it informs the TCP 3003B that the data F24 is sent to the port of the TCP 3102, being an IP address of the server 31.

The TCP 3003B receives the data F24 from the encapsulation process 3001B, and allows it to flow to the TCP session pre-established between the TCP 3102 and the TCP 3003B. That is, the TCP 3003B adds the IP header F22 and the TCP header F23 to the data F24, and transfers it to the IP routing 3004. Herein, the IP address of the server 31 is described in the IP DA of the IP header F22, and the IP address of the gateway device 30 is described in the IP SA of the IP header F22. Further, the port of the TCP 3102 is described in the destination port, and the port of the TCP 3003B is described in the transmission source port.

The IP routing 3004 receives the packet from the TCP 3003B, makes a reference to the IP DA, the port, etc., and transfers the frame to the IP stack 3005B.

Upon receipt of the data from the IP routing 3004, the IP stack 3005B adds the header F21 hereto, and sends it to the driver 3007. Herein, it sets the MAC address of the server 31 to the MAC DA within F12, and sets the MAC address of the gateway device 30 to the MAC SA within F12. In such a manner, it converts the frame received from the TCP 3003B into a formatted frame having the frame format F20, and transfers it to the driver 3007.

The frame output from the IP stack 3005B is transferred to the HUB 32 through the bridge 3008, the driver 3007, and the NIC 301.

Upon receipt of the frame from the port of the gateway device 30 side, the HUB 32 makes a reference to the MAC DA within F21, and outputs this frame to the port of the server 31 side as it stands based upon a result of learning the past routing because the MAC DA is an MAC address of the server 31.

The frame transmitted from the HUB 32 is transferred through the NIC 311, the driver 3105, the IP stack 3104, the IP routing 3103, and the TCP 3102 within the server 31, and the data F24 within the frame is delivered to the application 3101.

As mentioned above, a series of the frame transfer from the application 2101 within the terminal 21 to the application 3101 within the server 31 is completed.

A series of the frame transfer from the application 3101 within the server 31 to the application 2101 within the terminal 21 also can be realized similarly by tracing the path opposite to that of the above-mentioned example.

Additionally, in this embodiment, the TCP session is established between the TCP 2102 and the intermediate driver 2106, between the TCP 2003 and the TCP 3003, and between the TCP 3003B and the TCP 3102, respectively. Thus, it follows that the function of the congestion control and the re-sending control by the TCP does not extend over the transfer from the intermediate driver 2106 to the TCP 2003, and the transfer from the TCP 3003 to the TCP 3003B.

However, as a rule, it is rarely that the packet loss occurs and the congestion occurs within the intranet, and the connection for riding the Firewall, i.e. the connection via the WAN necessitates a countermeasure to the loss or the congestions. In this embodiment, the TCP works between the gateway device 20 and the gateway device 30, whereby an influence upon communication between the application 2101 and the application 3101 hardly occurs so long as the re-sending control and the congestion control exist in this section.

In this embodiment, an example of packaging the encapsulation process etc. in the gateway device 30 side, and packaging the intermediate driver in the terminal 21 side was shown; however, contrarily hereto, it is also possible to package the encapsulation process etc. in the gateway device 20 side, and to package the intermediate driver in the server 31 side.

[Effects of the Invention]

Next, effects of this embodiment will be explained.

Utilizing the invention listed in this embodiment enables a high-speed transfer of the frame between the terminal 21 and the server 31.

The reason is that the TCP within the terminal 21 and the TCP within the server 31 are terminated in the intermediate driver within the terminal 21 and in the encapsulation process 3001B within the gateway device 30, respectively, and occurrence of the TCP-over-TCP problem is avoided so as to prevent the congestion control and the re-sending control due to the TCP at a position of the header F23 from occurring in communication between the terminal 21 and the server 31.

[Seventh Embodiment]

The seventh embodiment of the present invention differs from the sixth embodiment in a point that a bridge 3008 and an IP stack 3005B are additionally mounted within the gateway device 30.

A configuration and an operation of the HUB 22, the HUB 32, the terminal 21, the gateway device 20, the intranet 2, and the intranet 3 in the seventh embodiment are identical to that of the sixth embodiment.

In the seventh embodiment, not only a closed LAN but also an open WAN such as Internet may be employed for the intranet 2.

In the sixth embodiment, there exists the problem that the application of the server 31 side recognizes as if it had been accessed by the gateway device 30 notwithstanding actually making communication with the application 2101 within the terminal 21.

In the seventh embodiment, additionally mounting the IP stack onto the gateway device allows the environments to be created in which the application of the server 31 side recognizes that it has been accessed by the terminal 21.

[Explanation of a Configuration]

Figure 23:
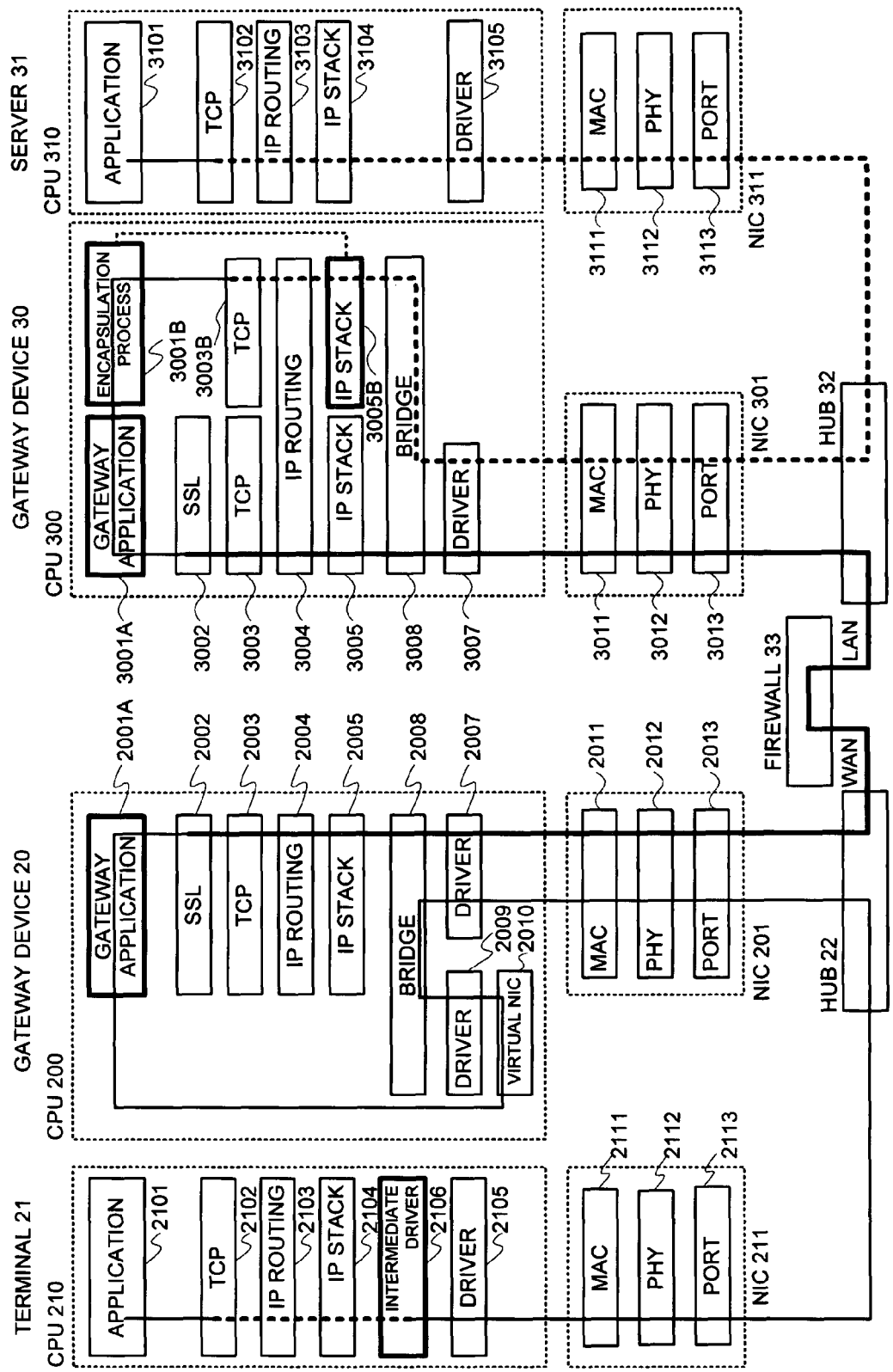
FIG. 23 is a block diagram illustrating a network configuration and a communication path in a seventh embodiment of the present invention.

FIG. 23 is a block diagram having a configuration of each apparatus and a transfer path of the frame in the seventh embodiment shown in details.

The gateway device 30 differs from the gateway device 30 in the sixth embodiment in a point that each of the bridge 3008 and the IP stack 3005B are additionally mounted.

The bridge 3008 is similar to the bridge 3008 in the third and the fifth embodiments. That is, it decides the driver or the IP stack that becomes a transferee based upon the MAC DA.

The IP stack 3005B has a configuration similar to that of the IP stack 3005, and performs a similar operation. However, it employs an address designated by the de-encapsulation 3001B for the MAC SA and IP SA that are added.

A configuration and an operation of the HUB 22, the HUB 32, the terminal 21, the gateway device 20, the intranet 2, and the intranet 3 are identical to that of the sixth embodiment.

The Firewall 33 has a configuration similar to that of the Firewall 33 of the sixth embodiment, and performs a similar operation. However, in this embodiment, a NAT router or a Proxy server may be employed instead of the Firewall 33.

Also in the seventh embodiment, similarly to the other embodiments, only in the case that the SSL session has been pre-established between the gateway device 20 and the gateway device 30, an access to the apparatus within the intranet 3 from the apparatus in the intranet 2 is enabled.

[Explanation of an Operation]

[An Operation of Establishing the SSL Session]

An operation of establishing the SSL session (secure TCP session) from the gateway device 30 to the gateway device 20 in the seventh embodiment is similar to that of the fifth embodiment and the sixth embodiment, so its explanation is omitted.

[An Operation of Constructing the Session from the Application 2101 to the Application 3101]

An operation will be explained of establishing the session between the application 2101 within the terminal 21 and the application 3101 within the server 31 in the seventh embodiment by employing FIG. 23.

At this moment, it is assumed that the bridge 2008, the HUB 22 and the HUB 32 have already learned the MAC addresses of the terminal 21, the server 31, the Firewall 33, the gateway device 20, and the gateway device 30.

Further, it is assumed that the Firewall 33 permits communication between the gateway device 20 and the gateway device 30 in a bi-direction, and interrupts direct communication between the terminal 21 and the server 31, which does not go through the gateway device 20 or the gateway device 30, in a bi-direction.

Further, it is assumed that the SSL session (secure TCP session) from the gateway device 30 to the gateway device 20 has already established according to the foregoing operational example.

It is assumed that the setting has been made to the intermediate driver 2106 in advance so that the process of the TCP in all applications within its own node is terminated.

The application 2101 within the terminal 21 receives a request for making a connection to the application 3101 within the server 31 from a user, and instructs the TCP 2102 to start communication with the application 3101 within the server 31.

The TCP 2102 receives the communication start instruction from the application 2101, and transmits a packet (SYN) for requesting establishment of the TCP session with the TCP 3102 to the IP routing 2103 for a purpose of establishing the TCP session with the TCP 3102. This packet is a packet in line with the TCP specification, in which the server 31 has been set to the destination IP address, and the TCP 3102 to the destination port number. This so-called TCP session establishment request packet is an SYN packet that is transmitted for a three-way handshake in establishing the TCP session. In this specification, for simplifying explanation of the SSL session establishment operation, out of the packets that are transmitted/received with the three-way handshake, the SYN packet is called a TCP session establishment request packet, and the SYN+ACK packet is called a response packet. Further, as a matter of fact, the ACK packet is also transmitted; however its explanation is omitted in the explanation of this operation because it is transferred similarly to the SYN packet.

The IP routing 2104 makes a reference to the destination IP address and the destination port number of the session establishment request packet received from the TCP 2102, and transfers the packet to the IP stack 2104.

The IP stack 2104 adds the MAC address of the server 31 to the packet received from the IP routing 2103 as a destination MAC address, further sets the MAC address of the terminal 21 to the transmission source MAC address, thereby to generate a TCP session establishment frame, and transfers it to the intermediate driver 2106.

The intermediate driver 2106 receives the frame from the IP stack 2104, and makes a frame analysis thereof. The frame is a TCP session establishment frame, whereby the intermediate driver 2106 removes the MAC header in the de-encapsulation, and terminates a request for establishing the session from the TCP 2102 to the TCP 3102 in the TCP of the intermediate driver 2106. That is, originally, the TCP 2102 requested the TCP 3102 to establish the TCP session; however as a matter of fact, the TCP within the intermediate driver 2106 receives and reserves this request, and the process of establishing the TCP session is performed between the TCP 2102 and the TCP within the intermediate driver 2106, thereby to allow the TCP session establishment process to be terminated.

The intermediate driver 2106 sends a packet for a connection request to the driver 2105 in terminating the TCP session establishment process for a purpose of requesting the encapsulation process 3001B to establish the TCP session with the TCP 3102. This connection request packet is not a packet in line with the TCP specification, but a peculiar packet. In this connection request packet, the server 31 is set to the destination IP address, and the TCP 3102 to the destination port number. And, the destination MAC address is added to this packet, and further the MAC address of its own node is set to the transmission source MAC address, thereby to generate a frame.

The driver 2105 receives the connection request frame from the intermediate driver 2106, and transfers it to the MAC 2111.

The MAC 2111 receives the frame from the driver 2105, and transfers it to the PHY 2112.

The PHY 2112 receives the frame from the MAC 2111, and transfers it to the port 2113.

The port 2113 receives the frame from the PHY 2112, and transfers it to the HUB 22 via the Ethernet cable.

Upon receipt of the frame from the port of the NIC 211 side of the terminal 21, the HUB 22 makes a reference to the MAC DA within F21, and outputs this frame to the port of the gateway device 20 side as it stands based upon a result of learning the past routing because the MAC DA is an DAC address of the server 31.

The gateway device 20 receives the frame transmitted by the HUB 22 in the port 2013, and delivers it to the bridge 2008 through the PHY 2012, the MAC 2011, and the driver 2007.

The bridge 2008 makes a reference to the MAC DA that exists within the header F21 within the formatted frame (having the frame format F20) received from the driver 2007, and transfers the frame to the driver 2009 because the MAC DA is an MAC address of the server 31, and not an MAC address of the gateway device 20.

The frame transmitted from the bridge 2008 is transferred to the gateway application 2001A through the driver 2009 and the virtual NIC 2010.

The gateway application 2001A allows the frame received from the virtual NIC 2010 to flow to the SSL session established between the gateway application 2001A and the gateway application 3001A.

That is, the gateway application 2001A delivers the Ethernet frame (having the frame format F20) received from the virtual NIC 2010 as data to the SSL 2002.

Upon receipt of the data (F21 to F24) from the gateway application 2001A, the SSL 2002 encrypts this, thereby to generate data F14, and delivers it the TCP 2003.

The TCP 2003 receives the data F14 from the SSL 2002, adds the TCP header F13 and the IP header F12, and transfers it to the IP routing 2004.

Herein, the IP address of the gateway device 30 is set to the IP DA within F12, and the IP address of the gateway device 20 to the IP SA within F12. Further, the port of the TCP 3003 is set to the destination port, and the port of the TCP 2003 is designated as the transmission source port.

The IP routing 2004 makes a reference to the IP address etc. within the IP header F12 of the data received from the TCP 2003, and transfers the frame to the IP stack 2005.

The IP stack 2005 receives the frame from the IP routing 2004, adds the MAC header F11 to the frame, thereby to convert it into a formatted frame having the Ether-over-SSL frame format F10, and delivers it to the bridge 2008.

Herein, from a result of the ARP, the MAC address of the WAN side of the Firewall 33 is set to the MAC DA within F11, and the MAC address of the gateway device 20 to the MAC SA within F11.

The frame transmitted from the IP stack 2005 is sent to the HUB 22 through the bridge 2008, the driver 2007, and the NIC 2001.

Upon receipt of the frame from the port of the gateway device 22 side, the HUB 22 makes a reference to the MAC DA within F11, and outputs this frame to the Firewall 33 as it stands based upon a result of learning the past routing because the MAC DA is an MAC address of the WAN side of the Firewall 33.

The Firewall 33 receives the frame transmitted by the HUB 22, makes a reference to the IP DA, thereby to change the MAC header F11, and transfers the received frame with a form of the frame format F10 unchanged to the HUB 32.

Herein, the MAC address of the gateway device 30 is set to the MAC DA within F11, and the MAC address of the LAN side of the Firewall 33 to the MAC SA within F11.

Upon receipt of the frame from the Firewall 33, the HUB 32 makes a reference to the MAC DA within F11, and outputs this frame to the port of the gateway device 30 side as it stands based upon a result of learning the past routing because the MAC DA is an MAC address of the gateway device 30.

Upon receipt of the frame transmitted by the HUB 32 in the port 3013, the gateway device 30 transfers it to the IP stack 3005 through the PHY 3012, the MAC 3011, the driver 3007, and the bridge 3008.

The IP stack 3005 removes the MAC header F11 of the frame received from the bridge 3008, thereby to convert it into a packet, and sends it to the IP routing 3004.

The IP routing 3004 makes a reference to the IP DA within the header F12 and the destination port number within F13 of the packet received from the IP stack 3005, and transfers the packet to the TCP 3003.

Upon receipt of the packet from the IP routing 3004, the TCP 3003 performs the process of sending back an ACK packet to the TCP 2003, or the like according to the TCP protocol. And, it removes the TCP header F13 and the IP header F12 from the received frame, and transfers data F14 to the SSL 3002.

Upon receipt of the data F14 from the TCP 3003, the SSL 3002 undoes the encryption with decoding process, takes out an Ethernet frame F20, i.e. F21 to F24, from the data F14, and transfers it to the gateway application 3001A.

Upon receipt of the frame F20 from the SSL 3002, the gateway application 3001A allows this frame to flow to the encapsulation process 3001B as it stands. This frame keeps the state at the time of having been transmitted from the terminal 21 to the HUB 22 as it stands, in which the MAC address of the server 31 has been set to the MAC DA within the LAN MAC F21, and the MAC address of the terminal 21 to the MAC SA within the LAN MAC F21. Further, the IP address of the server 31 has been set to the IP DA within the LAN IP F22, and the IP address of the terminal 21 to the IP SA within the LAN IP F22.

The encapsulation process 3001B receives the frame from the gateway application 3001A, and makes a frame analysis thereof. As a result of the analysis, the packet is a request for making a connection to the TCP 3102 transmitted from the intermediate driver 2106, whereby it commands the TCP 3003B to establish the TCP session with the TCP 3102. Simultaneously, the encapsulation process 3001B makes the setting to the IP stack 3005B so as to include the IP address of the terminal 21 as an IP address, and the MAC address of the terminal 21 as an MAC address.

The TCP 3003B transmits a packet (SYN) of requesting establishment of the TCP session with the TCP 3102 to the IP routing 3004 for a purpose of establishing the TCP session with the TCP 3102. This packet is a packet in line with the TCP specification, in which the server 31 is set to the destination IP address, the TCP 3102 to the destination port number, further, the IP address of the terminal 21 to the transmission source IP address, and the port number of the TCP 2102 to the transmission source port number, thereby to generate a frame for requesting the TCP session establishment.

The frame delivered to the IP routing 3005B is transferred to the HUB 32 through the IP stack 3005, the driver 3007, and the NIC 301.

Upon receipt of the frame from the port of the gateway device 30 side, the HUB 32 makes a reference to the MAC DA within F21, and outputs this frame to the port of the server 31 side as it stands based upon a result of learning the past routing because the MAC DA is an MAC address of the server 31.

The server 31 receives the frame from the HUB 32, and transfers it to the IP stack 3104 through the path of the port 3113, the PHY 3112, the MAC 3111, and the driver 3105.

The IP stack 3104 receives the frame from the driver 3105, removes the MAC header, thereby to convert the frame into a TCP session establishment request packet, and transfers it to the IP routing 3103.

The IP routing 3103 makes a reference to the destination port number of the packet received from the IP stack 3104, and transfers this packet to the TCP 3102 because the port number of the TCP 3102 side has been added.

The TCP 3102 receives the packet from the IP routing 3103. It sends back a response packet to the session establishment according to the TCP protocol because this packet is a TCP session establishment request packet.

The TCP 3102 transmits the response packet addressed to the TCP 2102. That is, the IP address of the terminal 21 is set to the destination IP of the response packet, and the port number of the TCP 2102 to the destination port thereof. The reason is that the TCP 3003B has behaved itself as if it were the TCP 2102, and the IP stack 3005B has behaved itself as if it were the IP stack 2104 of the terminal 21.

The response packet arrives at the TCP 3003B through the path opposite to that of the TCP session establishment request packet, i.e. the IP routing 3103, the IP stack 3104, the driver 3105, the NIC 311, the HUB 32, the NIC 301, the bridge 3008, and the IP stack 3005B.

Upon receipt of the response packet, the TCP 3003B transmits an ACK packet of this response packet to the TCP 3102, thereby to terminate the process of the TCP, and delivers the data to the encapsulation process 3001B.

The encapsulation process 3001B transmits to the intermediate driver 2106 within the terminal 21 a packet for notifying completion of a connection. This connection completion notification packet is not a packet in line with the TCP specification, but a peculiar packet. In this packet, the terminal 21 is set as the destination IP address, the TCP 2102 as the destination port number, the server 31 as the transmission source IP address, and the TCP 3102 as the transmission source port number, and a frame is generated.

The connection completion notification frame arrives at the intermediate driver 2106 within the CPU 210 through the path opposite to that of the connection request frame, i.e. the gateway application 3001A, the SSL 3002, the TCP 3003, the IP routing 3004, the IP stack 3005, the driver 3007, the NIC 301, the HUB 33, the Firewall 33, the HUB 32, the NIC 201, the CPU 200, the NIC 201, the HUB 22, and the NIC 211.

The intermediate driver 2106 receives the connection completion notification frame, and makes a frame analysis. As a result of the analysis, the packet is a packet addressed to the application within its own node, whereby it receives this packet. The received packet is a packet of notifying completion of a connection between the encapsulation process 3001B and the TCP 3102 transmitted to the intermediate driver 2106 from the encapsulation process 3001B, whereby the TCP within the intermediate driver 2106 transmits a response packet to the IP stack 2104 according to the TCP protocol for a purpose of sending a response packet to the TCP session establishment request to the TCP 2103.

The response packet arrives at the TCP 2102 through the IP stack 2104 and the IP routing 2103.

The TCP 2102 receives the packet from the IP routing 2103. It notifies completion of a connection of the TCP session with the TCP 3102 to the application 2101 because this packet is a response packet to the request for establishing the TCP session. At this moment, the TCP 2102 recognizes that the response packet is one that has arrived from the TCP 3102. The reason is that the actual response is one transmitted from the TCP within the intermediate driver 2106; however the TCP 2102 recognizes as if the response had been given by the TCP 3102 because the TCP within the intermediate driver 2006 gave the session establishment response to the TCP 2102 under a false name of the TCP 3102.

Upon receipt of the response packet, the TCP 2102 generates an ACK packet to this response packet addressed to the TCP 3102, and transmits it. This ACK packet, which is received by the TCP of the intermediate driver 2106 via the IP routing 2004 and the IP stack 2005, allows the TCP process to be terminated.

As mentioned above, in the seventh embodiment, the operation is completed of establishing the session between the application 2101 within the terminal 21 and the application 3101 within the server 31.

[An operation of transferring the frame from the Terminal 21 to the Server 31]

The case of transferring the frame from the terminal 21 to the server 31 in the seventh embodiment will be exemplified to explain the operation by employing FIG. 23.

At this moment, it is assumed that the bridge 2008, the bridge 3008, the HUB 22 and the HUB 32 have already learned the MAC addresses of the terminal 21, the server 31, the Firewall 33, the gateway device 20, and the gateway device 30.

Further, it is assumed that the Firewall 33 permits communication between the gateway device 20 and the gateway device 30 in a bi-direction, and interrupts direct communication between the terminal 21 and the server 31, which does not go through the gateway device 20 or the gateway device 30, in a bi-direction.

Further, it is assumed that the SSL session (secure TCP session) from the gateway device 30 to the gateway device 20 has already established according to the foregoing operational example.

Further, it is assumed that the TCP session has been already constructed between the application 2101 within the terminal 21 and the application (application 3101) within the server 31.

The application 2101 within the terminal 21 delivers data addressed to the application 3101 within the server 31 to the TCP 2102.

The TCP 2102 receives the data from the application 2101, adds the TCP header (F23 in FIG. 2) or the IP header (F22 in FIG. 2) according to the TCP protocol, thereby to convert it into an IP packet, and delivers it to the IP routing 2103. At this time, the IP address of the server 31 is set to the IP DA within the LAN IP F22, and the IP address of the terminal 21 to the IP SA within the LAN IP F22.

The IP routing 2103 makes a reference to the destination IP address (addressed to the server 31) and the destination port (addressed to the TCP 3102) of the packet received from the TCP 2102, and transfers the data to the IP stack 2104 as it stands.

The IP stack 2104 receives the packet from the IP routing 2103, adds the MAC header (F21 in FIG. 2), thereby to generate an Ethernet frame, and delivers it to the intermediate driver 2106. This frame has a format of the Ethernet frame F20. At this time, the IP stack 2104 makes a reference to a result of the ARP, and sets the MAC address of the server 31 to the MAC DA within the LAN MAC F21 of the frame, and the MAC address of the terminal 21 to the MAC SA within the LAN MAC F21.

The intermediate driver 2106 receives the frame from the IP stack 2004, and makes a frame analysis in the frame analysis 2006H. As a result of the analysis, the frame is a frame of the session between the TCP 2102 and the TCP 3102 previously session-established, whereby it deletes and preserves the MAC header F21 of this frame in the de-encapsulation 2106F, and delivers the frame to the TCP 2106A.

The TCP 2106A within intermediate driver 2106 terminates the TCP 2103A. That is, it deletes the IP header F22 and the MAC header F23 of the frame, leaves only F24, and sends the data F24 to the fragmentation 2106B. Further, it transmits an ACK frame to the TCP 2102.

The fragmentation 2106B within the intermediate driver 2106 confirms size of the data F24 received from the TCP 2106A, and sends the data to the re-encapsulation 2106D as it stands because the data does not need to be fragmented.

The re-encapsulation 2106D within the intermediate driver 2106 adds the MAC header F21, the IP header F22, and the MAC header F23 to the data F24 received from the fragmentation 2106B, thereby to convert it into formatted data having the frame format F20, and transmits it to the driver 2105. At this moment, the MAC address of the server 31 is set to the MAC DA within F21, and the MAC address of the terminal 21 to the MAC SA within F21. Further, the IP address of the server 31 is set to the IP DA within F22, and the IP address of the terminal 21 to the IP SA within F22. Further, the port of the TCP 3102 is set to the destination port, and the port of the TCP 2102 is designated as the transmission source. Theses headers are ones preserved by the de-encapsulation 2106F.

The driver 2105 receives the above-mentioned frame from the intermediate driver 2106, and transfers it to the NIC 211.

The NIC 211 receives the frame from the driver 2105, and transfers it to the HUB 22 through the MAC 2111, the PHY 2112, and the port 2113.

Upon receipt of the frame from the port of the NIC 211 side of the terminal 21, the HUB 22 makes a reference to the MAC DA within F21, and outputs this frame to the port of the gateway device 20 side as it stands based upon a result of learning the past routing because the MAC DA is an MAC address of the server 31.

The gateway device 20 receives the frame transmitted by the HUB 22 in the port 2013, and delivers it to the bridge 2008 through the PHY 2012, the MAC 2011 and the driver 2007.

The bridge 2008 makes a reference to the MAC DA that exists within the header F21 within the formatted frame (having the frame format F20) received from the driver 2007, and transfers the frame to the driver 2009 because the MAC DA is an MAC address of the server 31, and not an MAC address of the gateway device 20.

The frame transmitted from the bridge 2008 is transferred to the gateway application 2001A through the driver 2009, and the virtual NIC 2010.

The gateway application 2001A allows the frame received from the virtual NIC 2010 to flow to the SSL session established between the gateway application 2001A and the gateway application 3001A. That is, the gateway application 2001A delivers the Ethernet frame (having the frame format F20) received from the virtual NIC 2010 as data to the SSL 2002.

Upon receipt of the data (F21 to F24) from the gateway application 2001A, the SSL 2002 encrypts this, thereby to generate data F14, and delivers it the TCP 2003.

The TCP 2003 receives the data F14 from the SSL 2002, adds the TCP header F13 and the IP header F12, and delivers it to the IP routing 2004.

Herein, the IP address of the gateway device 30 is set to the IP DA within F12, and the IP address of the gateway device 20 to the IP SA within F12. Further, the port of the TCP 3003 is set to the destination port, and the port of the TCP 2003 is designated as the transmission source port.

The IP routing 2004 makes a reference to the IP address etc. within the IP header F12 of the data received from the TCP 2003, and transfers the frame to the IP stack 2005.

The IP stack 2005 receives the frame from the IP routing 2004, adds the MAC header F11 to the frame, thereby to convert it into a formatted frame having the Ether-over-SSL frame format F10, and delivers it to the bridge 2008.

Herein, from a result of the ARP, the MAC address of the WAN side of the Firewall 33 is set to the MAC DA within F11, and the MAC address of the gateway device 20 to the MAC SA within F11.

The frame transmitted from the IP stack 2005 is sent to the HUB 22 through the bridge 2008, the driver 2007, and the NIC 201.

Upon receipt of the frame from the port of the gateway device 22 side, the HUB 22 makes a reference to the MAC DA within F11, and outputs this frame to the Firewall 33 as it stands based upon a result of learning the past routing because the MAC DA is an MAC address of the WAN side of the Firewall 33.

The Firewall 33 receives the frame transmitted by the HUB 22, makes a reference to the IP DA, thereby to change the MAC header F11, and transfers the received frame with a form of the frame format F10 unchanged to the HUB 32.

Herein, the MAC address of the gateway device 30 is set to the MAC DA within F11, and the MAC address of the LAN side of the Firewall 33 to the MAC SA within F11.

Upon receipt of the frame from the Firewall 33, the HUB 32 makes a reference to the MAC DA within F11, and outputs this frame to the port of the gateway device 30 side as it stands based upon a result of learning the past routing because the MAC DA is an MAC address of the gateway device 30.

Upon receipt of the frame transmitted by the HUB 32 in the port 3013, the gateway device 30 transfers it to the IP stack 3005 through the PHY 3012, the MAC 3011, and the driver 3007 and the bridge 3008.

The IP stack 3005 removes the MAC header F11 of the frame received from the bridge 3008, and transfers the frame to the IP routing 3004.

The IP routing 3004 makes a reference to the IP DA within the header F12 and the destination port number within F13 of the received frame, and transfers the frame to the TCP 3003.

Upon receipt of the frame from the IP routing 3004, the TCP 3003 performs the process of sending back an ACK packet, or the like according to the TCP protocol. And, it removes the TCP header F13 and the IP header F12 from the received frame, and transfers data F14 to the SSL 3002.

Upon receipt of the data F14 from the TCP 3003, the SSL 3002 undoes the encryption with decoding process, takes out an Ethernet frame F20, i.e. F21 to F24, from the data F14, and transfers it to the gateway application 3001A.

This frame keeps the state at the time of having been transmitted from the terminal 21 to the HUB 22 as it stands, in which the MAC address of the server 31 has been set to the MAC DA within the LAN MAC F21, and the MAC address of the terminal 21 set to the MAC SA within the LAN MAC F21. Further, the IP address of the server 31 has been set to the IP DA within the LAN IP F22, and the IP address of the terminal 21 set to the IP SA within the LAN IP F22.

Upon receipt of the frame F20 from the SSL 3002, the gateway application 3001A allows this frame to flow to the encapsulation process 3001B as it stands.

Upon receipt of the frame from the gateway application 3001A, the encapsulation process 3001B removes the header F21, the header F22, and the header F23, revises the IP address and the port into ones described in these headers, and transmits the frame. That is, it informs the TCP 3003B that the data F24 is sent to the port of the TCP 3102, being an IP address of the server 31. Simultaneously therewith, it makes the setting for the IP stack 3005B so that the MAC address of the terminal 21 is set to the MAC SA within the header F21 of the frame, and the IP address of the terminal 21 is set to the IP SA of the header F22.

The TCP 3003B receives the data F24 from the encapsulation 3001B, and allows it to flow to the TCP session pre-established between the TCP 3102 and the TCP 3003B. That is, the TCP 3003B adds the IP header F22 and the TCP header F23 to the data F24, and transfers it to the IP routing 3004. Herein, the IP address of the server 31 is described in the IP DA of the IP header F22, and the IP address of the terminal 21 is described in the IP SA of the IP header F22. Further, the port of the TCP 3102 is described in the destination port, and the port of the TCP 2102 is described in the transmission source port.

The IP routing 3004 receives the packet from the TCP 3003B, makes a reference to the IP DA, the port, etc., and transfers the frame to the IP stack 3005B.

Upon receipt of the data from the IP routing 3004, the IP stack 3005B adds the header F21 hereto, and sends it to the driver 3007. Herein, it sets the MAC address of the server 31 to the MAC DA within F12, and sets the MAC address of the terminal 21 to the MAC SA within F12. In such a manner, it converts the frame received from the TCP 3003B into a formatted frame having the frame format F20, and transfers it to the driver 3007 through the bridge 3008.

The frame output from the IP stack 3005B is transferred to the HUB 32 through the bridge 3008, the driver 3007, and the NIC 301.

Upon receipt of the frame from the port of the gateway device 30 side, the HUB 32 makes a reference to the MAC DA within F21, and outputs this frame to the port of the server 31 side as it stands based upon a result of learning the past routing because the MAC DA is an MAC address of the server 31.

The frame transmitted from the HUB 32 is transferred through the NIC 311, the driver 3105, the IP stack 3104, the IP routing 3103, and the TCP 3102 within the server 31, and the data F24 within the frame is delivered to the application 3101.

As mentioned above, a series of the frame transfer from the application 2101 within the terminal 21 to the application 3101 within the server 31 is completed.

A series of the frame transfer from the application 3101 within the server 31 to the application 2101 within the terminal 21 also can be realized similarly by tracing the path opposite to that of the above-mentioned example.

Additionally, in this embodiment, the TCP session is established between the TCP 2102 and the intermediate driver 2106, between the TCP 2003 and the TCP 3003, and between the TCP 3003B and the TCP 3102, respectively. Thus, the function of the congestion control and the re-sending control by the TCP does not extend over the transfer from the intermediate driver 2106 to the TCP 2003, and the transfer from the TCP 3003 to the TCP 3003B.

However, as a rule, it is rarely that the packet loss occurs and the congestion occurs within the intranet, and the connection for riding the Firewall, i.e. the connection via the WAN necessitates a countermeasure to the loss or the congestion. In this embodiment, the TCP works between the gateway device 20 and the gateway device 30, whereby an influence upon communication between the application 2101 and the application 3101 hardly occurs so long as the re-sending control and the congestion control exist in this section.

In this embodiment, an example of packaging the encapsulation process etc. in the gateway device 30 side, and packaging the intermediate driver in the terminal 21 side was shown; however, contrarily hereto, it is also possible to package the encapsulation process etc. in the gateway device 20 side, and to package the intermediate driver in the server 31 side.

EFFECTS OF THE INVENTION

Next, effects of this embodiment will be explained.

Utilizing the invention listed in this embodiment enables a high-speed transfer of the frame between the terminal 21 and the server 31.

The reason is that the TCP within the terminal 21 and the TCP within the server 31 are terminated in the intermediate driver within the terminal 21 and in the encapsulation process 3001B within the gateway device 30, respectively, and occurrence of the TCP-over-TCP problem is avoided so as to prevent the congestion control and the re-sending control due to the TCP at a position of the header F23 from occurring in communication between the terminal 21 and the server 31.

[Eight Embodiment]

The eighth embodiment of the present invention differs from the fifth embodiment in a point that each of the intermediate driver 2106 within the terminal 21 and the intermediate driver 3106 within the server 31 is lost, a processing speed acceleration engine X2014 is mounted within the gateway device 20, and the encryption process and the decoding process of the SSL 2002 are performed in the processing speed acceleration engine X2014.

Further, the eighth embodiment is configured to specialize in performing the processing speed acceleration of the encryption and decoding process in the SSL session at a high speed without taking a countermeasure to the TCP-over-TCP problem, differently from the case of the fifth embodiment.

A configuration and an operation of the HUB 22, the HUB 32, the intranet 2, the intranet 3, and the gateway device 30 in the eighth embodiment are identical to that of the fifth embodiment.

In the eighth embodiment, not only a closed LAN but also an open WAN such as Internet may be employed for the intranet 2.

[Explanation of a Configuration]

Figure 24:
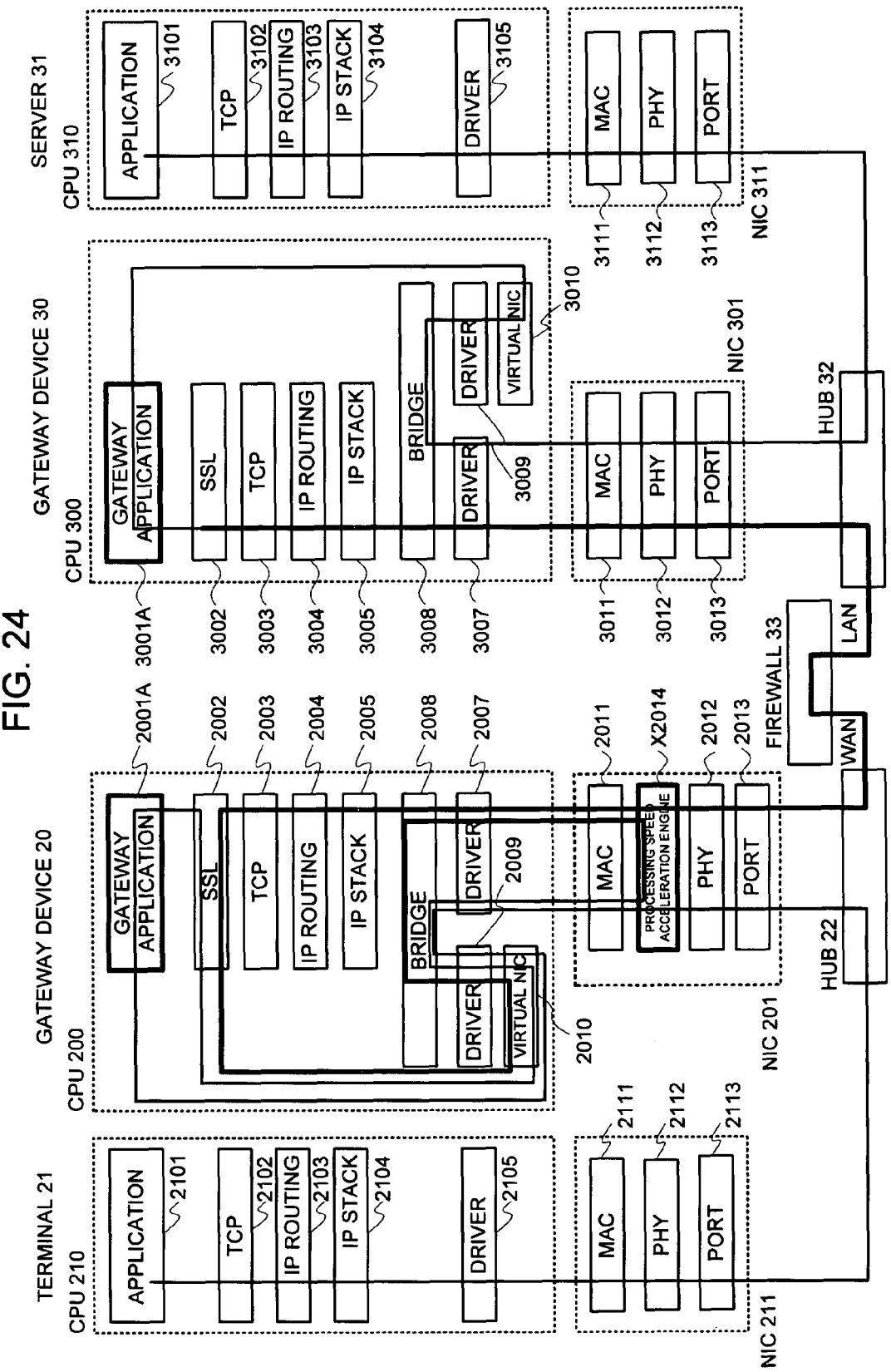
FIG. 24 is a block diagram illustrating a network configuration and a communication path in an eighth embodiment of the present invention.

FIG. 24 is a block diagram having a configuration of each apparatus and a transfer path of the frame in the eighth embodiment shown in details.

The gateway device 20 differs from the gateway device 20 in the fifth embodiment in a point that the processing speed acceleration engine X2014 is mounted, and the encryption and decoding process of the SSL 2002 are performed in the processing speed acceleration engine X2014.

The terminal 21 differs from the terminal 21 in the fifth embodiment in a point that the intermediate driver 2106 is lost. That is, the terminal 21 has a configuration similar to the terminal 21 of the first embodiment to the fourth embodiment, and performs a similar operation.

The server 31 differs from the server 31 in the fifth embodiment in a point that the intermediate driver 3106 is lost. That is, the server 31 has a configuration similar to the server 31 in the first embodiment to the fourth embodiment, the sixth embodiment, and the seventh embodiment, and performs a similar operation.

Each of the HUB 22, the HUB 32, and the gateway device 30 has a configuration similar to that of the fifth embodiment, and performs a similar operation.

The Firewall 33 has a configuration similar to that of the Firewall 33 of the seventh embodiment, and performs a similar operation. However, in this embodiment, a NAT router or a Proxy server may be employed instead of the Firewall 33.

Also in the eighth embodiment, similarly to the other embodiments, only in the case that the SSL session has been pre-established between the gateway device 20 and the gateway device 30, an access to the apparatus within the intranet 3 from the apparatus in the intranet 2 is enabled.

Figure 25:
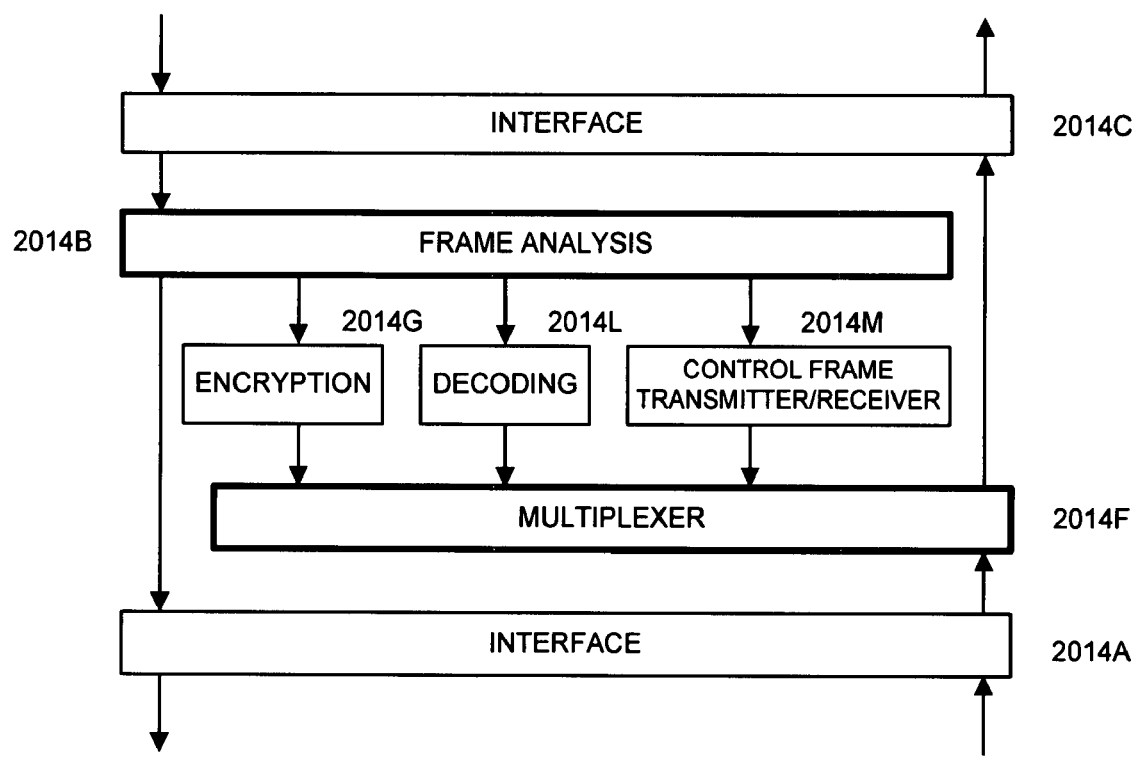
FIG. 25 is a block diagram illustrating a configuration of a processing speed acceleration engine X2014 in the eighth embodiment of the present invention.

FIG. 25 is a block diagram having a configuration of the processing speed acceleration engine X2014 in the eighth embodiment shown in details.

The processing speed acceleration engine X2014 in the eighth embodiment differs from the processing speed acceleration engine 2014 in the first embodiment shown in FIG. 12 in a point that a location and an operation of each of the frame analysis 2014B and the multiplexer 2014F differ, and the fragmentation 2014H, the encapsulation 2014I, the de-encapsulation 2014J, the de-fragmentation 2014K, the control frame analysis 2014D, and the multiplexer 2014E do not exist.

In the processing speed acceleration engine 2014 in the first embodiment, the frame to be encrypted and decoded was input from the interface 2014A, whereas in the processing speed acceleration engine X2014 in the eighth embodiment it is input from the interface 2014C.

In the processing speed acceleration engine X2014 in the eighth embodiment, the interface 2014A, the interface 2014C, the encryption 2014G, the decoding 2014L, the control frame transmitter/receiver 2014M have a configuration to similar to that of the interface 2014A, the interface 2014C, the encryption 2014G, the decoding 2014L, the control frame transmitter/receiver 2014M in the processing speed acceleration engine 2014 in the first embodiment, and perform a similar operation, respectively.

The frame analysis 2014B receives the frame from the interface 2014C, decides the destination in the order of (1) to (4) shown below, and transfers the frame.

(1) It determines whether or not the received frame is a special frame relating to a control of the processing speed acceleration engine, and transfers the frame to the interface 2014A in a case where the frame is not a special one.

(2) If the received frame is a special frame, and yet a frame (control frame) relating to a control setting of the processing speed acceleration engine X2014, it transfers the frame to the control frame transmitter/receiver 2014M.

(3) If the received frame is a special frame, and yet a frame (to-be-encrypted frame) relating to the encryption, it transfers the frame to the encryption 2014G.

(4) If the received frame is a special frame, and yet a frame (to-be-decoded frame) relating to the decoding, it transfers the frame to the decoding 2014L.

The frame analysis 2014B usually determines whether or not the received frame is a special frame based upon the MAC DA and the MAC SA. In a case where the MAC address (referred to as an MAC address for control. For example, 00004C000000 to FF) within the pre-specified address range has been described in any of the MAC DA and the MAC SA, it determines that the received frame is a control frame.

The frame analysis 2014B determines each of the control frame, the to-be-encrypted frame, the to-be-decoded frame as well based upon the MAC address. For example, the MAC DA of the to-be-encrypted frame is set to 00:00:4 C:00:00:0A, and the MAC DA of the to-be-decoded frame to 00:00:4 C:00:00:0B.

The multiplexer 2014F receives the frame from the encryption 2014G, the decoding 2014L, the control frame transmitter/receiver 2014M, and further the interface 2014A, preserves it in a queue to regulate a transmission timing thereof if necessary, and transmits it to the interface 2014C. The reason why the frame is preserved in the queue is that the frames arriving from each of the encryption 2014G, the decoding 2014L, the control frame transmitter/receiver 2014M, and further the interface 2014A are prevented from colliding with each other.

[Explanation of an Operation]

[An Operation of Establishing the SSL Session]

The case of establishing the SSL session (secure TCP session) from the gateway device 30 to the gateway device 20 in the eighth embodiment will be exemplified to explain the operation by employing FIG. 24.

At this moment, it is assumed that the bridge 2008, the bridge 3008, the HUB 22 and the HUB 32 have already learned the MAC addresses of the terminal 21, the server 31, the LAN side of the Firewall 33, the WAN side of the Firewall 33, the gateway device 20, and the gateway device 30.

Further, it is assumed that the Firewall 33 permits communication between the gateway device 20 and the gateway device 30 in a bi-direction, and interrupts direct communication between the terminal 21 and the server 31, which does not go through the gateway device 20 or the gateway device 30, in a bi-direction.

The application 3001A within the gateway device 30 receives a request for making a connection to the gateway application 2001A within the gateway device 20 from a user, and instructs the SSL 3002 to start communication with the gateway application 2001A within the gateway device 20.

The SSL 3002 receives the communication start instruction from the gateway application 3001A, and instructs the TCP 3003 to start communication with the gateway application 2001A within the gateway device 20 for purpose of establishing the SSL session with the SSL 2002.

The TCP 3003 receives the communication start instruction from the SSL 3002, and transmits a packet (SYN) for requesting establishment of the TCP session with the TCP 2003 to the IP routing 3004 for a purpose of establishing the TCP session with the TCP 2003. This TCP session establishment request packet is a packet in line with the TCP specification, in which the gateway device 20 has been set to the destination IP address, and the TCP 2003 to the destination port number.

The IP routing 3004 makes a reference to the destination IP address and the destination port number of the packet received from the TCP 3003, and transfers the packet to the IP stack 3005.

The IP stack 3005 adds the MAC address of the intranet 3 side within the Firewall 33 to the packet received from the IP routing 3004 as a destination MAC address, further sets the MAC address of its own node to the transmission source MAC address, thereby to convert it into a TCP session establishment request frame, and transfers it to the driver 3007 through the bridge 3008.

The driver 3007 receives the frame from the IP stack 3005, and transfers it the MAC 3011.

The MAC 3011 receives the frame from the driver 3007, and transfers it the PHY 3012.

The PHY 3012 receives the frame from the MAC 3011, and transfers it the port 3013.

The port 3013 receives the frame from the PHY 3012, and transfers it the HUB 32 through the Ethernet cable.

Upon receipt of the frame, the HUB 32 makes a reference to the MAC DA, and outputs this frame to the port of the Firewall 33 side as it stands based upon a result of learning the past routing because the MAC DA is an MAC address of the LAN side of the Firewall 33.

The Firewall 33 receives the frame from the HUB 22, permits this for a purpose of communication from the gateway device 30 to the gateway device 20, and transfers it to the HUB 22.

The HUB 22 receives the packet from the Firewall 33, and transfers this frame to the gateway device 20 as it stands based upon a result of learning the past routing.

The gateway device 20 receives the packet from the HUB 22, and transfers the packet to the IP stack 2005 through the path of the port 2013, the PHY 2012, the MAC 2011, the driver 2007, and the bridge 2008.

The IP stack 2005 receives the packet from the bridge 2008, removes the MAC header, thereby to convert it into a packet, and transfers it to the IP routing 2004.

The IP routing 2004 makes a reference to the destination port number of the packet received from the IP stack 2005, and transfers this packet to the TCP 2003 because the port number of the TCP 2003 side has been added.

The TCP 2003 receives the packet from the IP routing 2004. It transmits a response packet (SYN+ACK) to the session establishment request addressed to the TCP 3003, which is necessary for establishing the session to the TCP 3003, according to the TCP protocol because this packet is a TCP session establishment request packet (SYN). That is, the IP address of the gateway device 30 is set to the destination IP of the response packet, and the port number of the TCP 3003 to the destination port thereof.

The response packet arrives at the CPU 300 through the IP routing 2004, the IP stack 2005, the bridge 2008, the driver 2007, the NIC 201, the HUB 22, the Firewall 33, the HUB 32, and the NIC 301, and further, arrives at the TCP 3003 through the driver 3007, the bridge 3008, the IP stack 3005, and the IP routing 3004.

The TCP 3003 receives the response packet from the IP routing 3004. It transmits an ACK packet to the TCP 2003 because this packet is a response packet to the request for establishing the TCP session. Upon receipt of the ACK packet, the TCP 2003 notifies completion of a connection of the TCP session with the TCP 3003 to the SSL 3002.

The SSL 3002 receives a notification saying completion of a connection to the TCP 3003, and transmits a packet (SSL session establishment request packet) for requesting the session establishment according to the SSL protocol for a purpose of establishing the SSL session with the SSL 2002.

The SSL session establishment request packet, which is received in the TCP 3003, goes through the TCP session established between the TCP 3003 and the TCP 2003, and arrives at the TCP 2003 through the NIC 301, the HUB 32, the Firewall 33, the HUB 22, and NIC 201.

The TCP 2003 transfers the SSL session establishment request packet to the SSL 2002.

The SSL 2002 verifies the content of the SSL session establishment request, notifies establishment of the session with the SSL 3002 to the gateway application 2001A if it were not a problem, and simultaneously therewith, transmits an SSL session establishment response packet to the SSL 3002 according to the SSL protocol.

The SSL session establishment response packet arrives at the SSL 3002 through the path opposite to that of the SSL session establishment request packet, i.e. the TCP session between the TCP 2003 and the TCP 3003.

The SSL 2002 loads the secret key of the SSL 2002, the public key of the SSL 3002, and the common key to the SSL 2002 and the SSL 3002, the IP address of a partner apparatus of the SSL session (IP address of the gateway device 30), the destination port (port of the TCP 3003) of a partner apparatus of the SSL session, the transmission source port number (port number of the TCP 2003) of the SSL session of its own node side, the transmission source IP address (IP address of the gateway device 20), and the start command into the control frame, and transmits the control frame to the virtual NIC 2010.

The control frame, which is output from the SSL 2002, arrives at the processing speed acceleration engine X2014 through the virtual NIC 2010, the driver 2009, the bridge 2008, the driver 2007, and the MAC 2111.

The processing speed acceleration engine X2014 determines that the received frame is a control frame based upon the MAC address etc., and receives it in the control frame transmitter/receiver. And, it preserves the public key, the secret key, and the common key, respectively, for a purpose of using them in the decoding and the encryption, and preserves the IP address or the port number for a purpose of analyzing the frame. And upon receipt of a processing speed acceleration process start command, it starts the processes of the frame analysis, the encryption, and the decoding.

The SSL 3002 verifies the content of the SSL session establishment response according to the SSL protocol, and notifies establishment of the SSL session between the SSL 3002 and the SSL 2002 to the gateway application 3001A if it were not for a problem.

As mentioned above, the SSL session is established between the SSL 2002 and the SSL 3002.

Above, in the eighth embodiment, the operation in the case of establishing the SSL session (secure TCP session) from the gateway device 30 to the gateway device 20 is completed.

[An Operation of Transferring the Frame from the Terminal 21 to the Server 31]

The case of transferring the frame from the terminal 21 to the server 31 in the eighth embodiment will be exemplified to explain the operation by employing FIG. 24.

At this moment, it is assumed that the bridge 2008, the bridge 3008, the HUB 22 and the HUB 32 have already learned the MAC addresses of the terminal 21, the server 31, the firewall 33, the gateway device 20, and the gateway device 30.

Further, it is assumed that the Firewall 33 permits communication between the gateway device 20 and the gateway device 30 in a bi-direction, and interrupts direct communication between the terminal 21 and the server 31, which does not go through the gateway device 20 or the gateway device 30, in a bi-direction.

Further, it is assumed that the SSL session (secure TCP session) from the gateway device 30 to the gateway device 20 has already established according to the foregoing operational example.

Further, it is assumed that the TCP session has been already constructed between the application 2101 within the terminal 21 and the application 3101 within the server 31.

The application 2101 within the terminal 21 delivers data addressed to the application 3101 within the server 31 to the TCP 2102.

The TCP 2102 receives the data from the application 2101, adds the TCP header (F23 in FIG. 2) or the IP header (F22 in FIG. 2) according to the TCP protocol, thereby to convert it into an IP packet, and delivers it to the IP routing 2103. At this time, the IP address of the server 31 is set to the IP DA within the LAN IP F22, and the IP address of the terminal 21 to the IP SA within the LAN IP F22.

The IP routing 2103 makes a reference to the destination IP address (addressed to the server 31) and the destination port (addressed to the TCP 3102) of the packet received from the TCP 2102, and transfers the data to the IP stack 2104 as it stands.

The IP stack 2104 receives the packet from the IP routing 2103, adds the MAC header (F21 in FIG. 2), thereby to generate an Ethernet frame, and delivers it to the driver 2105. This frame has a format of the Ethernet frame F20. At this time, the IP stack 2104 makes a reference to a result of the ARP, and sets the MAC address of the server 31 to the MAC DA within the LAN MAC F21 of the frame, and the MAC address of the terminal 21 to the MAC SA within the LAN MAC F21.

The driver 2105 receives the above-mentioned frame from the IP stack 2105, and transfers it to the NIC 211.

The NIC 211 receives the frame from the driver 2105, and transfers it to the HUB 22 through the MAC 2111, the PHY 2112, and the port 2113.

Upon receipt of the frame from the port of the NIC 211 side of the terminal 21, the HUB 22 makes a reference to the MAC DA within F21, and outputs this frame to the port of the gateway device 20 side as it stands based upon a result of learning the past routing because the MAC DA is an MAC address of the server 31.

The gateway device 20 receives the frame transmitted by the HUB 22 in the port 2013, and delivers it to the bridge 2008 through the PHY 2012, the MAC 2011, and the driver 2007.

The bridge 2008 makes a reference to the MAC DA that exists within the header F21 within the formatted frame (having the frame format F20) received from the driver 2007, and transfers the frame to the driver 2009 because the MAC DA is an MAC address of the server 31, and is not an MAC address of the gateway device 20.

The frame transmitted from the bridge 2008 is transferred to the gateway application 2001A through the driver 2009, and the virtual NIC 2010.

The gateway application 2001A allows the frame received from the virtual NIC 2010 to flow to the SSL session established between the gateway application 2001A and the gateway application 3001A.

That is, the gateway application 2001A delivers the Ethernet frame (having a frame format F20) received from the virtual NIC 2010 as data to the SSL 2002.

Upon receipt of the not-encrypted data F14 (F21 to F24) from the gateway application 2001A, the SSL 2002 attaches the header F11, thereby to prepare a to-be-encrypted frame, and delivers it to the virtual NIC 2010. Herein, it sets a special MAC (for example, 00:00:4 C:00:00:0A etc.) for commanding the encryption to the MAC DA within the header F11, and sets an MAC address etc. of the virtual NIC 2010 to the MAC SA. Needless to say, this frame may be delivered directly to the virtual NIC 2010 from the SSL 2002, and it may be delivered to the virtual NIC 2010 through the gateway application 2001A.

The to-be-encrypted frame arrives at the processing speed acceleration engine X2014 through the virtual NIC 2010, the driver 2009, the bridge 2008, the driver 2007, and the MAC 2011.

The processing speed acceleration engine X2014 receives the to-be-encrypted frame in the interface 2014C, determines in the frame analysis 2014B that the received frame is a to-be-encrypted frame, exchanges the MAC DA of the header F11 for the MAC SA thereof, and sends it to the encryption 2014G. The encryption 2014G encrypts the data F14 of the received frame, i.e. the portions of F21, F22, F23 and F24, thereby to generate encrypted data F14, and delivers it to the multiplexer 2014F. The multiplexer 2014F buffers the frame received from the encryption 2014G if necessary, and sends it to the interface 2014C.

The frame output from the processing speed acceleration engine X2014 returns to the SSL 2002 through the MAC 2011, the driver 2007, the bridge 2008, the driver 2009, and the virtual NIC 2010. The MAC address etc. of the virtual NIC 2010 has been set to the MAC DA of this frame, and a special MAC (for example, 00:00:4 C:00:00:0A etc.) for commanding the encryption to the MAC SA.

The SSL 2002 deletes the header F11 (MAC header) of the frame received from the virtual NIC, and delivers only the data F14 to the TCP 2003.

The TCP 2003 receives the data F14 from the SSL 2002, attaches the TCP header F13, and the IP header F12, and delivers it to the IP routing 2004.

Herein, the IP address of the gateway device 30 is set to the IP DA within F12, and the IP address of the gateway device 20 is set to the IP SA within F12. Further, the port of the TCP 3003 is set to the destination port, and the port of the TCP 2003 to the transmission source port.

The IP routing 2004 makes a reference to the IP address etc. within the IP header F12 of the data received from the TCP 2003, and transfers the frame to the IP stack 2005.

The IP stack 2005 receives the frame from the IP routing 2004, attaches the MAC header F11 to the frame, thereby to convert it into a formatted frame having the Ether-over-SSL frame format F10, and delivers it to the bridge 2008.

Herein, from a result of the ARP, the MAC address of the WAN side of the Firewall 33 is set to the MAC DA within F11, and the MAC address of the gateway device 20 to the MAC SA within F11.

The frame transmitted from the IP stack 2005 is sent to the HUB 22 through the bridge 2008, the driver 2007, the MAC 2011, the processing speed acceleration engine X2014, the PHY 2012, and the MAC 2013. At this time, the processing speed acceleration engine X2014 transfers the frame received from the MAC 2011 to the PHY 2012 as it stands.

Upon receipt of the frame from the port of the gateway device 22 side, the HUB 22 makes a reference to the MAC DA within F11, and outputs this frame to the Firewall 33 as it stands based upon a result of learning the past routing because the MAC DA is an MAC address of the WAN side of the Firewall 33.

The Firewall 33 receives the frame transmitted by the HUB 22, makes a reference to the IP DA, thereby to change the MAC header F11, and transfers the received frame with a form of the frame format F10 unchanged to the HUB 32.

Herein, the MAC address of the gateway device 30 is set to the MAC DA within F11, and the MAC address of the LAN side of the Firewall 33 to the MAC SA within F11.

Upon receipt of the frame from the Firewall 33, the HUB 32 makes a reference to the MAC DA within F11, and outputs this frame to the port of the gateway device 30 side as it stands based upon a result of learning the past routing because the MAC DA is an MAC address of the gateway device 30.

Upon receipt of the frame transmitted by the HUB 32 in the port 3013, the gateway device 30 transfers it to the IP stack 3005 through the PHY 3012, the MAC 3011, the driver 3007, and the bridge 3008.

The IP stack 3005 removes the MAC header F11 of the frame received from the bridge 3008, and transfers the frame to the IP routing 3004.

The IP routing 3004 makes a reference to the IP DA within the header F12 and the destination port number within F13 of the received frame, and transfers the frame to the TCP 3003.

Upon receipt of the frame from the IP routing 3004, the TCP 3003 performs the process of sending back an ACK packet to the TCP 2003, or the like according to the TCP protocol. And, it removes the TCP header F13 and the IP header F12 from the received frame, and transfers data F14 to the SSL 3002.

Upon receipt of the data F14 from the TCP 3003, the SSL 3002 undoes the encryption with decoding process, takes out an Ethernet frame F20, i.e. F21 to F24, from the data F14, and transfers it to the gateway application 3001A.

Upon receipt of the frame F20 from the SSL 3002, the gateway application 3001A allows this frame to flow to the virtual NIC 3010 as it stands.

This frame keeps the state at the time of having been transmitted from the terminal 21 to the HUB 22 as it stands, in which the MAC address of the server 31 has been set to the MAC DA within the LAN MAC F21, and the MAC address of the terminal 21 to the MAC SA within the LAN MAC F21. Further, the IP address of the server 31 has been set to the IP DA within the LAN IP F22, and the IP address of the terminal 21 to the IP SA within the LAN IP F22.

The frame delivered to the virtual NIC 3010 from the gateway application 3001A is transferred to the HUB 32 through the driver 3009, the bridge 3008, and the NIC 301.

Upon receipt of the frame from the port of the gateway device 30 side, the HUB 32 makes a reference to the MAC DA within F12, and outputs this frame to the port of the server 31 side as it stands based upon a result of learning the past routing because the MAC DA is an MAC address of the server 31.

The server 31 receives the frame transmitted from the HUB 32, and delivers the data F24 within the frame to the application 3101 through the driver 3105, the IP stack 3104, the IP routing 3103, and the TCP 3102.

As mentioned above, a series of the frame transfer from the application 2101 within the terminal 21 to the application 3101 within the server 31 is completed.

A series of the frame transfer from the application 3101 within the server 31 to the application 2101 within the terminal 21 also can be realized similarly by tracing the path opposite to that of the above-mentioned example.

In this embodiment, an example was shown of packaging the processing speed acceleration engine in the gateway device 20 side; however, contrarily hereto, it is also possible to package the processing speed acceleration engine in the gateway device 30 side. Further, it is also possible to package the processing speed acceleration engine in both of the gateway device 20 side and the gateway device 30 side. Further, it is also possible to exchange the installation location of the server 31 for that of the terminal 21.

[Effects of the Invention]

Next, effects of this embodiment will be explained. Utilizing the invention listed in this embodiment enables a high-speed transfer of the frame between the terminal 21 and the server 31.

The reason is that the encryption and the decoding are hardware-processed in the gateway device 20, thereby allowing the process of the SSL to be performed at a high speed.

[Ninth Embodiment]

The ninth embodiment of the present invention differs from the eighth embodiment in a point that an intermediate driver Y3006 is mounted within the gateway device 30, the processing speed acceleration engine X2014 within the gateway device 20 is changed to a processing speed acceleration engine Y2014, and in a point that the encryption and the decoding are executed not in the SSL 2002 within the gateway device 20 and in the SSL 3002 within the gateway device 30, but in the processing speed acceleration engine Y2014 and in the intermediate driver Y3006.

Further, the ninth embodiment, similarly to the eighth embodiment, is also configured to specialize in performing the encryption and decoding process at a high speed without taking a countermeasure to the TCP-over-TCP problem.

A configuration and an operation of the HUB 22, the HUB 32, the intranet 2, the intranet 3, the gateway device 30, the terminal 21, and the server 31 in the ninth embodiment are identical to that of the eighth embodiment.

In the ninth embodiment, not only a closed LAN but also an open WAN such as Internet may be employed for the intranet 2.

[Explanation of a Configuration]

Figure 26:
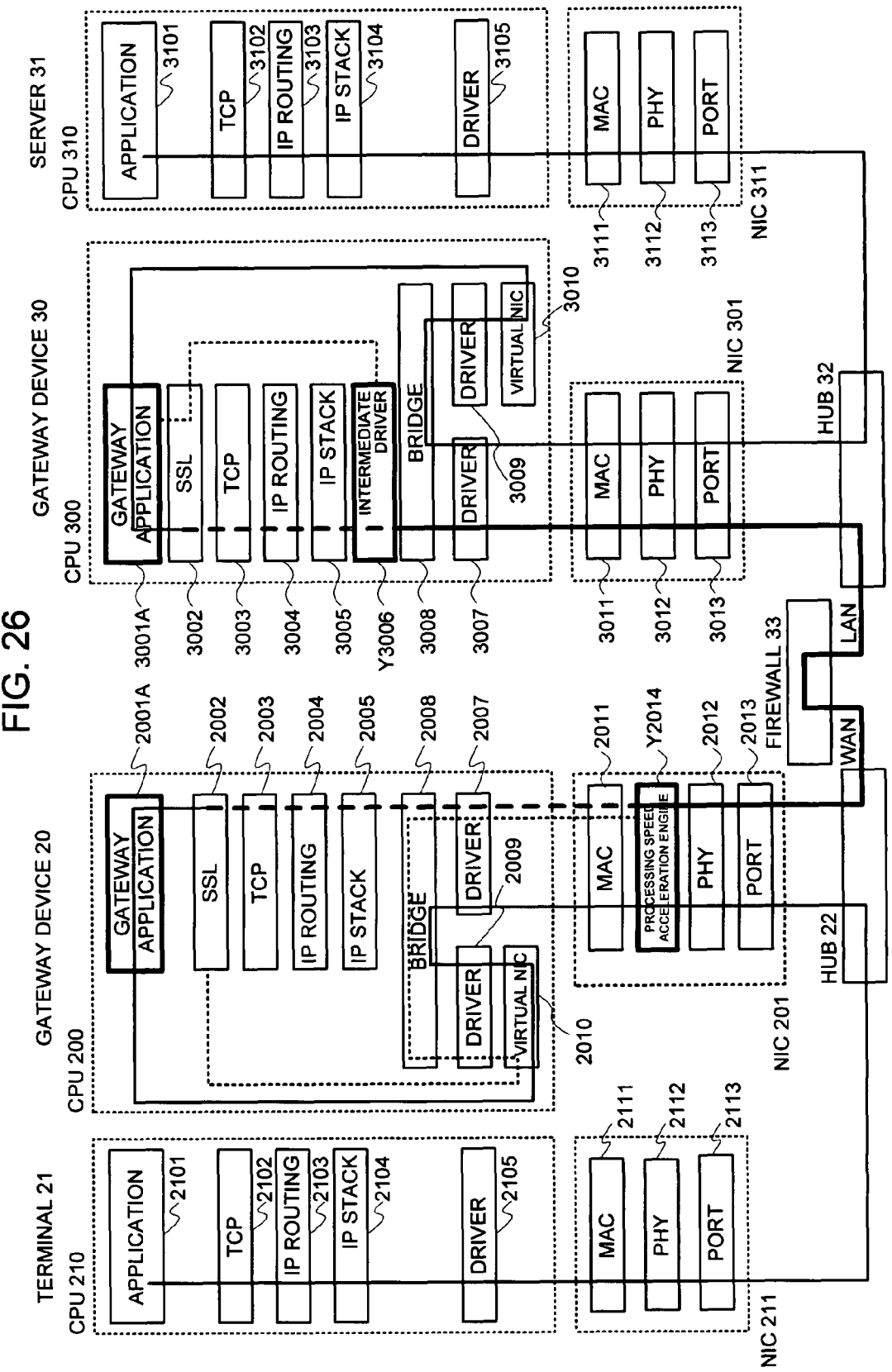
FIG. 26 is a block diagram illustrating a network configuration and a communication path in a ninth embodiment of the present invention.

FIG. 26 is a block diagram having a configuration of each apparatus and a transfer path of the frame in the ninth embodiment shown in details.

The gateway device 20 differs from the gateway device 20 in the eighth embodiment in a point that the processing speed acceleration engine X2014 is changed to the processing speed acceleration engine Y2014, and in point that the SSL 2002 is involved only in exchanging the certificate without executing the encryption and the decoding, delivers the data received from the gateway application 2001A as it stands to the TCP 2003 without encrypting it even after completing establishment of the SSL session, and further delivers the data received from the TCP 2003 as it stands to the gateway application 2001A without decoding it.

The gateway device 30 differs from the gateway device 30 in the eighth embodiment in a point that the intermediate driver Y3006 is mounted, and in a point that the SSL 3002 is involved only in exchanging the certificate without executing the encryption and the decoding, delivers the data received from the gateway application 3001A as it stands to the TCP 3003 without encrypting it even after completing establishment of the SSL session, and further delivers the data received from the TCP 3003 as it stands to the gateway application 3001A without decoding it.

Each of the terminal 21, the server 31, HUB 22, the HUB 32, and the gateway device 30 has a configuration similar to that of the eighth embodiment, and performs a similar operation.

The Firewall 33 has a configuration similar to that of the Firewall 33 of the eighth embodiment, and performs a similar operation. However, in this embodiment, a NAT router or a Proxy server may be employed instead of the Firewall 33.

Also in the ninth embodiment, similarly to the other embodiments, only in the case that the SSL session has been pre-established between the gateway device 20 and the gateway device 30, an access to the apparatus within the intranet 3 from the apparatus in the intranet 2 is enabled.

Figure 27:
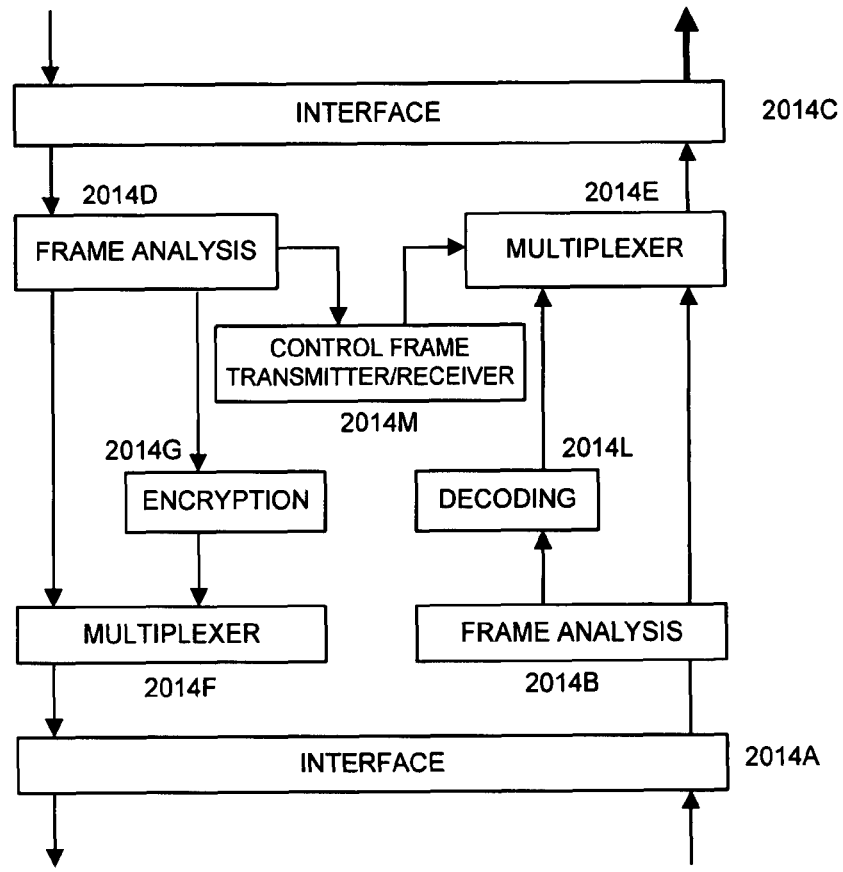
FIG. 27 is a block diagram illustrating a configuration of a processing speed acceleration engine Y2014 in the ninth embodiment of the present invention.

FIG. 27 is a block diagram having a configuration of the processing speed acceleration engine Y2014 in the ninth embodiment shown in details.

The processing speed acceleration engine Y2014 in the ninth embodiment differs from the processing speed acceleration engine 2014 in the first embodiment shown in FIG. 12 in a point that the fragmentation 2014H, the encapsulation 2014I, the de-encapsulation 2014J, and the de-fragmentation 2014K do not exist.

In the processing speed acceleration engine 2014 in the first embodiment, the frame being encrypted and decoded was input from the interface 2014A, and in the processing speed acceleration engine X2014 in the eighth embodiment, the frame being encrypted and decoded was input from the interface 2014C. However, in the processing speed acceleration engine Y2014 in the ninth embodiment, the frame being encrypted is input from the interface 2014C, and the frame being decoded is input from the interface 2014A.

In the processing speed acceleration engine Y2014 in the ninth embodiment, the interface 2014A, the interface 2014C, the encryption 2014G, the decoding 2014L, the control frame transmitter/receiver 2014M have a configuration to similar to that of the interface 2014A, the interface 2014C, the encryption 2014G, the decoding 2014L, the control frame transmitter/receiver 2014M in the processing speed acceleration engine 2014 in the first embodiment, and perform a similar operation, respectively.

The frame analysis 2014B receives the frame from the interface 2014A, decides the destination in the order shown below, and transfers the frame.

(1) If the frame is a frame addressed to its own node, a frame of a pre-established SSL session, and yet a frame encrypted in the gateway device 30, it transfers the frame to the decoding 2014L.

(2) If the frame is a frame other than (1), it transfers the frame to the multiplexer 2014E.

The frame analysis 2014D receives the frame from the interface 2014C, decides the destination in the order shown below, and transfers the frame.

(1) If the frame is a special frame (hereinafter, referred to as a control frame) relating to a control of the processing speed acceleration engine, it transfers the frame to the control frame transmitter/receiver 2014M.

(2) If the frame is a frame to which the MAC SA of its own node has been added, and yet a frame of a pre-established SSL session, it transfers the frame to the encryption 2014G.

(3) If the frame is a frame other than (1) and (2), it transfers the frame to the multiplexer 2014F.

The frame analysis 2014D usually determines whether or not the frame is a special frame based upon the MAC DA and the MAC SA. In a case where the MAC address within the pre-specified address range (referred to as an MAC address for control. For example, 00004C000000 to FF) has been described in any of the MAC DA and the MAC SA, it determines that the frame is a control frame.

The multiplexer 2014E receives the frame from the frame analysis 2014B, the control frame transmitter/receiver 2014M, or the decoding 2014L, preserves it in a queue to regulates a transmission timing thereof if necessary, and transmits it to the interface 2014C.

The reason why the frame is preserved in the queue is that the frames arriving from each of the frame analysis 2014B side, the decoding 2014L side, and the control frame transmitter/receiver 2014M side are prevented from colliding with each other.

The multiplexer 2014F receives the frame from the frame analysis 2014D and the encryption 2014G, preserves it in a queue to regulate a transmission timing thereof if necessary, and transmits it to the interface 2014A. The reason why the frame is preserved in the queue is that the frames arriving from each of the frame analysis 2014D, and further the encryption 2014G are prevented from colliding with each other.

Additionally, the processing speed acceleration engine Y2014 also can encrypt and decode a plurality of the SSL sessions. For this, it is also possible to have a plurality of items of session information such as the above-mentioned IP address, port, public key, secret key and common key.

Figure 28:
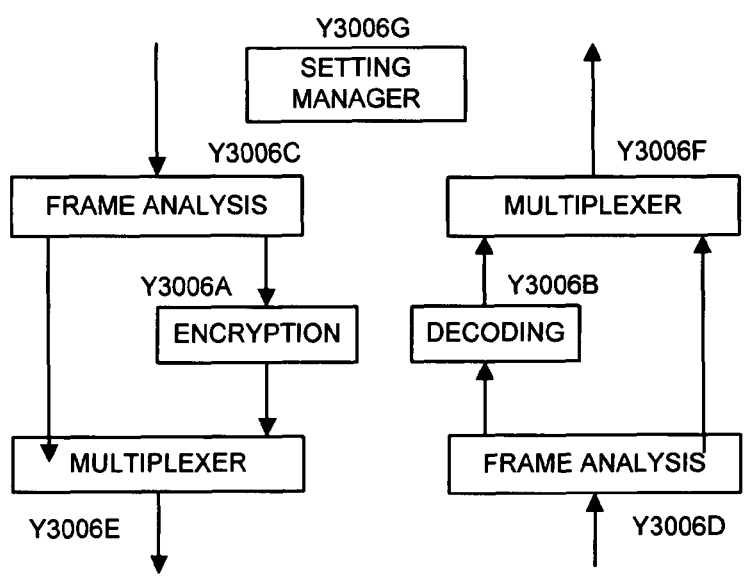
FIG. 28 is a block diagram illustrating a configuration of an intermediate driver Y3006 in the ninth embodiment of the present invention.

FIG. 28 is a block diagram having a configuration of the intermediate driver Y3006 in the ninth embodiment shown in details.

The intermediate driver Y3006 in the ninth embodiment differs from the intermediate driver 1008 in the first embodiment shown in FIG. 7 in a point that the control frame transmitter/receiver 1008M, the fragmentation 1008B, the fragment assembly 1008C, the re-encapsulation 1008D, the de-encapsulation 1008F, the re-encapsulation 1008E, and the de-encapsulation 1008G do not exist, and an encryption Y3006A and a decoding Y3006B are mounted instead thereof.

The intermediate driver Y3006 in the ninth embodiment is configured of the encryption Y3006A, the decoding Y3006B, a frame analysis Y3006C, a frame analysis Y3006D, a multiplexer Y3006E, a multiplexer Y3006F, and a setting manager Y3006G.

The encryption Y3006A receives the frame from the frame analysis Y3006C, encrypts it with the method such as the 3DES, and transfers it to the multiplexer Y3006E. The public key and the common key notified from the setting manager Y3006G are utilized as ones that are employed for encryption.

The decoding Y3006B receives the frame from the frame analysis Y3006D, decodes it with the method such as the 3DES, and transfers it to the multiplexer Y3006F. The secret key and the common key notified from the setting manager Y3006G are utilized as ones that are employed for decoding.

The frame analysis Y3006C receives the frame from the interface IP stack 3005, decides the destination in the order of (1) to (2) shown below, and transfers the frame.

(1) If the frame is a frame to which the MAC SA of its own node has been added, and yet a frame of a pre-established SSL session, it transfers the frame to the encryption Y3006A.

(2) If the frame is a frame other than (1), it transfers the frame to the multiplexer Y3006E.

The frame analysis Y3006D receives the frame from the bridge 3008, decides the destination in the order shown below, and transfers the frame.

(1) If the frame is a frame addressed to its own node and yet a frame of the pre-established SSL session, it transfers the frame to the decoding Y3006B.

(2) If the frame is a frame other than (1), it transfers the frame to the multiplexer Y3006F.

The multiplexer Y3006E receives the frame from the frame analysis Y3006C and the encryption Y3006A, and transfers it to the bridge 3008. At this moment, it performs a buffer operation so as to prevent a missing of the frame due to the simultaneous arrival from occurring.

The multiplexer Y3006F receives the frame from the frame analysis Y3006D and the decoding Y3006B, preserves it in a queue to regulate a transmission timing thereof if necessary, and transmits it to the IP stack 3005. The reason why the frame is preserved in the queue is that the frames arriving from each of the frame analysis 3006D side and the decoding Y3006B side are prevented from colliding with each other.

The setting manager Y3006G receives a notification about information (the IP address, the port number, etc.) of the session relating to the processing speed acceleration process from the gateway application 3001A, and makes the setting for the frame analysis Y3006C and the frame analysis Y3006D, and further, it receives a notification about the public key for encryption, the secret key for decoding, and further the common key from the gateway application 3001A or the SSL 3002, and makes the setting for the encryption Y3006A and the decoding Y3006B.

Additionally, the intermediate driver Y3006 also can encrypt and decode a plurality of the SSL sessions. For this, it is also possible to have a plurality of items of session information such as the above-mentioned IP address, port, public key, secret key and common key.

[Explanation of an Operation]

[An Operation of Establishing the SSL Session]

The case of establishing the SSL session (secure TCP session) from the gateway device 30 to the gateway device 20 in the ninth embodiment will be exemplified to explain the operation by employing FIG. 26.

At this moment, it is assumed that the bridge 2008, the bridge 3008, the HUB 22 and the HUB 32 have already learned the MAC addresses of the terminal 21, the server 31, the LAN side of the Firewall 33, the WAN side of the Firewall 33, the gateway device 20, and the gateway device 30.

Further, it is assumed that the Firewall 33 permits communication between the gateway device 20 and the gateway device 30 in a bi-direction, and interrupts direct communication between the terminal 21 and the server 31, which does not go through the gateway device 20 or the gateway device 30, in a bi-direction.

The gateway application 3001A within the gateway device 30 receives a request for making a connection to the gateway application 2001A within the gateway device 20 from a user, and instructs the SSL 3002 to start communication with the gateway application 2001A within the gateway device 20.

The SSL 3002 receives the communication start instruction from the gateway application 3001A, and instructs the TCP 3003 to start communication with the gateway application 2001A within the gateway device 20 for a purpose of establishing the SSL session with SSL 2002.

The TCP 3003 receives the communication start instruction from the SSL 3002, and transmits a packet (SYN) for requesting establishment of the TCP session with the TCP 2003 to the IP routing 3004 for a purpose of establishing the TCP session with the TCP 2003. This TCP session establishment request packet is a packet in line with the TCP specification, in which the gateway device 20 has been set to the destination IP address, and the TCP 2003 to the destination port number.

The IP routing 3004 makes a reference to the destination IP address and the destination port number of the packet received from the TCP 3003, and transfers the packet to the IP stack 3005.

The IP stack 3005 adds the MAC address of the intranet 3 side within the Firewall 33 to the packet received from the IP routing 3004 as a destination MAC address, further sets the MAC address of its own node to the transmission source MAC address, thereby to generate a frame, and transfers it to the intermediate driver Y3006.

The intermediate driver Y3006 receives the TCP session establishment request frame from the IP stack, and makes a header analysis. As a result of the analysis, the frame is not a frame that needs to be encrypted, whereby it transfers this frame to the driver 3007 through the bridge 3008 as it stands.

The driver 3007 receives the frame from the IP stack 3005, and transfers it the MAC 3011.

The MAC 3011 receives the frame from the driver 3007, and transfers it the PHY 3012.

The PHY 3012 receives the frame from the MAC 3011, and transfers it the port 3013.

The port 3013 receives the frame from the PHY 3012, and transfers it the HUB 32 through the Ethernet cable.

Upon receipt of the frame, the HUB 32 makes a reference to the MAC DA, and outputs this frame to the port of the Firewall 33 side as it stands based upon a result of learning the past routing because the MAC DA is an MAC address of the LAN side of the Firewall 33.

The Firewall 33 receives the frame from the HUB 22, permits this for a purpose of communication from the gateway device 30 to the gateway device 20, and transfers it to the HUB 22.

The HUB 22 receives the frame from the Firewall 33, and transfers this frame to the gateway device 20 as it stands based upon a result of learning the past routing.

The gateway device 20 receives the frame from the HUB 22, and transfers it to the IP stack 2005 through the path of the port 2013, the PHY 2012, the MAC 2011, the driver 2007, and the bridge 2008.

The IP stack 2005 receives the frame from the bridge 2008, removes the MAC header, thereby to convert it into a packet, transfers it to the IP routing 2004.

The IP routing 2004 makes a reference to the destination port number of the packet received from the IP stack 2005, and transfers this packet to the TCP 2003 because the port number of the TCP 2003 side has been added.

The TCP 2003 receives the packet from the IP routing 2004. It transmits a response packet (SYN+ACK) to the session establishment request addressed to the TCP 3003, which is necessary for establishing the session, according to the TCP protocol because this packet is a TCP session establishment request packet (SYN). That is, the IP address of the gateway device 30 is set to the destination IP of the response packet, and the port number of the TCP 3003 to the destination port thereof.

The response packet arrives at the CPU 300 through the IP routing 2004, the IP stack 2005, the bridge 2008, the driver 2007, the NIC 201, the HUB 22, the Firewall 33, the HUB 32, and the NIC 301, and arrives at the TCP 3003 through the driver 3007, the bridge 3008, the IP stack 3005, and the IP routing 3004.

The TCP 3003 receives the response packet from the IP routing 3004. It sets an ACK packet to this response packet with the destination assumed to be the TCP 2003, and transmits it because this packet is a response packet to the request for establishing the TCP session. Further, it notifies completion of a connection of the TCP session with the TCP 2003 to the SSL 3002.

The SSL 3002 receives the connection completion notification from the TCP 3003, and transmits a packet (SSL session establishment request packet) for requesting the session establishment according to the SSL protocol for a purpose of establishing the SSL session with the SSL 2002.

The SSL session establishment request packet, which is received in the TCP 3003, goes through the TCP session established between the TCP 3003 and the TCP 2003, and arrives at the TCP 2003 through the NIC 301, the HUB 32, the Firewall 33, the HUB 22, and NIC 201.

The TCP 2003 transfers the packet to the SSL 2002.

The SSL 2002 verifies the content of the SSL session establishment request, notifies establishment of the session with the SSL 3002 to the gateway application 2001A if it were not for a problem, and simultaneously therewith, transmits an SSL session establishment response packet to the SSL 3002 according to the SSL protocol.

The SSL session establishment response packet arrives at the SSL 3002 through the path opposite to that of the SSL session establishment request packet, i.e. the TCP session between the TCP 2003 and the TCP 3003.

The SSL 2002 loads the secret key of the SSL 2002, the public key of the SSL 3002, and the key common to the SSL 2002 and the SSL 3002, the IP address (IP address of the gateway device 30) of a partner apparatus of the SSL session, the destination port (port of the TCP 3003) of a partner apparatus of the SSL session, the transmission source port number (port number of the TCP 2003) of the SSL session of its own node side, the transmission source IP address (IP address of the gateway device 20), and the start command into the control frame, and transmits the control frame to the virtual NIC 2010.

The control frame, which is output from the SSL 2002, arrives at the processing speed acceleration engine Y2014 through the virtual NIC 2010, the driver 2009, the bridge 2008, the driver 2007, and the MAC 2111.

The processing speed acceleration engine Y2014 identifies the control frame by use of the MAC address etc., and receives it in the control frame transmitter/receiver. And, it preserves the public key, the secret key, and the common key, respectively, for a purpose of using them in the decoding and the encryption, and preserves the IP address or the port number for a purpose of analyzing the frame. And upon receipt of a processing speed acceleration process start command, it starts the processes of the frame analysis, the encryption, and the decoding.

The SSL 3002 verifies the content of the SSL session establishment response according to the SSL protocol, and notifies establishment of the SSL session between the SSL 3002 and the SSL 2002 to the gateway application 3001A if it were not for a problem.

The SSL 3002 notifies the secret key of the SSL 3002, the public key of the SSL 2002, and the common key to the SSL 3002 and the SSL 2002, the IP address (IP address of the gateway device 20) of a partner apparatus of the SSL session, the destination port (port of the TCP 2003) of a partner apparatus of the SSL session, the transmission source port number (port number of the TCP 3003) of the SSL session of its own node side, the transmission source IP address (IP address of the gateway device 30), and the start command to the intermediate driver Y3006.

The intermediate driver Y3006 preserves each of the public key, the secret key, and the common key notified from the SSL 3002 for a purpose of using them in the decoding and the encryption, and preserves the IP address or the port number for a purpose of analyzing the frame. And upon receipt of a processing speed acceleration process start command, it starts the processes of the frame analysis, the encryption, and the decoding.

As mentioned above, the SSL session is established between the SSL 2002 and the SSL 3002.

Above, in the ninth embodiment, the operation in the case of establishing the SSL session (secure TCP session) from the gateway device 30 to the gateway device 20 is completed.

[An Operation of Transferring the Frame from the Terminal 21 to the Server 31]

The case of transferring the frame from the terminal 21 to the server 31 in the ninth embodiment will be exemplified to explain the operation by employing FIG. 26.

At this moment, it is assumed that the bridge 2008, the bridge 3008, the HUB 22 and the HUB 32 have already learned the MAC addresses of the terminal 21, the server 31, the firewall 33, the gateway device 20, and the gateway device 30.

Further, it is assumed that the Firewall 33 permits communication between the gateway device 20 and the gateway device 30 in a bi-direction, and interrupts direct communication between the terminal 21 and the server 31, which does not go through the gateway device 20 or the gateway device 30, in a bi-direction.

Further, it is assumed that the SSL session (secure TCP session) from the gateway device 30 to the gateway device 20 has already established according to the foregoing operational example.

Further, it is assumed that the TCP session has been already constructed between the application 2101 within the terminal 21 and the application 3101 within the server 31.

The application 2101 within the terminal 21 delivers data addressed to the application 3101 within the server 31 to the TCP 2102.

The TCP 2102 receives the data from the application 2101, attaches the TCP header (F23 in FIG. 2) or the IP header (F22 in FIG. 2) according to the TCP protocol, thereby to convert it into an IP packet, and delivers it to the IP routing 2103. At this time, the IP address of the server 31 is set to the IP DA within the LAN IP F22, and the IP address of the terminal 21 to the IP SA within the LAN IP F22.

The IP routing 2103 makes a reference to the destination IP address (addressed to the server 31) and the destination port (addressed to the TCP 3102) of the packet received from the TCP 2102, and transfers the data to the IP stack 2104 as it stands.

The IP stack 2104 receives the packet from the IP routing 2103, attaches the MAC header (F21 in FIG. 2), thereby to prepare an Ethernet frame, and delivers it to the driver 2105. This frame has a format of the Ethernet frame F20. At this time, it makes a reference to a result of the ARP, and sets the MAC address of the server 31 to the MAC DA within the LAN MAC F21 of the frame, and the MAC address of the terminal 21 to the MAC SA within the LAN MAC F21.

The driver 2105 receives the above-mentioned frame from the IP stack 2105, and transfers it to the NIC 211.

The NIC 211 receives the frame from the driver 2105, and transfers it to the HUB 22 through the MAC 2111, the PHY 2112, and the port 2113.

Upon receipt of the frame from the port of the NIC 211 side of the terminal 21, the HUB 22 makes a reference to the MAC DA within F21, and outputs this frame to the port of the gateway device 20 side as it stands based upon a result of learning the past routing because the MAC DA is an MAC address of the server 31.

The gateway device 20 receives the frame transmitted by the HUB 22 in the port 2013, and delivers it to the bridge 2008 through the PHY 2012, the MAC 2011, and the driver 2007.

The bridge 2008 makes a reference to the MAC DA that exists within the header F21 within the formatted frame (having the frame format F20 format) received from the driver 2007, and transfers the frame to the driver 2009 because the MAC DA is an MAC address of the server 31, and is not an MAC address of the gateway device 20.

The frame transmitted from the bridge 2008 is transferred to the gateway application 2001A through the driver 2009, and the virtual NIC 2010.

The gateway application 2001A allows the frame received from the virtual NIC 2010 to flow to the SSL session established between the gateway application 2001A and the gateway application 3001A.

That is, the gateway application 2001A delivers the Ethernet frame (having the frame format F20) received from the virtual NIC 2010 as data to the SSL 2002.

Upon receipt of the not-encrypted data F14 (F21 to F24) from the gateway application 2001A, the SSL 2002 transfers it to the TCP 2003 as it stands without performing the encryption process.

The TCP 2003 receives the data F14 from the SSL 2002, attaches the TCP header F13 and the IP header F12, and delivers it to the IP routing 2004.

Herein, the IP address of the gateway device 30 is set to the IP DA within F12, and the IP address of the gateway device 20 is set to the IP SA within F12. Further, the port of the TCP 3003 is set to the destination port, and the port of the TCP 2003 is designated as the transmission source port.

The IP routing 2004 makes a reference to the IP address etc. within the IP header F12 of the data received from the TCP 2003, and transfers the frame to the IP stack 2005.

The IP stack 2005 receives the frame from the IP routing 2004, attaches the MAC header F11 to the frame, thereby to convert it into a formatted frame having the Ether-over-SSL frame format F10, and delivers it to the bridge 2008.

Herein, from a result of the ARP, the MAC address of the WAN side of the Firewall 33 is set to the MAC DA within F11, and the MAC address of the gateway device 20 to the MAC SA within F11.

The frame transmitted from the IP stack 2005 is sent to the processing speed acceleration engine Y2014 through the bridge 2008, the driver 2007, and the MAC 2011.

The processing speed acceleration engine Y2014 receives the frame in the interface 2014C, determines in the frame analysis Y2014D that the received frame is a frame of the SSL session pre-notified from the SSL 2002, and encrypts the data F14. And, it transfers the frame to the PHY 2012 through the multiplexer 2014F. At this time, it does not make an alteration to the headers F11 to F13 of the frame.

The frame output from the processing speed acceleration engine Y2014 is sent to the HUB 22 through the PHY 2012 and the port 2013.

Upon receipt of the frame from the port of the gateway device 22 side, the HUB 22 makes a reference to the MAC DA within F11, and outputs this frame to the Firewall 33 as it stands based upon a result of learning the past routing because the MAC DA is an MAC address of the WAN side of the Firewall 33.

The Firewall 33 receives the frame transmitted by the HUB 22, makes a reference to the IP DA, thereby to change the MAC header F11, and transfers the received frame with a form of the frame format F10 unchanged to the HUB 32.

Herein, the MAC address of the gateway device 30 is set to the MAC DA within F11, and the MAC address of the LAN side of the Firewall 33 to the MAC SA within F11.

Upon receipt of the frame from the Firewall 33, the HUB 32 makes a reference to the MAC DA within F11, and outputs this frame to the port of the gateway device 30 side as it stands based upon a result of learning the past routing because the MAC DA is an MAC address of the gateway device 30.

Upon receipt of the frame transmitted by the HUB 32 in the port 3013, the gateway device 30 transfers it to the intermediate driver Y3006 through the PHY 3012, the MAC 3011, the driver 3007, and the bridge 3008.

The intermediate driver Y3006 receives the frame from the bridge 3008, determines in the frame analysis Y3006D that the received frame is a frame of the SSL session pre-notified from the SSL 3002, and decodes the data F14. And, after undoing the encryption of the data F14 with the decoding process, it transfers the frame to the IP stack 3005 through the multiplexer Y3006F. At this time, it does not make an alteration to the headers F11 to F13 of the frame.

IP stack 3005 removes the MAC header F11 of the frame received from the intermediate driver Y3006, and transfers the frame to the IP routing 3004.

The IP routing 3004 makes a reference to the IP DA within the header F12 and the destination port number within F13 of the received frame, and transfers the frame to the TCP 3003.

Upon receipt of the frame from the IP routing 3004, the TCP 3003 performs the process of sending back an ACK packet, or the like according to the TCP protocol. And, it removes the TCP header F13 and the IP header F12 from the received frame, and transfers data F14 to the SSL 3002.

Upon receipt of the data F14 from the TCP 3003, the SSL 3002 transfers it to the gateway application 3001A as it stands without performing the process such as the decoding.

Upon receipt of the frame F20 from the SSL 3002, the gateway application 3001A allows this frame to flow to the virtual NIC 3010 as it stands.

This frame keeps the state at the time of having been transmitted from the terminal 21 to the HUB 22 as it stands, in which the MAC address of the server 31 has been set to the MAC DA within the LAN MAC F21, and the MAC address of the terminal 21 to the MAC SA within the LAN MAC F21. Further, the IP address of the server 31 has been set to the IP DA within the LAN IP F22, and the IP address of the terminal 21 to the IP SA within the LAN IP F22.

The frame delivered to the virtual NIC 3010 from the gateway application 3001A is transferred to the HUB 32 through the driver 3009, the bridge 3008, and the NIC 301.

Upon receipt of the frame from the port of the gateway device 30 side, the HUB 32 makes a reference to the MAC DA within F12, and outputs this frame to the port of the server 31 side based upon a result of learning the past routing because the MAC DA is an MAC address of the server 31.

The server 31 receives the frame transmitted by the HUB 32, and delivers the data F24 within the frame to the application 3101 through the driver 3105, the IP stack 3104, the IP routing 3103, and the TCP 3102.

As mentioned above, a series of the frame transfer from the application 2101 within the terminal 21 to the application 3101 within the server 31 is completed.

A series of the frame transfer from the application 3101 within the server 31 to the application 2101 within the terminal 21 also can be realized similarly by tracing the path opposite to that of the above-mentioned example.

In this embodiment, an example was shown of packaging the processing speed acceleration engine in the gateway device 20 side, and packaging the intermediate driver in the gateway device 30 side; however, contrarily hereto, it is also possible to package the processing speed acceleration engine in the gateway device 30 side and to package the intermediate driver in the gateway device 20 side. Further, a configuration also can be made so that the processing speed acceleration engine is packaged in both of the gateway device 20 side and the gateway device 30 side, and no intermediate driver is used at all. Moreover, a configuration also can be made so that the intermediate driver is packaged in both of the gateway device 20 side and the gateway device 30 side, and no processing speed acceleration engine is used. Moreover, it is also possible to exchange the installation location of the server 31 for that of the terminal 21 in this embodiment.

[Effects of the Invention]

Next, effects of this embodiment will be explained. Utilizing the invention listed in this embodiment enables a high-speed transfer of the frame between the terminal 21 and the server 31.

The reason is that the encryption and the decoding of the data that is used in employing the SSL session to make communication are hardware-processed in the gateway device 20, thereby allowing the SSL process to be performed at a high speed.

Further, utilizing the invention listed in this embodiment enables the cost for developing the hardware (processing speed acceleration engine) for the processing speed acceleration process and the cost for members to be suppressed at a relatively low level.

Further, the reason is that the hardware for the processing speed acceleration process (processing speed acceleration engine) can be packaged into the relatively inexpensive interface between the MAC and the PHY.

Further, the reason is that it is possible to leave the TCP process, which is difficult to package into the hardware, to the software, and to hardware-process only the encryption/decoding, which is relatively easy to package into the hardware and yet has a large effect upon the processing speed acceleration process.

[Tenth Embodiment]

The tenth embodiment of the present invention differs from the ninth embodiment in a point that the process within the gateway device 20 is performed in an intermediate driver Z2106 mounted within the terminal 21. Further, a configuration is made so that the HUB 22 and the HUB 33 are disused because the gateway device 20 and the gateway device 30 do not exist, the terminal 21 and the WAN side of the Firewall 33 are directly connected, and the server 31 and the LAN side of the Firewall 33 as well are directly connected.

Further, the tenth embodiment as well, similarly to the ninth embodiment, is configured to specialize in performing the encryption and decoding process of the data, which is used in employing the SSL session to make communication, at a high speed without taking a countermeasure to the TCP-over-TCP problem.

In the tenth embodiment, not only a closed LAN but also an open WAN such as Internet may be employed for the intranet 2.

[Explanation of a Configuration]

Figure 29:
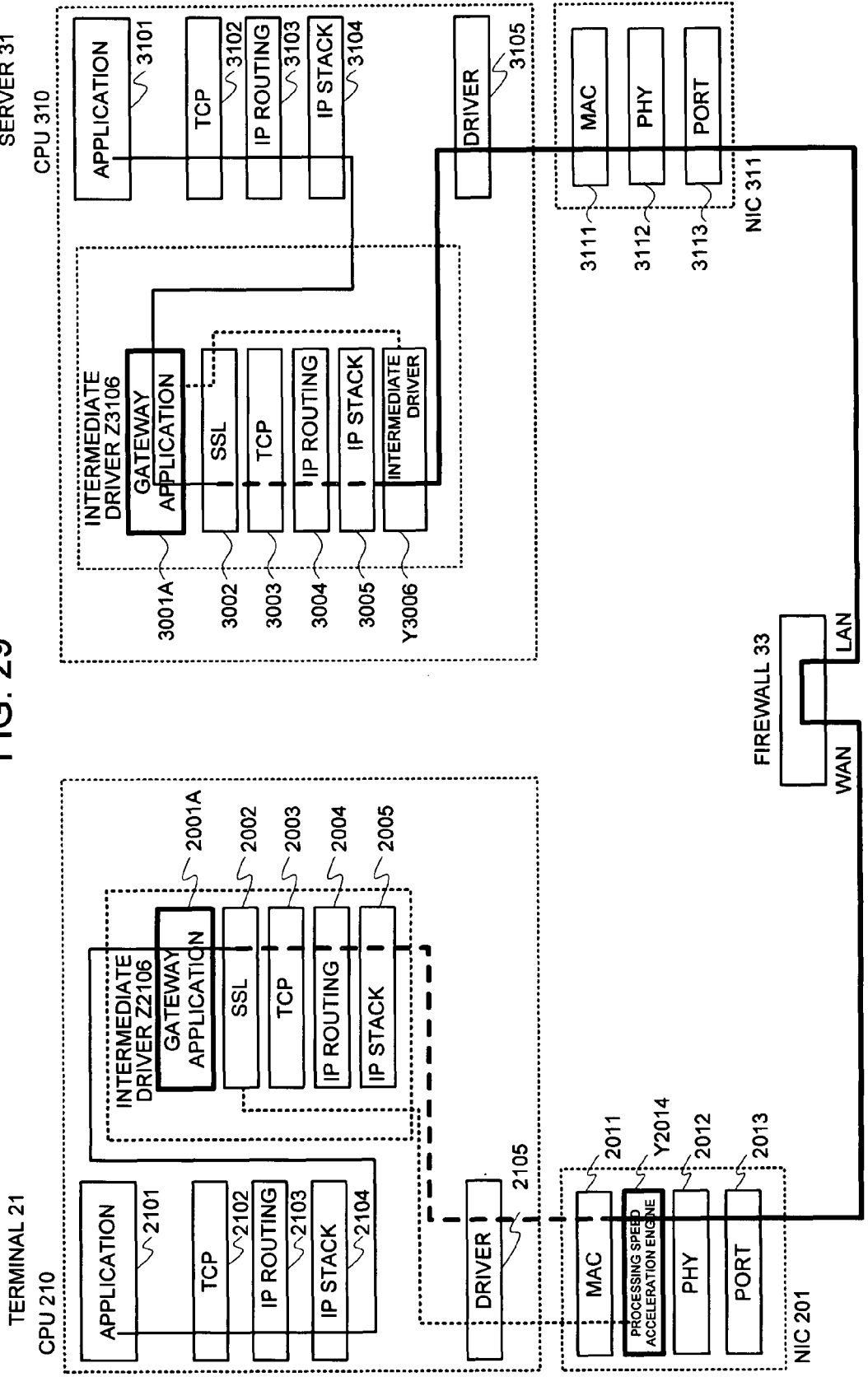
FIG. 29 is a block diagram illustrating a network configuration and a communication path in a tenth embodiment of the present invention.

FIG. 29 is a block diagram having a configuration of each apparatus and a transfer path of the frame in the tenth embodiment shown in details.

The terminal 21 differs from the terminal 21 in the ninth embodiment in a point that an intermediate driver Z2106 is additionally mounted, and in a point of performing an operation similar to that of the gateway device 20 in the intermediate driver Z2106. Further, it differs in a point the NIC 211 that exists within the gateway device 20 in the ninth embodiment is changed to an NIC 201.

The intermediate driver Z2106 is configured of a gateway application 2001A, an SSL 2002, a TCP 2003, an IP routing 2004, and an IP stack 2005. Each of the above-mentioned components has a configuration similar to each of the gateway application 2001A, the SSL 2002, the TCP 2003, the IP routing 2004, and the IP stack 2005 within the gateway device 20 of the ninth embodiment, and performs a similar operation.

The NIC 201 has a configuration similar to that of the NIC 201 within the gateway device 20 of the ninth embodiment, and performs a similar operation.

The server 31 differs from the server 31 in the ninth embodiment in a point that an intermediate driver Z3106 is additionally mounted, and in a point of performing an operation similar to that of the gateway device 30 in the intermediate driver Z3106.

The intermediate driver Z3106 is configured of a gateway application 3001A, an SSL 3002, a TCP 3003, an IP routing 3004, an IP stack 3005, and an intermediate driver Y3006. Each of the above-mentioned components has a configuration similar to that of each of the gateway application 3001A, the SSL 3002, the TCP 3003, the IP routing 3004, the IP stack 3005, and the intermediate driver Y3006 within the gateway device 30 in the ninth embodiment, and performs a similar operation.

The Firewall 33 has a configuration similar to that of the Firewall 33 of the ninth embodiment, and performs a similar operation. However, in this embodiment, a NAT router or a Proxy server may be employed instead of the Firewall 33.

Also in the tenth embodiment, similarly to the other embodiments, only in the case that the SSL session has been pre-established between the gateway device 20 and the gateway device 30, an access to the apparatus within the intranet 3 from the apparatus in the intranet 2 is enabled.

[Explanation of an Operation]

[An Operation of Establishing the SSL Session]

The case of establishing the SSL session (secure TCP session) from the server 31 30 to the terminal 21 in the tenth embodiment will be exemplified to explain the operation by employing FIG. 29.

At this moment, it is assumed that the Firewall 33 permits communication between the IP stack 2005 of the terminal 21 and the IP stack 3005 of the server 31 in a bi-direction, and interrupts direct communication between the terminal 21 and the server 31, which does not go through the IP stack 2005 or the IP stack 3005, in a bi-direction.

The gateway application 3001A within the server 31 receives a request for making a connection to the gateway application 2001A within the terminal 21 from a user, and instructs the SSL 3002 to start communication with the gateway application 2001A within the terminal 21.

The SSL 3002 receives the communication start instruction from the gateway application 3001A, and instructs the TCP 3003 to start communication with the gateway application 2001A within the terminal 21 for a purpose of establishing the SSL session with SSL 2002.

The TCP 3003 receives the communication start instruction from the SSL 3002, generates a session establishment request packet that is in line with the TCP specification in order to transmit a packet (SYN) for requesting establishment of the TCP session with the TCP 2003 to the IP routing 3004 for a purpose of establishing the TCP session with the TCP 2003. In this packet, the IP stack 2004 side of the terminal 21 has been set as a destination IP address, and the TCP 2003 has been set to the destination port number.

The IP routing 3004 makes a reference to the destination IP address and the destination port number of the packet received from the TCP 3003, and transfers the packet to the IP stack 3005.

The IP stack 3005 adds the MAC address of the intranet 3 side within the Firewall 33 to the packet received from the IP routing 3004 as a destination MAC address, further sets the MAC address of its own node to the transmission source MAC address, thereby to generate a frame, and transfers it to the intermediate driver Y3006.

The intermediate driver Y3006 receives the frame from the IP stack 3005, and makes a header analysis. As a result of the analysis, the frame is not a frame that needs to be encrypted, whereby it transfers this frame to the driver 3105 as it stands.

The driver 3105 receives the frame from the intermediate driver Y3006, and transfers it the MAC 3111.

The MAC 3111 receives the frame from the driver 3105, and transfers it the PHY 3112.

The PHY 3112 receives the frame from the MAC 3111, and transfers it the port 3113.

The port 3113 receives the frame from the PHY 3112, and transfers it to the Firewall 33 through the Ethernet cable.

The Firewall 33 receives the frame from the server 31, permits this for a purpose of communication from the server 31 to the terminal 21, and transfers it to the terminal 21.

The terminal 21 receives the frame from the Firewall 33, and transfers it to the IP stack 2005 through the path of the port 2013, the PHY 2012, the processing speed acceleration engine Y2014, the MAC 2011, and the driver 2105. At this time, the processing speed acceleration engine Y2014 allows the frame received from the PHY to flow to the MAC as it stands.

The IP stack 2005 receives the packet from the bridge 2008, removes the MAC header, thereby to convert it into a packet, and transfers it to the IP routing 2004.

The IP routing 2004 makes a reference to the destination port number of the packet received from the IP stack 2005, and transfers this packet to the TCP 2003 because the port number of the TCP 2003 side has been added.

The TCP 2003 receives the packet from the IP routing 2004. It generates a response packet (SYN+ACK) to the TCP session establishment request addressed to the TCP 3003 according to the TCP protocol and transmits it because this packet is a TCP session establishment request packet (SYN). That is, the IP address of the IP stack 3005 of the server 31 is set to the destination IP of the response packet, and the port number of the TCP 3003 to the destination port thereof.

The response packet arrives at the CPU 310 through the IP routing 2004, the IP stack 2005, the driver 2105, the NIC 201, the Firewall 33, and the NIC 311, and further arrives at the TCP 3003 through the driver 3105, the IP stack 3005, and the IP routing 3004.

The TCP 3003 receives the response packet from the IP routing 3004. It transmits an ACK packet of this response packet to the TCP 2003 because this packet is a response packet to the request for establishing the TCP session. In addition hereto, the TCP 3003 notifies completion of a connection of the TCP session with the TCP 2003 to the SSL 3002.

The SSL 3002 receives the connection completion notification from the TCP 3003, and transmits a packet (SSL session establishment request packet) for requesting the session establishment according to the SSL protocol for a purpose of establishing the SSL session with the SSL 2002.

The SSL session establishment request packet, which is received in the TCP 3003, goes through the TCP session established between the TCP 3003 and the TCP 2003, and arrives at the TCP 2003 through the NIC 311, the Firewall 33, and NIC 201.

The TCP 2003 transfers the SSL session establishment request packet to the SSL 2002.

The SSL 2002 verifies the content of the SSL session establishment request, notifies establishment of the session with the SSL 3002 to the gateway application 2001A if it were not for a problem, and simultaneously therewith, transmits an SSL session establishment response packet to the SSL 3002 according to the SSL protocol.

The SSL session establishment response packet arrives at the SSL 3002 through the path opposite to that of the SSL session establishment request packet, i.e. the TCP session between the TCP 2003 and the TCP 3003.

The SSL 2002 loads the secret key of the SSL 2002, the public key of the SSL 3002, and the common key to the SSL 2002 and the SSL 3002, the IP address (IP address of the IP routing 3004 side of the server 31) of a partner apparatus of the SSL session, the destination port (port of the TCP 3003) of a partner apparatus of the SSL session, the transmission source port number (port number of the TCP 2003) of the SSL session of its own node side, the transmission source IP address (IP address of the IP routing 2004 side of the terminal 21), and the start command into the control frame, and transmits the control frame to the processing speed acceleration engine Y2014.

The control frame, which is output from the SSL 2002, arrives at the processing speed acceleration engine Y2014 through the driver 2105 and the MAC 2011.

The processing speed acceleration engine Y2014 identifies the control frame by use of the MAC address etc., and receives it in the control frame transmitter/receiver. And, it preserves the public key, the secret key, and the common key, respectively, for a purpose of using them in the decoding and the encryption, and preserves the IP address or the port number for a purpose of analyzing the frame. And upon receipt of a processing speed acceleration process start command, it starts the processes of the frame analysis, the encryption, and the decoding.

The SSL 3002 verifies the content of the SSL session establishment response according to the SSL protocol, and notifies establishment of the SSL session between the SSL 3002 and the SSL 2002 to the gateway application 3001A if it were not a problem.

Further, the SSL 3002 notifies the secret key of the SSL 3002, the public key of the SSL 2002 and the common key to the SSL 3002 and the SSL 2022, the IP address (IP address of the terminal 21) of a partner apparatus of the SSL session, the destination port (port of the TCP 2003) of a partner apparatus of the SSL session, the transmission source port number (port number of the TCP 3003) of the SSL session of its own node side, the transmission source IP address (IP address of the server 31), and the start command to the intermediate driver Y3006.

The intermediate driver Y3006 preserves each of the public key, the secret key, and the common key notified from the SSL 3002 for a purpose of using them in the decoding or the encryption, and preserves the IP address or the port number for a purpose of analyzing the frame. And upon receipt of a processing speed acceleration process start command, it starts the processes of the frame analysis, the encryption, and the decoding.

As mentioned above, the SSL session is established between the SSL 2002 and the SSL 3002.

Above, in the tenth embodiment, the operation in the case of establishing the SSL session (secure TCP session) from the server 31 to the terminal 21 is completed.

[An Operation of Transferring the Frame from the Terminal 21 to the Server 31]

The case of transferring the frame from the terminal 21 to the server 31 in the tenth embodiment will be exemplified to explain the operation by employing FIG. 29.

At this moment, it is assumed that the Firewall 33 permits communication between the IP stack 2005 of the terminal 21 and the IP stack 3005 of the server 31 in a bi-direction, and interrupts direct communication between the terminal 21 and the server 31, which does not go through the IP stack 2005 or the IP stack 3005, in a bi-direction.

Further, it is assumed that the SSL session (secure TCP session) from the server 31 to the terminal 21 has already established according to the foregoing operational example.

Further, it is assumed that the TCP session has been already constructed between the application 2101 within the terminal 21 and the application 3101 within the server 31.

The application 2101 within the terminal 21 delivers data addressed to the application 3101 within the server 31 to the TCP 2102.

The TCP 2102 receives the data from the application 2101, attaches the TCP header (F23 in FIG. 2) or the IP header (F22 in FIG. 2) according to the TCP protocol, thereby to convert it into an IP packet, and delivers it to the IP routing 2103. At this time, the IP address of IP stack 3104 of the server 31 is set to the IP DA within the LAN IP F22, and the IP address of the IP stack 2104 of the terminal 21 to the IP SA within the LAN IP F22.

The IP routing 2103 makes a reference to the destination IP address (addressed to the server 31) and the destination port (addressed to the TCP 3102) of the packet received from the TCP 2102, and transfers the data to the IP stack 2104 as it stands.

The IP stack 2104 receives the packet from the IP routing 2103, attaches the MAC header (F21 in FIG. 2), thereby to generate an Ethernet frame, and delivers it to the intermediate driver Z2106. This frame has a format of the Ethernet frame F20. At this time, the IP stack 2104 makes a reference to a result of the ARP, and sets the MAC address of the server 31 to the MAC DA within the LAN MAC F21 of the frame, and the MAC address of the terminal 21 to the MAC SA within the LAN MAC F21.

The gateway application 2001A within the intermediate driver Z2106 allows the frame received from the IP stack 2104 to flow to the SSL session established between the gateway application 2001A and the gateway application 3001A.

That is, the gateway application 2001A delivers the Ethernet frame (having the frame format F20) received from the IP stack 2104 as data to the SSL 2002.

Upon receipt of the not-encrypted data F14 (F21 to F24) from the gateway application 2001A, the SSL 2002 transfers it to the TCP 2003 as it stands without performing the encryption process.

The TCP 2003 receives the data F14 from the SSL 2002, attaches the TCP header F13 and the IP header F12, and delivers it to the IP routing 2004.

Herein, the IP address of the IP stack 3005 of the server 31 is set to the IP DA within F12, and the IP address of the IP stack 2005 of the terminal 21 is set to the IP SA within F12. Further, the port of the TCP 3003 is set to the destination port, and the port of the TCP 2003 is designated as the transmission source port.

The IP routing 2004 makes a reference to the IP address etc. within the IP header F12 of the data received from the TCP 2003, and transfers the frame to the IP stack 2005.

The IP stack 2005 receives the frame from the IP routing 2004, attaches the MAC header F11 to the frame, thereby to convert it into a formatted frame having the Ether-over-SSL frame format F10, and delivers it to the driver 2105.

Herein, from a result of the ARP, the MAC address of the WAN side of the Firewall 33 is set to the MAC DA within F11, and the MAC address of the terminal 21 to the MAC SA within F11.

The frame transmitted from the IP stack 2005 is sent to the processing speed acceleration engine Y2014 through the driver 2105 and the MAC 2011.

The processing speed acceleration engine Y2014 receives the frame in the interface 2014C, determines in the frame analysis Y2014D that the received frame is a frame of the SSL session pre-notified from the SSL 2002, and encrypts the data F14. And, it transfers it to the PHY 2012 through the multiplexer 2014F. At this time, it does not make an alteration to the headers F11 to F13 of the frame.

The frame output from the processing speed acceleration engine Y2014 is sent to the Firewall 33 through the PHY 2012 and the port 2013.

The Firewall 33 receives the frame transmitted by the terminal 21, makes a reference to the IP DA, thereby to change the MAC header F11, and transfers the received frame with a form of the frame format F10 unchanged to the server 31.

Herein, the MAC address of the server 31 is set to the MAC DA within F11, and the MAC address of the LAN side of the Firewall 33 to the MAC SA within F11.

Upon receipt of the frame transmitted by the Firewall 33 in the port 3113, the server 31 transfers it to the intermediate driver Y3006 within the intermediate driver Z3106 through the PHY 3112, the MAC 3111, and the driver 3105.

The intermediate driver Y3006 receives the frame from the driver 3105, determines in the frame analysis Y3006D that the received frame is a frame of the SSL session pre-notified from the SSL 3002, and decodes the data F14. And, after undoing the encryption of the data F14 with the decoding process, it transfers it to the IP stack 3005 through the multiplexer Y3006F. At this time, it does not make an alteration to the headers F11 to F13 of the frame.

IP stack 3005 removes the MAC header F11 of the frame received from the intermediate driver Y3006, and transfers the frame to the IP routing 3004.

The IP routing 3004 makes a reference to the IP DA within the header F12 and the destination port number within F13 of the received frame, and transfers the frame to the TCP 3003.

Upon receipt of the frame from the IP routing 3004, the TCP 3003 performs the process of sending back an ACK packet, or the like according to the TCP protocol. And, it removes the TCP header F13 and the IP header F12 from the received frame, and transfers data F14 to the SSL 3002.

Upon receipt of the data F14 from the TCP 3003, the SSL 3002 transfers it to the gateway application 3001A as it stands without performing the process such as the decoding.

Upon receipt of the frame F20 from the SSL 3002, the gateway application 3001A allows this frame to flow to the IP stack 3104 as it stands.

The frame sent out from the gateway application 3001A is transferred through the IP stack 3104, the IP routing 3103, and the TCP 3102, and the data F24 within the frame is delivered to the application 3101.

As mentioned above, a series of the frame transfer from the application 2101 within the terminal 21 to the application 3101 within the server 31 is completed.

A series of the frame transfer from the application 3101 within the server 31 to the application 2101 within the terminal 21 also can be realized similarly by tracing the path opposite to that of the above-mentioned example.

In this embodiment, an example was shown of packaging the intermediate driver and the processing speed acceleration engine in the terminal 21 side and packaging the intermediate driver in the server 31 side; however, contrarily hereto, it is also possible to package the intermediate driver and the processing speed acceleration engine in the server 31 side and to package the intermediate driver in the terminal 21 side.

Further, it is also possible to package the processing speed acceleration engines in both of the terminal 21 side and the server 31 side. In addition hereto, a configuration also can be made so that the intermediate drivers is packaged in both of the terminal 21 side and the server 31 side and the processing speed acceleration engine is not used. In addition hereto, it is also possible to exchange the installation location of the server 31 for that of the terminal 21 in this embodiment.

[Effects of the Invention]

Next, effects of this embodiment will be explained.

Utilizing the invention listed in this embodiment enables a high-speed transfer of the frame between the terminal 21 and the server 31.

The reason is that the encryption and the decoding are hardware-processed in the terminal 21, thereby allowing the SSL process to be performed at a high speed.

Further, utilizing the invention listed in this embodiment enables the cost for developing the hardware (processing speed acceleration engine) for the processing speed acceleration process and the cost for members to be suppressed at a relatively low level.

Further, the reason is that the hardware for the processing speed acceleration process (processing speed acceleration engine) can be packaged into the relatively inexpensive interface between the MAC and the PHY.

Further, the reason is that it is possible to leave the TCP process, which is difficult to package into the hardware, to the software, and to hardware-process only the encryption/decoding, which is relatively easy to package into the hardware and yet has a large effect upon the processing speed acceleration process.

[Eleventh Embodiment]

The eleventh embodiment of the present invention differs from the third embodiment shown in FIG. 19 in a point that a UDP 2003 is mounted instead of the TCP 2003 in the gateway device 20, the intermediate driver 2006 is discarded, and a bridge 2008, a driver 2009, and a virtual NIC 2010 are mounted instead thereof. Further, a UDP 3003 is mounted instead of the TCP 3003 also in the gateway device 30, and the intermediate driver 3006 is discarded. Further, the control frame is prepared not in the intermediate driver but in the processing speed acceleration engine, and is transmitted by using the virtual NIC and the bridge.

A configuration and an operation of the terminal 21, the server 31, HUB 22, the HUB 32, the intranet 2, and the intranet 3 in the eleventh embodiment are identical to that of the third embodiment.

In the eleventh embodiment, not only a closed LAN but also an open WAN such as Internet may be employed for the intranet 2.

[Explanation of a Configuration]

Figure 30:
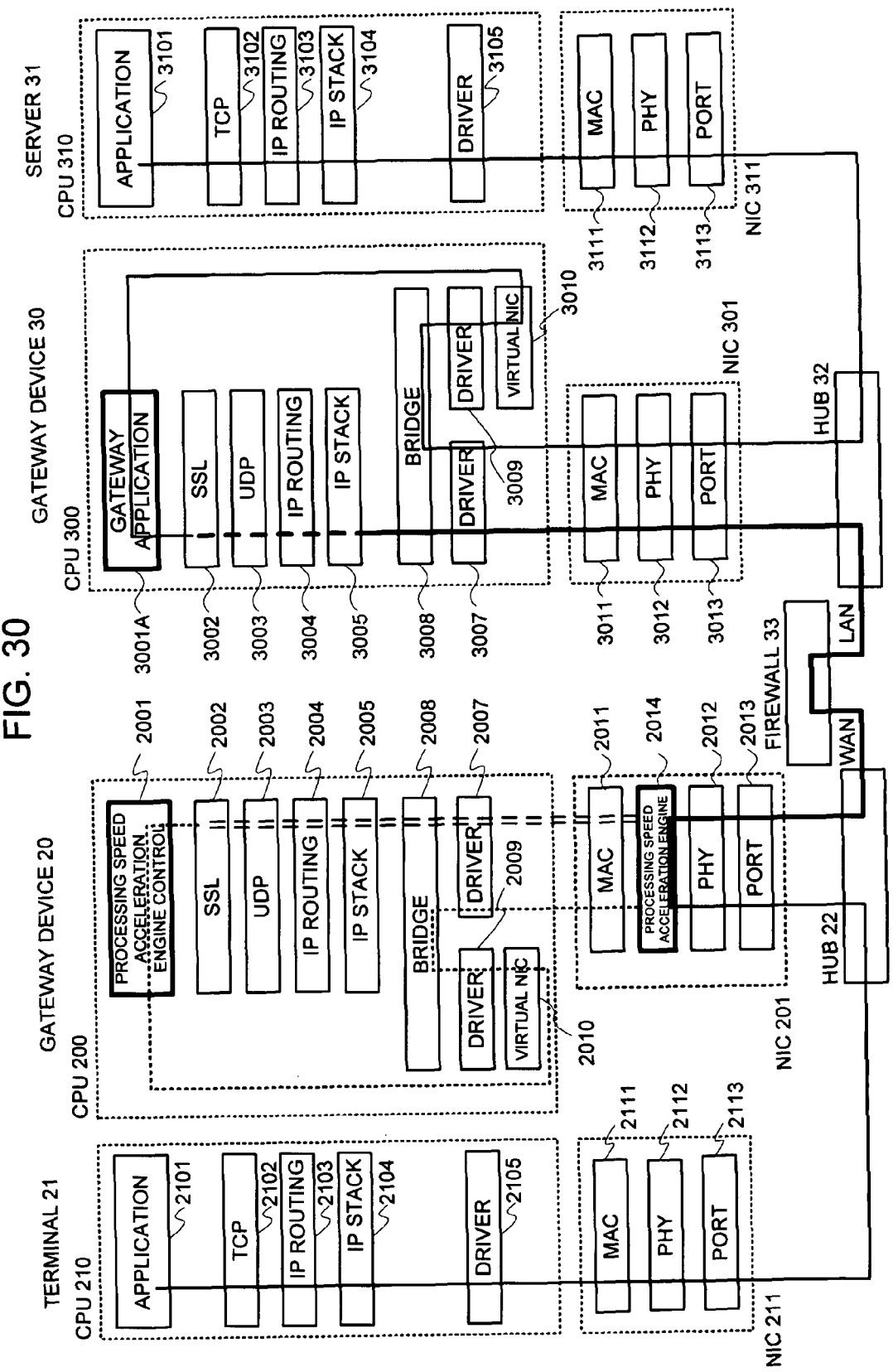
FIG. 30 is a block diagram illustrating a network configuration and a communication path in an eleventh embodiment of the present invention.

FIG. 30 is a block diagram having a configuration of each apparatus and a transfer path of the frame in the eleventh embodiment shown in details.

The gateway device 20 differs from the gateway device 20 in the third embodiment in a point that the UDP 2003 is mounted instead of the TCP 2003, the intermediate driver is discarded, and the bridge 2008, the driver 2009, and the virtual NIC 2010 are mounted instead thereof.

Each of the bridge 2008, the driver 2009, and the virtual NIC 2010 has a configuration similar to that of each of the bridge 3008, the driver 3009, and the virtual NIC 3010 of the third embodiment, and performs a similar operation.

The UDP 2003 has the function of the TCP 2003 except for the congestion control and the re-sending control.

The processing speed acceleration engine control 2001 has not only the function of the processing speed acceleration engine control 2001 in the third embodiment but also the function relating to transmission/reception of the control frame within the intermediate driver 2006 in the third embodiment.

The gateway device 30 differs from the gateway device 30 in the third embodiment in a point that the UDP 3003 is mounted instead of the TCP 3003, and the intermediate driver 3006 is discarded.

The UDP 3003 is similar to the UDP 2003 within the gateway device 20 in this embodiment.

In the eleventh embodiment, only in the case that the SSL session has been pre-established between the gateway device 20 and the gateway device 30, an access to the apparatus within the intranet 3 from the apparatus in the intranet 2 is enabled.

[Explanation of an Operation]
[An Operation of Establishing the SSL Session]

The case of establishing the SSL session (secure TCP session) from the gateway device 30 to the gateway device 20 in the eleventh embodiment will be exemplified to explain the operation by employing FIG. 30.

At this moment, it is assumed that the bridge 2008, the bridge 3008, the HUB 22 and the HUB 32 have already learned the MAC addresses of the terminal 21, the server 31, the WAN side of the Firewall 33, the LAN side of the firewall 33, the gateway device 20, and the gateway device 30.

Further, it is assumed that the Firewall 33 permits communication between the gateway device 20 and the gateway device 30 in a bi-direction, and interrupts direct communication between the terminal 21 and the server 31, which does not go through the gateway device 20 or the gateway device 30, in a bi-direction.

The gateway application 3001A within the gateway device 30 receives a request for making a connection to the processing speed acceleration engine control 2001 within the gateway device 20 from a user, and instructs the SSL 3002 to start communication with the processing speed acceleration engine control 2001 within the gateway device 20. Simultaneously, it notifies a start of communication with the processing speed acceleration engine control 2001 within the gateway device 20 to the intermediate driver 3006. The IP address of the gateway device 20, the port number of the processing speed acceleration engine control 2001, the transmission source port number of the gateway application 3001A, and further the IP address of the gateway device 30 are included in this notification.

The SSL 3002 receives the communication start instruction from the gateway application 3001A, and instructs the UDP 3003 to start communication with the processing speed acceleration engine control 2001 within the gateway device 20 for a purpose of establishing the SSL session with the SSL 2002.

The UDP 3003 receives the communication start instruction from the SSL 3002, and transmits a packet necessary for establishing the session with the UDP 2003 to the IP routing 3004 for a purpose of establishing the TCP session with the UDP 2003. This packet is a packet in line with the UDP specification, in which the gateway device 20 has been set to the destination IP address, and the UDP 2003 to the destination port number.

The IP routing 3004 makes a reference to the destination IP address and the destination port number of the packet received from the UDP 3003, and transfers the packet to the IP stack 3005.

The IP stack 3005 adds the MAC address of the intranet 3 side within the Firewall 33 to the packet received from the IP routing 3004 as a destination MAC address, further sets the MAC address of its own node to the transmission source MAC address, thereby to generate a frame, and transfers it to the driver 3007 through the bridge 3008.

The driver 3007 receives the frame from the bridge 3008, and transfers it to the MAC 3011.

The MAC 3011 receives the frame from the driver 3007, and transfers it the PHY 3012.

The PHY 3012 receives the frame from the MAC 3011, and transfers it the port 3013.

The port 3013 receives the frame from the PHY 3012, and transfers it the HUB 32 through the Ethernet cable.

Upon receipt of the frame, the HUB 32 makes a reference to the MAC DA, and outputs this frame to the port of the Firewall 33 side as it stands based upon a result of learning the past routing because the MAC DA is an MAC address of the LAN side of the Firewall 33.

The Firewall 33 receives the frame from the HUB 22, permits this for a purpose of communication from the gateway device 30 to the gateway device 20, and transfers it to the HUB 22.

The HUB 22 receives the frame from the Firewall 33, and transfers this frame to the gateway device 20 as it stands based upon a result of learning the past routing.

The gateway device 20 receives the frame from the HUB 22, and transfers it to the IP stack 2005 through the path of the port 2013, the PHY 2012, the processing speed acceleration engine 2014, the MAC 2011, the driver 2007, and the bridge 2008. At this time, the processing speed acceleration engine 2014 transfers the frame received from the PHY as it stands to the MAC 2011.

The IP stack 2005 receives the frame from the bridge 2008, removes the MAC header, thereby to convert it into a packet, and transfers it to the IP routing 2004.

The IP routing 2004 makes a reference to the destination port number of the packet received from the IP stack 2005, and transfers this packet to the UDP 2003 because the port number of the UDP 2003 side has been added.

The UDP 2003 receives the packet from the IP routing 2004. And, it informs the SSL 2002 of a report about reception of the session establishment request. As a result, the SSL 2002 commands the UDP 2003 to establish the session.

The UDP 2003 transmits a packet addressed to the UDP 3003 that is necessary for establishing the session. That is, the IP address of the gateway device 30 is set to the destination IP of the session establishment request packet, and the port number of the TCP 3003 to the destination port thereof.

The connection request packet arrives at the UDP 3003 through the path opposite to the session establishment request packet, i.e. the IP routing 2004, the IP stack 2005, bridge 2008, the driver 2007, the NIC 201, the HUB 22, the Firewall 33, the HUB 32, the NIC 301, the driver 3007, the bridge 3008, the IP stack 3005, and the IP routing 3004.

The UDP 3003 receives the packet from the IP routing 3004. It notifies completion of a connection of the UDP session with the UDP 2003 to the SSL 3002 because this packet is a request for establishing the UDP session.

The SSL 3002 receives the connection completion notification from the UDP 3003, and transmits a packet (SSL session establishment request packet) for requesting the session establishment according to the SSL protocol for a purpose of establishing the SSL session with the SSL 2002.

The SSL session establishment request packet, which is received in the UDP 3003, goes through the UDP session established between the UDP 3003 and the UDP within the intermediate driver 3006, and arrives at the UDP 2003 through the NIC 301, the HUB 32, the Firewall 33, the HUB 22, and NIC 201. At this moment, the processing speed acceleration engine 2014 within the NIC 201 transfers the packet received from the PHY 2012 as it stands to the MAC 2011.

The UDP 2003 transfers the packet to the SSL 2002.

The SSL 2002 verifies the content of the SSL session establishment request, notifies establishment of the session with the SSL 3002 to the processing speed acceleration engine control 2001 if it were not for a problem, and simultaneously therewith, transmits an SSL session establishment response packet to the SSL 3002 according to the SSL protocol.

The SSL session establishment response packet arrives at the SSL 3002 through the path opposite to that of the SSL session establishment request packet, i.e. the UDP session between the UDP 2003 and the intermediate driver 2006.

The SSL 3002 verifies the content of the SSL session establishment response according to the SSL protocol, and notifies establishment of the SSL session between the SSL 3002 and the SSL 2002 to the gateway application 3001A if it were not for a problem.

Upon receipt of the SSL session establishment notification from the SSL 2002, the processing speed acceleration engine control 2001 generates a control frame, transfers this frame through the path of the virtual NIC 2010, the driver 2009, the bridge 2008, the driver 2007, and the MAC 2011, and sends it to the processing speed acceleration engine 2014. The public key, the secret key, and the common key, the IP address (IP address of the gateway device 30) of a partner apparatus of the SSL session, the destination port (port of the UDP 3003) of a partner apparatus of the SSL session, the transmission source port number (port number of the UDP 2003) of the SSL session of its own node side, the transmission source IP address (IP address of the gateway device 20), and the start command are included in the control frame.

The processing speed acceleration engine 2014 identifies the control frame by use of the MAC address etc., and receives it in the control frame transmitter/receiver. And, it preserves the public key, the secret key, and the common key, respectively, for a purpose of using them in the decoding and the encryption, and preserves the IP address or the port number for a purpose of analyzing the frame. And upon receipt of a processing speed acceleration process start command, it starts the processes of the frame analysis, the encryption, and the decoding.

Prior to the processing speed acceleration process start command, the processing speed acceleration engine 2014 transmitted all frames received from the MAC 2011 other than the control frame to the PHY 2012 as they stood, and transmitted all frames received from the PHY 2012 to the MAC 2011 as they stood. However, after the processing speed acceleration process start command, it performs the following processes for the frames received from the PHY 2012 even though the operation of transmitting all frames received from the MAC 2011 other than the control frame to the PHY 2012 as they stands remains unchanged.

(1) If the frame is a frame addressed to the gateway device 20, and yet a frame encrypted in the SSL 3002, it undoes the encapsulation such as the UDP, undoes the fragmentation if necessary, and decodes the frame and transmits it to the PHY 2012 side.

(2) If the frame is a frame addressed to its own node except for (1), it transfers the frame to the MAC 2011.

(3) If the frame is a broadcast frame, or a multicast frame, it copies the frame, transfers one copy to the MAC 2011 as it stands, and encrypts and encapsulates the other, which is transmitted to the SSL 3002 (PHY 2012 side). The frame is also fragmented if necessary.

(4) If the frame is a frame other than (1) to (3), it encrypts and encapsulates the frame, and transmits the frame to the SSL 3002 (PHY 2012 side). The frame is also fragmented if necessary.

As mentioned above, the session for transferring the frame causing not the congestion control such as the UDP is established between the processing speed acceleration engine 2014 and the UDP 3003. Further, the SSL session is established between the processing speed acceleration engine 2014 and the SSL 3002.

That is, the SSL 2002 exchanges the frame with the SSL 3002 only at the time of requesting establishment of the session; however when the establishment of the session is finished, thereafter, information of the encryption and the decoding of the SSL is exchanged between the processing speed acceleration engine 2014 and the SSL 3002.

Further, the UDP 3003 exchanges the frame with the UDP 2003 only at the time of requesting establishment of the session; however after the SSL session has been established, the frame is exchanged between the processing speed acceleration engine 2014 and the UDP 3003.

Above, in the eleventh embodiment, the operation in the case of establishing the SSL session (secure UDP session) from the gateway device 30 to the gateway device 20 is completed.

[An Operation of Transferring the Frame from the Terminal 21 to the Server 31]

The case of transferring the frame from the terminal 21 to the server 31 in the eleventh embodiment will be exemplified for to explain the operation by employing FIG. 30.

At this moment, it is assumed that the bridge 2008, the bridge 3008, the HUB 22 and the HUB 32 have already learned the MAC addresses of the terminal 21, the server 31, Firewall 33, the gateway device 20, and the gateway device 30.

Further, it is assumed that the Firewall 33 permits communication between the gateway device 20 and the gateway device 30 in a bi-direction, and interrupts direct communication between the terminal 21 and the server 31, which does not go through the gateway device 20 or the gateway device 30, in a bi-direction.

Further, it is assumed that the SSL session (secure UDP session) from the gateway device 30 to the gateway device 20 has already established according to the foregoing operational example.

Further, it is assumed that the TCP session has been already constructed between the application 2101 within the terminal 21 and the application (application 3101) within the server 31.

The application 2101 within the terminal 21 delivers data addressed to the application 3101 within the server 31 to the TCP 2102.

The TCP 2102 receives the data from the application 2101, attaches the TCP header (F23 in FIG. 2) or the IP header (F22 in FIG. 2) according to the TCP protocol, thereby to convert it into an IP packet, and delivers it to the IP routing 2103. At this time, the IP address of the server 31 is set to the IP DA within the LAN IP F22, and the IP address of the terminal 21 to the IP SA within the LAN IP F22.

The IP routing 2103 makes a reference to the destination IP address (addressed to the server 31) and the destination port (addressed to the TCP 3102) of the packet received from the TCP 2102, and transfers the data to the IP stack 2104 as it stands.

The IP stack 2104 receives the packet from the IP routing 2103, attaches the MAC header (F21 in FIG. 2), thereby to prepare an Ethernet frame, and delivers it to the driver 2105. This frame has a format of the Ethernet frame F20. At this time, the IP stack 2104 makes a reference to a result of the ARP, and sets the MAC address of the server 31 to the MAC DA within the LAN MAC F21 of the frame, and the MAC address of the terminal 21 to the MAC SA within the LAN MAC F21.

The driver 2105 receives the above-mentioned frame from the IP stack 2105, and transfers it to the NIC 211.

The NIC 211 receives the frame from the driver 2105, and transfers it to the HUB 22 through the MAC 2111, the PHY 2112, and the port 2113.

Upon receipt of the frame from the port of the NIC 211 side of the terminal 21, the HUB 22 makes a reference to the MAC DA within F21, and outputs this frame to the port of the gateway device 20 side as it stands based upon a result of learning the past routing because the MAC DA is an MAC address of the server 31.

The NIC 201 within the gateway device 20 receives the frame transmitted by the HUB 22 in the port 2013, and delivers it to the processing speed acceleration engine 2014 through the PHY 2012.

The processing speed acceleration engine 2014 encrypts the frame in the encryption 2014G within the processing speed acceleration engine 2014 to prepare the data F14 in FIG. 3 because the destination MAC of the frame that has arrived is addressed to the server 31, further attaches each header of F11 to F13 in FIG. 3 in the encapsulation 2014I, thereby to convert it into a formatted frame having the Ether-over-SSL frame F10, and transfers it to the PHY 2012 again.

At this time, the MAC address of the WAN side of the Firewall 33 is set to the MAC DA within the INET MAC F11, and the MAC address of the gateway device 20 to the MAC SA within F11. Further, the IP address of the gateway device 30 is set to the IP DA within the INET IP F12, and the IP address of the gateway device 20 to the IP SA within F12. With the INET TCP F13, the UDP 3003 is set to the destination port, and the UDP 2003 is set to the transmission source port (In this embodiment, it is assumed that the Firewall 33 permits the UDP communication).

Upon receipt of the frame from the processing speed acceleration engine 2014, the PHY 2012 transfers the frame to the HUB 22 through the port 2013.

Upon receipt of the frame from the port of the gateway device 22 side, the HUB 22 makes a reference to the MAC DA within F11, and outputs this frame to the Firewall 33 as it stands based upon a result of learning the past routing because the MAC DA is an MAC address of the WAN side of the Firewall 33.

The Firewall 33 receives the frame transmitted by the HUB 22, makes a reference to the IP DA to change the MAC header F11, and transfers the received frame with a form of the frame format F10 unchanged to the HUB 32.

Herein, the MAC address of the gateway device 30 is set to the MAC DA within F11, and the MAC address of the LAN side of the Firewall 33 to the MAC SA within F11.

Upon receipt of the frame transmitted by the Firewall 33, the HUB 32 makes a reference to the MAC DA within F11, and outputs this frame to the port of the gateway device 30 as it stands based upon a result of learning the past routing because the MAC DA is an MAC address of the gateway device 30.

Upon receipt of the frame transmitted by the HUB 32 in the port 3013, the gateway device 30 transfers it to the IP stack 3005 through the PHY 3012, the MAC 3011, the driver 3007, and the bridge 3008.

The IP stack 3005 removes the MAC header F11 of the frame received from the bridge 3008, and sends the frame to the IP routing 3004.

The IP routing 3004 makes a reference to the IP DA within the header F12 and the destination port number within F13 of the received frame, and transfers the frame to the TCP 3003.

Upon receipt of the frame from the IP routing 3004, the UDP 3003 removes the UDP header F13 and the IP header F12 from the received frame, and transfers data F14 to the SSL 3002.

Upon receipt of the data F14 from the UDP 3003, the SSL 3002 undoes the encryption with decoding process, takes out an Ethernet frame F20, i.e. F21 to F24, from the data F14, and transfers it to the gateway application 3001A.

Upon receipt of the frame F20 from the SSL 3002, the gateway application 3001A allows this frame to flow to the virtual NIC 3010 as it stands.

This frame keeps the state at the time of having been transmitted from the terminal 21 to the HUB 22 as it stands, in which the MAC address of the server 31 has been set to the MAC DA within the LAN MAC F21, and has the MAC address of the terminal 21 to the MAC SA within the LAN MAC F21. Further, the IP address of the server 31 has been set to the IP DA within the LAN IP F22, and the IP address of the terminal 21 to the IP SA within the LAN IP F22.

The frame delivered to the virtual NIC 3010 from the gateway application 3001A is transferred to the HUB 32 through the driver 3009, the bridge 3008, and the NIC 301.

Upon receipt of the frame from the port of the gateway device 30 side, the HUB 32 makes a reference to the MAC DA within F21, and outputs this frame to the port of the server 31 side as it stands based upon a result of learning the past routing because the MAC DA is an MAC address of the server 31.

The server 31 receives the frame transmitted by the HUB 32, and delivers the data F24 within the frame to the application 3101 through the driver 3105, the IP stack 3104, the IP routing 3103, and the TCP 3102.

As mentioned above, a series of the frame transfer from the application 2101 within the terminal 21 to the application 3101 within the server 31 is completed.

A series of the frame transfer from the application 3101 within the server 31 to the application 2101 within the terminal 21 also can be realized similarly by tracing the path opposite to that of the above-mentioned example.

In this embodiment, an example was shown of packaging the processing speed acceleration engine in the gateway device 20 side; however, contrarily hereto, it is also possible to package the processing speed acceleration engine in the gateway device 30 side. In addition hereto, it is also possible to exchange the installation location of the server 31 for that of the terminal 21 in this embodiment.

[Effects of the Invention]

Next, effects of this embodiment will be explained.

Utilizing the invention listed in this embodiment enables a high-speed transfer of the frame between the terminal 21 and the server 31.

The reason is that utilizing the processing speed acceleration engine makes it possible to exclude the encapsulation process and the encryption/decoding process by the CPU (software process) in the gateway device 20, and to realize all these processes with the processing speed acceleration engine (hardware).

Further, utilizing the invention listed in this embodiment enables the cost for developing the hardware (processing speed acceleration engine) for the processing speed acceleration process and the cost for members to be suppressed at a relatively low level.

The reason is that the encryption/decoding and the encapsulation can be executed on identical hardware (FPGA/ASIC).

Further, the reason is that the hardware can be packaged into the relatively inexpensive interface between the MAC and the PHY.

Further, the reason is that it is possible to leave the TCP process, which is difficult to package into the hardware, to the software, and to hardware-process only the encryption/decoding and the encapsulation, which are relatively easy to package into the hardware and yet have a large effect upon the processing speed acceleration process.

[Twelfth Embodiment]

The twelfth embodiment of the present invention is configured so that a plurality of the sessions are handled in the processing speed acceleration engine 2014, differently from the case of the first embodiment.

[Explanation of a Configuration]

Figure 31:
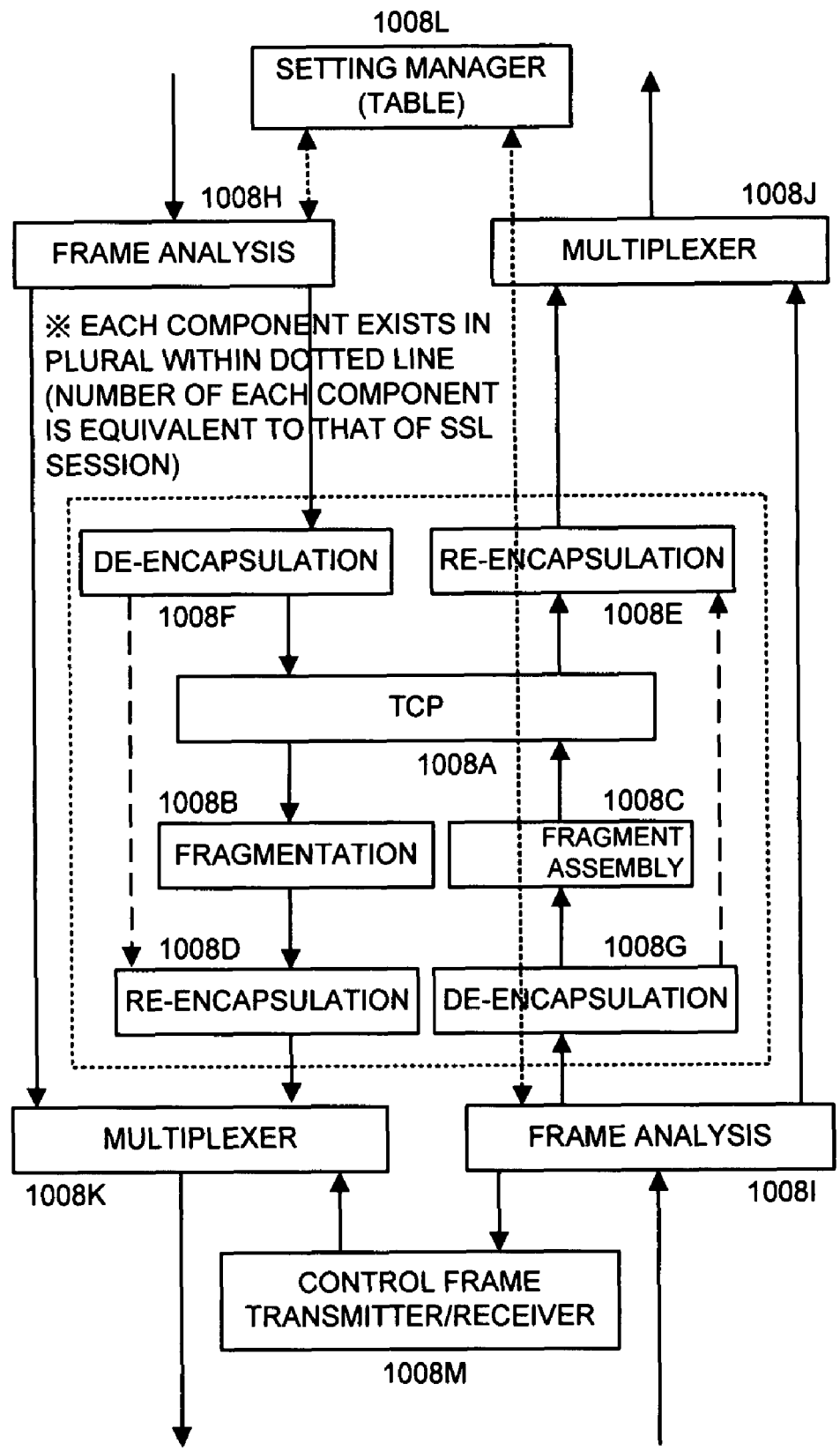
FIG. 31 is a block diagram illustrating a configuration of an intermediate driver 1008 in a twelfth embodiment of the present invention.

FIG. 31 is a block diagram illustrating a configuration of the intermediate driver 1008 in this embodiment. The intermediate driver 1008 in this embodiment differs from the intermediate driver 1008 in the first embodiment shown in FIG. 7 in a point of having a table within the setting manager 1008L, and of being capable of preserving information of a plurality of the sessions.

In addition hereto, it differs in a point that the frame analysis 1008H and the frame analysis 1008I make a reference to the table within the setting manager 1008L, and decide the transferee of the received frame.

The frame analysis 1008H receives the frame from the IP stack 1007, and searches the table within the setting manager 1008L with header information of the frame assumed to be a key in the following order.

(1) It makes a search as to whether the frame is a frame relating to the processing speed acceleration process. In a case where the frame is a frame relating to the processing speed acceleration process, it transfers the frame to the de-encapsulation 1008F. It is determined based upon the MAC address, the IP address, the TCP header, the UDP header, etc. whether or not the frame is a frame relating to the processing speed acceleration process.

(2) If, as a result of the search, the frame is another frame, it transfers the frame to the multiplexer 1008K.

The frame analysis 1008I receives the frame from the driver 1009, and searches the table within the setting manager 1008L with header information of the frame assumed to be a key in the following order.

(1) It makes a search as to whether the frame is a frame relating to the processing speed acceleration process.

In a case where the frame is a frame relating to the processing speed acceleration process, the frame analysis 1008I transfers the frame to the de-encapsulation 1008G. It is determined based upon the MAC address, the IP address, the TCP header, the UDP header, etc. whether or not the frame is a frame relating to the processing speed acceleration process.

(2) It makes a search as to whether the frame is a special frame (hereinafter, referred to as a control frame) relating to a control of the appliance or the processing speed acceleration engine.

If, as a result of the search, the frame is a control frame, it transfers the frame to the control frame transmitter/receiver 1008M. It is usually determined based upon the MAC DA and the MAC SA whether or not the frame is a special frame. The frame analysis 1008I searches the table with the MAC DA or the MAC SA assumed to be a key, and determines that the frame is a control frame in a case where the MAC address (referred to as an MAC address for control. for example, 00004C0000xx) within the address range pre-registered in the table is described.

(3) If, as a result of the search, the frame is another frame, it transfers the frame to the multiplexer 1008J.

The setting manager 1008L has the following functions.

(1) It receives a notification about information (the MAC address, the IP address, the port number, etc.) of the session relating to the processing speed acceleration process from the relay application 1001, and preserves it in the table.

(2) It receives a notification about the MAC address of the special frame from the relay application 1001, and preserves it in the table.

(3) It searches the table responding to a request by the frame analysis 1008H and the frame analysis 1008I, and informs them of its result.

Information of not only one session portion of the MAC address, the IP address, the port number, etc. but also a plurality of the portions thereof can be stored in the table.

Figure 32:
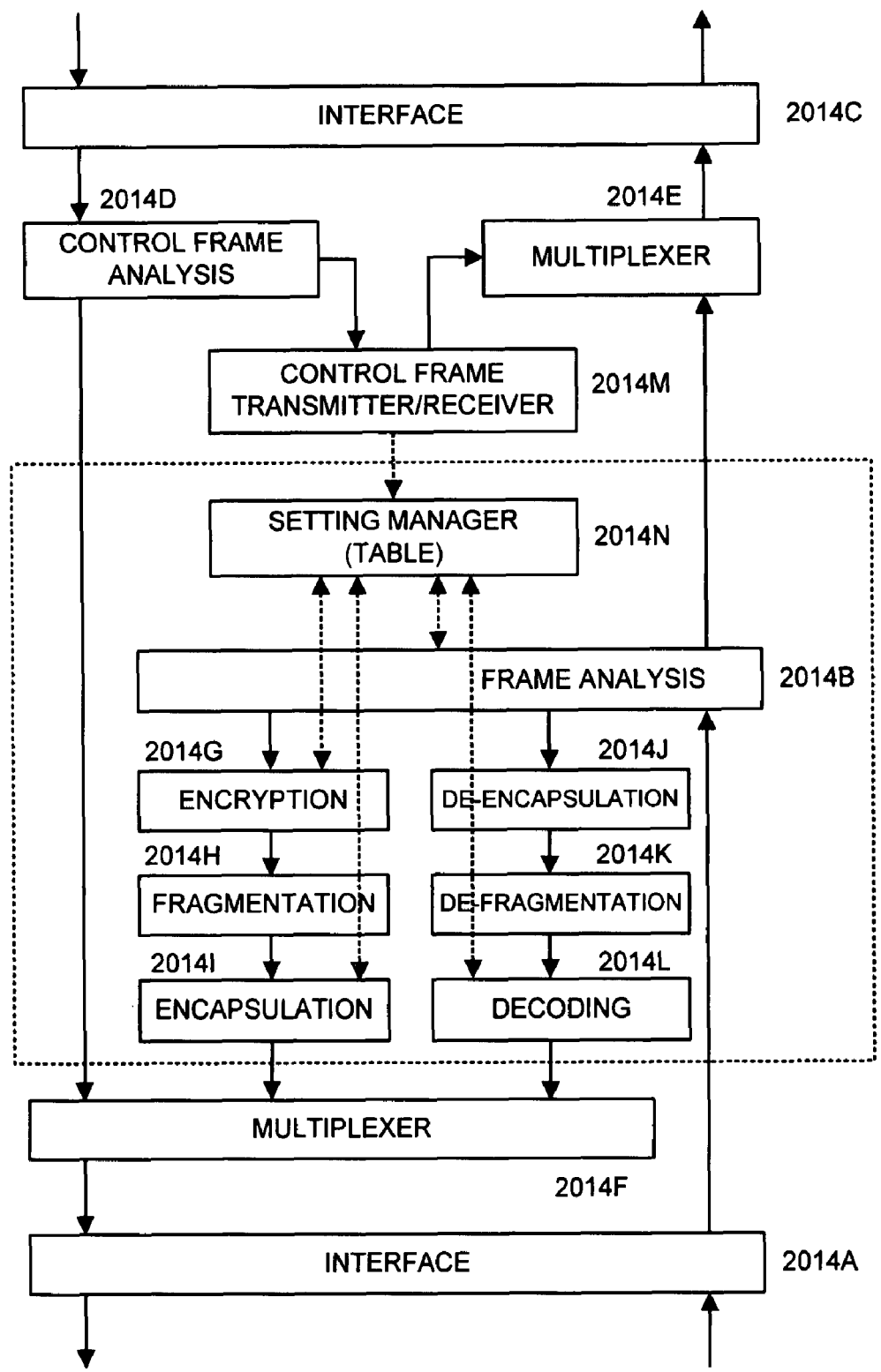
FIG. 32 is a block diagram illustrating a configuration of a processing speed acceleration engine 2014 in the twelfth embodiment of the present invention.

FIG. 32 is a block diagram illustrating a configuration of the processing speed acceleration engine 2014 in this embodiment. The processing speed acceleration engine 2014 in this embodiment differs from the processing speed acceleration engine 2014 in the first embodiment shown in FIG. 12 in a point of including a setting manager 2014N, and of being capable of preserving information of a plurality of the sessions.

Further, the frame analysis 2014B makes a reference to the table within the setting manager 2014N to decide the transferee of the received frame, and in addition hereto, each of the encryption 2014G, the decoding 2014L, and the encapsulation 2041I as well makes a reference to the table within the setting manager 2014N to obtain information of the public key, secret key and common key suitable for the session, the header, etc.

The frame analysis 2014B receives the frame from the interface 2014A, decides the destination in the order of (1) to (4) shown below, and transfers the frame.

(1) It searches the table within the setting manager 2014N, and in a case where the frame is a frame addressed to its own node, and yet a frame hit in the search (in a case where the frame is a frame of a pre-established SSL session, i.e. a frame encrypted by the session relay devise 10), transfers the frame to the de-encapsulation 2014J. At this time, it delivers session ID information as well received from the setting manager together therewith.

(2) If the frame is a frame addressed to its own node other than (1) (in a case where the frame is a frame addressed to its own node, and yet a frame that has not been hit in searching the table within setting manager 2014N), it transfers the frame to the multiplexer 2014E.

(3) If the frame is a broadcast frame in which a broadcast MAC has been added to the MAC DA, or a multicast frame in which a multicast MAC has been added to the MAC DA, it copies this frame, and transfers a copy to the multiplexer 2014E and the encryption 2014G, respectively. Supposing that a plurality of the sessions have been registered into the setting manager 2014N, it copies the frame by the number equivalent to the number of the registered sessions, and delivers them to the encryption 2014G together with the session ID that is obtained from the setting manager 2014N.

(4) If the frame is a frame other than (1) to (3), it transfers the frame to the encryption 2014G. Supposing that a plurality of the sessions have been registered into the setting manager 2014N, it copies the frame by the number equivalent to the number of the registered sessions, and delivers them to the encryption 2014G together with the session ID that is obtained from the setting manager 2014N.

The control frame analysis 2014D receives the frame from the interface 2014C, and in a case where the frame is a special frame (hereinafter, referred to as a control frame) relating to a control of the processing speed acceleration engine, transfers the frame to the control frame transmitter/receiver 2014M. In a case where the frame is not a special frame, it transfers the frame to the multiplexer 2014F. It is usually determined Whether or not the frame is a special frame from the MAC DA and the MAC SA. In a case where the MAC address (called a MAC address for a control. For example, 00004C000000 to FF) within a pre-specified address range is described in any of the MAC DA and the MAC SA, it determines that the frame is a control frame.

The encryption 2014G receives the frame from the frame analysis 2014B, encrypts it with the method such as 3DES, and transfers it to the fragmentation 2014H. The public key and the common key obtained from a result of having searched the table within the setting manager 2014N with the session ID notified by the frame analysis 2014B assumed to be a key are utilized as a public key that is employed for the encryption.

The encapsulation 2014I performs an operation similar to that of the re-encapsulation 1008D within the intermediate driver 1008 shown in FIG. 7. That is, it adds each header of the INET MAC F11, the INET IP F12, and an INET TCP F13 to the data (F14 in FIG. 3) that is sent from the fragmentation 2014H, and transfers it to the multiplexer 2014F. The value of the header obtained from a result of having searched the table within the setting manager 2014N with the session ID assumed to be a key is utilized as a value of each of the headers F11 to F13 that is added. Additionally, it is also possible to set not the TCP header but the UDP header to a position of the INET TCP F13, depending upon the setting.

The reason why the TCP header F13 is added in the encapsulation 2041I is that the packet is prevented from being interrupted due to the Firewall, the NAT router, etc. (Firewall 23 in an example of FIG. 1) that exist in the communication path. In a case of having set the UPD header to F13, there is a possibility that communication is interrupted if the Firewall, the NAT router, etc. exist on the communication path. The TCP header added in the encapsulation 2014I, of which the frame format has a form of the TCP, is not employed for the congestion control and the re-sending control as a matter of fact because the TCP is not an added header. The header F13 that is added herein is totally for allowing the packet to pass through the Firewall and the NAT router, and the actual congestion control and re-sending control are taken by the TCP (a TCP header portion of F23 in the frame format F10 of FIG. 3) that exists within the terminal 21 or the server 31.

The decoding 2014L receives the frame from the de-fragmentation 2014K, decodes it with the method such as the 3DES, and transfers it to the multiplexer 2014F. The secret key and the common key obtained from a result of having searched the table within the setting manager 2014N with the session ID assumed to be a key are utilized as a public key that is employed for the decoding.

The control frame transmitter/receiver 2014M transmits/receives the control frame to/from the control frame transmitter/receiver 1008M within the intermediate driver 1008 shown in FIG. 7. The control frame transmitter/receiver 2014M sends a special frame (hereinafter referred to as a control frame) relating to a control of the processing speed acceleration engine to the multiplexer 2014E, and further receives the control frame from the control frame analysis 2014D. And, it preserves setting parameters or the like received by the control frame in the table within the setting manager 2014N. Herein, supposing that a command of starting and ending the processing speed acceleration process has been received with the control frame, the control frame transmitter/receiver 2014M notifies its effect to the frame analysis 2014B. The following information is transmitted/received in the control frame transmitter/receiver.

(1) The IP address or the destination port of a partner appliance (session relay device 10) of the SSL session, the transmission source port number or the transmission source IP address of the SSL session of its own node (gateway device 20) side, and further the destination MAC address and the transmission source MAC address of its own node.

(2) The public key
(3) The secret key
(4) The common key
(5) Information about starting and ending the processing speed acceleration process The setting manager 2014N obtains the setting information sent by the control frame transmitter/receiver 2014M, and preserves it in a table format session by session. Further, it searches the table with the method of (1) to (3) shown below responding to a request by the encryption 2014G, the decoding 2014L, and the frame analysis 2014B, and gives a result as a reply. It is possible for the setting manager 2014N to preserve information equivalent to a portion of a plurality of the sessions by use of the table, to search the table responding to a request, and to give appropriate information as a reply.

(1) It gives the public key and the common key of the session as a reply that correspond to the search key (session ID) for a search request by the encryption 2014G.

(2) It gives the secret key and the common key of the session as a reply that correspond to the search key (session ID) for a search request by the decoding 2014L.

(3) It gives an ID of the session as a reply that correspond to the search key (the MAC address, the IP address, and the port) for a search request by the frame analysis 2014B if the appropriate one is hit in the search. If the appropriate one is not hit, it gives its effect as a reply.

[Explanation of an Operation]

An operation in the twelfth embodiment is almost identical to that of the first embodiment, so its content is omitted.

In this embodiment, it is possible to dynamically establish the SSL session and, further to disconnect this responding to the header of the received packet because a plurality of the sessions can be established. In this case, the IP address of the construction destination of the session is decided with the method such as learning and BGP.

[Effects of the Invention]

Next, effects of this embodiment will be explained.

Utilizing the invention listed in this embodiment enables a high-speed transfer of the frame between the terminal 21 and the server 31.

The reason is that utilizing the processing speed acceleration engine makes it possible to exclude encapsulation process and the encryption/decoding process by the software in the gateway device 20 or the gateway device 30, and to realize all these processes with the processing speed acceleration engine (hardware).

In addition hereto, the reason is that the TCP is terminated in the intermediate driver within the session relay device, and in the intermediate driver within the gateway device and occurrence of the TCP-over-TCP problem is avoided so as to prevent the congestion control and the re-sending control due to the TCP at a position of the header F13 from occurring in communication between the gateway session and the session relay device.

Further, utilizing the invention listed in this embodiment enables the cost for developing the hardware (processing speed acceleration engine) for the processing speed acceleration process and the cost for members to be suppressed at a relatively low level.

The reason is that the encryption and decoding, and the encapsulation can be executed on identical hardware (FPGA/ASIC).

Further, the reason is that the hardware can be packaged into the relatively inexpensive interface between the MAC and the PHY.

Further, the reason is that it is possible to leave the TCP process, which is difficult to package into the hardware, to the software, and to hardware-process only the encryption/decoding and encapsulation, which are relatively easy to package into the hardware and yet have a large effect upon the processing speed acceleration process.

Above, the present invention has been described with reference to the preferred embodiments and examples; however the present invention, which is not always limited to the above-mentioned embodiments and examples, can be carried out by making an alteration hereto in various ways within the scope of the technical spirit of the present invention.

Additionally, in the configuration of each foregoing embodiment, the part that is configured with the software, and the part that is configured with the hardware were separated for explanation, and the parts that are configured with the software and the hardware are not limited to the above-mentioned embodiments.

[How the Invention is Capable of Industrial Exploitation]

The present invention is applicable to an Internet VPN device and an Internet VPN system that enables communication by means of the Internet layer between the LANs, each of which is a base of the enterprise, via the WAN such as Internet.

Further, it is applicable to a remote access device and a remote access system that enables communication from the terminal over the WAN such as Internet to the LAN, being a base of the enterprise, at an Ethernet level.

The first effect of the above-mentioned present invention lies in a point of enabling a high-speed transfer of the frame.

The reason is that utilizing the processing speed acceleration engine makes it possible to exclude the encapsulation process and the encryption/decoding process by the CPU (software process) in the gateway device, and to realize all these processes with the processing speed acceleration engine (hardware).

In addition hereto, the reason is that the TCP is terminated in the intermediate driver within the session relay device, and in the intermediate driver within the gateway device and occurrence of the TCP-over-TCP problem is avoided so as to prevent the congestion control and the re-sending control due to the TCP at a position of the header F13 from occurring in communication between the gateway device and the session relay device.

Further, the reason is that the TCP within the terminal 21, and the TCP within the server 31 are terminated in the intermediate driver within terminal 21 and in the intermediate driver within the server 31, respectively, and occurrence of the TCP-over-TCP problem is avoided so as to prevent the congestion control and the re-sending control due to the TCP at a position of the header F23 from occurring in communication between the terminal 21 and the server 31.

Further, the reason is that the encryption and the decoding are hardware-processed in the gateway device, thereby allowing the process of the SSL to be performed at a high speed.

The second effect of the present invention lies in a point that the cost for developing the hardware (processing speed acceleration engine) for the processing speed acceleration process and the cost for members can be suppressed at a relatively low level.

The reason is that the encryption/decoding, and the encapsulation can be executed on identical hardware (FPGA/ASIC).

Further, the reason is that the hardware can be packaged into the relatively inexpensive interface between the MAC and the PHY.

Further, the reason is that it is possible to leave the TCP process, which is difficult to package into the hardware, to the software, and to hardware-process only the encryption/decoding and encapsulation, which are relatively easy to package into the hardware and yet have a large effect upon the processing speed acceleration process.

The invention claimed is:

1. A communication system, comprising:
 a first terminal which transmits a frame in a first TCP session; and
 a first communication device comprising i) a central processing unit establishing a second TCP session over the first TCP session in order to transfer the frame received from the first terminal, and ii) an intermediate driver which terminates the second TCP session established by the central processing unit in the first communication device in order to terminate the second TCP session inside the first communication device and then transfers the frame through the first TCP session to a second terminal,
 wherein the first communication device that receives the frame from the first terminal over the first TCP connection is the only device that establishes the second TCP connection over the existing first TCP connection so that the second TCP connection does not occur elsewhere over the Internet.

2. The communication system according to claim 1, wherein said first communication device further comprises a transferring means which deletes header information included in the frame as received from the first terminal and transfers the frame, with the header information deleted, back to the second terminal.

3. The communication system according to claim 2, wherein,
 said transferring means comprises an encrypting means for preserving an encryption key that is used in employing said first TCP session to make encrypted communication, and upon receipt of a processing speed acceleration process start command, employing this preserved encryption key to encrypt or decode the frame.

4. The communication system according to claim 2, wherein,
 said transferring means comprises an encrypting key acquiring means for acquiring an encryption key that is used in employing the first TCP session to make encrypted communication,
 an encryptor for preserving said acquired encryption key, and upon receipt of a processing speed acceleration process start command, employing the preserved encryption key to encrypt the frame for transmission as an encrypted frame,
 an encapsulator for adding an encryption header and an encapsulation header to said encrypted frame,
 a de-encapsulator for deleting the encryption header and the encapsulation header from the received frame, and
 a decoder for employing said preserved encryption key to decode the frame from which said encryption header and said encapsulation header have been deleted.

5. A communication system, comprising:
 a first terminal which creates a first SSL session and transmits an Ether-over-SSL frame in a first TCP session; and
 a first communication device comprising i) a central processing unit establishing a second TCP session over the first TCP session in order to transfer the frame received from the first terminal, and ii) an intermediate driver which terminates the second TCP session established by the central processing unit in the first communication device in order to terminate the second TCP session inside the first communication device and then transfers the frame of the first TCP session to a second terminal within the first SSL, wherein the first communication device that receives the frame from the first terminal over the first TCP connection is the only device that establishes the second TCP connection over the existing first TCP connection so that the second TCP connection does not occur elsewhere over the Internet.

6. A communication device, comprising:

a central processing unit configured for receiving a frame of a first TCP session from a first terminal, the central processing unit establishing a second TCP session over the first TCP session in order to transfer the frame received from the first terminal; and an intermediate driver which terminates the second TCP session established by the central processing unit in the first communication device in order to terminate the second TCP session inside the first communication device and then transfers the frame of the first TCP session to a second terminal, wherein the first communication device that receives the frame from the first terminal over the first TCP connection is the only device that establishes the second TCP connection over the existing first TCP connection so that the second TCP connection does not occur elsewhere over the Internet.

7. The communication device according to claim 6, further comprising a transferring means which deletes header information included in the frame as received from the first terminal and transfers the frame back to the second terminal.

8. The communication device according to claim 7, wherein said transferring means comprises an encrypting means for preserving an encryption key that is used in employing said first TCP session to make encrypted communication, and upon receipt of a processing speed acceleration process start command, employing this preserved encryption key to encrypt or decode the frame.

9. The communication device according to claim 7, wherein, said transferring means comprises an encrypting key acquiring means for acquiring an encryption key that is used in employing the first TCP session to make encrypted communication, an encryptor for preserving said acquired encryption key, and upon receipt of a processing speed acceleration process start command, employing the preserved encryption key to encrypt the frame for transmission as an encrypted frame, an encapsulator for adding an encryption header and an encapsulation header to said encrypted frame, a de-encapsulator for deleting the encryption header and the encapsulation header from the received frame, and a decoder for employing said preserved encryption key to decode the frame from which said encryption header and said encapsulation header have been deleted.

10. A communication method of making communication via a TCP session, comprising:

a call-origination step of a first terminal transmitting a frame in a first TCP session; and a connecting step of a first communication device receiving the frame over the first TCP session from the first terminal, the first communication device comprising i) a central processing unit establishing a second TCP session over the first TCP session in order to transfer the frame received from the first terminal, and ii) an intermediate driver terminating the second TCP session established by the central processing unit in the first communication device in order to terminate the second TCP session inside the first communication device and then transferring the frame of the first TCP session to a second terminal, wherein the first communication device that receives the frame from the first terminal over the first TCP connection is the only device that establishes the second TCP connection over the existing first TCP connection so that the second TCP connection does not occur elsewhere over the Internet.

11. The communication method according to claim 10, wherein said connecting step further comprises:

an acquiring step of acquiring an encryption key that is used in employing the first TCP session to make encrypted communication; and an encryption step of, upon receipt of a processing speed acceleration process start command, employing said preserved encryption key to encrypt the frame for transmission as an encrypted frame.

12. The communication method according to claim 10, wherein said connecting step comprises:

an acquiring step of acquiring an encryption key that is used in employing the first TCP session to make encrypted communication; and a decoding step of, upon receipt of a processing speed acceleration process start command, employing said preserved encryption key to decode the frame transmitted from the first terminal.

13. The communication method according to claim 11, wherein said connecting step comprises:

an acquiring step of acquiring an encryption key that is used in employing the first TCP session to make encrypted communication; and a decoding step of, upon receipt of a processing speed acceleration process start command, employing said preserved encryption key to decode the frame transmitted from the first terminal.

14. A communication method of making communication via a TCP session, comprising:

using a communication device comprised of a central processing unit, to receive a frame of a first TCP session from a first terminal, the central processing unit establishing a second TCP session over the first TCP session in order to transfer the frame received from the first terminal;

using an intermediate driver of the communication device, terminating the second TCP session established by the central processing unit in the first communication device in order to terminate the second TCP session inside the first communication device and then transferring the frame of the first TCP session to a second terminal, including an encryption key acquisition step of acquiring an encryption key that is used in employing the first TCP session to make encrypted communication;

an encryption step of preserving said acquired encryption key, and upon receipt of a processing speed acceleration process start command, employing the preserved encryption key to encrypt the frame for transmission as an encrypted frame;

a transmission step of adding an encryption header and an encapsulation header to said encrypted frame, and transmitting said encrypted frame in the first TCP session to a second terminal;

a de-encapsulation step of deleting the encryption header and the encapsulation header from the received frame; and a decoding step of employing said preserved encryption key to decode the frame from which said encryption header as well as said encapsulation header have been deleted, wherein the first communication device that receives the frame from the first terminal over the first TCP connection is the only device that establishes the second TCP connection over the existing first TCP connection so that the second TCP connection does not occur elsewhere over the Internet.

15. A non-transitory tangible computer readable medium storing a program of a communication device, the program causing said communication device to function as:

a communication device comprised of i) a central processing unit configured for receiving a frame of a first TCP session from a first terminal, the central processing unit establishing a second TCP session over the first TCP session in order to transfer the frame received from the first terminal; and ii) an intermediate driver which terminates the second TCP session established by the central processing unit in the first communication device in order to terminate the second TCP session inside the first communication device and then transfers the frame of the first TCP session to a second terminal, wherein the first communication device that receives the frame from the first terminal over the first TCP connection is the only device that establishes the second TCP connection over the existing first TCP connection so that the second TCP connection does not occur elsewhere over the Internet.

16. A non-transitory tangible computer readable medium storing a program of a communication device for making communication via a TCP session, said program causing said communication device to function as:

a receiver receiving a frame of a first TCP session from a first terminal, establishing a second TCP session over the first TCP session in order to transfer the frame received from the first terminal, terminating the second TCP session established in the first communication device in order to terminate the second TCP session inside the first communication device and then transferring the frame of the first TCP session to a second terminal;

an encryption key acquiring means for acquiring an encryption key that is used in employing the first TCP session to make encrypted communication;

an encryptor for preserving said acquired encryption key, and upon receipt of a processing speed acceleration process start command, employing this preserved encryption key to encrypt the frame for transmission as an encrypted frame;

an encapsulator for adding an encryption header and an encapsulation header to said encrypted frame, and transmitting the encrypted frame to a destination of the first TCP session;

a de-encapsulator for deleting the encryption header and the encapsulation header from the received frame; and a decoder for employing said preserved encryption key to decode the frame from which said encryption header and said encapsulation header have been deleted, wherein the first communication device that receives the frame from the first terminal over the first TCP connection is the only device that establishes the second TCP connection over the existing first TCP connection so that the second TCP connection does not occur elsewhere over the Internet.

* * * * *